United States Patent
Yamamoto et al.

(10) Patent No.: US 10,194,169 B2
(45) Date of Patent: Jan. 29, 2019

(54) METHOD FOR DECODING AN IMAGE, IMAGE DECODING APPARATUS, METHOD FOR ENCODING AN IMAGE, AND IMAGE ENCODING APPARATUS

(71) Applicant: SHARP KABUSHIKI KAISHA, Sakai, Osaka (JP)

(72) Inventors: Tomoyuki Yamamoto, Osaka (JP); Tomohiro Ikai, Osaka (JP); Yukinobu Yasugi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/642,574

(22) Filed: Jul. 6, 2017

(65) Prior Publication Data

US 2017/0310991 A1  Oct. 26, 2017

Related U.S. Application Data

(63) Continuation of application No. 14/347,523, filed as application No. PCT/JP2012/075200 on Sep. 28, 2012, now Pat. No. 10,075,733.

(30) Foreign Application Priority Data

Sep. 29, 2011 (JP) ................ 2011-215475
Nov. 4, 2011 (JP) ................ 2011-242843
Dec. 28, 2011 (JP) ................ 2011-289936

(51) Int. Cl.
  *H04N 19/13* (2014.01)
  *H04N 19/577* (2014.01)
  (Continued)

(52) U.S. Cl.
  CPC ......... *H04N 19/577* (2014.11); *H04N 19/105* (2014.11); *H04N 19/119* (2014.11);
  (Continued)

(58) Field of Classification Search
  CPC .... H04N 19/105; H04N 19/119; H04N 19/13; H04N 19/157; H04N 19/159;
  (Continued)

(56) References Cited

U.S. PATENT DOCUMENTS 7,215,818 B2  5/2007  Naito
7,292,731 B2  11/2007  Sekiguchi et al.
(Continued)

FOREIGN PATENT DOCUMENTS

| CN | 101001373 A | 7/2007 |
| EP | 2 744 204 A2 | 6/2014 |
| WO | WO 2006/082690 A1 | 8/2006 |

OTHER PUBLICATIONS

Wang et al, Hard-decision quantization with adaptive reconstruction levels for high efficiency video coding (Year: 2011).*
(Continued)

*Primary Examiner* — Shan E Elahi
(74) *Attorney, Agent, or Firm* — Birch, Stewart, Kolasch & Birch, LLP

(57) ABSTRACT

To achieve a reduction in the amount of coding taken in the use of an asymmetric partition and to implement efficient encoding/decoding processes exploiting the characteristics of the asymmetric partition. An image decoding device includes a motion compensation parameter derivation unit configured to derive a motion compensation parameter indicating either a uni-prediction scheme or a bi-prediction scheme. In a case that a prediction unit has a size less than or equal to a predetermined value, the motion compensation parameter derivation unit is configured to derive the motion compensation parameter by switching between the prediction schemes.

4 Claims, 78 Drawing Sheets

(51) Int. Cl.
*H04N 19/105* (2014.01)
*H04N 19/52* (2014.01)
*H04N 19/119* (2014.01)
*H04N 19/463* (2014.01)
*H04N 19/157* (2014.01)
*H04N 19/159* (2014.01)
*H04N 19/44* (2014.01)
*H04N 19/96* (2014.01)

(52) U.S. Cl.
CPC ........... *H04N 19/13* (2014.11); *H04N 19/157* (2014.11); *H04N 19/159* (2014.11); *H04N 19/44* (2014.11); *H04N 19/463* (2014.11); *H04N 19/52* (2014.11); *H04N 19/96* (2014.11)

(58) Field of Classification Search
CPC ...... H04N 19/44; H04N 19/463; H04N 19/52; H04N 19/577; H04N 19/96
USPC .................................................... 375/240.15
See application file for complete search history.

(56) References Cited

U.S. PATENT DOCUMENTS

| | | | |
|---|---|---|---|
| 7,365,659 B1 | 4/2008 | Hoffmann et al. | |
| 7,577,198 B2 | 8/2009 | Holcomb et al. | |
| 7,599,438 B2 | 10/2009 | Holcomb et al. | |
| 7,616,692 B2 | 11/2009 | Holcomb et al. | |
| 7,620,106 B2 | 11/2009 | Holcomb et al. | |
| 7,761,238 B2 | 7/2010 | Moser et al. | |
| 8,009,739 B2 | 8/2011 | Holcomb et al. | |
| 8,400,336 B2 | 3/2013 | He et al. | |
| 8,823,821 B2* | 9/2014 | Tian | H04N 7/181 348/218.1 |
| 9,866,859 B2* | 1/2018 | Zhou | H04N 19/463 |
| 2002/0080874 A1 | 6/2002 | Wilson | |
| 2005/0123207 A1 | 6/2005 | Marpe et al. | |
| 2006/0268166 A1 | 11/2006 | Bossen et al. | |
| 2007/0025442 A1 | 2/2007 | Okada et al. | |
| 2007/0183491 A1 | 8/2007 | Pearson et al. | |
| 2007/0217512 A1* | 9/2007 | Matsuda | H04N 19/105 375/240.16 |
| 2007/0237240 A1 | 10/2007 | Lee et al. | |
| 2008/0025398 A1 | 1/2008 | Molloy et al. | |
| 2008/0123972 A1* | 5/2008 | Sekiguchi | H04N 21/236 382/232 |
| 2008/0231483 A1 | 9/2008 | He et al. | |
| 2008/0304561 A1 | 12/2008 | Vanderheijden et al. | |
| 2008/0310503 A1 | 12/2008 | Lee et al. | |
| 2009/0002379 A1* | 1/2009 | Baeza | G06T 1/20 345/522 |
| 2009/0028427 A1 | 1/2009 | Yamada et al. | |
| 2009/0141811 A1 | 6/2009 | Mohan | |
| 2009/0175331 A1 | 7/2009 | Karczewicz et al. | |
| 2009/0175332 A1 | 7/2009 | Karczewicz et al. | |
| 2009/0296812 A1 | 12/2009 | Kim et al. | |
| 2010/0074332 A1 | 3/2010 | Karczewicz et al. | |
| 2010/0086032 A1 | 4/2010 | Chen et al. | |
| 2010/0127904 A1 | 5/2010 | Oxman et al. | |
| 2010/0208818 A1* | 8/2010 | Yin | H04N 19/176 375/240.15 |
| 2010/0329341 A1 | 12/2010 | Kam et al. | |
| 2011/0016388 A1 | 1/2011 | Tang et al. | |
| 2011/0038414 A1 | 2/2011 | Song et al. | |
| 2011/0090960 A1 | 4/2011 | Leontaris et al. | |
| 2011/0096826 A1 | 4/2011 | Han et al. | |
| 2011/0096834 A1 | 4/2011 | Cheon et al. | |
| 2011/0134998 A1* | 6/2011 | Lee | H04N 19/50 375/240.12 |
| 2011/0135000 A1 | 6/2011 | Alshina et al. | |
| 2011/0150075 A1 | 6/2011 | Pearson et al. | |
| 2011/0206289 A1 | 8/2011 | Dikbas et al. | |
| 2011/0228858 A1 | 9/2011 | Budagavi et al. | |
| 2012/0027089 A1 | 2/2012 | Chien et al. | |
| 2012/0075436 A1 | 3/2012 | Chen | |
| 2012/0189056 A1 | 7/2012 | Li et al. | |
| 2012/0230397 A1 | 9/2012 | Ouedraogo et al. | |
| 2012/0230421 A1* | 9/2012 | Chen | H04N 19/176 375/240.18 |
| 2012/0320984 A1* | 12/2012 | Zhou | H04N 19/50 375/240.16 |
| 2013/0034157 A1 | 2/2013 | Helle et al. | |
| 2013/0034171 A1 | 2/2013 | Winken et al. | |
| 2013/0058410 A1 | 3/2013 | Yasugi et al. | |
| 2013/0114671 A1* | 5/2013 | Chien | H03M 7/4018 375/240.02 |
| 2013/0202037 A1* | 8/2013 | Wang | H04N 19/52 375/240.15 |
| 2013/0259130 A1 | 10/2013 | Coban et al. | |
| 2014/0016701 A1* | 1/2014 | Chen | H04N 19/105 375/240.14 |
| 2014/0044161 A1 | 2/2014 | Chen et al. | |
| 2014/0092978 A1* | 4/2014 | Bugdayci | H04N 19/513 375/240.16 |
| 2014/0098880 A1 | 4/2014 | Seregin et al. | |
| 2014/0198846 A1* | 7/2014 | Guo | H04N 19/30 375/240.12 |
| 2014/0226719 A1 | 8/2014 | Yamamoto et al. | |
| 2014/0247868 A1 | 9/2014 | Oh et al. | |
| 2014/0269908 A1 | 9/2014 | Oh et al. | |
| 2014/0294078 A1 | 10/2014 | Seregin et al. | |

OTHER PUBLICATIONS

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, JCTVC-F803_d1, Sep. 8, 2011, 6th Meeting, Torino, IT, pp. 1-222.

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, JCTVC-F803_d5, Oct. 28, 2011, 6th Meeting, Torino, IT.

Chien et al., "Context modeling for asymmetric partitioning on partition mode," Joint Collaborative Team on Video Coding (JCT-VC) of ITU-T SG16 WP3 and ISO/IEC JTC1/SC29/WG11, 8th Meeting, Document: JCTVC-H0545, Feb. 1-10, 2012, pp. 1-2, XP30051951.

Chien et al., "Context reduction for CABAC," Joint Collaborative Team on Video Coding (JCT-VC) of ITU-T SG16 WP3 and ISO/IEC JTC1/SC29/WG11, 7th Meeting, Document: JCTVC-G718, Nov. 21-30, 2011, pp. 1-8, XP30110702.

European Search Report dated Jan. 5, 2015 for related European Application No. 12 83 5063.

Ikai (Sharp) T: "Bi-prediction restriction in small PU", 7.JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/, No. JCTVC-G307, Nov. 8, 2011, XP030110291.8.

International Search Report issued in PCT/JP2012/075200, dated Jan. 8, 2013.

Kim et al., "CE2: Test results of asymmetric motion partition (AMP)," Joint Collaborative Team on Video Coding (JCT-VC) of ITU-T SG16 WP3 and ISO/IEC JTC1/SC29/WG11, Jul. 2, 2011, 6th Meeting, Torino, pp. 1-10.

Macinnis, Alexander (Sandy), "Complexity Limitations for High Definition," Joint Video Team (JVT) of ISO/IEC MPEG & ITU-T VCEG (ISO/IEC JTC1/5C29/WG11 and ITU-T SG16 Q.6), Jul. 22, 2002, 4th Meeting, Klagenfurt, Austria, pp. 1-3.

Seregin et al., "Binarisation modification for last position coding," Joint Collaborative Team on Video Coding (JCT-VC) of ITU-T SG16 WP3 and ISO/IEC JTC1/SC29/WG11, 6th Meeting, Document: JCTVC-F375, Jul. 14-22, 2011, pp. 1-3, XP30009398.

Written Opinion issued in PCT/JP2012/075200, dated Jan. 8, 2013.

Yamamoto, "On CABAC context for partition mode," Joint Collaborative Team on Video Coding (JCT-VC) of ITU-T SG16 WP3 and ISO/IEC JTC1/SC29/WG11, 8th Meeting, Document: JCTVC-Hxxx, Feb. 1-10, 2012, pp. 1-3, XP30111126.

(56) References Cited

OTHER PUBLICATIONS

Yuan et al., "CE2: Non-Square Quadtree Transform for symmetric and asymmetric motion partition," Joint Collaborative Team on Video Coding (JCT-VC) of ITU-T SG16 WP3 and ISO/IEC JTC1/SC29/WG11, Jul. 2, 2011, 6th Meeting, Torino, IT, pp. 1-7.
Advisory Action issued in co-pending U.S. Appl. No. 14/347,523 dated Feb. 3, 2017.
Advisory Action issued in corresponding U.S. Appl. No. 14/348,499 dated Nov. 14, 2016.
Blasi et al, "Enhanced inter-prediction using marge prediction transformation in the HEVC CODEC," 2013.
Ezhilarasan et al, "An improved transformation technique for H.264/Advanced Video Coding," 2007.
Notice of Allowance issued in co-pending U.S. Appl. No. 14/347,523 dated Apr. 21, 2017.
Office Action issued in co-pending U.S. Appl. No. 14/347,523 dated Apr. 29, 2016.
Office Action issued in co-pending U.S. Appl. No. 14/347,523 dated Oct. 13, 2016.
Advisory Action issued in corresponding U.S. Appl. No. 14/348,499 dated Oct. 18, 2017.
U.S. Office Action issued in co-pending U.S. Appl. No. 14/347,523 dated Aug. 18, 2017.
U.S. Office action issued in co-pending U.S. Appl. No. 14/348,499 dated Jul. 10, 2017.
Office Action issued in corresponding U.S. Appl. No. 14/348,499 dated Feb. 2, 2017.
U.S. Office action issued in co-pending U.S. Appl. No. 14/348,499 dated Jun. 23, 2016.
Zernicki et al, "Improved coding of tonal components in MPEG-4 AAC with SBR," Aug. 25-28, 2008.
Office Action issued in co-pending U.S. Appl. No. 14/347,523 dated Jan. 2, 2018.
Office Action issued in co-pending U.S. Appl. No. 14/348,499 dated Feb. 6, 2018.
Winger "Reduced Decoder Peak Bus Bandwidth", 3.JVT Meeting; 60. MPEG Meeting; May 6, 2002-May 10, 2002; Fairfax, US; (Joint Video Team of ISO/IEC JTC1/SC29/WG11 and ITU-T SG.16), No. JVT-C115, May 10, 2002, XP030005225.
Advisory Action issued in co-pending U.S. Appl. No. 14/347,523 dated Apr. 13, 2018.
Office Action Issued in co-pending U.S. Appl. No. 16/118,820 dated Oct. 19, 2018.

* cited by examiner

FIG. 5

| CU | | PU partitioning type | | | | | | | | Intra | |
|---|---|---|---|---|---|---|---|---|---|---|---|
| | | Inter | | | | | | | | | |
| size | d | 2Nx2N | 2NxN | 2NxnU | 2NxnD | Nx2N | nLx2N | nRx2N | NxN | 2Nx2N | NxN |
| 64x64 | 0 | 64x64 | 64x32 | 64x16<br>64x48 | 64x48<br>64x16 | 32x64 | 16x64<br>48x64 | 48x64<br>16x64 | – | 32x32 | – |
| 32x32 | 1 | 32x32 | 32x16 | 32x8<br>32x24 | 32x24<br>8x32 | 16x32 | 8x32<br>24x32 | 24x32<br>8x32 | – | 32x32 | – |
| 16x16 | 2 | 16x16 | 16x8 | 16x4<br>16x12 | 16x12<br>4x16 | 8x16 | 4x16<br>12x16 | 12x16<br>4x16 | – | 16x16 | – |
| 8x8 | 3 | 8x8 | 8x4 | – | – | 4x8 | – | – | – | 8x8 | 4x4 |

113

|  |  | CU > 8x8 | | CU==8x8 | |
|---|---|---|---|---|---|
|  |  | prefix | suffix | prefix | suffix |
| Intra | 2Nx2N | 000 | – | 000 | 0 |
|  | NxN | – | – | 000 | 1 |
| Inter | 2Nx2N | 1 | – | 1 | – |
|  | 2NxN | 01 | 1 | 01 | – |
|  | 2NxnU | 01 | 00 | – | – |
|  | 2NxnD | 01 | 01 | – | – |
|  | Nx2N | 001 | 1 | 001 | – |
|  | nLx2N | 001 | 00 | – | – |
|  | nRx2N | 001 | 01 | – | – |
|  | NxN | – | – | – | – |

|  |  | CU==8x8 | |
|---|---|---|---|
|  |  | prefix | suffix |
| Intra | 2Nx2N | 1 | 0 |
|  | NxN | 1 | 1 |
| Inter | 2Nx2N | 01 | – |
|  | 2NxN | 000 | – |
|  | 2NxnU | – | – |
|  | 2NxnD | – | – |
|  | Nx2N | 001 | – |
|  | nLx2N | – | – |
|  | nRx2N | – | – |
|  | NxN | – | – |

|  |  | CU==8x8 | | |
|---|---|---|---|---|
|  |  | flag | prefix | suffix |
| Intra | 2Nx2N | 1 | – | 0 |
|  | NxN | 1 | – | 1 |
| Inter | 2Nx2N | 0 | 1 | – |
|  | 2NxN | 0 | 01 | – |
|  | 2NxnU | – | – | – |
|  | 2NxnD | – | – | – |
|  | Nx2N | 0 | 00 | – |
|  | nLx2N | – | – | – |
|  | nRx2N | – | – | – |
|  | NxN | – | – | – |

|  |  | CU > 8x8 |  | CU==8x8 (IN A CASE WHERE AT LEAST ONE OF NEIGHBORING CUs IS INTER CU) |  | CU==8x8 (IN A CASE WHERE BOTH NEIGHBORING CUs ARE INTRA CUs) |  |
|---|---|---|---|---|---|---|---|
|  |  | prefix | suffix | prefix | suffix | prefix | suffix |
| Intra | 2Nx2N | 000 | – | 000 | 0 | 1 | 0 |
|  | NxN | – | – | 000 | 1 | 1 | 1 |
| Inter | 2Nx2N | 1 | – | 1 | – | 000 |  |
|  | 2NxN | 01 | 1 | 01 | – | 01 | – |
|  | 2NxnU | 01 | 00 | – | – | – | – |
|  | 2NxnD | 01 | 01 | – | – | – | – |
|  | Nx2N | 001 | 1 | 001 | – | 001 | – |
|  | nLx2N | 001 | 00 | – | – | – | – |
|  | nRx2N | 001 | 01 | – | – | – | – |
|  | NxN | – | – | – | – | – | – |

|  |  | CU > 8x8 (SIZE OF UPPER CU IS GREATER THAN OR EQUAL TO THAT OF TARGET CU) | | CU > 8x8 (SIZE OF UPPER CU IS LESS THAN THAT OF TARGET CU) | | CU==8x8 | |
|---|---|---|---|---|---|---|---|
|  |  | prefix | suffix | prefix | suffix | prefix | suffix |
| Intra | 2Nx2N | 000 | – | 000 | – | 1 | 0 |
|  | NxN | – | – | – | – | 1 | 1 |
| Inter | 2Nx2N | 1 | – | 1 | – | 000 |  |
|  | 2NxN | 01 | 1 | 001 | 1 | 01 | – |
|  | 2NxnU | 01 | 00 | 001 | 00 | – | – |
|  | 2NxnD | 01 | 01 | 001 | 01 | – | – |
|  | Nx2N | 001 | 1 | 01 | 1 | 001 | – |
|  | nLx2N | 001 | 00 | 01 | 00 | – | – |
|  | nRx2N | 001 | 01 | 01 | 01 | – | – |

| CU size | d | PU type | TU depth 0 | 1 | 2 |
|---|---|---|---|---|---|
| 64x64 | 0 | 2Nx2N | – (*1) | 32x32 | 16x16 |
| | | 2NxN, 2NxnU, 2NxnD Nx2N, nLx2N, nRx2N | – (*1) | 32x32 | 32x8 8x32 |
| 32x32 | 1 | 2Nx2N | 32x32 | 16x16 | 8x8 |
| | | 2NxN, 2NxnU, 2NxnD Nx2N, nLx2N, nRx2N | 32x32 | 32x8 8x32 | 16x4 4x16 |
| 16x16 | 2 | 2Nx2N | 16x16 | 8x8 | 4x4 |
| | | 2NxN, 2NxnU, 2NxnD Nx2N, nLx2N, nRx2N | 16x16 | 16x4 4x16 | 4x4 |
| 8x8 | 3 | 2Nx2N 2NxN Nx2N | 8x8 | 4x4 | – (*2) |

PU PARTITIONING TYPE: 2N×2N depth=0    depth=1    depth=2

FIG. 31

| prediction_unit( x0, y0 ) { | Descriptor |
|---|---|
|   if( skip_flag[ x0 ][ y0 ] ) { | |
|     merge_idx[ x0 ][ y0 ] | ue(v) \| ae(v) |
|   } else if( PredMode == MODE_INTRA ) { | |
|     ... | |
|   } else { /* MODE_INTER */ | |
|     if( entropy_coding_mode_flag \|\| PartMode != PART_2Nx2N ) | |
|       merge_flag[ x0 ][ y0 ] | u(1) \| ae(v) |
|     if( merge_flag[ x0 ][ y0 ] ) { | |
|       merge_idx[ x0 ][ y0 ] | ue(v) \| ae(v) |
|     } else { | |
|       if( slice_type == B ) { | |
|         inter_pred_flag[ x0 ][ y0 ] | ue(v) \| ae(v) |
|       } | |
|       if( inter_pred_flag[ x0 ][ y0 ] == Pred_LC ) { | |
|         if( num_ref_idx_lc_active_minus1 > 0 ) { | |
|           ref_idx_lc[ x0 ][ y0 ] | ae(v) |
|         } | |
|         mvd_lc[ x0 ][ y0 ][ 0 ] | se(v)   ae(v) |
|         mvd_lc[ x0 ][ y0 ][ 1 ] | se(v)   ae(v) |
|         mvp_idx_lc[ x0 ][ y0 ] | ue(v)   ae(v) |
|       } | |
|       else { /* Pred_L0 or Pred_BI */ | |
|         if( num_ref_idx_l0_active_minus1 > 0 ) { | |
|           ref_idx_l0_minusX[ x0 ][ y0 ] | ue(v) \| ae(v) |
|         } | |
|         mvd_l0[ x0 ][ y0 ][ 0 ] | se(v) \| ae(v) |
|         mvd_l0[ x0 ][ y0 ][ 1 ] | se(v) \| ae(v) |
|         mvp_idx_l0[ x0 ][ y0 ] | ue(v) \| ae(v) |
|       } | |
|       if( inter_pred_flag[ x0 ][ y0 ] == Pred_BI ) { | |
|         if( num_ref_idx_l1_active_minus1 > 0 ) { | |
|           ref_idx_l1[ x0 ][ y0 ] | ue(v) \| ae(v) |
|         } | |
|         mvd_l1[ x0 ][ y0 ][ 0 ] | se(v) \| ae(v) |
|         mvd_l1[ x0 ][ y0 ][ 1 ] | se(v) \| ae(v) |
|         mvp_idx_l1[ x0 ][ y0 ] | ue(v) \| ae(v) |
|       } | |
|     } | |
|   } | |
| } | |

| slice_type | inter_pred_flag | Name of inter_pred_flag |
|---|---|---|
| P | inferred | Pred_L0 |
| B | 0 | Pred_LC |
|   | 1 | Pred_BI |

(b)

| slice_type | inter_pred_flag | Name of inter_pred_flag | |
|---|---|---|---|
|   |   | IN THE CASE OF USING A COMBINED LIST | OTHER CASES |
| P | inferred | Pred_L0 | Pred_L0 |
| B | 0 | Pred_LC | Pred_L0 |
|   | 1 | – | Pred_L1 |
|   | 2 | Pred_BI | Pred_BI |

| prediction_unit( x0, y0 ) { | Descriptor |
|---|---|
| ... | |
|   if( slice_type == B ) { | |
|     if (!DisableBiPred) { | |
|       inter_pred_flag0[ x0 ][ y0 ] | ue(1) \| ae(1) |
|     } | |
|     else if (!UsePredRefLC && !NoBackPredFlag) { | |
|       inter_pred_flag1[ x0 ][ y0 ] | ue(1) \| ae(1) |
|     } | |
|   } | |
| ... | |
| } | |

(b)

| prediction_unit( x0, y0 ) { | Descriptor |
|---|---|
| ... | |
|   if( slice_type == B ) { | |
|     if (!DisableBiPred) { | |
|       inter_pred_flag0[ x0 ][ y0 ] | ue(1) \| ae(1) |
|     } | |
|   } | |
| ... | |
| } | |

| sequence_parameter_set(){ | Descriptor |
|---|---|
| | |
| disable_inter4x4 | u(1) |
| disable_bipred_in_small_PU | u(1) |
| | |
| | |
| } | |

(b)

| sequence_parameter_set(){ | Descriptor |
|---|---|
| | |
| use_restricted_prediction | u(1) |
| | |
| | |
| | |
| } | |

(c)

| sequence_parameter_set(){ | Descriptor |
|---|---|
| | |
| disable_bipred_size | u(v) |
| | |
| | |
| | |
| } | |

|  | BI-PREDICTION RESTRICTION ONLY ON BASIC INTER PU | BI-PREDICTION RESTRICTION ON ALL PUs |
|---|---|---|
| SKIP CU | NO RESTRICTION OF BI-PREDICTION ON SMALL SIZE PU | RESTRICTION OF BI-PREDICTION ON SMALL SIZE PU |
| MERGE PU | | |
| BASIC INTER PU (PU OTHER THAN SKIP OR MERGE PU) | RESTRICTION OF BI-PREDICTION ON SMALL SIZE PU | |

(b)

|  | BI-PREDICTION RESTRICTION METHOD |
|---|---|
| SKIP CU | METHOD OF DERIVING MOTION COMPENSATION PARAMETERS OF SKIP CANDIDATE AND MERGE CANDIDATE |
| MERGE PU | |
| BASIC INTER PU (PU OTHER THAN SKIP OR MERGE PU) | DECODING OF INTER PREDICTION FLAG IN ACCORDANCE WITH PU SIZE |

FIG. 36

| prediction_unit(x0, y0 ,log2CUSize) { | Descriptor |
|---|---|
|   if( skip_flag[ x0 ][ y0 ] ) { | |
|     merge_idx[x0 ][ y0 ] | ue(v) \| ae(v) |
|   } else if( PredMode == MODE_INTRA ) { | |
|     ... | |
|   } else { /* MODE_INTER */ | |
|     if( entropy_coding_mode_flag \|\| PartMode != PART_2Nx2N) | |
|       merge_flag[x0 ][ y0 ] | u(1) \| ae(v) |
|     if( merge_flag[ x0 ][ y0 ] ) { | |
|       merge_idx[x0 ][ y0 ] | ue(v) \| ae(v) |
|     } else { | |
|       if( slice_type == B ) { | |
|         if( !entropy_coding_mode_flag ) { | |
|           combined_inter_pred_ref_idx | ue(v) |
|           DisableBiPred= (log2CUSize == 3 && PartMode != PART_2Nx2N) | |
|           if( combined_inter_pred_ref_idx == MaxPredRef && !DisableBipred) | |
|             inter_pred_flag[x0 ][ y0 ] | ue(v) |
|         } else | |
|           if (!DisableBipred) | |
|             inter_pred_flag[x0 ][ y0 ] | ue(v) \| ae(v) |
|         } | |
|         ... | |
|       } | |
|     } | |
|   } | |

FIG. 37

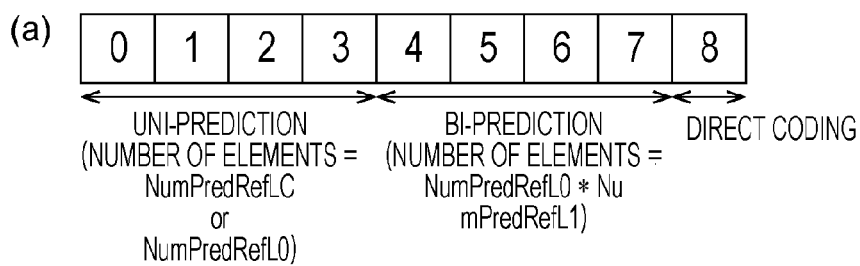

(c)

| Value | Meaning |
|---|---|
| 0 | List 0 prediction using reference frame 0 |
| 1 | List 0 prediction using reference frame 1 |
| 2 | List 1 prediction using reference frame 0 |
| 3 | List 1 prediction using reference frame 1 |
| 4 | Bi-prediction using reference frame (0, 0) |
| 5 | Bi-prediction using reference frame (0, 1) |
| 6 | Bi-prediction using reference frame (1, 0) |
| 7 | Bi-prediction using reference frame (1, 1) |
| 8 | Explicit coding |

(d)

|  | disableBi = true | disableBi != true |
|---|---|---|
| num_ref_idx_lc_active_minus1 > 0 | NumPredRefLC | NumPredRefLC + NumPredRefL0 * NumPredRefL1 |
| num_ref_idx_lc_active_minus1 = 0 | NumPredRefL0 | NumPredRefL0 + NumPredRefL0 * NumPredRefL1 |

TBL37

CODE37

```
If num_ref_lc_active_minus1 is greater than 0 and !disableBi,
        MaxPredRef = NumPredRefLC
Otherwise If num_ref_lc_active_minus1 is equal to 0 and !disableBi,
        MaxPredRef = NumPredRefL0
Otherwise, If num_ref_lc_active_minus1
        MaxPredRef = NumPredRefLC + NumPredRefL0 * NumPredRefL1
Otherwise (combined list is not used),
        MaxPredRef = NumPredRefL0 + NumPredRefL0 * NumPredRefL1
```

FIG. 41

```
// S501
if (uiNumRefIdxOfLC > 0) {
   uiMaxVal = uiValNumRefIdxOfLC + uiValNumRefIdxOfL0*uiValNumRefIdxOfL1;
} else if (pcCU->getSlice()->getNoBackPredFlag()) {
   uiMaxVal = uiValNumRefIdxOfL0 + uiValNumRefIdxOfL0*uiValNumRefIdxOfL1;
} else {
   uiMaxVal = uiValNumRefIdxOfL0 + uiValNumRefIdxOfL1 +
uiValNumRefIdxOfL0*uiValNumRefIdxOfL1;
}

// S502
if (bDisableBi) {
   uiBipredVal = uiMaxVal = uiMaxVal - uiValNumRefIdxOfL0*uiValNumRefIdxOfL1;
}

// S503
xReadUnaryMaxSymbol( tmp, uiMaxVal );

// S504
combined_inter_pred_ref_idx = m_uiMITableD[tmp];

// S505
if (bDisableBi)
{
  Int tmp2;
  // S506
  uiMaxVal += uiValNumRefIdxOfL0*uiValNumRefIdxOfL1;
  // S507
  cx = 0;
  for (tmp2 = 0; tmp2 <= uiMaxVal; tmp2++)
  {
    // S508
    x = m_uiMITableD[tmp2];
    // S509
    if (x < uiBipredVal || x == uiMaxVal)
    {
      // S510
      if (cx == tmp)
      {
        tmp = tmp2;
        break;
      }
      // S511
      cx++;
    }
  }
  // S512
  combined_inter_pred_ref_idx = x;
}
// S513
adaptCodeword(tmp, m_ucMI1TableCounter, m_ucMI1TableCounterSum, m_uiMITableD,
NULL, 4 );
```

FIG. 42

```
// S601
if (uiNumRefIdxOfLC > 0)
{
  uiMaxVal = uiValNumRefIdxOfLC + uiValNumRefIdxOfL0*uiValNumRefIdxOfL1;
}
else if (m_pcSlice->getNoBackPredFlag())
{
  uiMaxVal = uiValNumRefIdxOfL0 + uiValNumRefIdxOfL0*uiValNumRefIdxOfL1;
}
else
{
  uiMaxVal = uiValNumRefIdxOfL0 + uiValNumRefIdxOfL1 +
uiValNumRefIdxOfL0*uiValNumRefIdxOfL1;
}
// S602
uiBipredVal = uiMaxVal - uiValNumRefIdxOfL0*uiValNumRefIdxOfL1;
cx2 = 0;
// S603
for (Int i = 0; i <= uiMaxVal; i++)
{
    x = m_uiMITableD[i];
    if (x < uiBipredVal || x == uiMaxVal)
    {
      if (x == uiIndex)
      {
        break;
      }
      cx2++;
    }
}
// S604
 adaptCodeword(cx, m_ucMI1TableCounter, m_ucMI1TableCounterSum, m_uiMITableD,
m_uiMITableE, 4);

uiMaxVal = uiBipredVal

// S605
xWriteUnaryMaxSymbol( cx2, uiMaxVal );
```

FIG. 47

```
// S4701
  for (i = 0; i < NumCand; i++) {
    motion_valid[i] = true
  }
// S4702
  for (i = 1; i < NumCand; i++) {
    for (j = 0; j < i; j++) {
      // S4702-1
      if (hasEqualMotion(motion_cand[i], motion_cand[j]) )
        motion_valid[i] = false
      else
        motion_ valid[i] = true
    }
  }
// S4703
  dst = 0;
  for (i = 1; i < NumCand; i++) {
    if (motion_ valid[i] == true) {
      copy (motion_cand[dst], motion_cand[i])
      motion_valid[dst] = true
      dst += 1
    }
  }
// S4704
  for (i = NumCand - 1; i >= dst; i--) {
    motion_valid[i] = false
  }
// S4705
  NumCand = dst - 1
}
```

FIG. 48

(a)
$$\begin{cases} \text{predFlagL0l0Cand} == 1 \\ \text{predFlagL1l1Cand} == 1 \\ \text{RefPicOrderCnt(refIdxL0l0Cand, L0)} \mathrel{!=} \text{RefPicOrderCnt(refIdxL1l1Cand, L1)} \mathrel{||} \text{mvL0l0Cand} \mathrel{!=} \text{mvL1l1Cand} \end{cases}$$

(b)
$$\begin{cases} \text{refIdxL0combCand}_k = \text{refIdxL0l0Cand} & (8\text{-}92) \\ \text{refIdxL1combCand}_k = \text{refIdxL1l1Cand} & (8\text{-}93) \\ \text{predFlagL0combCand}_k = 1 & (8\text{-}94) \\ \text{predFlagL1combCand}_k = 1 & (8\text{-}95) \\ \text{mvL0combCand}_k[0] = \text{mvL0l0Cand}[0] & (8\text{-}96) \\ \text{mvL0combCand}_k[1] = \text{mvL0l0Cand}[1] & (8\text{-}97) \\ \text{mvL1combCand}_k[0] = \text{mvL1l1Cand}[0] & (8\text{-}98) \\ \text{mvL1combCand}_k[1] = \text{mvL1l1Cand}[1] & (8\text{-}99) \\ \text{numMergeCand} = \text{numMergeCand} + 1 & (8\text{-}100) \end{cases}$$

(c)

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

$$\begin{cases} \text{refIdxLXorigCand} >= 0 \\ \text{RefPicOrderCnt( refIdxLXorigCand, LX ) != RefPicOrderCnt( refIdxorigCandLX, LY )} \\ \text{abs( PicOrderCnt − RefPicOrderCnt( refIdxLXorigCand, LX ) ) == abs( PicOrderCnt − RefPicOrderCnt( refIdxLXorigCand, LY ) )} \\ \text{refIdxLXorigCand < num\_ref\_idx\_lY\_active\_minus1 + 1} \end{cases}$$

(b)

$$\begin{cases} \text{refIdxL0nscaleCand}_i = \text{refIdxLXorigCand} & (8\text{-}92) \\ \text{refIdxL1nscaleCand}_i = \text{refIdxLXorigCand} & (8\text{-}93) \\ \text{predFlagL0nscaleCand}_i = 1 & (8\text{-}94) \\ \text{predFlagL1nscaleCand}_i = 1 & (8\text{-}95) \\ \text{mvL0nscaleCand}_i[\ 0\ ] = \text{mvLXorigCand}[\ 0\ ] & (8\text{-}96) \\ \text{mvL0nscaleCand}_i[\ 1\ ] = \text{mvLXorigCand}[\ 1\ ] & (8\text{-}97) \\ \text{mvL1nscaleCand}_i[\ 0\ ] = -\text{mvLXorigCand}[\ 0\ ] & (8\text{-}98) \\ \text{mvL1nscaleCand}_i[\ 1\ ] = -\text{mvLXorigCand}[\ 1\ ] & (8\text{-}99) \\ \text{numMergeCand} = \text{numMergeCand} + 1 & (8\text{-}100) \end{cases}$$

FIG. 50

$$\begin{cases} \text{refIdxL0zeroCand}_m = \text{zeroIdx} & (8\text{-}110) \\ \text{refIdxL1zeroCand}_m = -1 & (8\text{-}111) \\ \text{predFlagL0zeroCand}_m = 1 & (8\text{-}112) \\ \text{predFlagL1zeroCand}_m = 0 & (8\text{-}113) \\ \text{mvL0zeroCand}_m[\ 0\ ] = 0 & (8\text{-}114) \\ \text{mvL0zeroCand}_m[\ 1\ ] = 0 & (8\text{-}115) \\ \text{mvL1zeroCand}_m[\ 0\ ] = 0 & (8\text{-}116) \\ \text{mvL1zeroCand}_m[\ 1\ ] = 0 & (8\text{-}117) \\ \text{numMergeCand} = \text{numMergeCand} + 1 & (8\text{-}118) \end{cases}$$

FIG. 51

| NAME | METHOD | FORMULA |
|---|---|---|
| L0 SELECTION | ALWAYS USE L0 MOTION COMPENSATION PARAMETERS | predFlagL1 = 0 |
| L1 SELECTION | ALWAYS USE L1 MOTION COMPENSATION PARAMETERS | predFlagL0 = 0 |
| REFERENCE INDEX NUMBER SELECTION | USE ONE OF L0 AND L1 HAVING SMALLER REFERENCE NUMBER | X = (ref_idx_L1 < ref_idx_L0) ? 0 : 1<br>predFlagLX = 0 |
| POC SELECTION | USE ONE OF L0 AND L1 HAVING SMALLER DIFFERENCE BETWEEN POC OF REFERENCE FRAME AND POC OF CURRENT FRAME | X = (\|POC_L1−POC_curr\| < \|POC_L0−POC_curr\|) ? 0 : 1<br>predFlagLX = 0 |
| DUAL SELECTION | USE BOTH L0 MOTION COMPENSATION PARAMETERS AND L1 MOTION COMPENSATION PARAMETERS AS CANDIDATES | CANDIDATE OF predFlagL1 = 0 AND CANDIDATE OF predFlagL0 = 0 |

|  | BI-PREDICTION RESTRICTION ON BASIC INTER PU | BI-PREDICTION RESTRICTION ON MERGE PU | SKIPPED DERIVATION OF BI-PREDICTIVE MERGE CANDIDATES |
|---|---|---|---|
| 4x4, 4x8, 8x4 | ○ | ○ | ○ |
| 8x8 | × | × | × |
| OTHER SIZES | × | × | × |

(b)

|  | BI-PREDICTION RESTRICTION ON BASIC INTER PU | BI-PREDICTION RESTRICTION ON MERGE PU | SKIPPED DERIVATION OF BI-PREDICTIVE MERGE CANDIDATES |
|---|---|---|---|
| 4x4, 4x8, 8x4 | ○ | × | × |
| 8x8 | × | × | × |
| OTHER SIZES | × | × | × |

(c)

|  | BI-PREDICTION RESTRICTION ON BASIC INTER PU | BI-PREDICTION RESTRICTION ON MERGE PU | SKIPPED DERIVATION OF BI-PREDICTIVE MERGE CANDIDATES |
|---|---|---|---|
| 4x4, 4x8, 8x4 | ○ | × | × |
| 8x8 | ○ | × | × |
| OTHER SIZES | × | × | × |

(d)

|  | BI-PREDICTION RESTRICTION ON BASIC INTER PU | BI-PREDICTION RESTRICTION ON MERGE PU | SKIPPED DERIVATION OF BI-PREDICTIVE MERGE CANDIDATES |
|---|---|---|---|
| 4x4, 4x8, 8x4 | ○ | ○ | ○ |
| 8x8 | × | ○ | ○ |
| OTHER SIZES | × | × | × |

|  | BI-PREDICTION RESTRICTION ON BASIC INTER PU | BI-PREDICTION RESTRICTION ON MERGE PU | SKIPPED DERIVATION OF BI-PREDICTIVE MERGE CANDIDATES |
|---|---|---|---|
| 4x4, 4x8, 8x4 | ○ | × | ○ |
| 8x8 | ○ | × | ○ |
| OTHER SIZES | × | × | × |

(b)

|  | BI-PREDICTION RESTRICTION ON BASIC INTER PU | BI-PREDICTION RESTRICTION ON MERGE PU | SKIPPED DERIVATION OF BI-PREDICTIVE MERGE CANDIDATES |
|---|---|---|---|
| 4x4, 4x8, 8x4 | × | × | ○ |
| 8x8 | × | × | ○ |
| OTHER SIZES | × | × | × |

FIG. 58

| Level number | Max macroblock processing rate MaxMBPS (MB/s) | Max frame size MaxFS (MBs) | Max decoded picture buffer size MaxDPB (1024 bytes for 4:2:0) | Max video bit rate MaxBR (1000 bits/s, 1200 bits/s, cpbBrVclFactor bits/s, or cpbBrNalFactor bits/s) | Max CPB size MaxCPB (1000 bits, 1200 bits, cpbBrVclFactor bits, or cpbBrNalFactor bits) | Vertical MV component range MaxVmvR (luma frame samples) | Min compression ratio MinCR | Max number of motion vectors per two consecutive MBs MaxMvsPer2Mb |
|---|---|---|---|---|---|---|---|---|
| 1 | 1 485 | 99 | 148.5 | 64 | 175 | [−64,+63.75] | 2 | − |
| 1b | 1 485 | 99 | 148.5 | 128 | 350 | [−64,+63.75] | 2 | − |
| 1.1 | 3 000 | 396 | 337.5 | 192 | 500 | [−128,+127.75] | 2 | − |
| 1.2 | 6 000 | 396 | 891.0 | 384 | 1 000 | [−128,+127.75] | 2 | − |
| 1.3 | 11 880 | 396 | 891.0 | 768 | 2 000 | [−128,+127.75] | 2 | − |
| 2 | 11 880 | 396 | 891.0 | 2 000 | 2 000 | [−128,+127.75] | 2 | − |
| 2.1 | 19 800 | 792 | 1 782.0 | 4 000 | 4 000 | [−256,+255.75] | 2 | − |
| 2.2 | 20 250 | 1 620 | 3 037.5 | 4 000 | 4 000 | [−256,+255.75] | 2 | 32 |
| 3 | 40 500 | 1 620 | 3 037.5 | 10 000 | 10 000 | [−256,+255.75] | 2 | 16 |
| 3.1 | 108 000 | 3 600 | 6 750.0 | 14 000 | 14 000 | [−512,+511.75] | 4 | 16 |
| 3.2 | 216 000 | 5 120 | 7 680.0 | 20 000 | 20 000 | [−512,+511.75] | 4 | 16 |
| 4 | 245 760 | 8 192 | 12 288.0 | 20 000 | 25 000 | [−512,+511.75] | 4 | 16 |
| 4.1 | 245 760 | 8 192 | 12 288.0 | 50 000 | 62 500 | [−512,+511.75] | 2 | 16 |
| 4.2 | 522 240 | 8 704 | 13 056.0 | 50 000 | 62 500 | [−512,+511.75] | 2 | 16 |
| 5 | 589 824 | 22 080 | 41 400.0 | 135 000 | 135 000 | [−512,+511.75] | 2 | 16 |
| 5.1 | 983 040 | 36 864 | 69 120.0 | 240 000 | 240 000 | [−512,+511.75] | 2 | 16 |

COL581     COL582

| Level number | SliceRate | MinLumaBiPredSize | direct_8x8_inference_flag | frame_mbs_only_flag | |
|---|---|---|---|---|---|
| 1 | – | – | – | 1 | |
| 1b | – | – | – | 1 | |
| 1.1 | – | – | – | 1 | |
| 1.2 | – | – | – | 1 | |
| 1.3 | – | – | – | 1 | |
| 2 | – | – | – | – | |
| 2.1 | – | – | – | – | |
| 2.2 | – | – | – | – | |
| 3 | 22 | – | 1 | – | |
| 3.1 | 60 | 8x8 | 1 | – | 720P (/256=3600) |
| 3.2 | 60 | 8x8 | 1 | – | |
| 4 | 60 | 8x8 | 1 | – | 1080P (/256=8160) |
| 4.1 | 24 | 8x8 | 1 | – | |
| 4.2 | 24 | 8x8 | 1 | 1 | 2560x1600 (/256=16000) |
| 5 | 24 | 8x8 | 1 | 1 | |
| 5.1 | 24 | 8x8 | 1 | 1 | 4k (/256=34560) |

COL591

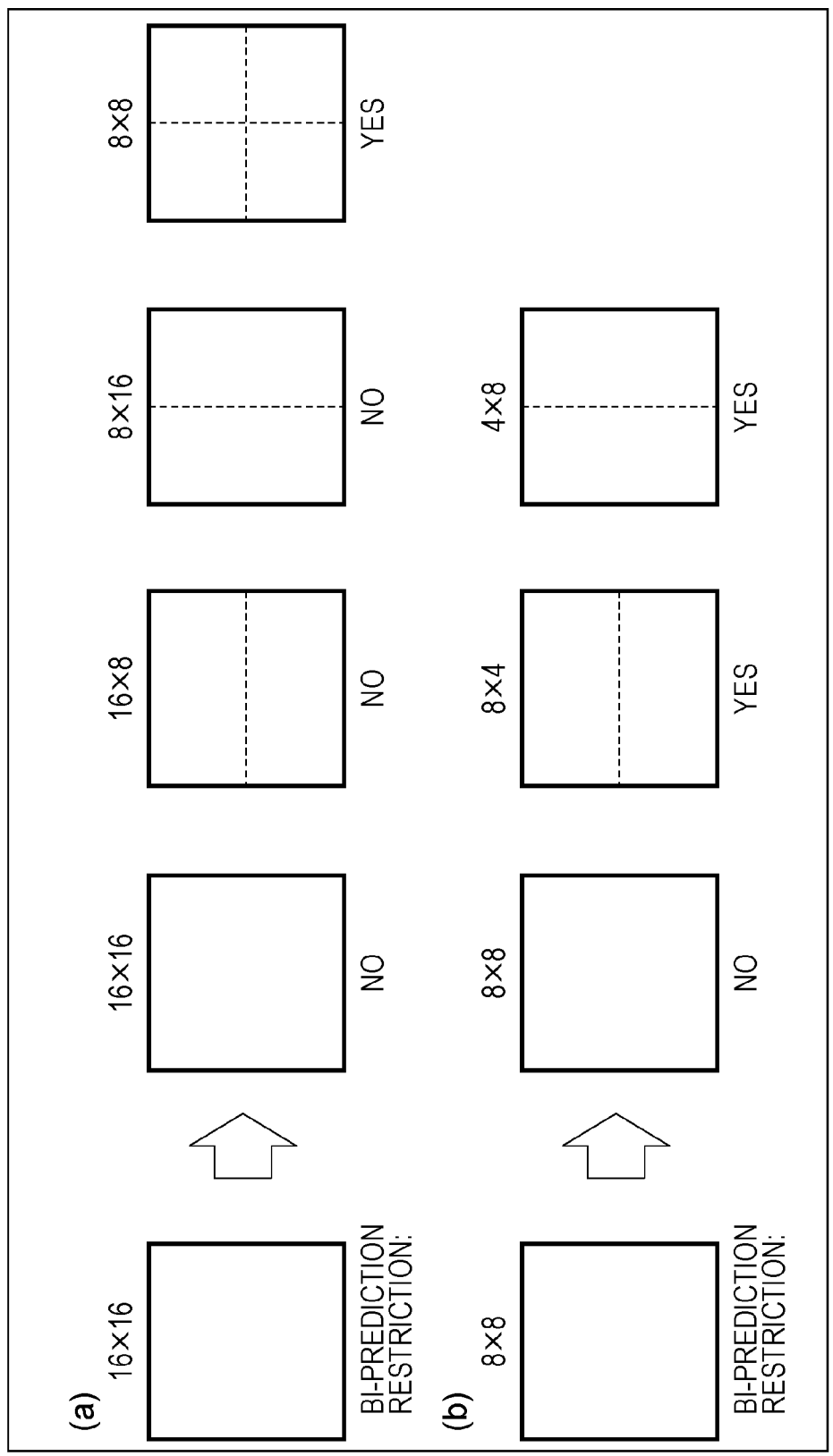

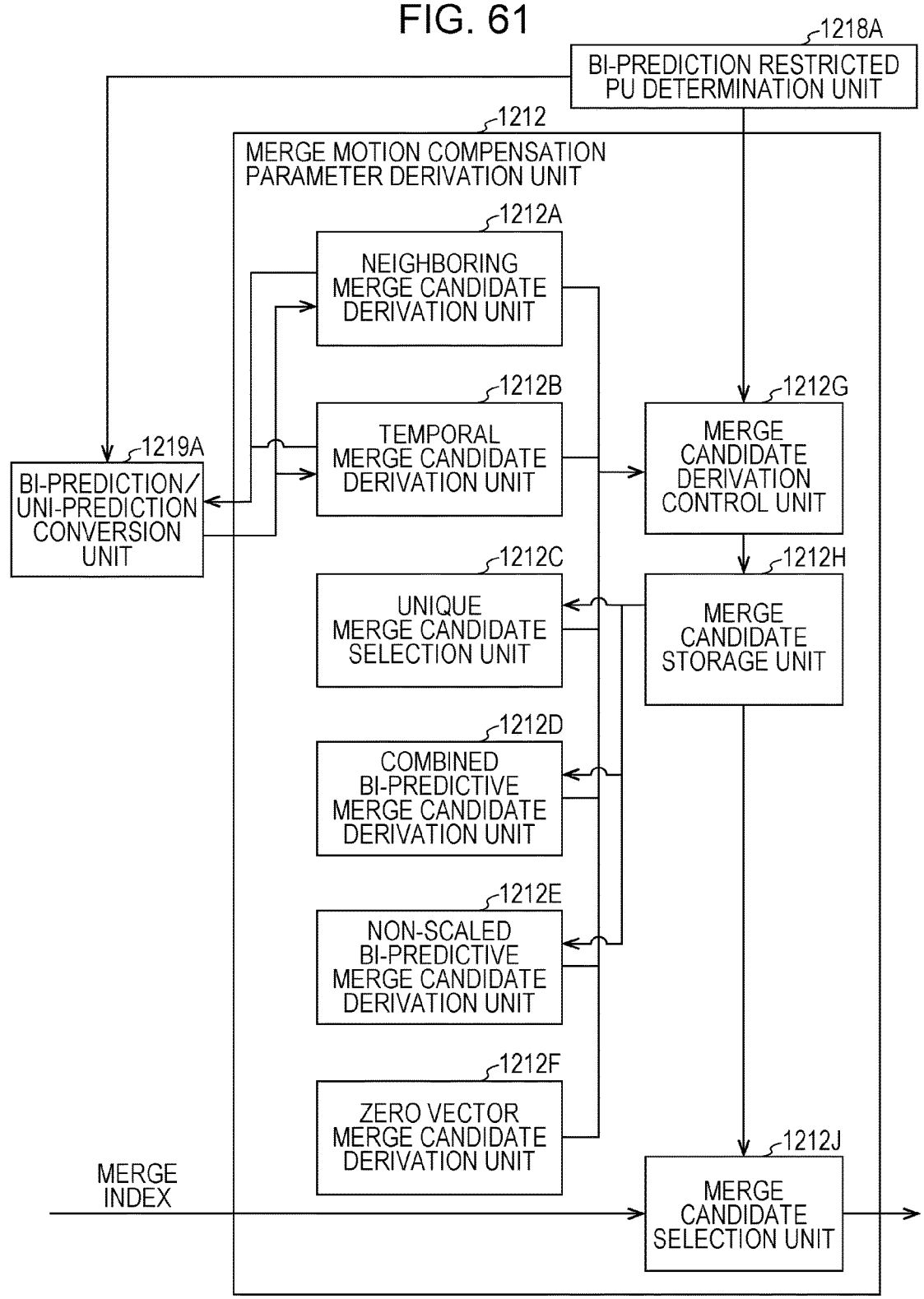

FIG. 62

| seq_parameter_set_rbsp( ) { | Descriptor | |
|---|---|---|
| profile_idc | u(8) | |
| reserved_zero_8bits /* equal to 0 */ | u(8) | |
| level_idc | u(8) | |
| seq_parameter_set_id | ue(v) | |
| max_temporal_layers_minus1 | u(3) | |
| pic_width_in_luma_samples | u(16) | |
| pic_height_in_luma_samples | u(16) | |
| bit_depth_luma_minus8 | ue(v) | |
| bit_depth_chroma_minus8 | ue(v) | |
| pcm_bit_depth_luma_minus1 | u(4) | |
| pcm_bit_depth_chroma_minus1 | u(4) | |
| log2_max_frame_num_minus4 | ue(v) | |
| pic_order_cnt_type | ue(v) | |
| if( pic_order_cnt_type == 0 ) | | |
|    log2_max_pic_order_cnt_lsb_minus4 | ue(v) | |
| else if( pic_order_cnt_type == 1 ) { | | |
|    delta_pic_order_always_zero_flag | u(1) | |
|    offset_for_non_ref_pic | se(v) | |
|    num_ref_frames_in_pic_order_cnt_cycle | ue(v) | |
|    for( i = 0; i < num_ref_frames_in_pic_order_cnt_cycle; i++ ) | | |
|      offset_for_ref_frame[ i ] | se(v) | |
| } | | |
| max_num_ref_frames | ue(v) | |
| gaps_in_frame_num_value_allowed_flag | u(1) | |
| log2_min_coding_block_size_minus3 | ue(v) | ←SYN621 |
| log2_diff_max_min_coding_block_size | ue(v) | |
| log2_min_transform_block_size_minus2 | ue(v) | |
| log2_diff_max_min_transform_block_size | ue(v) | |
| log2_min_pcm_coding_block_size_minus3 | ue(v) | |
| max_transform_hierarchy_depth_inter | ue(v) | |
| max_transform_hierarchy_depth_intra | ue(v) | |
| chroma_pred_from_luma_enabled_flag | u(1) | |
| loop_filter_across_slice_flag | u(1) | |
| sample_adaptive_offset_enabled_flag | u(1) | |
| adaptive_loop_filter_enabled_flag | u(1) | |
| pcm_loop_filter_disable_flag | u(1) | |
| cu_qp_delta_enabled_flag | u(1) | |
| temporal_id_nesting_flag | u(1) | |
| inter_4x4_enabled_flag | u(1) | ←SYN622 |
|  restrict_bipred_flag | u(1) | ←SYN623 |
| if (restrict_bipred_flag) | | ←SYN624 |
|   log2_min_bipred_coding_block_size_minus3 | ue(v) | ←SYN625 |
| rbsp_trailing_bits( ) | | |
| } | | |

FIG. 63

```
if (restrict_bipred_flag == 0)         ←S631
{
    DisableBiPred = 0                  ←S632
}
else if (Log2MinBipredCUSize == 3)     ←S633
{
    // If the minimum CU size is 8x8, restriction is imposed on non-8x8 (2Nx2N)
    DisableBiPred = (log2CUSize == Log2MinBipredCUSize && PartMode != PART_2Nx2N)   ←S634
}
else
{
    // If the minimum CU size is NON-8x8 (e.g., 16x16), restriction of B for minimum PU (NxN) is imposed
    DisableBiPred = (log2CUSize == Log2MinBipredCUSize && PartMode == PART_NxN)     ←S635
 or
    DisableBiPred = (log2CUSize == Log2MinBipredCUSize && PartMode == PART_NxN) ||  ←S635'
                    (log2CUSize < Log2MinBipredCUSize)
}
```

FIG. 64

| seq_parameter_set_rbsp( ) { | Descriptor | |
|---|---|---|
| profile_idc | u(8) | |
| reserved_zero_8bits /* equal to 0 */ | u(8) | |
| level_idc | u(8) | ←SYN642 |
| seq_parameter_set_id | ue(v) | |
| max_temporal_layers_minus1 | u(3) | |
| pic_width_in_luma_samples | u(16) | |
| pic_height_in_luma_samples | u(16) | |
| bit_depth_luma_minus8 | ue(v) | |
| bit_depth_chroma_minus8 | ue(v) | |
| pcm_bit_depth_luma_minus1 | u(4) | |
| pcm_bit_depth_chroma_minus1 | u(4) | |
| log2_max_frame_num_minus4 | ue(v) | |
| pic_order_cnt_type | ue(v) | |
| if( pic_order_cnt_type == 0 ) | | |
|    log2_max_pic_order_cnt_lsb_minus4 | ue(v) | |
| else if( pic_order_cnt_type == 1 ) { | | |
|    delta_pic_order_always_zero_flag | u(1) | |
|    offset_for_non_ref_pic | se(v) | |
|    num_ref_frames_in_pic_order_cnt_cycle | ue(v) | |
|    for( i = 0; i < num_ref_frames_in_pic_order_cnt_cycle; i++ ) | | |
|      offset_for_ref_frame[ i ] | se(v) | |
| } | | |
| max_num_ref_frames | ue(v) | |
| gaps_in_frame_num_value_allowed_flag | u(1) | |
| log2_min_coding_block_size_minus3 | ue(v) | ←SYN641 |
| log2_diff_max_min_coding_block_size | ue(v) | |
| log2_min_transform_block_size_minus2 | ue(v) | |
| log2_diff_max_min_transform_block_size | ue(v) | |
| log2_min_pcm_coding_block_size_minus3 | ue(v) | |
| max_transform_hierarchy_depth_inter | ue(v) | |
| max_transform_hierarchy_depth_intra | ue(v) | |
| chroma_pred_from_luma_enabled_flag | u(1) | |
| loop_filter_across_slice_flag | u(1) | |
| sample_adaptive_offset_enabled_flag | u(1) | |
| adaptive_loop_filter_enabled_flag | u(1) | |
| pcm_loop_filter_disable_flag | u(1) | |
| cu_qp_delta_enabled_flag | u(1) | |
| temporal_id_nesting_flag | u(1) | |
| inter_4x4_enabled_flag | u(1) | |
| rbsp_trailing_bits( ) | | |
| } | | |

FIG. 65

```
if (Log2MinCUSize == 3)   ←S651
{
    // If the minimum CU size is 8x8, restriction is imposed on non-8x8 (2Nx2N)
    DisableBiPred = (log2CUSize == Log2MinCUSize && PartMode != PART_2Nx2N)   ←S652
}
else
{
    // If the minimum CU size is NON-8x8 (e.g., 16x16), restriction of B for minimum PU (NxN) is imposed
    DisableBiPred = (log2CUSize == Log2MinCUSize && PartMode == PART_NxN)   ←S653
}
```

FIG. 66

| | |
|---|---|
| seq_parameter_set_rbsp( ) { | Descriptor |
| profile_idc | u(8) |
| reserved_zero_8bits /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_frame_num_minus4 | ue(v) |
| pic_order_cnt_type | ue(v) |
| if( pic_order_cnt_type == 0 ) | |
|   log2_max_pic_order_cnt_lsb_minus4 | ue(v) |
| else if( pic_order_cnt_type == 1 ) { | |
|   delta_pic_order_always_zero_flag | u(1) |
|   offset_for_non_ref_pic | se(v) |
|   num_ref_frames_in_pic_order_cnt_cycle | ue(v) |
|   for( i = 0; i < num_ref_frames_in_pic_order_cnt_cycle; i++ ) | |
|     offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) ←SYN661 |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | u(1) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) ←SYN662 |
| restrict_bipred_flag | u(1) ←SYN663 |
| rbsp_trailing_bits( ) | |
| } | |

FIG. 67

```
if (restrict_bipred_flag == 0)         ←S671
{
    DisableBiPred = 0                   ←S672
}
else if (Log2MinCUSize == 3)           ←S673
{
    // If the minimum CU size is 8x8, restriction is imposed on non-8x8 (2Nx2N)
    DisableBiPred = (log2CUSize == Log2MinCUSize && PartMode != PART_2Nx2N)    ←S674
}
else
{
    // If the minimum CU size is NON-8x8 (e.g., 16x16), restriction of B for minimum PU (NxN) is imposed
    DisableBiPred = (log2CUSize == Log2MinCUSize && PartMode == PART_NxN)      ←S675
}
```

FIG. 68

```
if (restrict_bipred_flag == 0)
{
    DisableBiPred = 0                    ←S681
}
else if (restrict_bipred_flag == 1)
{
    // The use of PUs other than 2Nx2N is restricted
    DisableBiPred = (log2CUSize == Log2MinCUSize && PartMode != PART_2Nx2N) ||    ←S682
        (log2CUSize < Log2MinCUSize)
}
else
{
    // The use of NxN is restricted
    DisableBiPred = (log2CUSize == Log2MinCUSize && PartMode == PART_NxN) ||    ←S683
        (log2CUSize < Log2MinCUSize)
}
```

FIG. 69

| seq_parameter_set_rbsp( ) { | Descriptor | |
|---|---|---|
| profile_idc | u(8) | |
| reserved_zero_8bits /* equal to 0 */ | u(8) | |
| level_idc | u(8) | |
| seq_parameter_set_id | ue(v) | |
| max_temporal_layers_minus1 | u(3) | |
| pic_width_in_luma_samples | u(16) | |
| pic_height_in_luma_samples | u(16) | |
| bit_depth_luma_minus8 | ue(v) | |
| bit_depth_chroma_minus8 | ue(v) | |
| pcm_bit_depth_luma_minus1 | u(4) | |
| pcm_bit_depth_chroma_minus1 | u(4) | |
| log2_max_frame_num_minus4 | ue(v) | |
| pic_order_cnt_type | ue(v) | |
| if( pic_order_cnt_type == 0 ) | | |
|   log2_max_pic_order_cnt_lsb_minus4 | ue(v) | |
| else if( pic_order_cnt_type == 1 ) { | | |
|   delta_pic_order_always_zero_flag | u(1) | |
|   offset_for_non_ref_pic | se(v) | |
|   num_ref_frames_in_pic_order_cnt_cycle | ue(v) | |
|   for( i = 0; i < num_ref_frames_in_pic_order_cnt_cycle; i++ ) | | |
|     offset_for_ref_frame[ i ] | se(v) | |
| } | | |
| max_num_ref_frames | ue(v) | |
| gaps_in_frame_num_value_allowed_flag | u(1) | |
| log2_min_coding_block_size_minus3 | ue(v) | ←SYN691 |
| log2_diff_max_min_coding_block_size | ue(v) | |
| log2_min_transform_block_size_minus2 | ue(v) | |
| log2_diff_max_min_transform_block_size | ue(v) | |
| log2_min_pcm_coding_block_size_minus3 | ue(v) | |
| max_transform_hierarchy_depth_inter | ue(v) | |
| max_transform_hierarchy_depth_intra | ue(v) | |
| chroma_pred_from_luma_enabled_flag | u(1) | |
| loop_filter_across_slice_flag | u(1) | |
| sample_adaptive_offset_enabled_flag | u(1) | |
| adaptive_loop_filter_enabled_flag | u(1) | |
| pcm_loop_filter_disable_flag | u(1) | |
| cu_qp_delta_enabled_flag | u(1) | |
| temporal_id_nesting_flag | u(1) | |
| restrict_motion_compensation_flag | u(1) | ←SYN692 |
| rbsp_trailing_bits( ) | | |
| } | | |

FIG. 70

```
if (restrict_motion_compensation_flag == 0)    ←S701
{
    DisableBiPred = 0    ←S702
}
else if (Log2MinCUSize == 3)    ←S703
{
    // If the minimum CU size is 8x8, restriction is imposed on non-8x8 (2Nx2N)
    DisableBiPred = (log2CUSize == Log2MinCUSize && PartMode != PART_2Nx2N)    ←S704
}
else
{
    // If the minimum CU size is NON-8x8 (e.g., 16x16), restriction of B for minimum PU (NxN) is imposed
    DisableBiPred = (log2CUSize == Log2MinCUSize && PartMode == PART_NxN)    ←S705
}
```

FIG. 77

```
// Convert the X coordinate into an integer if (mv_L0[0] & 3 && mvL0[1] & 3) {      ←—S771
    mv_L0[0] &= ~3                       ←—S772
}
if (mv_L1[0] & 3 && mvL1[1] & 3) {      ←—S773
    mv_L1[0] &= ~3                       ←—S774
}
```

FIG. 78

```
// Convert the Y coordinate into an integer
if (mv_L0[0] & 3 && mvL0[1] & 3) {      ←—S781
    mv_L0[1] &= ~3                       ←—S782
}
if (mv_L1[0] & 3 && mvL1[1] & 3) {      ←—S783
    mv_L1[1] &= ~3                       ←—S784
}
```

FIG. 79

```
// Convert the X coordinate and Y coordinate
into integers
if (mv_L0[0] & 3 && mvL0[1] & 3) {         ← S791
    mv_L0[0] &= ~3                         ⎫
    mv_L0[1] &= ~3                         ⎬ S792
}                                          ⎭
if (mv_L1[0] & 3 && mvL1[1] & 3) {         ← S793
    mv_L1[0] &= ~3                         ⎫
    mv_L1[1] &= ~3                         ⎬ S794
}                                          ⎭
```

FIG. 80

```
// Convert the X coordinate and Y coordinate
for only one list into integers
if (mv_LX[0] & 3 && mvLX[1] & 3) {         ← S801
    mv_LX[0] &= ~3                         ⎫
    mv_LX[1] &= ~3                         ⎬ S802
}                                          ⎭
X = 0 OR 1
```

FIG. 84

| LevelNumber | MaxSize | MaxLog2MinCUSize | MinPUSize | MinBipredPUSize |
|---|---|---|---|---|
| 1 | 99 | 3(=8x8) | 4x4 | 8x4 |
| 2 | 396 | 3 | 4x4 | 8x4 |
| 2.1 | 396 | 3 | 4x4 | 8x4 |
| 2.2 | 792 | 3 | 4x4 | 8x4 |
| 3 | 1620 | 3 | 4x4 | 8x4 |
| 3.1 | 3600 | 3 | 8x4 | 8x8 |
| 3.2 | 5120 | 3 | 8x4 | 8x8 |
| 4 | 8192 | 3 | 8x4 | 8x8 |
| 4.1 | 8192 | 3 | 8x4 | 8x8 |
| 4.2 | 8704 | 3 | 8x4 | 8x8 |
| 5 | 22080 | 4(=16x16) | 8x8 | 16x8, 8x16 |
| 5.1 | 36864 | 4 | 8x8 | 16x8, 8x16 |

480P (/256 = 1350)
720P (/256 = 3600)
1080P (/256 = 8160)
2560x1600 (/256 = 16000)
4k (/256 = 34560)

TH1 → (between 3 and 3.1)
TH2 → (between 4.2 and 5)

FIG. 85

| LevelNumber | MaxSize | MaxLog2MinCUSize | MinPUSize | MinBipredPUSize |
|---|---|---|---|---|
| 1 | 99 | 3 (=8x8) | 4x4 | 4x4 |
| 2 | 396 | 3 | 4x4 | 4x4 |
| 2.1 | 396 | 3 | 4x4 | 4x4 |
| 2.2 | 792 | 3 | 4x4 | 8x4 |
| 3 | 1620 | 3 | 4x4 | 8x4 |
| 3.1 | 3600 | 3 | 8x4 | 8x8 |
| 3.2 | 5120 | 3 | 8x4 | 8x8 |
| 4 | 8192 | 3 | 8x4 | 8x8 |
| 4.1 | 8192 | 3 | 8x4 | 8x8 |
| 4.2 | 8704 | 3 | 8x4 | 8x8 |
| 5 | 22080 | 4 (=16x16) | 8x8 | 16x8, 8x16 |
| 5.1 | 36864 | 4 | 8x8 | 16x8, 8x16 |

TH0 → (between 2.2 and 3): 480P (/256 = 1350)
TH1 → (between 3 and 3.1): 720P (/256 = 3600)
(1080P /256 = 8160)
TH2 → (between 4.2 and 5): 2560x1600 (/256 = 16000)
4k (/256 = 34560)

FIG. 86

```
if (level_idc < TH1) // S861
{
    // S862
    // Impose no restrictions
}
else if (level_idc < TH2) // S863
{
    // S864
    // Impose restriction of B for 8x4 and 4x8
    DisableBiPred = (log2CUSize == 3 && PartMode != PART_2Nx2N)
}
else
{
    // S865
    // Impose restriction of B for 8x8
    DisableBiPred = (log2CUSize == 4 && PartMode = PART_NxN)
}
```

FIG. 87

```
if (level_idc < TH1) // S871
{
    // S872
    // Impose no restrictions
}
else if (level_idc < TH2) // S873
{
    // S874'
    // Prohibit 4x4 PU (restriction of PU SIZE)
    inter_4x4_enable_flag = 0
    // S874
    // Impose restriction of B for 8x4 and 4x8
    DisableBiPred = (log2CUSize == 3 && PartMode != PART_2Nx2N)
else
{
    // S875'
    // Restrict CU size (restriction of PU SIZE)
    Log2MinCuSize = Min(Log2MinCuSize, 4)
    // S875
    // Impose restriction of B for 8x8
    DisableBiPred = (log2CUSize == 4 && PartMode = PART_NxN)
}
```

METHOD FOR DECODING AN IMAGE, IMAGE DECODING APPARATUS, METHOD FOR ENCODING AN IMAGE, AND IMAGE ENCODING APPARATUS

CROSS-REFERENCE TO RELATED APPLICATION

This application is a Continuation of co-pending application Ser. No. 14/347,523, filed on Mar. 26, 2014, which is the National Phase under 35 U.S.C. § 371 of International Application No. PCT/JP2012/075200, filed on Sep. 28, 2012, which claims the benefit under 35 U.S.C. § 119(a) to Japanese Patent Application No. 2011-215475 filed on Sep. 29, 2011, Japanese Patent Application No. 2011-242843 filed Nov. 4, 2011, and Japanese Patent Application No. 2011-289936 filed Dec. 28, 2011, all of which are hereby expressly incorporated by reference into the present application.

TECHNICAL FIELD

The present invention relates to an image decoding device and an image method for decoding encoded data representing an image, and an image encoding device for encoding an image to generate encoded data.

BACKGROUND ART

Video encoding devices for encoding moving images to generate encoded data, and video decoding devices for decoding the encoded data to generate decoded images are used for efficient transmission or recording of moving images.

Specifically, video coding standards are available, such as H.264/MPEG-4.AVC, the standard implemented in KTA software, which is a codec for joint development in VCEG (Video Coding Expert Group), the standard implemented in TMuC (Test Model under Consideration) software, and the standard proposed in HEVC (High-Efficiency Video Coding), which is a codec successor to H.264/MPEG-4.AVC (NPLs 1 and 4).

In such video coding standards, images (pictures) forming a moving image are managed using a hierarchical structure that is composed of slices obtained by partitioning each image, coding units obtained by splitting each slice, and blocks and partitions obtained by splitting each coding unit. The images (pictures) are generally encoded/decoded on a block-by-block basis.

In such video coding standards, generally, a prediction image is generated based on a locally decoded image obtained by encoding/decoding an input image, and the prediction image is subtracted from the input image (original image) to obtain a prediction residual (also referred to as a "differential image" or a "residual image") which is then encoded. Methods of generating prediction images include inter-frame prediction (inter prediction) and intra-frame prediction (intra prediction).

In intra prediction, a prediction image in a frame is sequentially generated based on a locally decoded image in this frame.

In inter prediction, on the other hand, a prediction image in a frame to be predicted is generated in units of prediction units (for example, blocks) by applying motion compensation using motion vectors to a reference image in a reference frame (decoded image) the entirety of which has been decoded.

As for inter prediction, a technique of splitting a coding unit, which is the unit of a coding process, into asymmetric partitions (PUs) when using inter prediction was adopted (AMP; Asymmetric Motion Partition, NPLs 2 and 3) at the sixth meeting of the JCT-VC, which was recently held (Torino, IT, 14-22 Jul., 2011).

It has also been proposed that non-square quadtree transform (NSQT) be used if the type of partition is an asymmetric partition (NPL 2).

CITATION LIST

Non Patent Literature

NPL 1: "WD4: Working Draft 4 of High-Efficiency Video Coding (JCTVC-F803_d1)", Joint Collaborative Team on Video Coding (JCT-VC) of ITU-T SG16 WP3 and ISO/IEC JTC1/SC29/WG11 6th Meeting: Torino, IT, 14-22 Jul., 2011 (published on Sep. 8, 2011)

NPL 2: "CE2: Non-Square Quadtree Transform for symmetric and asymmetric motion partition (JCTVC-F412)", Joint Collaborative Team on Video Coding (JCT-VC) of ITU-T SG16 WP3 and ISO/IEC JTC1/SC29/WG116th Meeting: Torino, IT, 14-22 Jul., 2011 (published on Jul. 2, 2011)

NPL 3: "CE2: Test results of asymmetric motion partition (AMP) (JCTVC-F379)", Joint Collaborative Team on Video Coding (JCT-VC) of ITU-T SG16 WP3 and ISO/IEC JTC1/SC29/WG116th Meeting: Torino, 14-22 Jul., 2011 (published on Jul. 2, 2011)

NPL 4: "WD4: Working Draft 4 of High-Efficiency Video Coding (JCTVC-F803_d5)", Joint Collaborative Team on Video Coding (JCT-VC) of ITU-T SG16 WP3 and ISO/IEC JTC1/SC29/WG11 6th Meeting: Torino, IT, 14-22 Jul., 2011 (published on Oct. 28, 2011)

SUMMARY OF INVENTION

Technical Problem

In inter prediction, however, new addition of an asymmetric partition, described above, causes an increase in the amount of coding of side information. There is another problem in that although a newly added asymmetric partition has different characteristics from an existing symmetric partition, the characteristics of the asymmetric partition are not fully exploited in coding processes.

The present invention has been made in view of the foregoing problems, and it is an object of the present invention to provide an image decoding device, an image decoding method, and an image encoding device that may achieve a reduction in the amount of coding taken in the use of an asymmetric partition and that may implement efficient encoding/decoding processes exploiting the characteristics of the asymmetric partition.

Solution to Problem

In order to overcome the foregoing problems, an image decoding device according to an aspect of the present invention is an image decoding device for decoding an image in a prediction unit using, as an inter-frame prediction scheme, a uni-prediction scheme in which one reference image is referred to or a bi-prediction scheme in which two reference images are referred to, the image decoding device including a motion compensation parameter derivation unit configured to derive a motion compensation parameter indicating one of the uni-prediction scheme and the bi-prediction scheme, wherein in a case that the prediction unit has a size less than or equal to a predetermined value, the motion compensation parameter derivation unit is configured to derive the motion compensation parameter by switching between the prediction schemes.

In order to overcome the foregoing problems, an image decoding method according to an aspect of the present invention is an image decoding method for decoding an image in a prediction unit using, as an inter-frame prediction scheme, a uni-prediction scheme in which one reference image is referred to or a bi-prediction scheme in which two reference images are referred to, the image decoding method at least including the steps of deriving a motion compensation parameter indicating one of the uni-prediction scheme and the bi-prediction scheme, and determining whether or not the prediction unit has a size less than or equal to a predetermined value, wherein the step of deriving a motion compensation parameter includes deriving the motion compensation parameter by switching between the prediction schemes in a case that the size of the prediction unit is less than or equal to the predetermined value.

In order to overcome the foregoing problems, an image encoding device according to an aspect of the present invention is an image encoding device for encoding an image in a prediction unit using, as an inter-frame prediction scheme, a uni-prediction scheme in which one reference image is referred to or a bi-prediction scheme in which two reference images are referred to, the image encoding device including a motion compensation parameter derivation unit configured to derive a motion compensation parameter indicating one of the uni-prediction scheme and the bi-prediction scheme, wherein in a case that the prediction unit has a size less than or equal to a predetermined value, the motion compensation parameter derivation unit is configured to derive the motion compensation parameter by switching between the prediction schemes.

In order to overcome the foregoing problems, an image decoding device according to an aspect of the present invention is an image decoding device for decoding encoded image data for each coding unit to generate a decoded image, the image decoding device including a CU information decoding unit configured to decode information for specifying a partition type in which the coding unit is split, and an arithmetic decoding unit configured to decode binary values from the encoded image data using arithmetic decoding that uses contexts or arithmetic decoding that does not use contexts, wherein in a case that the CU information decoding unit decodes information for specifying an asymmetric partition (AMP; Asymmetric Motion Partition) as the partition type, the arithmetic decoding unit is configured to decode the binary values by switching between the arithmetic decoding that uses contexts and the arithmetic decoding that does not use contexts in accordance with a position of the binary values.

Advantageous Effects of Invention

According to an aspect of the present invention, a reduction in the amount of coding taken in the use of an asymmetric partition may be achieved. In addition, efficient encoding/decoding processes exploiting the characteristics of the asymmetric partition may be implemented.

BRIEF DESCRIPTION OF DRAWINGS

FIG. 5 is a diagram illustrating a specific example configuration of a PU size table in which the numbers of PUs and PU sizes are defined in association with CU sizes and PU partition types.

FIG. 8 is a diagram illustrating an example of the binarization information that defines a CU having an 8×8 size.

FIG. 9 is a diagram illustrating another example of the binarization information that defines a CU having an 8×8 size.

FIG. 10 is a table illustrating another example of the binarization information that defines associations between combinations of CU prediction types and PU partition types and bin sequences.

FIG. 11 is a table illustrating another example of the binarization information that defines associations between combinations of CU prediction types and PU partition types and bin sequences.

FIG. 31 illustrates an example of a PU syntax table in the related art, and is a diagram illustrating the configuration of encoded data in a case that no restriction of bi-prediction is performed.

FIG. 32 includes diagrams illustrating the meaning of an inter prediction flag. Part (a) of FIG. 32 illustrates the meaning of an inter prediction flag in a case that the inter prediction flag is a binary flag, and part (b) of FIG. 32 illustrates the meaning of an inter prediction flag in a case that the inter prediction flag is a ternary flag.

FIG. 33 includes diagrams illustrating an example of a PU syntax table, in which (a) and (b) illustrate the configuration of encoded data in a case that restriction of bi-prediction is performed, and specifically illustrate the portion of an inter prediction flag inter_pred_flag.

FIG. 34 includes diagrams illustrating an example of a syntax table for bi-prediction restriction. Part (a) of FIG. 34 illustrates the case that the sequence parameter set includes a flag disable_bipred_in_small_PU restricting whether or not to impose the restriction of bi-prediction. Part (b) of FIG. 34 illustrates an example in which a prediction restriction flag use_restricted_prediction is used as a common flag. Part (c) of FIG. 34 illustrates an example in which disable_bipred_size indicating the size of a PU for which bi-prediction is prohibited is included in encoded data.

FIG. 35 includes diagrams illustrating correspondences between ranges over which the restriction of bi-prediction applies and bi-prediction restriction methods.

FIG. 36 is a diagram illustrating an example of a syntax table for bi-prediction restriction.

FIG. 37 includes diagrams depicting a combined table for bi-prediction restriction, in which parts (a), (b), and (c) are diagrams depicting an example of the value of combined_inter_pred_ref_idx, and part (d) includes a table illustrating a method for deriving a maximum value MaxPredRef and a diagram illustrating pseudo code.

FIG. 41 is pseudo code illustrating a decoding process for combined_inter_pred_ref_idx in a case that an inverse conversion variable table is used.

FIG. 42 is pseudo code illustrating an encoding process for combined_inter_pred_ref_idx in a case that a conversion variable table is used.

Figure 46:
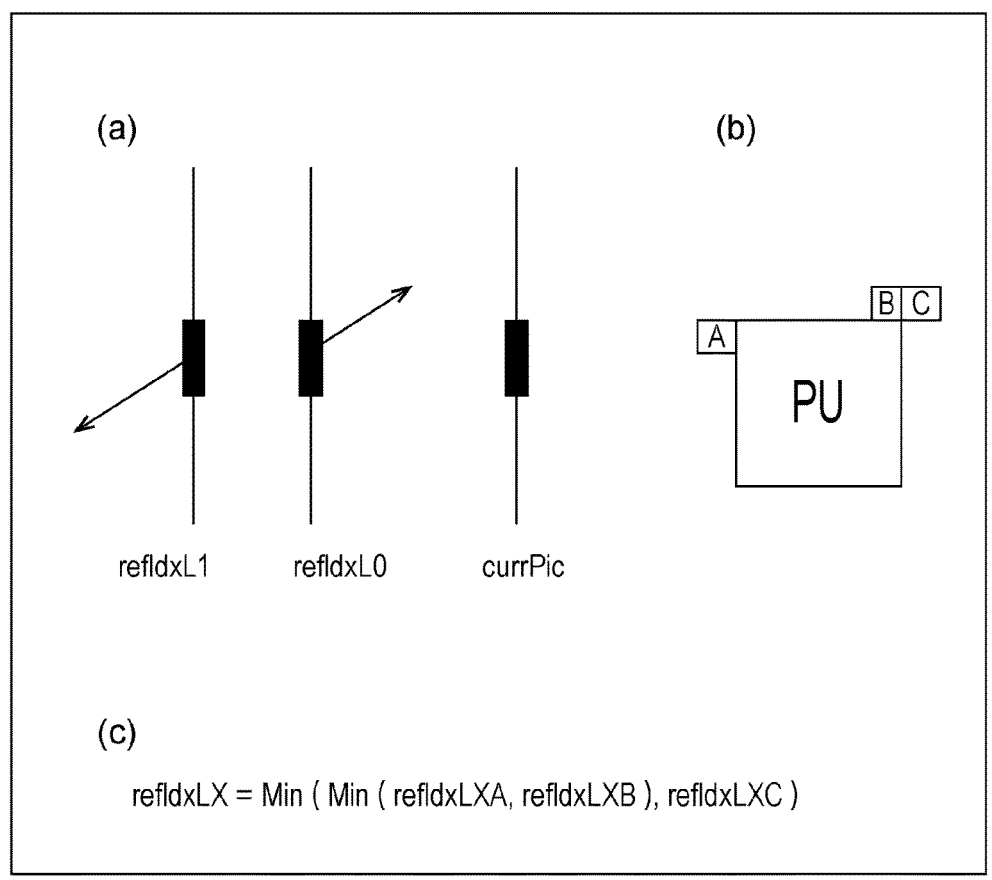

Parts (a) to (c) of FIG. 46 are diagrams depicting the operation of a temporal merge candidate derivation unit 1212B.

FIG. 47 is a diagram depicting the operation of a unique candidate derivation unit 1212C.

Parts (a) to (c) of FIG. 48 are diagrams depicting the operation of a combined bi-predictive merge candidate derivation unit 1212D.

Parts (a) and (b) of FIG. 49 are diagrams depicting the operation of a non-scaled bi-predictive merge candidate derivation unit 1212E.

FIG. 50 is a diagram depicting the operation of a zero vector merge candidate derivation unit 1212F.

FIG. 51 is a diagram depicting the operation of bi-prediction/uni-prediction conversion.

FIG. 52 includes diagrams depicting an example of bi-prediction restriction methods, in which part (a) is a diagram illustrating an example in which bi-prediction restriction on a basic inter PU, bi-prediction restriction on a merge PU, skipped derivation of bi-predictive merge candidates are uniformly applied to PUs having 4×4, 4×8, and 8×4 sizes, parts (b) and (c) are diagrams illustrating an example in which the restriction of bi-prediction is imposed only on a basic inter PU without the application of the bi-prediction restriction on the merge PU and the skipped derivation of bi-predictive merge candidates, and part (d) is a diagram illustrating an example in which the bi-prediction restriction on the basic inter PU is uniformly applied to PUs having 4×4, 4×8, and 8×4 sizes and in which the bi-prediction restriction on the merge PU and the skipped derivation of bi-predictive merge candidates are applied to PUs having an 8×8 size.

FIG. 53 includes diagrams depicting an example of bi-prediction restriction methods, in which part (a) is a diagram illustrating an example in which the bi-prediction restriction on the basic inter PU and the skipped derivation of bi-predictive merge candidates are applied to 4×4, 4×8, 8×4, and 8×8, and part (b) is a diagram illustrating an example in which the skipped derivation of bi-predictive merge candidates is applied to 4×4, 4×8, 4×8, and 8×8.

Figure 54:
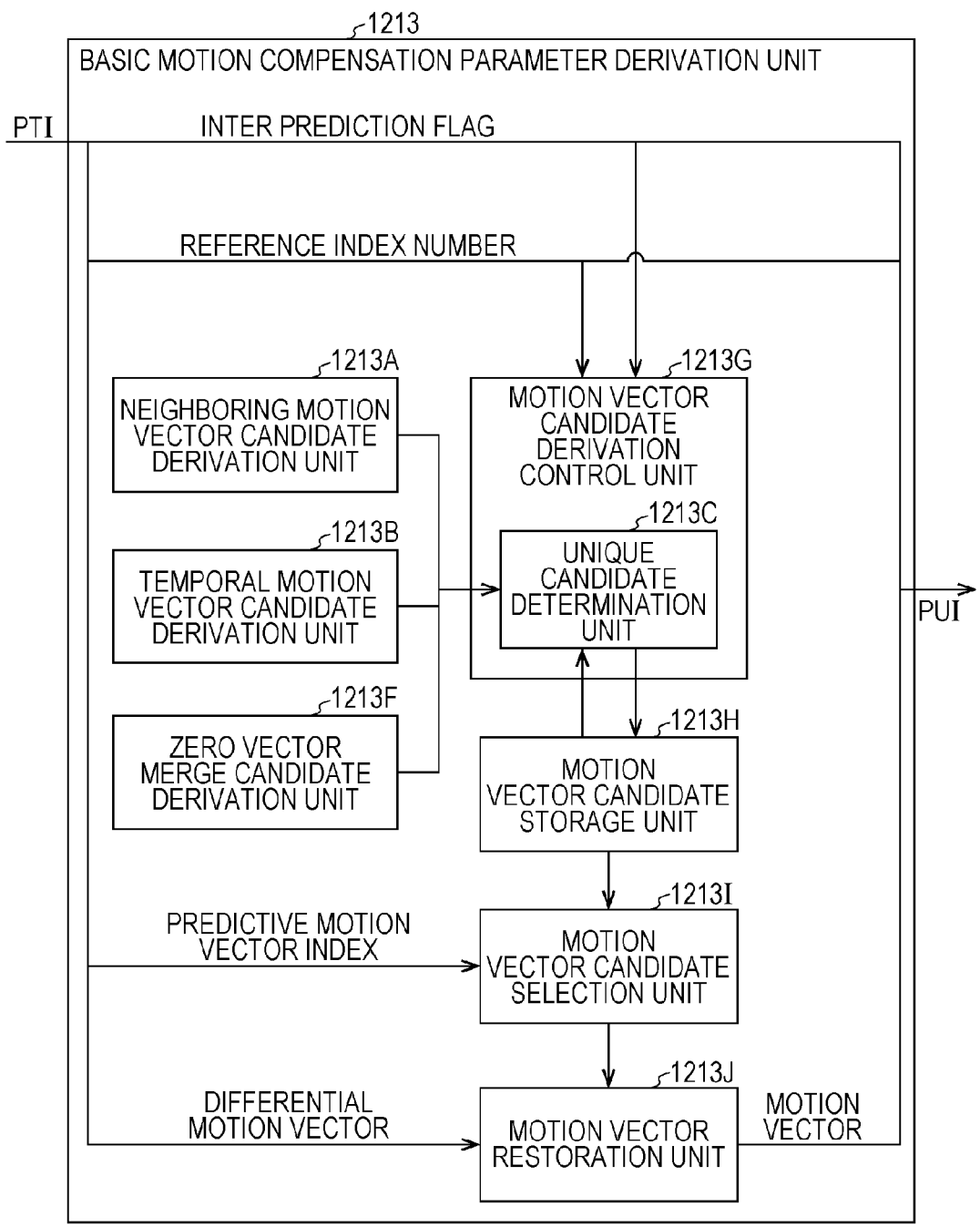

FIG. 54 is a block diagram illustrating a configuration of a basic motion compensation parameter derivation unit.

Figure 55:
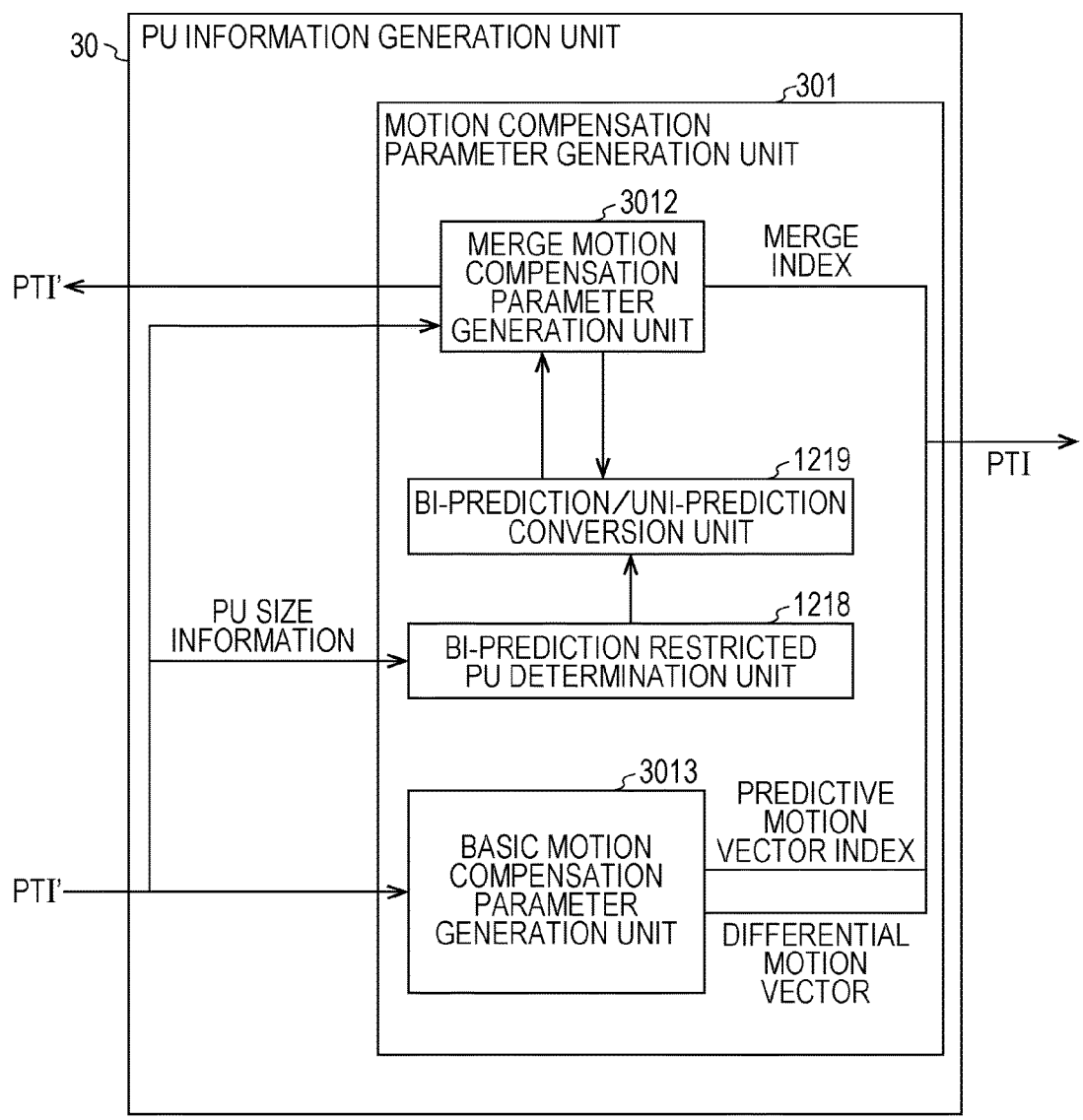

FIG. 55 is a block diagram illustrating a configuration of a PU information generation unit.

Figure 56:
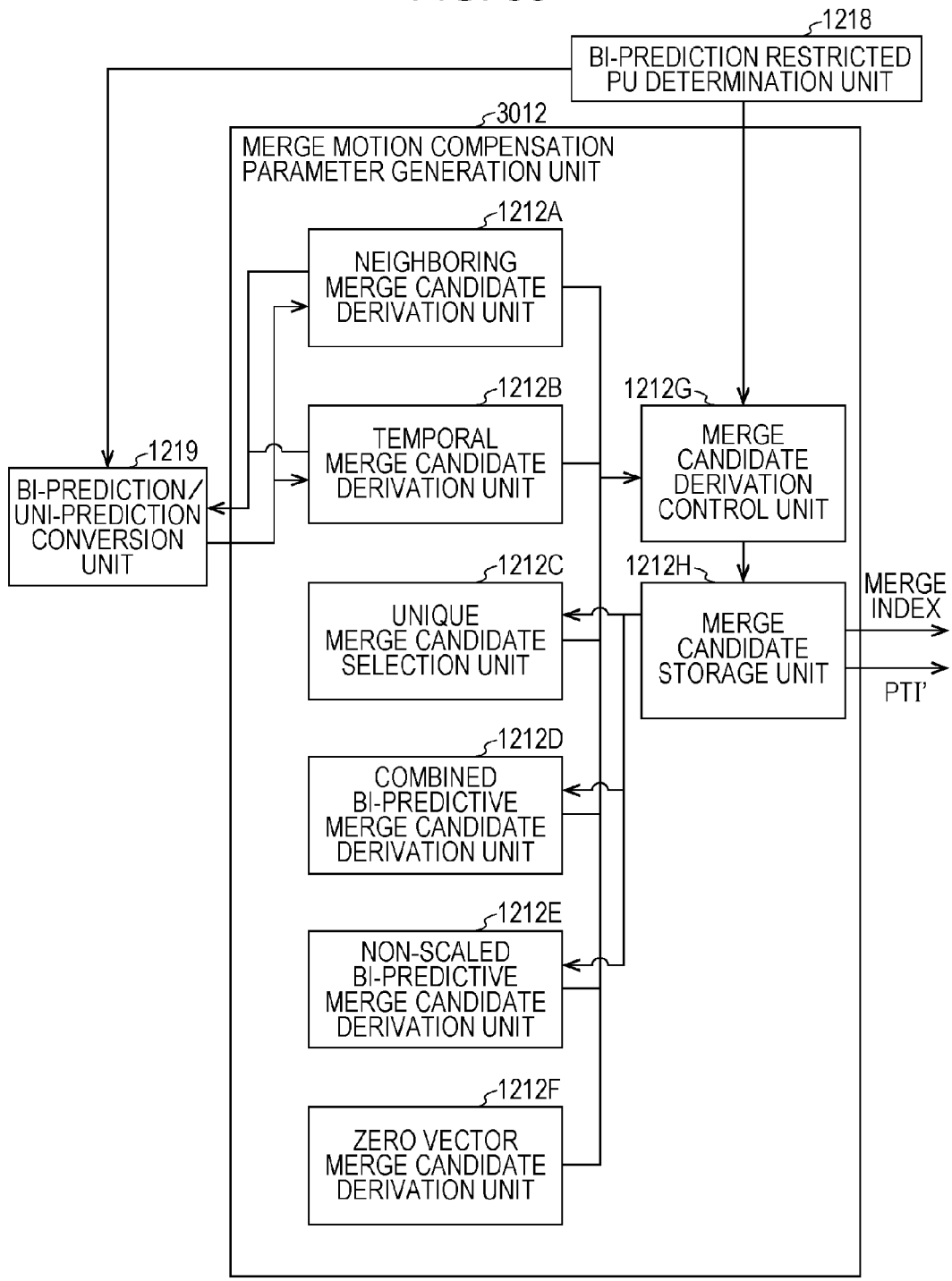

FIG. 56 is a block diagram illustrating a configuration of a merge motion compensation parameter generation unit.

Figure 57:
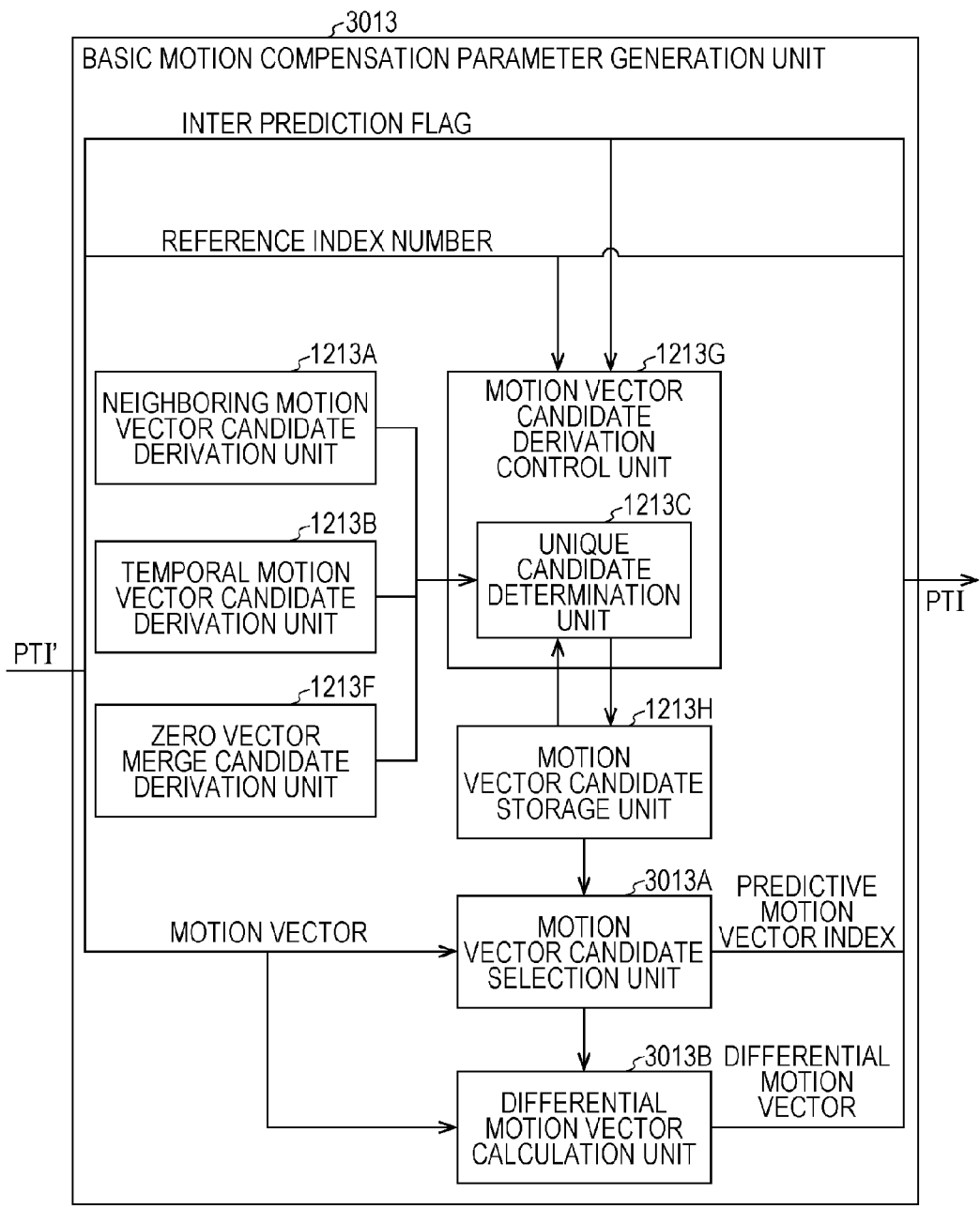

FIG. 57 is a block diagram illustrating a configuration of a basic motion compensation parameter generation unit.

FIG. 58 is a table that defines level limits specified in H.264/AVC.

FIG. 59 is a table that defines level limits specified in H.264/AVC.

FIG. 60 includes diagrams illustrating adaptive PU size constraints and bi-prediction restriction. Part (a) of FIG. 60 illustrates the case of a 16×16 CU, and part (b) of FIG. 60 illustrates the case of an 8×8 CU.

FIG. 61 is a block diagram illustrating an example configuration of a merge motion compensation parameter derivation unit and so on in the PU information decoding unit.

FIG. 62 is a diagram illustrating an example of a syntax table for bi-prediction restriction.

FIG. 63 is a diagram illustrating an example of pseudo code illustrating the operation of a bi-prediction restricted PU determination unit.

FIG. 64 is a diagram illustrating another example of the syntax table for bi-prediction restriction.

FIG. 65 is a diagram illustrating another example of the pseudo code illustrating the operation of the bi-prediction restricted PU determination unit.

FIG. 66 is a diagram illustrating another example of the syntax table for bi-prediction restriction.

FIG. 67 is a diagram illustrating another example of the pseudo code illustrating the operation of the bi-prediction restricted PU determination unit.

FIG. 68 is a diagram illustrating a modification of another example of the pseudo code illustrating the operation of the bi-prediction restricted PU determination unit.

FIG. 69 is a diagram illustrating still another example of the syntax table for bi-prediction restriction.

FIG. 70 is a diagram illustrating still another example of the pseudo code illustrating the operation of the bi-prediction restricted PU determination unit.

Figure 71:
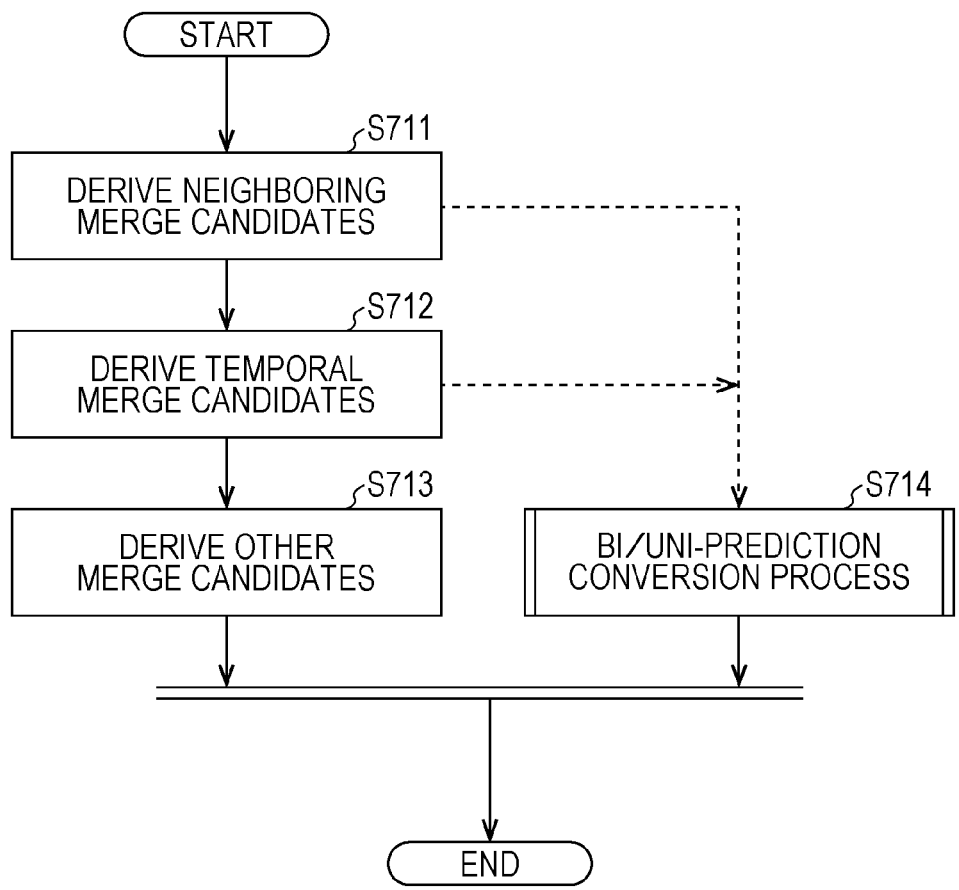

FIG. 71 is a flowchart illustrating an example of the processing flow of the merge motion compensation parameter derivation unit and a bi-prediction/uni-prediction conversion unit.

Figure 72:
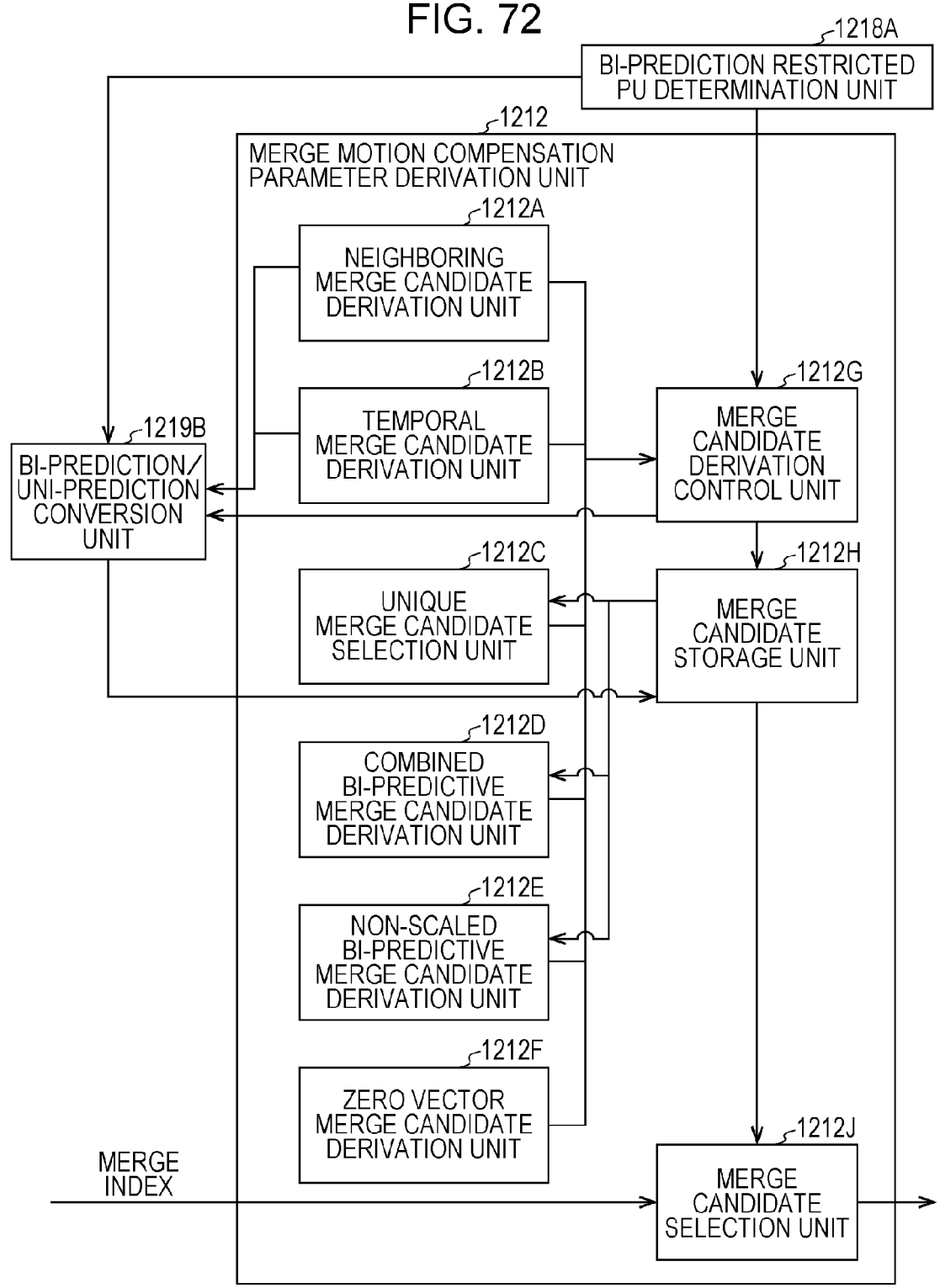

FIG. 72 is a block diagram illustrating an example configuration of the merge motion compensation parameter derivation unit and so on in the PU information decoding unit.

Figure 73:
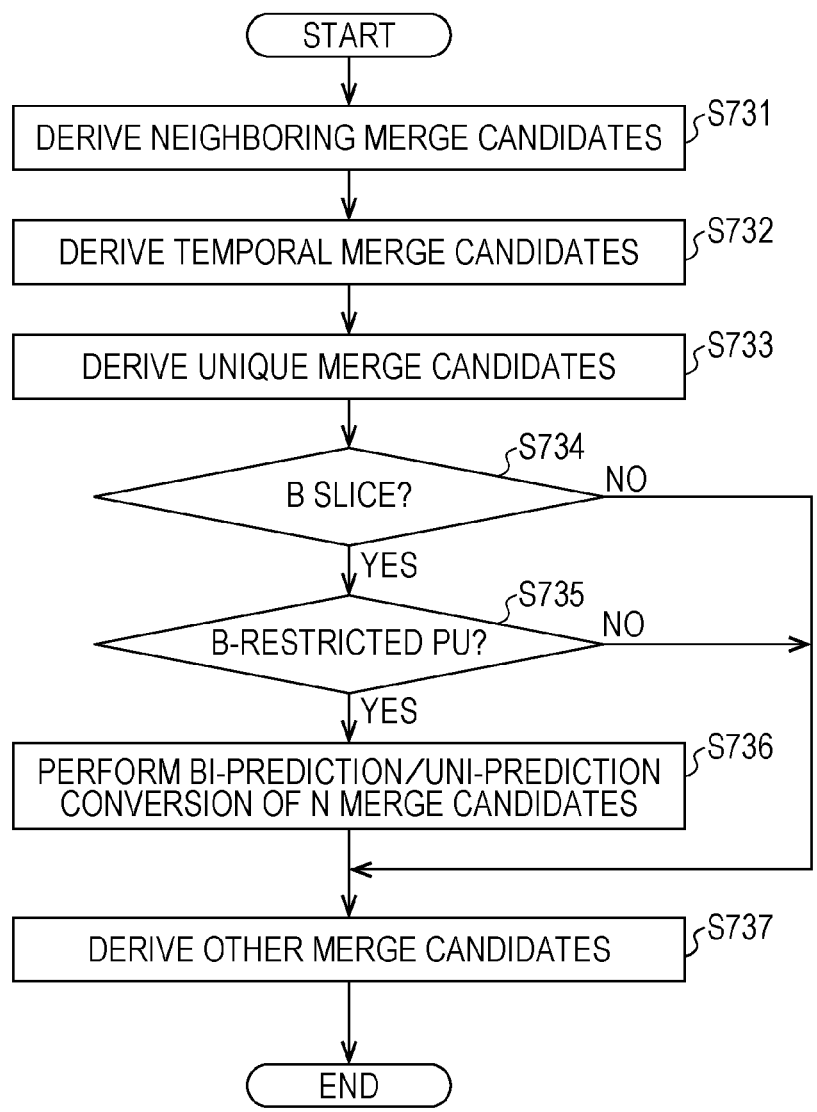

FIG. 73 is a flowchart illustrating a modification of the processing flow of the merge motion compensation parameter derivation unit and the bi-prediction/uni-prediction conversion unit.

Figure 74:
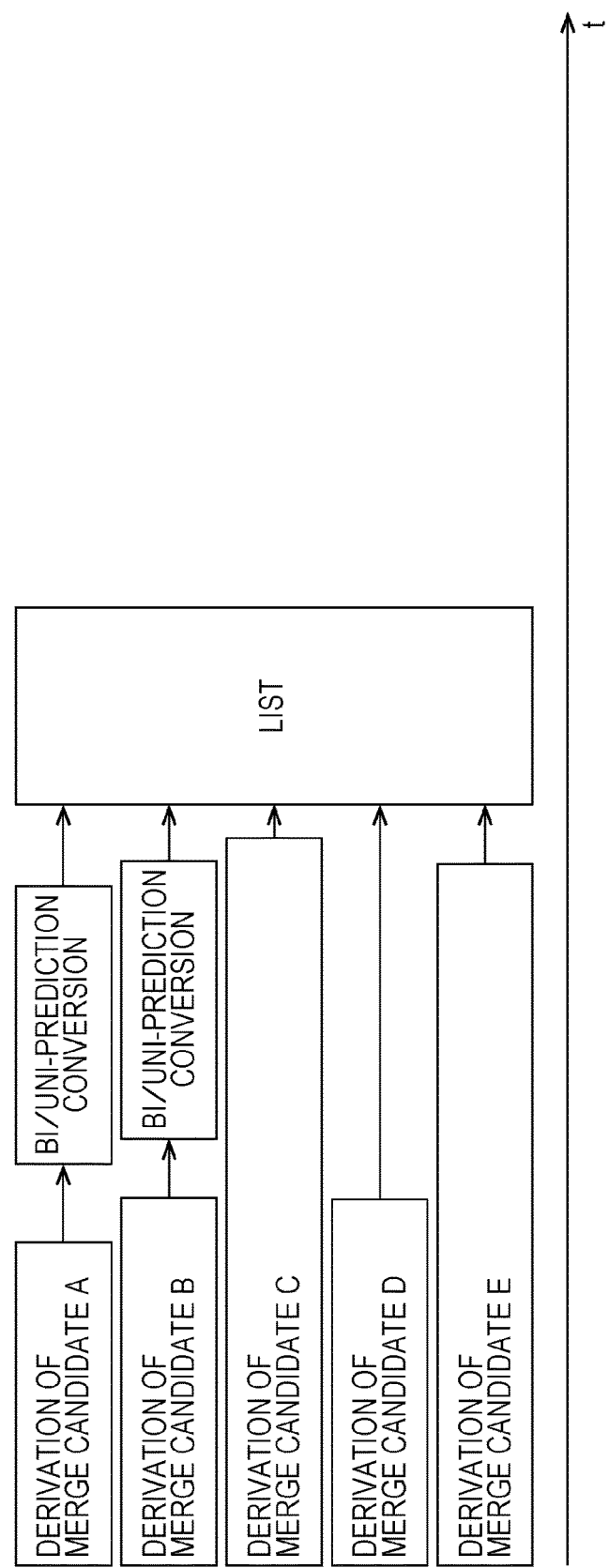

FIG. 74 is a time chart of a series of processes including a merge candidate derivation process, a bi-/uni-prediction conversion process, and a list creation process.

Figure 75:
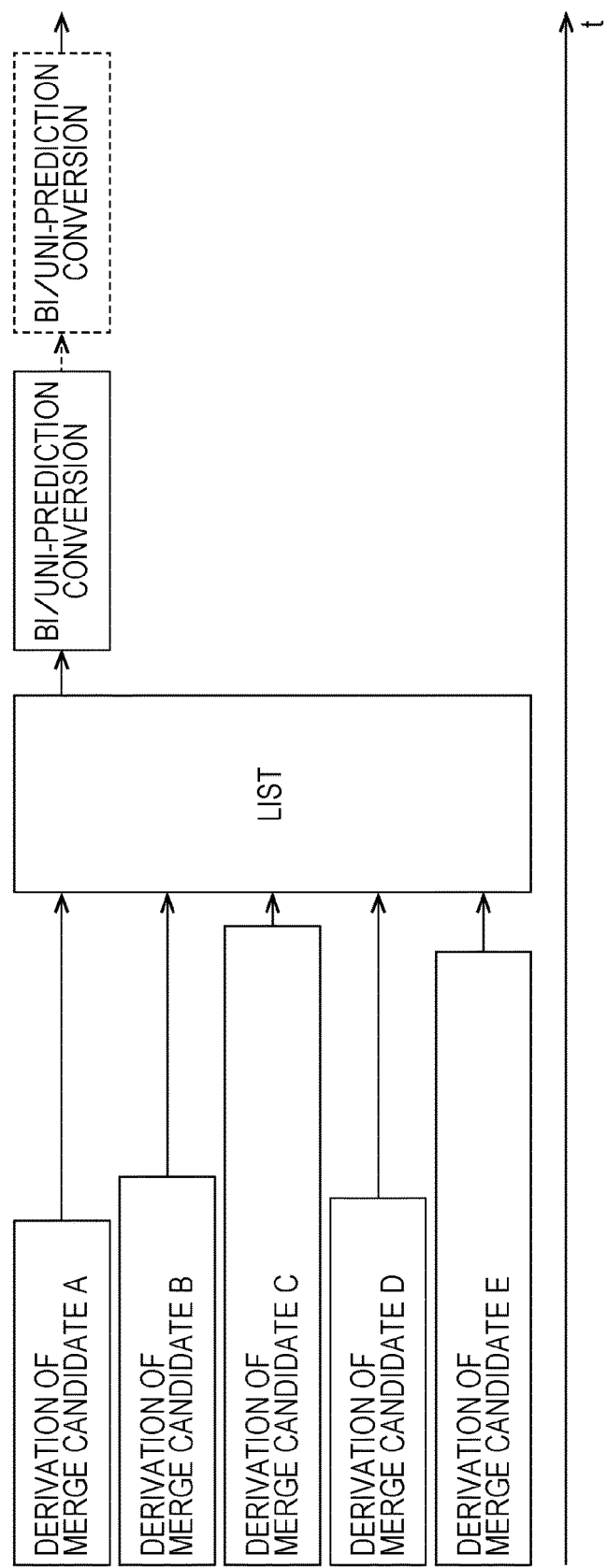

FIG. 75 is a time chart of a series of processes including a merge candidate derivation process, a bi-/uni-prediction conversion process, and a list creation process.

Figure 76:
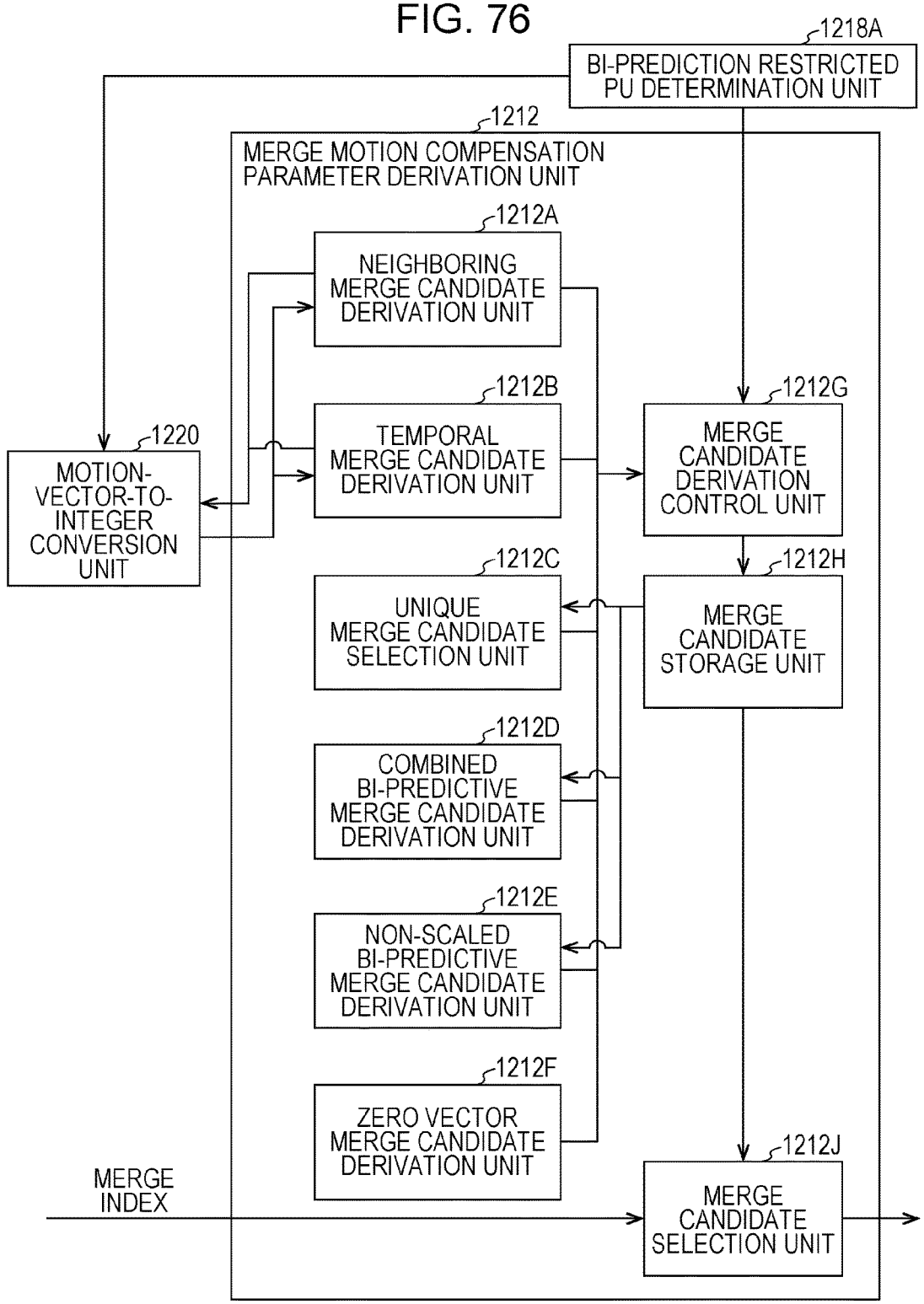

FIG. 76 is a block diagram illustrating an example configuration of the merge motion compensation parameter derivation unit and so on in the PU information decoding unit.

FIG. 77 is a diagram depicting a specific example of an integer formation process for converting the X coordinate into integers.

FIG. 78 is a diagram depicting a specific example of an integer formation process for converting the Y coordinate into integers.

FIG. 79 is a diagram depicting a specific example of an integer formation process for converting the X coordinate and the Y coordinate into integers.

FIG. 80 is a diagram depicting a specific example of an integer formation process for converting only one list from the X coordinate and Y coordinate to integers.

Figure 81:
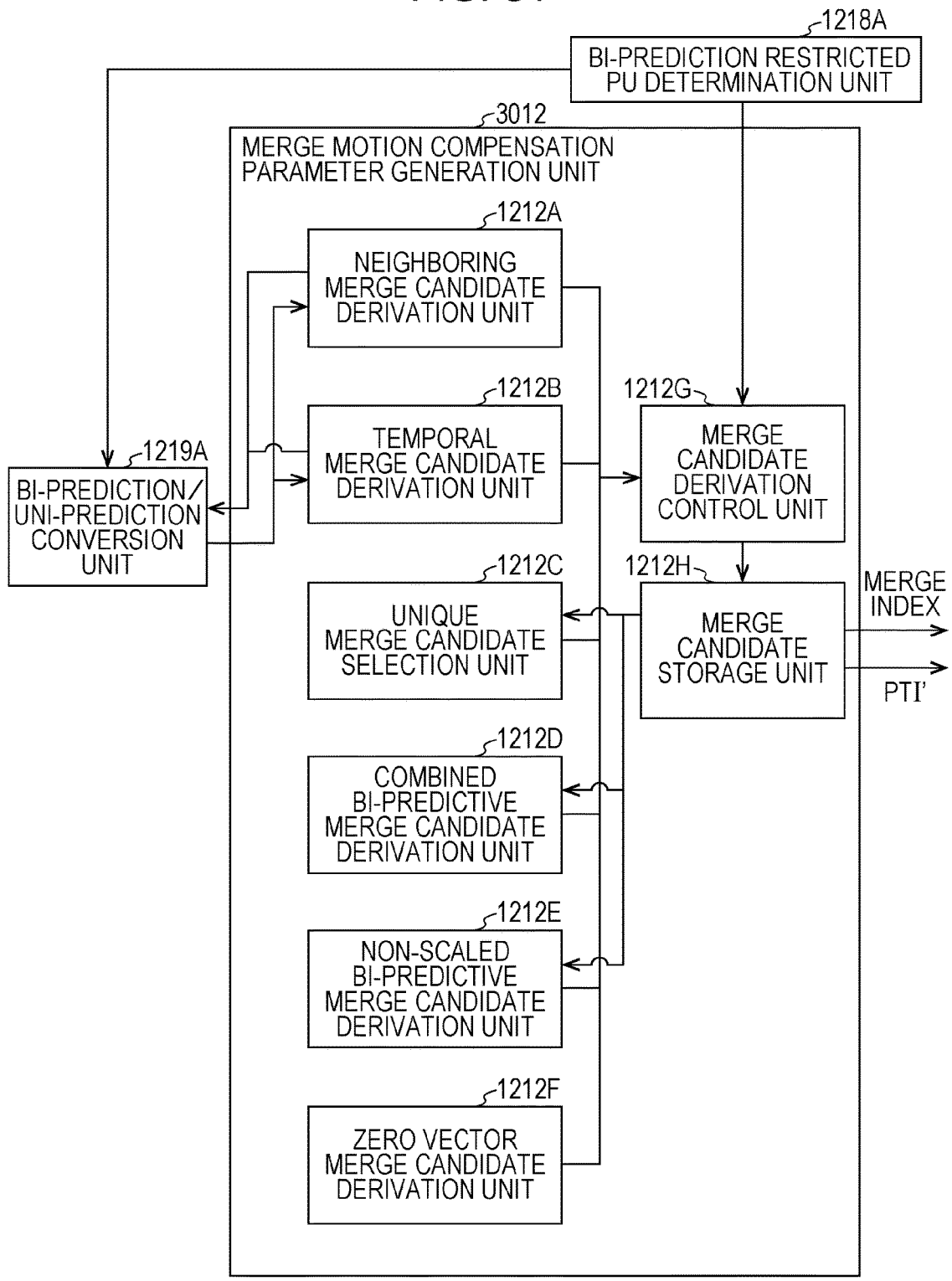

FIG. 81 is a block diagram illustrating an example configuration of the merge motion compensation parameter generation unit and so on in the PU information generation unit.

Figure 82:
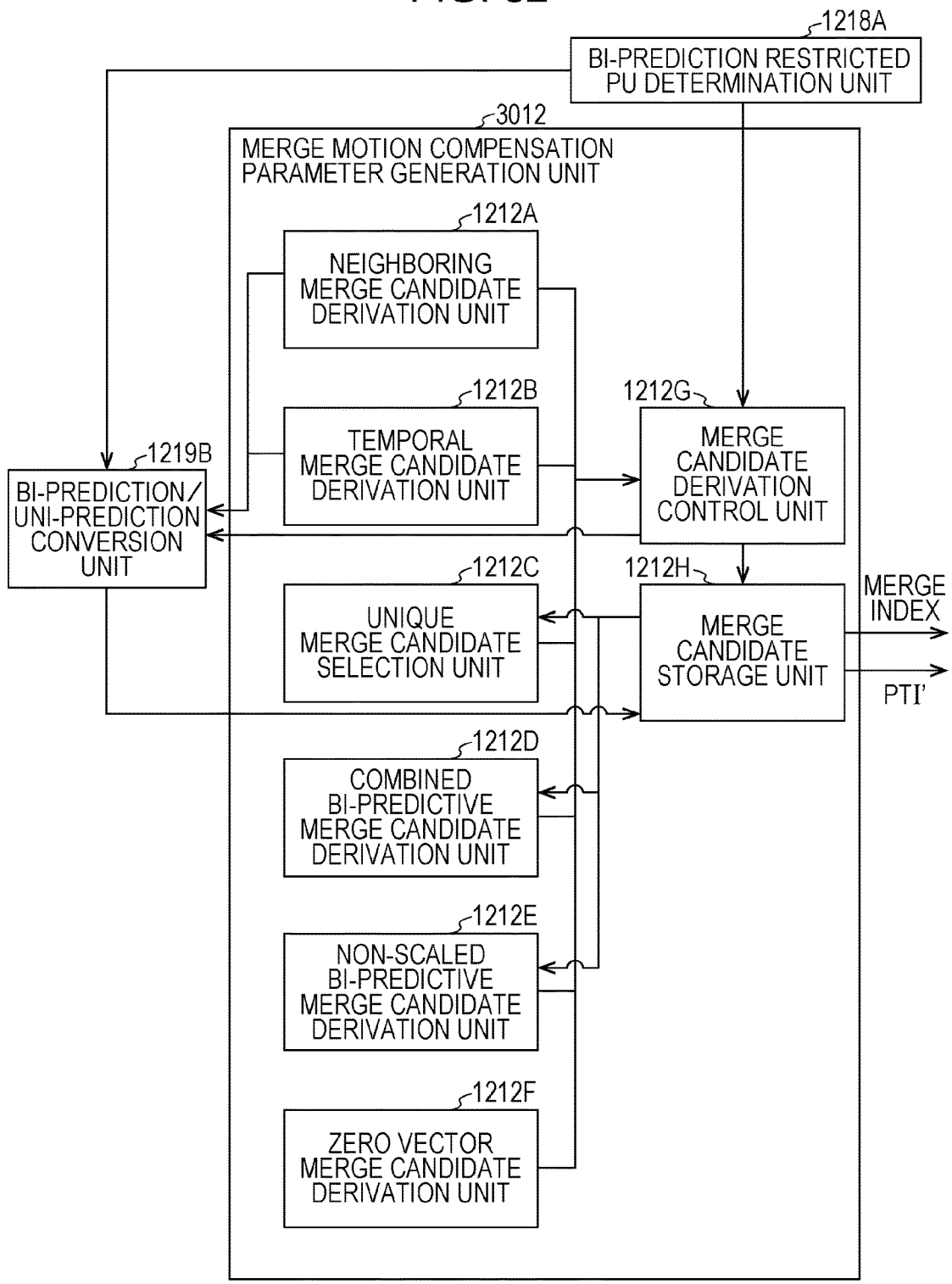

FIG. 82 is a block diagram illustrating an example configuration of the merge motion compensation parameter generation unit and so on in the PU information generation unit.

Figure 83:
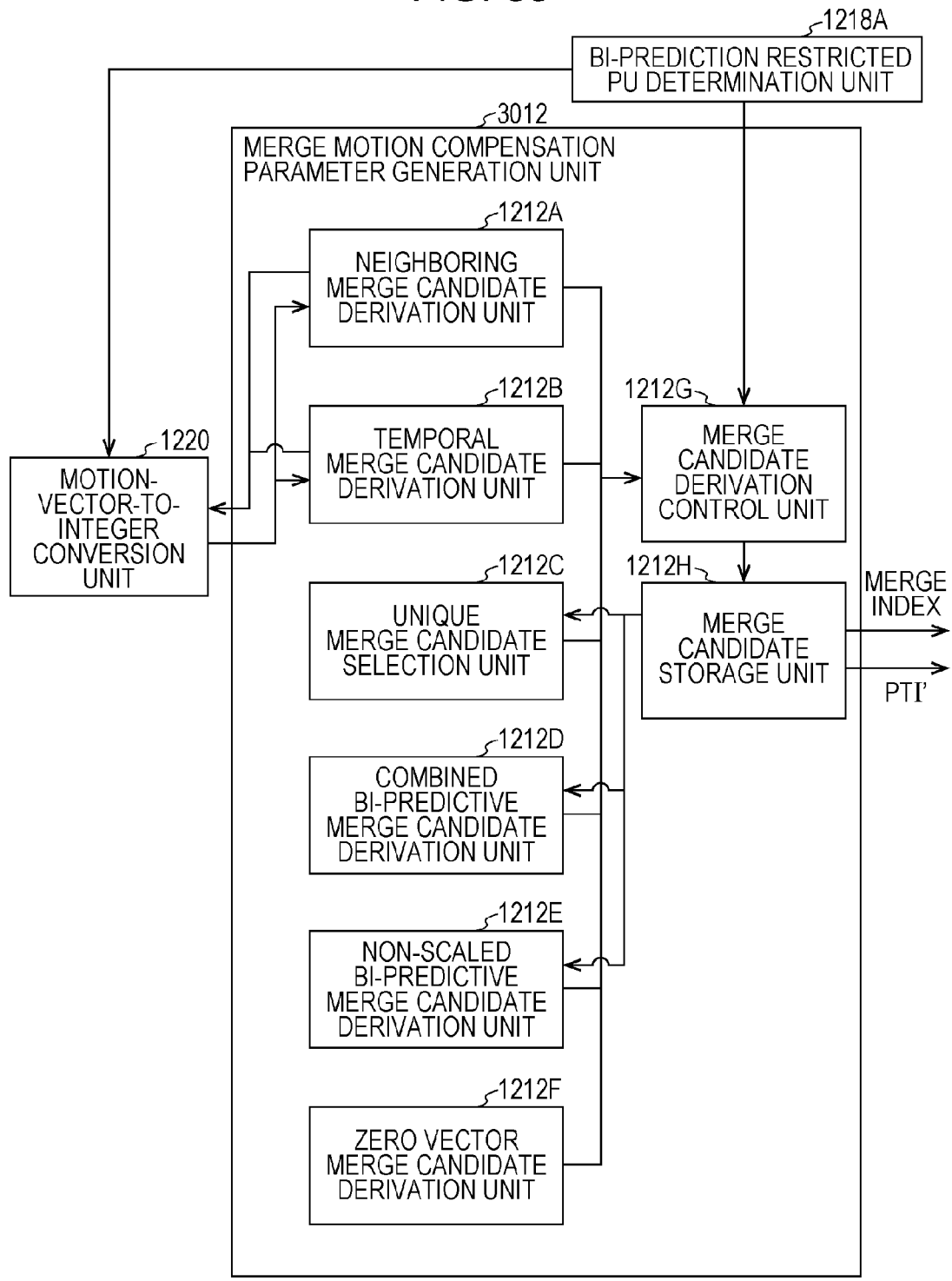

FIG. 83 is a block diagram illustrating an example configuration of the merge motion compensation parameter generation unit and so on in the PU information generation unit.

FIG. 84 is a table that defines level limits according to the present invention.

FIG. 85 is a table that defines another example of the level limits according to the present invention.

FIG. 86 is a diagram illustrating a modification of another example of the pseudo code illustrating the operation of the bi-prediction restricted PU determination unit.

FIG. 87 is a diagram illustrating an example of pseudo code illustrating the operation of a motion compensation parameter restriction unit.

Figure 88:
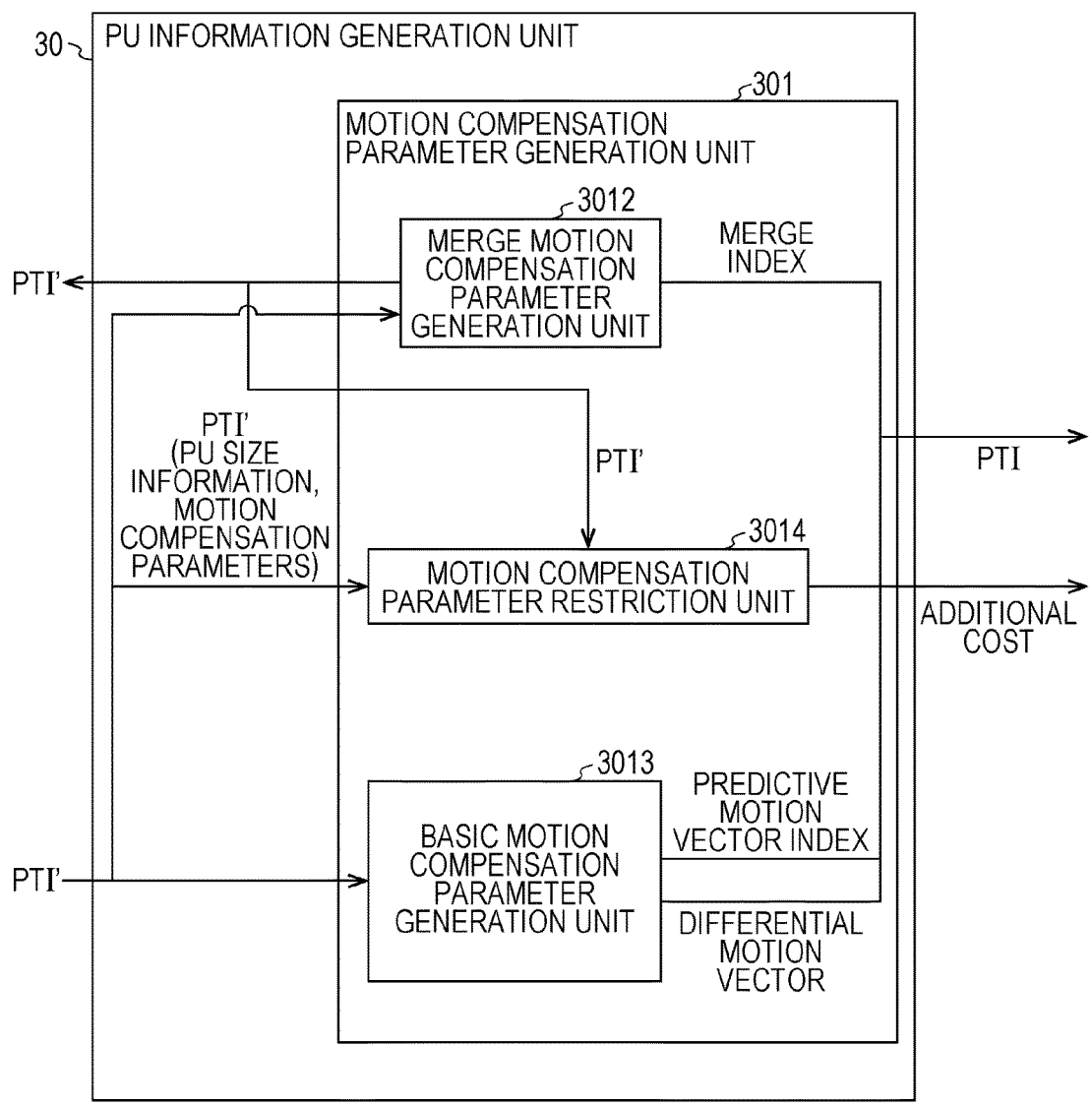

FIG. 88 is a block diagram illustrating another configuration of the PU information generation unit 30.

DESCRIPTION OF EMBODIMENTS

Figure 1:
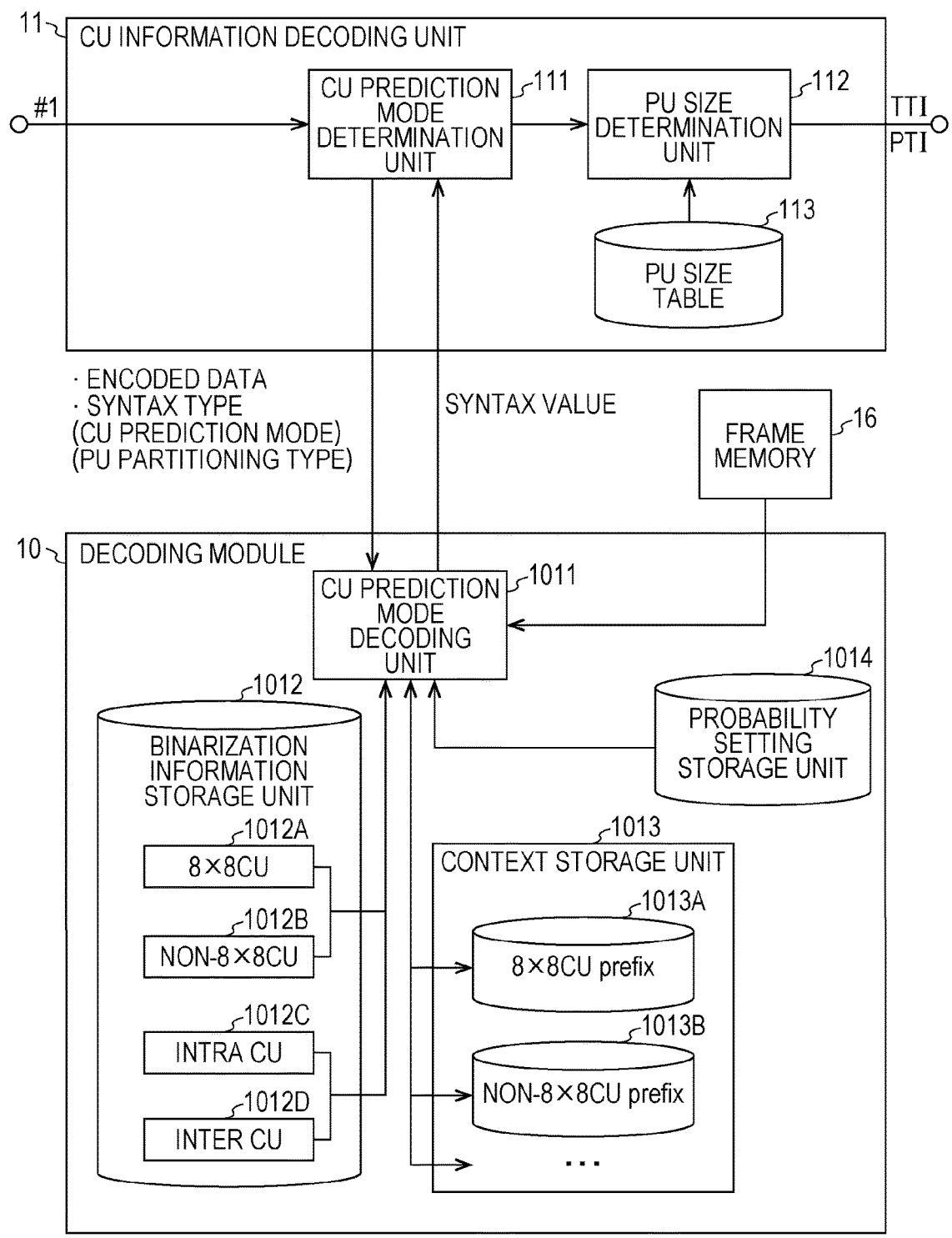
FIG. 1 is a functional block diagram illustrating an example configuration of a CU information decoding unit and a decoding module in a video decoding device according to an embodiment of the present invention.
Figure 2:
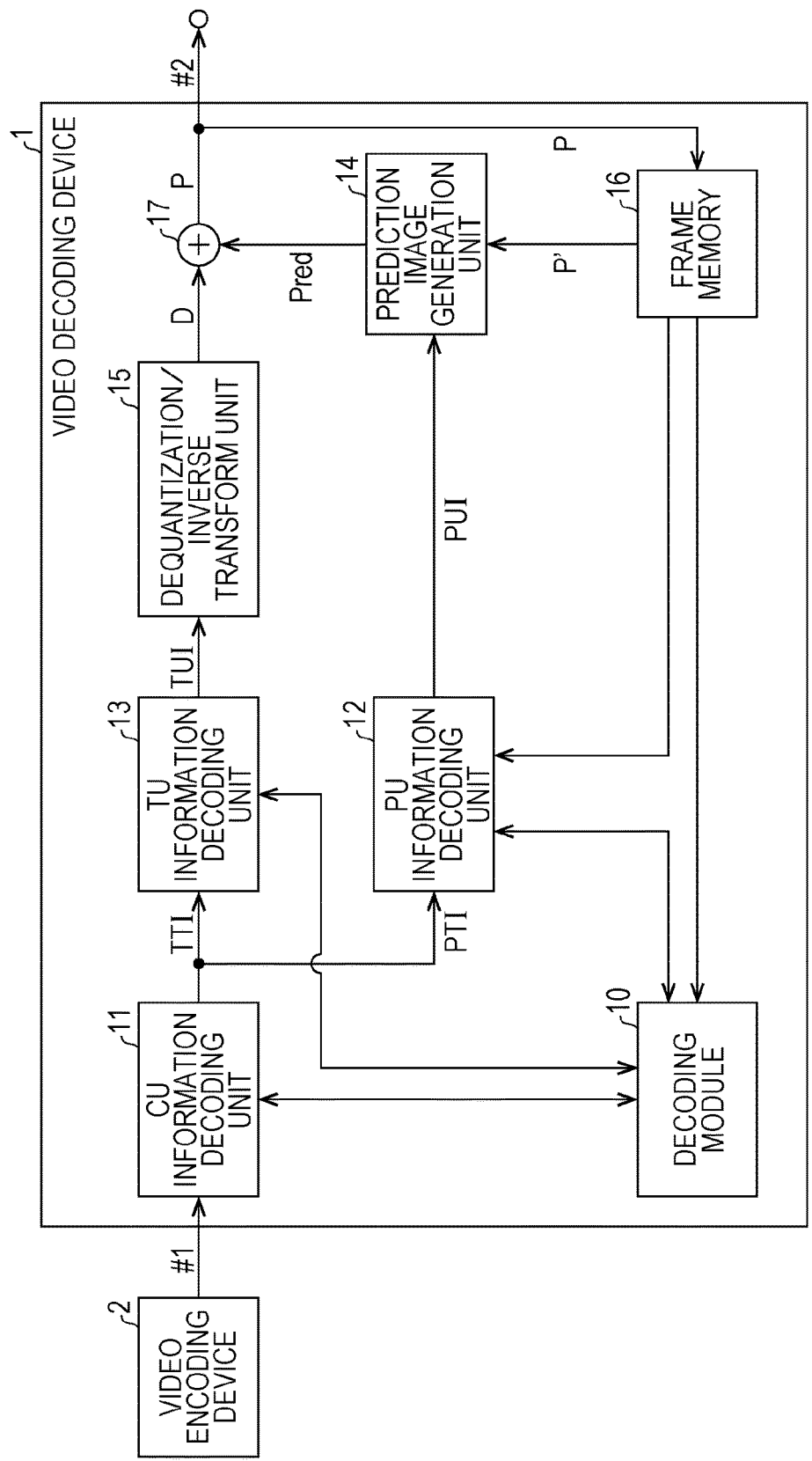
FIG. 2 is a functional block diagram illustrating a schematic configuration of the video decoding device.

An embodiment of the present invention will be described with reference to FIG. 1 to FIG. 24. First, an overview of a video decoding device (image decoding device) 1 and a video encoding device (image encoding device) 2 will be described with reference to FIG. 2. FIG. 2 is a functional block diagram illustrating a schematic configuration of the video decoding device 1.

The video decoding device 1 and the video encoding device 2 illustrated in FIG. 2 implement technologies adopted in the H.264/MPEG-4 AVC specifications, technologies adopted in KTA software, which is a codec for joint development in VCEG (Video Coding Expert Group), technologies adopted in TMuC (Test Model under Consideration) software, and technologies proposed in HEVC (High-Efficiency Video Coding), which is a codec successor to H.264/MPEG-4 AVC.

The video encoding device 2 generates encoded data #1 by entropy encoding the syntax values specified in the above-described video coding standards to be transmitted from an encoder to a decoder.

Context-based adaptive variable length coding (CAVLC) and context-based adaptive binary arithmetic coding (CABAC) are known as entropy coding schemes.

CAVLC- and CABAC-based encoding/decoding is based on context-adaptive processing. The term "context" refers to a state (context) of encoding/decoding. A context is determined using the previous encoded/decoded results of relevant syntax. The relevant syntax includes, for example, various syntax structures related to intra prediction and inter prediction, various syntax structures related to luminance (Luma) and color difference (Chroma), and various syntax structures related to CU (coding unit) sizes. In CABAC, furthermore, the position of the binary to be encoded/decoded in binary data (binary sequence) corresponding to a syntax structure may be used as a context.

In CAVLC, various syntax elements are coded by adaptively changing a VLC table to be used for coding. In CABAC, on the other hand, syntax elements that may take multiple values, such as prediction modes and transform coefficients, are binarized, and binary data obtained by the binarization procedure is adaptively arithmetically coded in accordance with the probability of occurrence. Specifically, a plurality of buffers each holding the probability of occurrence of a binary value (0 or 1) are prepared. One of the buffers is selected in accordance with the context, and arithmetic coding is performed based on the probability of occurrence recorded on the selected buffer. The probability of occurrence in the buffer is updated on the basis of the binary value to be decoded/encoded, enabling the appropriate probability of occurrence to be maintained in accordance with the context.

The encoded data #1 obtained by the video encoding device 2 encoding a moving image is input to the video decoding device 1. The video decoding device 1 decodes the input encoded data #1, and outputs a moving image #2 to outside. Before proceeding to a detailed description of the video decoding device 1, a description will be given hereinafter of the configuration of the encoded data #1.

[Configuration of Encoded Data]

An example configuration of the encoded data #1 generated by the video encoding device 2 and decoded by the video decoding device 1 will be described with reference to FIG. 3. The encoded data #1 includes, by way of example, a sequence and a plurality of pictures forming the sequence.

Figure 3:
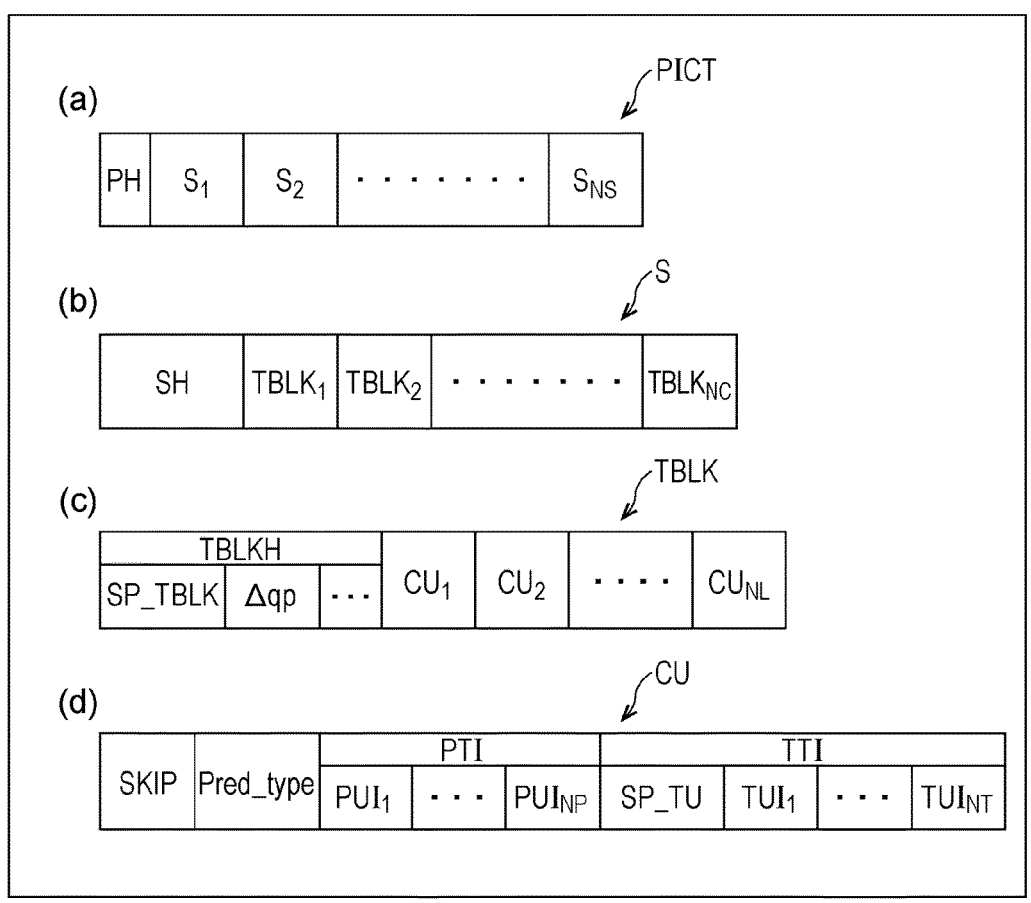
FIG. 3 includes diagrams illustrating a data configuration of encoded data generated by a video encoding device according to an embodiment of the present invention and decoded by the video decoding device, in which parts (a) to (d) are diagrams illustrating a picture layer, a slice layer, a tree block layer, and a CU layer, respectively.

FIG. 3 illustrates a structure of layers including a picture layer and layers below the picture layer in the encoded data #1. Parts (a) to (d) of FIG. 3 are diagrams illustrating, respectively, a picture layer that defines a picture PICT, a slice layer that defines a slice S, a tree block layer that defines a tree block TBLK, and a CU layer that defines a coding unit (CU) included in the tree block TBLK.

(Picture Layer)

The picture layer defines a data set referred to by the video decoding device 1 in order to decode a picture PICT being processed (hereinafter also referred to as a target picture). As illustrated in part (a) of FIG. 3, the picture PICT includes a picture header PH and slices $S_1$ to $S_{NS}$ (where NS is the total number of slices included in the picture PICT).

Hereinafter, subscripts may be omitted if there is no need to distinguish the slices $S_1$ to $S_{NS}$ from one another. The above similarly applies to other data items with subscripts among the data items included in the encoded data #1, described below.

The picture header PH includes a coding parameter group referred to by the video decoding device 1 in order to determine a method for decoding the target picture. For example, coding mode information (entropy_coding_mode_flag) indicating a variable length coding mode used by the video encoding device 2 for coding is an example of a coding parameter included in the picture header PH.

If entropy_coding_mode_flag is equal to 0, the picture PICT is a picture coded using CAVLC (Context-based Adaptive Variable Length Coding). If entropy_coding_mode_flag is equal to 1, the picture PICT is a picture coded using CABAC (Context-based Adaptive Binary Arithmetic Coding).

The picture header PH is also referred to as a picture parameter set (PPS).

(Slice Layer)

The slice layer defines a data set referred to by the video decoding device 1 in order to decode a slice S being processed (hereinafter also called a target slice). As illustrated in part (b) of FIG. 3, the slice S includes a slice header SH and tree blocks $TBLK_1$ to $TBLK_{NC}$ (where NC is the total number of tree blocks included in the slice S).

The slice header SH includes a coding parameter group referred to by the video decoding device 1 in order to determine a method for decoding the target slice. Slice type specifying information (slice_type) specifying a slice type is an example of a coding parameter included in the slice header SH.

Slice types that may be specified by the slice type specifying information include (1) I slice that uses only intra prediction for coding, (2) P slice that uses uni-prediction or intra prediction for coding, and (3) B slice that uses uni-prediction, bi-prediction, or intra prediction for coding.

The slice header SH may also include filter parameters referred to by a loop filter (not illustrated) included in the video decoding device 1.

(Tree Block Layer)

The tree block layer defines a data set referred to by the video decoding device 1 in order to decode a tree block TBLK being processed (hereinafter also called a target tree block).

The tree block TBLK includes a tree block header TBLKH and coding unit information items $CU_1$ to $CU_{NL}$ (where NL is the total number of coding unit information items included in the tree block TBLK). The following is a description of, first, the relationship between the tree block TBLK and the coding unit information CU.

The tree block TBLK is split into units for specifying block sizes for the respective processes of intra prediction or inter prediction and transformation.

The units of the tree block TBLK are obtained by recursive quadtree partitioning. The tree structure obtained by the recursive quadtree partitioning is hereinafter referred to as a coding tree.

In the following, units corresponding to leaf nodes that are end points in a coding tree will be referenced as coding nodes. Since a coding node is the basic unit of a coding process, a coding node is hereinafter also referred to as a coding unit (CU).

That is, the coding unit information items $CU_1$ to $CU_{NL}$ are information items corresponding to the coding nodes (coding units) obtained by the recursive quadtree partitioning of the tree block TBLK.

The root of the coding tree is associated with the tree block TBLK. In other words, the tree block TBLK is associated with the highest node of a quadtree structure recursively including a plurality of coding nodes.

The size of each individual coding node is half, both horizontally and vertically, the size of a coding node to which the individual coding node directly belongs (that is, the unit at the node that is one layer above the individual coding node).

The size that each individual coding node may take depends on size specifying information and the maximum hierarchical depth of the individual coding node, which are included in the sequence parameter set SPS in the encoded data #1. For example, if the tree block TBLK has a size of 64×64 pixels and has a maximum hierarchical depth of 3, each of the coding nodes in the layers at or below the tree block TBLK may take any of the following four sizes: 64×64 pixels, 32×32 pixels, 16×16 pixels, and 8×8 pixels.

(Tree Block Header)

The tree block header TBLKH includes coding parameters referred to by the video decoding device 1 in order to determine a method for decoding the target tree block. Specifically, as illustrated in part (c) of FIG. 3, the tree block header TBLKH includes tree block split information SP_TBLK specifying a pattern in which the target tree block is split into individual CUs, and a quantization parameter difference Δqp (qp_delta) specifying a quantization step size.

The tree block split information SP_TBLK is information indicating a coding tree for splitting a tree block. Specifically, the tree block split information SP_TBLK is information for specifying the shape and size of the CUs included in the target tree block and also specifying the position of the CUs in the target tree block.

The tree block split information SP_TBLK may not necessarily explicitly include the shape or size of the CUs. For example, the tree block split information SP_TBLK may be a set of flags (split_coding_unit_flag) indicating whether or not to split the entire target tree block or a sub-block of a tree block into four sections. In this case, the shape and size of the CUs can be identified using the shape and size of the tree block in combination with the set of flags.

The quantization parameter difference Δqp is a difference qp−qp' between a quantization parameter qp in the target tree block and a quantization parameter qp' in the tree block that has been coded immediately before the target tree block.

(CU Layer)

The CU layer defines a data set referred to by the video decoding device 1 in order to decode a CU being processed (hereinafter also referred to as a target CU).

Before proceeding to the discussion of the specific content of the data items included in the coding unit information CU, a description will be given of the tree structure of data items included in a CU. A coding node is a node at the root of a prediction tree (PT) and a transform tree (TT). The following is a description of the prediction tree and the transform tree.

In the prediction tree, the coding node is split into one or more prediction blocks, and the prediction tree specifies the position and size of the individual prediction blocks. In other words, prediction blocks are one or more non-overlapping regions forming a coding node. The prediction tree includes one or more prediction blocks obtained by the splitting procedure described above.

A prediction process is performed in units of prediction blocks. The prediction blocks, which are the units of prediction, are hereinafter also referred to as prediction units (PUs).

There are roughly two prediction tree partition types, namely, intra prediction and inter prediction.

For the intra prediction, partitions of 2N×2N (the same size as the coding node) and N×N are available.

For the inter prediction, partitions of 2N×2N (the same size as the coding node), 2N×N, N×2N, N×N, and the like are available.

In the transform tree, the coding node is split into one or more transform blocks, and the transform tree specifies the position and size of the individual transform blocks. In other words, transform blocks are one or more non-overlapping regions forming a coding node. The transform tree includes one or more transform blocks obtained by the splitting procedure described above.

A transform process is performed in units of transform blocks. The transform blocks, which are the units of transform, are hereinafter also referred to as transform units (TUs).

(Data Structure of Coding Unit Information)

Next, the detailed content of data items included in the coding unit information CU will be described with reference to part (d) of FIG. 3. As illustrated in part (d) of FIG. 3, specifically, the coding unit information CU includes a skip mode flag (a skip flag) SKIP, CU prediction type information Pred_type, PT information PTI, and TT information TTI.

[Skip Flag]

The skip flag SKIP is a flag indicating whether or not a skip mode is applied to the target CU. If the value of the skip flag SKIP is equal to 1, that is, if a skip mode is applied to the target CU, the PT information PTI in the coding unit information CU is omitted. The skip flag SKIP is omitted in I slices.

[CU Prediction Type Information]

The CU prediction type information Pred_type includes CU prediction mode information PredMode and PU partition type information PartMode.

The CU prediction mode information PredMode specifies which of intra prediction (intra CU) and inter prediction (inter CU) to use as a prediction image generation method for each of the PUs included in the target CU. In the following, the types of skip, intra prediction, and inter prediction in the target CU are referred to as CU prediction modes.

The PU partition type information PartMode specifies a PU partition type that is a pattern in which the target coding unit (CU) is split into individual PUs. The split of the target coding unit (CU) into individual PUs in the manner described above in accordance with the PU partition type is hereinafter referred to as PU partition.

The PU partition type information PartMode may be, by way of example, an index indicating a type of PU partition pattern, or may specify the shape and size of the PUs included in the target prediction tree and also specify the position of the PUs in the target prediction tree.

PU partition types that can be selected differ depending on the CU prediction scheme and the CU size. Moreover, PU partition types that can be selected differ depending on inter prediction or intra prediction. The details of the PU partition types will be described below.

For non-I slices, the value of the PU partition type information PartMode may be identified by an index (cu_split_pred_part_mode) specifying a combination of tree block partitioning, prediction scheme, and CU splitting method.

[PT Information]

The PT information PTI is information concerning a PT included in the target CU. In other words, the PT information PTI is a set of information items each concerning one of one or more PUs included in the PT. As described above, since a prediction image is generated on a per-PU basis, the PT information PTI is referred to by the video decoding device 1 to generate a prediction image. As illustrated in part (d) of FIG. 3, the PT information PTI includes PU information items $PUI_1$ to $PUI_{NP}$ (where NP is the total number of PUs included in the target PT) each including prediction information and the like on one of the PUs.

The prediction information PUI includes intra prediction information or inter prediction information in accordance with which prediction method the prediction type information Pred_mode specifies. In the following, a PU to which intra prediction is applied is also referred to as an intra PU, and a PU to which inter prediction is applied is also referred to as an inter PU.

The inter prediction information includes coding parameters referred to by the video decoding device 1 to generate an inter prediction image using inter prediction.

Inter prediction parameters include, for example, a merge flag (merge_flag), a merge index (merge_idx), a motion vector predictor index (mvp_idx), a reference image index (ref_idx), an inter prediction flag (inter_pred_flag), and a motion vector difference (mvd).

The intra prediction information includes coding parameters referred to by the video decoding device 1 to generate an intra prediction image using intra prediction.

Intra prediction parameters include, for example, an estimated prediction mode flag, an estimated prediction mode index, and a residual prediction mode index.

In the intra prediction information, a PCM mode flag indicating whether or not to use a PCM mode may be coded. If the PCM mode flag has been coded and the PCM mode flag indicates the use of the PCM mode, the processes of prediction (intra), transformation, and entropy coding are omitted.

[TT Information]

The TT information TTI is information concerning a TT included in a CU. In other words, the TT information TTI is a set of information items each concerning one of one or more TUs included in the TT. The TT information TTI is referred to by the video decoding device 1 to decode residual data. In the following, a TU may also be referred to as a block.

As illustrated in part (d) of FIG. 3, the TT information TTI includes TT split information SP_TU specifying a pattern in which the target CU is split into individual transform blocks, and TU information items $TUI_1$ to $TUI_{NT}$ (where NT is the total number of blocks included in the target CU).

The TT split information SP_TU is information for, specifically, determining the shape and size of the TUs included in the target CU and also determining the position of the TUs in the target CU. The TT split information SP_TU may be implemented by, for example, information (split_transform_flag) indicating whether or not to split the target node into partitions and information (trafoDepth) indicating the depth of the partitions.

For example, if the CU size is 64×64, each of the TUs obtained by splitting may have a size in the range of 32×32 pixels to 4×4 pixels.

The TU information items $TUI_1$ to $TUI_{NT}$ are individual information items each concerning one of one or more TUs included in the TT. For example, the TU information TUI includes quantized prediction residuals.

Each quantized prediction residual is encoded data generated by the video encoding device 2 performing the following processes 1 to 3 on the target block, which is a block being processed.

Process 1: Application of a DCT transform (Discrete Cosine Transform) to a prediction residual obtained by subtracting a prediction image from an image to be encoded;

Process 2: Quantization of a transform coefficient obtained by Process 1; and

Process 3: Encoding of the transform coefficient quantized in Process 2 using a variable-length code.

The quantization parameter qp described above represents the size of the quantization step QP used when the video encoding device 2 quantizes a transform coefficient ($QP=2^{qp/6}$).

(PU Partition Type)

Given that the target CU has a size of 2N×2N pixels, the PU partition type has the following eight patterns: four symmetric partitions (symmetric splittings) of 2N×2N pixels, 2N×N pixels, N×2N pixels, and N×N pixels, and four asymmetric partitions (asymmetric splittings) of 2N×nU pixels, 2N×nD pixels, nL×2N pixels, and nR×2N pixels. Note that $N=2^m$ (where m is an arbitrary integer greater than or equal to 1). In the following, regions obtained by splitting the target CU are also referred to as partitions.

Figure 4:
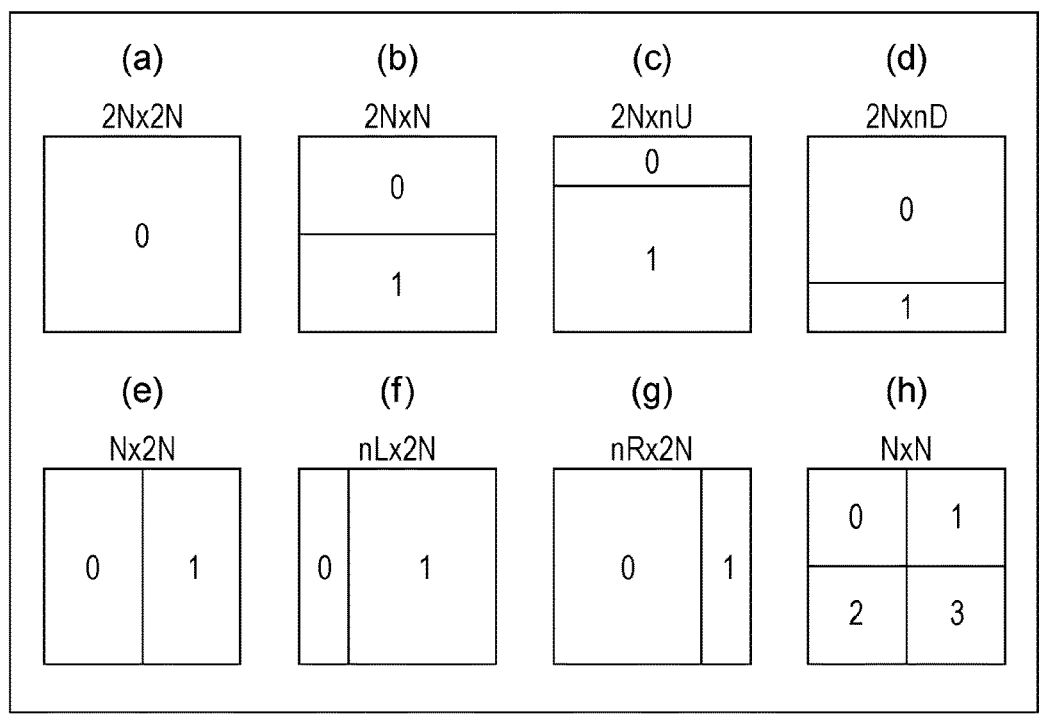
FIG. 4 includes diagrams illustrating patterns of PU partition types. Parts (a) to (h) of FIG. 4 illustrate partition shapes in the PU partition types of 2N×2N, 2N×N, 2N×nU, 2N×nD, N×2N, nL×2N, nR×2N and N×N, respectively.

Parts (a) to (h) of FIG. 4 illustrate specific positions of the boundaries of PU partitions in CUs for the respective partition types.

Part (a) of FIG. 4 illustrates the PU partition type of 2N×2N in which the CU is not split.

Parts (b), (c), and (d) of FIG. 4 illustrate the shape of partitions for the PU partition types of 2N×N, 2N×nU, and 2N×nD, respectively. In the following, partitions for the PU partition types of 2N×N, 2N×nU, and 2N×nD are collectively referred to as landscape-oriented partitions.

Parts (e), (f), and (g) of FIG. 4 illustrate the shape of partitions for the PU partition types of N×2N, nL×2N, and nR×2N, respectively. In the following, partitions for the PU partition types of N×2N, nL×2N, and nR×2N are collectively referred to as portrait-oriented partitions.

The landscape-oriented partitions and the portrait-oriented partitions are collectively referred to as rectangular partitions.

Part (h) of FIG. 4 illustrates the shape of partitions for the PU partition type of N×N. The PU partition types in parts (a) and (h) of FIG. 4 are also referred to as a square partition, which is based on the shapes of the partitions. The PU partition types in parts (b) to (g) of FIG. 4 are also referred to as a non-square partition.

In parts (a) to (h) of FIG. 4, numbers assigned to individual regions represent the identification numbers of the regions, and the regions are processed in ascending order of their identification numbers. That is, the identification numbers represent the scan order of the regions.

In parts (a) to (h) of FIG. 4, furthermore, it is assumed that the upper left corner is the reference point (origin) of the CU.

[Partition Types for Inter Prediction]

Of the eight partition types described above, seven types, other than N×N (part (h) of FIG. 4), are defined for inter PUs. The four asymmetric splittings described above may also be referred to as AMPS (Asymmetric Motion Partitions).

The specific value of N, described above, is specified by the size of the CU to which the current PU belongs, and the specific values of nU, nD, nL, and nR are determined in accordance with the value of N. For example, an inter CU having 128×128 pixels can be split into an inter PU having 128×128 pixels or into inter PUs having 128×64 pixels, 64×128 pixels, 64×64 pixels, 128×32 pixels, 128×96 pixels, 32×128 pixels, or 96×128 pixels.

[Partition Types for Intra Prediction]

The following two partition patterns are defined for intra PUs: the partition pattern of 2N×2N in which the target CU is not split, that is, the target CU itself is handled as one PU, and the pattern of N×N in which the target CU is symmetrically split into four PUs.

Thus, referring to the examples illustrated in FIG. 4, the partition patterns in parts (a) and (h) may be used for intra PUs.

For example, an intra CU having 128×128 pixels may be split into an intra PU having 128×128 pixels or intra PUs having 64×64 pixels.

For I slices, the coding unit information CU may include an intra partition mode (intra_part_mode) for identifying the PU partition type PartMode.

(TU Partitioning and Order of TUs in Node)

Next, TU partitioning and the order of TUs in a node will be described with reference to FIG. 18 to FIG. 20. A TU partition pattern is determined by the CU size, the partition depth (trafoDepth), and the PU partition type of the target PU.

The TU partition patterns include square quadtree partitions and non-square quadtree partitions. Specific examples of the TU partition patterns are illustrated in FIG. 18 and FIG. 19.

Figures 17, 18:
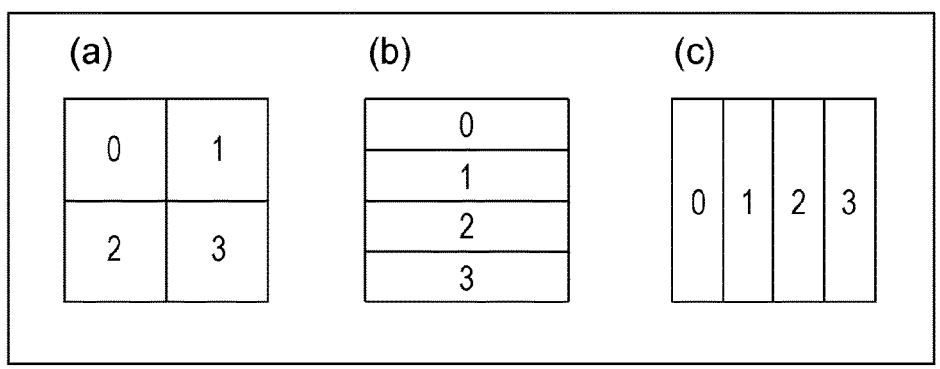
FIG. 17 is a diagram illustrating an example of transform size determination information in which TU partition patterns are defined in accordance with CU sizes, TU partition depths (trafoDepth), and PU partition types of target PUs.
FIG. 18 includes diagrams illustrating partitioning schemes in which a square node is partitioned into square or non-square nodes using quadtree partitioning. Part (a) of FIG. 18 illustrates partitioning into square nodes, part (b) of FIG. 18 illustrates partitioning into landscape-oriented rectangular nodes, and part (c) of FIG. 18 illustrates partitioning into portrait-oriented rectangular nodes.

FIG. 18 illustrates partitioning schemes in which a square node is split into square or non-square nodes using quadtree partitioning.

Part (a) of FIG. 18 illustrates a partitioning scheme in which a square node is split into square nodes using quadtree partitioning. Part (b) of FIG. 18 illustrates a partitioning scheme in which a square node is split into landscape-oriented rectangular nodes using quadtree partitioning. Part (c) of FIG. 18 illustrates a partitioning scheme in which a square node is split into portrait-oriented rectangular nodes using quadtree partitioning.

Figure 19:
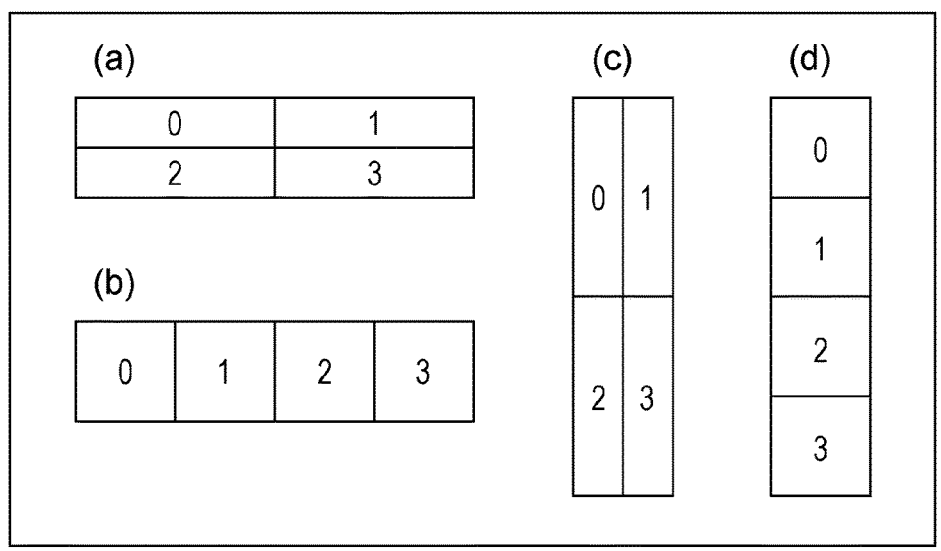
FIG. 19 includes diagrams illustrating partitioning schemes in which a square node is partitioned into square or non-square nodes using quadtree partitioning. Part (a) of FIG. 19 illustrates partitioning of a landscape-oriented node into landscape-oriented nodes, part (b) of FIG. 19 illustrates partitioning of a landscape-oriented node into square nodes, part (c) of FIG. 19 illustrates partitioning of a portrait-oriented node into portrait-oriented nodes, and part (d) of FIG. 19 illustrates partitioning of a portrait-oriented node into square nodes.

FIG. 19 illustrates partitioning schemes in which a non-square node is split into square or non-square nodes using quadtree partitioning.

Part (a) of FIG. 19 illustrates a partitioning scheme in which a landscape-oriented rectangular node is split into landscape-oriented rectangular nodes using quadtree partitioning. Part (b) of FIG. 19 illustrates a partitioning scheme in which a landscape-oriented rectangular node is split into square nodes using quadtree partitioning. Part (c) of FIG. 19 illustrates a partitioning scheme in which a portrait-oriented rectangular node is split into portrait-oriented rectangular nodes using quadtree partitioning. Part (d) of FIG. 19 illustrates a partitioning scheme in which a portrait-oriented rectangular node is split into square nodes using quadtree partitioning.

Figure 20:
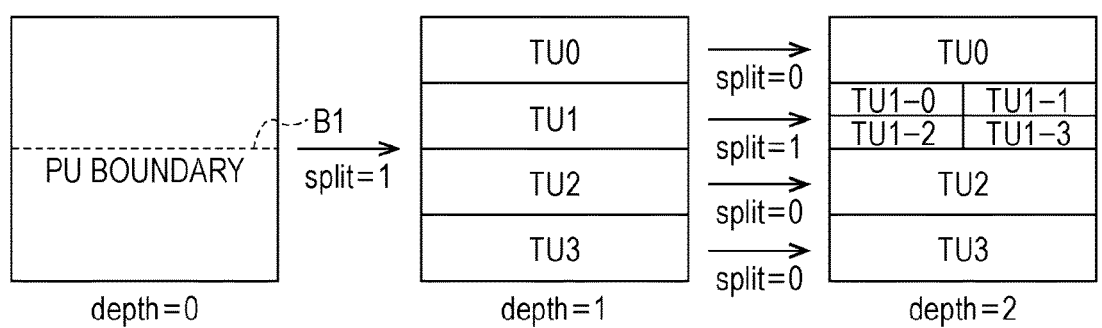
FIG. 20 is a diagram illustrating an example of TU partitions of a 32×32 CU with the PU partition type of 2N×N.

FIG. 20 illustrates an example of TU partitions of a 32×32 CU with the PU partition type of 2N×N. In FIG. 20, "depth" represents the partition depth (trafoDepth). Further, "split" represents the value of split_transform_flag at the corresponding depth. If "split" is equal to "1", TU partitioning is applied to the node at the corresponding depth. If "split" is equal to "0", no TU partitioning is applied.

The details of the correspondences between the TU partition patterns and CU sizes, partition depths (trafoDepth), and PU partition types of the target PU will be described below.

[Video Decoding Device]

A configuration of the video decoding device 1 according to this embodiment will be described hereinafter with reference to FIG. 1 to FIG. 24.

(Overview of Video Decoding Device)

The video decoding device 1 generates a prediction image for each PU. The video decoding device 1 adds the generated prediction image to a prediction residual decoded from the encoded data #1 to generate a decoded image #2, and outputs the generated decoded image #2 to outside.

The generation of a prediction image is based on the reference to coding parameters obtained by decoding the encoded data #1. The coding parameters are parameters referred to in order to generate a prediction image. The coding parameters include prediction parameters such as a motion vector that is referred to in inter-frame prediction and a prediction mode that is referred to in intra-frame prediction. The coding parameters also include the PU size and shape, the block size and shape, residual data between the original image and the prediction image, and so on. In the following, a set of all information items, except for the residual data, among the information items included in the coding parameters is referred to as side information.

In the following, furthermore, the picture (frame), slice, tree block, block, and PU to be decoded are referred to as the target picture, the target slice, the target tree block, the target block, and the target PU, respectively.

The tree block size is, for example, 64×64 pixels, and the PU size is, for example, 64×64 pixels, 32×32 pixels, 16×16 pixels, 8×8 pixels, 4×4 pixels, or the like. However, these sizes are merely illustrative, and any other tree block size and PU size may be used.

(Configuration of Video Decoding Device)

Referring back to FIG. 2, a schematic configuration of the video decoding device 1 will be described hereinafter. FIG. 2 is a functional block diagram illustrating a schematic configuration of the video decoding device 1.

As illustrated in FIG. 2, the video decoding device 1 includes a decoding module 10, a CU information decoding unit 11, a PU information decoding unit 12, a TU information decoding unit 13, a prediction image generation unit 14, a dequantization/inverse transform unit 15, a frame memory 16, and an adder 17.

[Decoding Module]

The decoding module 10 performs a decoding process to decode a syntax value from a binary representation. More specifically, the decoding module 10 decodes a syntax value encoded using an entropy coding scheme such as CABAC or CAVLC, on the basis of the encoded data and syntax type supplied from the source, and returns the decoded syntax value to the source.

In the example described below, the source from which the encoded data and the syntax type are supplied includes the CU information decoding unit 11, the PU information decoding unit 12, and the TU information decoding unit 13.

The following is a description of an example of the decoding process of the decoding module 10, in which a binary representation (bit sequence) of encoded data and the syntax type "split_coding_unit_flag" are supplied from the CU information decoding unit 11 to the decoding module 10. In this case, the decoding module 10 refers to the associations between a bit sequence related to "split_coding_unit-_flag" and a syntax value to derive the syntax value from the binary representation, and returns the derived syntax value to the CU information decoding unit 11.

[CU Information Decoding Unit]

The CU information decoding unit 11 performs a decoding process on encoded data #1 of one frame, which is input from the video encoding device 2, using the decoding module 10 on the tree block and CU levels. Specifically, the CU information decoding unit 11 decodes the encoded data #1 using the following procedure.

First, the CU information decoding unit 11 refers to various headers included in the encoded data #1, and sequentially separates the encoded data #1 into slices and then tree blocks.

The various headers include (1) information on the method of partitioning the target picture into slices, and (2) information on the size and shape of tree blocks included in the target slice and the position of the tree blocks in the target slice.

The CU information decoding unit 11 refers to the tree block split information SP_TBLK included in the tree block header TBLKH, and splits the target tree block into CUs.

Then, the CU information decoding unit 11 acquires coding unit information (hereinafter referred to as CU information) corresponding to the obtained CUs. The CU information decoding unit 11 sequentially designates each of the CUs included in the tree block as a target CU, and executes the decoding process on the CU information corresponding to the target CU.

That is, the CU information decoding unit 11 demultiplexes the TT information TTI concerning the transform tree obtained for the target CU and the PT information PTI concerning the prediction tree obtained for the target CU.

As described above, the TT information TTI includes TU information TUI corresponding to the TUs included in the transform tree. As described above, the PT information PTI includes PU information PUI corresponding to the PUs included in the target prediction tree.

The CU information decoding unit 11 supplies the PT information PTI obtained for the target CU to the PU information decoding unit 12. Further, the CU information decoding unit 11 supplies the TT information TTI obtained for the target CU to the TU information decoding unit 13.

[PU Information Decoding Unit]

The PU information decoding unit 12 performs a decoding process on the PT information PTI supplied from the CU information decoding unit 11, using the decoding module 10 on the PU level. Specifically, the PU information decoding unit 12 decodes the PT information PTI using the following procedure.

The PU information decoding unit 12 refers to the PU partition type information PartMode, and determines the PU partition type for the target prediction tree. Then, the PU information decoding unit 12 sequentially designates each of the PUs included in the target prediction tree as a target PU, and executes the decoding process on the PU information corresponding to the target PU.

That is, the PU information decoding unit 12 decodes parameters used for the generation of a prediction image, from the PU information corresponding to the target PU.

The PU information decoding unit 12 supplies the PU information decoded for the target PU to the prediction image generation unit 14.

[TU Information Decoding Unit]

The TU information decoding unit 13 performs a decoding process on the TT information TTI supplied from the CU information decoding unit 11, using the decoding module 10 on the TU level. Specifically, the TU information decoding unit 13 decodes the TT information TTI using the following procedure.

The TU information decoding unit 13 refers to the TT split information SP_TU, and splits the target transform tree into nodes or TUs. If the further splitting of the target node is specified, the TU information decoding unit 13 recursively performs the splitting of the TUs.

When the splitting process is completed, the TU information decoding unit 13 sequentially designates each of the TUs included in the target prediction tree as a target TU, and executes the decoding process on the TU information corresponding to the target TU.

That is, the TU information decoding unit 13 decodes parameters used for the restoration of a transform coefficient, from the TU information corresponding to the target TU.

The TU information decoding unit 13 supplies the TU information decoded for the target TU to the dequantization/inverse transform unit 15.

[Prediction Image Generation Unit]

The prediction image generation unit 14 generates a prediction image for each of the PUs included in the target CU, on the basis of the PT information PTI. Specifically, the prediction image generation unit 14 performs intra prediction or inter prediction on each target PU included in the target prediction tree in accordance with the parameters included in the PU information PUI corresponding to the target PU to generate a prediction image Pred from a decoded image, or a locally decoded image P'. The prediction image generation unit 14 supplies the generated prediction image Pred to the adder 17.

The following is a description of a technique how the prediction image generation unit 14 generates a prediction image of a PU included in the target CU on the basis of motion compensation prediction parameters (motion vector, reference image index, inter prediction flag).

If the inter prediction flag indicates uni-prediction, the prediction image generation unit 14 generates a prediction image corresponding to a decoded image located at the position indicated by the motion vector of the reference image identified by the reference image index.

If the inter prediction flag indicates bi-prediction, on the other hand, the prediction image generation unit 14 generates a prediction image using motion compensation for each of two combinations of reference image indices and motion vectors and averages the generated prediction images, or performs weighted addition of the respective prediction images on the basis of the display time interval between the target picture and the respective reference images. Accordingly, the prediction image generation unit 14 generates a final prediction image.

[Dequantization/Inverse Transform Unit]

The dequantization/inverse transform unit 15 performs a dequantization and inverse transform process on each of the TUs included in the target CU on the basis of the TT information TTI. Specifically, the dequantization/inverse transform unit 15 dequantizes and performs inverse orthogonal transform on the quantized prediction residual included in the TU information TUI corresponding to each of the target TUs included in the target transform tree to restore a prediction residual D for each pixel. The term "orthogonal transform", as used herein, refers to the orthogonal transform from the pixel domain to the frequency domain. The term "inverse orthogonal transform" thus refers to the transform from the frequency domain to the pixel domain.

Examples of the inverse orthogonal transform include inverse DCT transform (Inverse Discrete Cosine Transform) and inverse DST transform (Inverse Discrete Sine Transform). The dequantization/inverse transform unit 15 supplies the restored prediction residual D to the adder 17.

[Frame Memory]

Decoded images P are sequentially recorded on the frame memory 16 together with the parameters used in the decoding of the decoded images P. At the time of decoding of a target tree block, the frame memory 16 has recorded thereon the decoded images corresponding to all the tree blocks (for example, all the preceding tree blocks in raster scan order) that have already been decoded before the target tree block. The decoding parameters recorded on the frame memory 16 include, for example, the CU prediction mode information PredMode.

[Adder]

The adder 17 adds the prediction images Pred supplied from the prediction image generation unit 14 to the prediction residuals D supplied from the dequantization/inverse transform unit 15 to generate a decoded image P for the target CU.

At the time when the generation process for a decoded image on a tree block basis is completed for all the tree blocks in an image, a decoded image #2 corresponding to encoded data #1 of one frame, which is input to the video decoding device 1, is output to outside from the video decoding device 1.

In the following, a detailed description will be given of the respective configurations of (1) the CU information decoding unit 11, (2) the PU information decoding unit 12, and (3) the TU information decoding unit 13, together with the configuration of the decoding module 10 corresponding to the configurations.

(1) Details of CU Information Decoding Unit

An example configuration of the CU information decoding unit 11 and the decoding module 10 will now be described with reference to FIG. 1. FIG. 1 is a functional block diagram exemplifying a configuration for decoding CU prediction information in the video decoding device 1, that is, the configuration of the CU information decoding unit 11 and the decoding module 10.

The configuration of the individual components in the CU information decoding unit 11 and the decoding module 10 will be described hereinafter in this order.

(CU Information Decoding Unit)

As illustrated in FIG. 1, the CU information decoding unit 11 includes a CU prediction mode determination unit 111, a PU size determination unit 112, and a PU size table 113.

The CU prediction mode determination unit 111 supplies encoded data and syntax type of the CU prediction mode and encoded data and syntax type of the PU partition type to the decoding module 10. In addition, the CU prediction mode determination unit 111 acquires the syntax values of the CU prediction mode and the syntax values of the PU partition type, which have been decoded, from the decoding module 10.

Specifically, the CU prediction mode determination unit 111 determines the CU prediction mode and the PU partition type as follows.

First, the CU prediction mode determination unit 111 determines whether or not the target CU is a skip CU using a skip flag SKIP decoded by the decoding module 10.

If the target CU is not a skip CU, the CU prediction type information Pred_type is decoded using the decoding module 10. Further, the CU prediction mode determination unit 111 determines whether the target CU is an intra CU or an inter CU on the basis of the CU prediction mode information PredMode included in the CU prediction type information Pred_type, and also determines the PU partition type on the basis of the PU partition type information PartMode.

The PU size determination unit 112 refers to the PU size table 113, and determines the number of PUs and a PU size from the size of the target CU and the CU prediction type and PU partition type determined by the CU prediction mode determination unit 111.

The PU size table 113 is a table in which the numbers of PUs and PU sizes are associated with CU sizes and combinations of CU prediction types and PU partition types.

A specific example configuration of the PU size table 113 will now be described with reference to FIG. 5.

The PU size table 113 illustrated in FIG. 5 defines the numbers of PUs and PU sizes in accordance with CU sizes and PU partition types (intra CU and inter CU). In the table, the symbol "d" denotes the CU partition depth.

In the PU size table 113, the following four CU sizes are defined: 64×64, 32×32, 16×16, and 8×8.

In the PU size table 113, furthermore, the number of PUs and a PU size for each PU partition type are defined for each CU size.

For example, for a 64×64 inter CU and a partition of 2N×N, the number of PUs is 2 and the PU sizes are both 64×32.

For a 64×64 inter CU and a partition of 2N×nU, the number of PUs is 2 and the PU sizes are 64×16 and 64×48.

For an 8×8 intra CU and a partition of N×N, the number of PUs is 4 and the PU sizes are all 4×4.

The PU partition type of a skip CU is presumably 2N×2N. In the table, the sign "-" represents an unselectable PU partition type.

Specifically, for the CU size of 8×8, PU partition types of asymmetric partition (2N×nU, 2N×nD, nL×2N, and nR×2N) are not selectable in the case of inter CU. In the case of inter CU, furthermore, the PU partition type of N×N is not selectable.

For intra prediction, the PU partition type of N×N is selectable only in the case of 8×8 CU size.

(Decoding Module)

As illustrated in FIG. 1, the decoding module 10 includes a CU prediction mode decoding unit (decoding means, changing means) 1011, a binarization information storage unit 1012, a context storage unit 1013, and a probability setting storage unit 1014.

The CU prediction mode decoding unit 1011 decodes a syntax value, in accordance with the encoded data and syntax type supplied from the CU prediction mode determination unit 111, from a binary representation included in the encoded data. Specifically, the CU prediction mode decoding unit 1011 performs decoding processes for the CU prediction mode and the PU partition type in accordance with the binarization information stored in the binarization information storage unit 1012. The CU prediction mode decoding unit 1011 also performs a decoding process for the skip flag.

The binarization information storage unit 1012 stores binarization information for allowing the CU prediction mode decoding unit 1011 to decode a syntax value from a binary representation. The binarization information is information indicating associations between binary representations (bin sequences) and syntax values.

The context storage unit 1013 stores contexts referred to by the CU prediction mode decoding unit 1011 in decoding processes.

The probability setting storage unit 1014 stores probability setting values referred to by the CU prediction mode decoding unit 1011 to decode a bin sequence from encoded data using an arithmetic decoding process. The probability setting values include recorded setting values each corresponding to a context, and specified probability setting values. The probability setting values corresponding to the individual contexts are updated based on the results of arithmetic decoding. On the other hand, the specified probability setting values are fixed and are not updated in accordance with the results of arithmetic decoding. The probability setting values may not necessarily be in the form of the values of probability, but may be represented as being indicated by integer values corresponding to the values of probability.

[Specific Example Configuration]

[1-1] Example of Configuration for Restricting References to Contexts

If the PU partition type is an asymmetric partition, the CU prediction mode decoding unit 1011 may perform a decoding process on information indicating a partition type of the asymmetric partition, without using contexts for CABAC. In other words, the CU prediction mode decoding unit 1011 may decode a bin sequence corresponding to information indicating a partition type of the asymmetric partition from encoded data using arithmetic decoding, by performing the decoding process using a specified probability setting value (for example, a probability setting value in which the probability of occurrence of 0 is equal to the probability of occurrence of 1) without using a probability setting value recorded on the probability setting storage unit 1014 for each context.

A configuration for restricted references to contexts, described above, will be described hereinafter by way of example with reference to FIG. 7.

The CU prediction mode decoding unit 1011 decodes information indicating a partition type of asymmetric partition, assuming a specified probability.

A more specific example of the present example configuration will now be described with reference to FIG. 7. An association table BT1 illustrated in FIG. 7 depicts rectangular partitions, with the prefix portion indicating whether the direction of partitioning is landscape orientation (horizontal) or portrait orientation (vertical) and the suffix portion indicating partition types.

For example, when the prefix portion indicates that the PU partition type is a landscape-oriented partition, the suffix portion indicates which of the three kinds of landscape-oriented partitions, namely, 2N×N, 2N×nU, and 2N×nD, to select.

If the PU partition type is a rectangular partition, the CU prediction mode decoding unit 1011 refers to the specified probability setting values set in the probability setting storage unit 1014, instead of the probability setting values recorded for the respective contexts, which are set in the probability setting storage unit 1014, and performs arithmetic decoding of each bin in the suffix portion. The probability setting value may be set on the basis of the assumption of, for example, equal probabilities.

The term "CABAC arithmetic decoding using a context", as used herein, refers to a process for recording or updating the (state indicating the) probability of occurrence of a binary value in accordance with the position (context) of a binary representation and performing arithmetic decoding based on the probability of occurrence (state). The term "CABAC arithmetic decoding without using a context", in contrast, refers to arithmetic decoding based on a fixed probability determined by a probability setting value without updating the probability of occurrence (state) of a binary value. Since the update of the probability of occurrence (state) is not necessary in encoding processes or decoding processes if contexts are not used, processing load is reduced and throughput is increased. In addition, a memory for accumulating probabilities of occurrence (states) corresponding to contexts is not necessary. Coding with a fixed probability of 0.5 may be referred to as EP coding (equal probabilities, equal probability coding) or bypass.

The operations and effects of the configuration described above will be described with reference to FIG. 6. A context is effective for the improvement in coding efficiency when the same code appears consecutively in a specific condition. Coding efficiency is improved by decoding the suffix portion by referring to contexts when, specifically, 2N×N, 2N×nU, or 2N×nD is consecutively selected in a state where a landscape-oriented partition is selected. This effect works, for example, when 2N×N is selected in a prediction unit subsequent to the prediction unit in which 2N×N was selected.

Figures 6, 7:
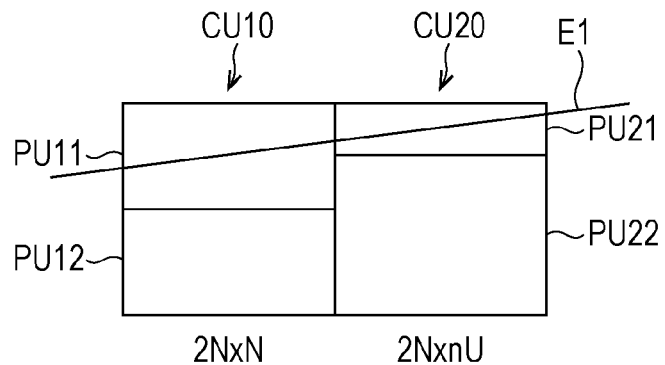
FIG. 6 is a diagram illustrating a 2N×N CU and a 2N×nU CU in which an edge having an inclination is present.
FIG. 7 is a table illustrating an example of binarization information that defines associations between combinations of CU prediction types and PU partition types and bin sequences.

On the other hand, partitions are generally set so as not to lie over edge boundaries, as illustrated in FIG. 6.

Specifically, as illustrated in FIG. 6, if an edge E1 having an inclination is present in a region, the PU partition type of a CU 10 and a CU 20 is determined so that no partitions lie across the edge E1.

More specifically, the edge E1 is present near the center in the vertical direction of a region in the CU 10, whereas the edge E1 is present in an upper portion of a region in the CU 20.

In this manner, if an edge E1 having an inclination is present in a region, the CU 10 is split into a PU 11 and a PU 12 that are symmetric to each other using the 2N×N PU partition type so that no partitions lie across the edge E1.

The CU 20 is split into a PU 21 and a PU 22 that are asymmetric to each other using the 2N×nU partition type so that no partitions lie across the edge E1.

In this manner, if an edge E1 having an inclination is present in a region, in some cases, partitions having the same shape do not appear consecutively.

In such cases, 2N×N, 2N×nU, or 2N×nD is not consecutively selected. In these cases, coding efficiency might not be reduced even without using contexts.

As in the configuration described above, the information described above is decoded with the assumption of a specified probability for the prefix portion, which may simplify the decoding process for pred_type while maintaining coding efficiency.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions. Partition types in which a coding unit is split into the prediction units include a partition into rectangular prediction units, and codes for identifying a partition into the rectangular prediction units include a code indicating whether each of the rectangular prediction units is portrait-oriented or landscape-oriented, and a code indicating a type of rectangular prediction unit. The image decoding device includes decoding means for decoding the code indicating a type of rectangular prediction unit without using a context.

Thus, it is possible to achieve simplified processes without referring to contexts while maintaining coding efficiency.

The example described above may also be expressed as follows. Information for selecting any PU partition type among a set of PU partition types for PU partition including a plurality of rectangular partitions, the set of PU partition types including symmetric partition types and asymmetric partition types, may be decoded without using a context.

In the example described above, a context may be used for the decoding of some of the bins in a bin sequence corresponding to information used for the selection of asymmetric partition, instead of no contexts being used for the decoding of any of the bins. For example, in the example in FIG. 7 described above, if a partition including a rectangular partition is selected for a CU having a size larger than 8×8, up to two-digit bins are decoded. Of the two-digit bins, the first digit is information indicating a symmetric partition or an asymmetric partition. The second digit is a bin to be decoded if the first digit is equal to '0', or indicates an asymmetric partition, and represents a positional relationship between the smaller PU and the larger PU in an asymmetric partition. Preferably, a context is not set for the first digit since the same code may not necessarily appear consecutively due to the reason described above with reference to FIG. 6. For the second digit, however, a context is preferably set because on the basis of the assumption that an asymmetric partition is being used, the smaller PU locally tends to be tilted to one side (for example, upward or downward if the second digit indicates information on the selection of 2N×nU or 2N×nD).

[1-2] Configuration for Decoding CU Prediction Type Information (Pred_Type)

The CU prediction mode decoding unit 1011 may be configured to decode CU prediction type information by referring to the binarization information stored in the binarization information storage unit 1012, as described below.

An example configuration of the binarization information stored in the binarization information storage unit 1012 will be described with reference to FIG. 7. FIG. 7 is a table indicating an example of binarization information that defines associations between combinations of CU prediction types and PU partition types and bin sequences.

In FIG. 7, by way of example, but not limited to, binarization information is represented in tabular form in which bin sequences are associated with CU prediction types and PU partition types. The binarization information may be represented as derivation formulas from which PU partition types and CU prediction types are derived. The above similarly applies to binarization information described below.

In addition, the binarization information may not necessarily be stored as data. The binarization information may be implemented as logic of a program for performing a decoding process.

In the table BT1 illustrated by way of example in FIG. 7, bin sequences are associated with CU prediction types and PU partition types in accordance with CU sizes.

First, a description will be given of the definition of CU sizes. In the association table BT1, two associations, namely, a non-8×8 CU 1012B having a CU size larger than 8×8 (CU>8×8) and an 8×8 CU 1012A having a CU size equal to 8×8 (CU=8×8), are defined as the definition of CU sizes.

Each of the bin sequences associated in the non-8×8 CU 1012B and the 8×8 CU 1012A has a prefix portion (prefix) and a suffix portion (suffix).

In the association table BT1, two CU prediction types, namely, the intra CU described above (labeled as "Intra") and inter CU (labeled as "Inter"), are defined for the definition of the respective CU sizes. PU partition types are further defined for the respective CU prediction types.

Details are as follows. First, for the intra CU, two PU partition types, namely, 2N×2N and N×N, are defined.

A description of 2N×2N will be given hereinafter. In the non-8×8 CU 1012B, only the prefix portion is defined and the bin sequence is "000". The suffix portion is not coded. In the 8×8 CU 1012A, the prefix portion is "000" and the suffix portion is "0".

For N×N, on the other hand, a definition is provided only for the non-8×8 CU 1012B. In this case, the prefix portion is "000", and the suffix portion is "1".

In this manner, for the intra CU, the prefix portion is "000", which is common.

For the inter CU, seven PU partition types, namely, 2N×2N, 2N×N, 2N×nU, 2N×nD, N×2N, nL×2N, and nR×2N, are defined.

If the PU partition type is 2N×2N, only the prefix portion is defined and the bin sequence is "1" in either the non-8×8 CU 1012B or the 8×8 CU 1012A.

In the non-8×8 CU 1012B, the common prefix portion "01" is assigned to the PU partition types of the landscape-oriented partition, which are based on partitioning in the horizontal direction, namely, 2N×N, 2N×nU, and 2N×nD.

The suffix portions for 2N×N, 2N×nU, and 2N×nD are "1", "00", and "01", respectively.

Further, the common prefix portion "001" is assigned to the PU partition types of the portrait-oriented partition, which are based on a partition in the vertical direction, namely, N×2N, nL×2N, and nR×2N.

The suffix portions for N×2N, nL×2N, and nR×2N are "1", "00", and "01", respectively. The suffix portions are similar to those in the PU partition types described above which are based on a partition in the horizontal direction.

Specifically, in the definition of the landscape-oriented partition and the portrait-oriented partition, the suffix portion represents partition types. More specifically, the bin is "1" for a symmetric partition. "00" indicates that the partition boundary lies nearer the origin than that for a symmetric partition, and "01" indicates that the partition boundary lies farther from the origin than for a symmetric partition.

Next, in the 8×8 CU 1012A, only the prefix portions are defined for 2N×2N, 2N×N, and N×2N. The prefix portions for 2N×2N, 2N×N, and N×2N are "1", "01", and "001", respectively.

The CU prediction mode decoding unit 1011 may perform a decoding process in accordance with the binarization information described above, by using different contexts for the respective bin positions in the prefix portion and the suffix portion.

If different contexts are used for the respective bin positions in the prefix portion and the suffix portion, a total of eight contexts are used as follows.

Since a bin of up to 3 bits is defined in the prefix portion, the number of contexts is three.

For the suffix portion, first, one context is used for 2N×2N and N×N. Then, two contexts are used for landscape-oriented partitions (2N×N, 2N×nU, and 2N×nD), and two contexts are used for portrait-oriented partitions (N×2N, nL×2N, and nR×2N).

[1-3] Configuration for Decoding Short Code of Intra CU in Small Size CU

The CU prediction mode decoding unit 1011 may be configured to decode a short code of an intra CU in a small size CU. The small size CU is a CU having a size less than or equal to a predetermined value. In the following, by way of example, the small size CU is a CU having an 8×8 size.

[Example Configuration 1-3-1]

The binarization information stored in the binarization information storage unit 1012 may have a configuration as illustrated in FIG. 8. FIG. 8 illustrates another example configuration of the 8×8 CU 1012A, which is a definition of binarization information. An 8×8 CU 1012A_1 illustrated in FIG. 8 is another example configuration of the 8×8 CU 1012A included in the association table BT1 illustrated in FIG. 7.

As illustrated in FIG. 8, in the 8×8 CU 1012A_1, which is a definition of binarization information, a short code is assigned to an intra CU for a CU having an 8×8 size, which is a small size CU.

In the 8×8 CU 1012A_1 illustrated in FIG. 8, a shorter code than a code assigned to an intra CU for a large size CU is assigned (see the non-8×8 CU 1012B in FIG. 7). The term "large size CU" refers to a CU that is a non-small size CU, and refers to, specifically, a CU having a size larger than an 8×8 size.

In the 8×8 CU 1012A_1, furthermore, a code assigned to an intra CU is shorter than a code assigned to an inter CU. In other words, in CUs having the same size, a shorter code is assigned to an intra CU than to any other PU partition type other than an intra CU.

For example, in the 8×8 CU 1012A_1, a 1-bit code is assigned to an intra CU, and a 2-bit or 3-bit code is assigned to an inter CU.

Intra prediction of small CUs tends to be applied to a region where inter prediction is less reliable. For this reason, small CUs have a high usage rate of intra CU. In the example configuration illustrated in FIG. 7, a long code is assigned to an intra CU. In contrast, in the data configuration described above, short codes are assigned to intra CUs having a small size.

Accordingly, the CU prediction mode decoding unit 1011 decodes short codes for intra CUs having a small size in a region for which inter prediction is less reliable. This achieves the advantage of improved coding efficiency.

In the configuration described above, preferably, the CU prediction mode decoding unit 1011 sets different contexts for the prefix portion of a large size CU and the prefix portion of a small size CU.

Accordingly, the context storage unit 1013 may store an 8×8 CU prefix 1013A, which is a context for decoding the prefix portion of a large size CU, and a non-8×8 CU prefix 1013B, which is a context for decoding the prefix portion of a small size CU. The 8×8 CU prefix 1013A and the non-8×8 CU prefix 1013B are different contexts.

The meaning of the bins in the prefix portion is different between a small size CU (CU==8×8) and a large size CU (CU>8×8).

For example, for a small size CU, the first bit of the prefix portion is information indicating whether the CU prediction type is intra CU or inter CU. For a large size CU, however, the first bit of the prefix portion is information indicating whether the CU prediction type is 2N×2N inter CU or other inter CU.

Bins having different meanings have different tendencies to appear. If the same context is set for the prefix portion for a large size CU and the prefix portion for a small size CU, the tendency for the bins to appear differs. This may cause a reduction in coding efficiency.

According to the configuration described above, allows different contexts may be set for bins having different tendencies to appear. Accordingly, the coding efficiency of bins may be improved.

[Example Configuration 1-3-2]

The binarization information stored in the binarization information storage unit 1012 may also have a configuration as illustrated in FIG. 9. FIG. 9 illustrates another example configuration of the 8×8 CU 1012A, which is a definition of binarization information. An 8×8 CU 1012A_2 illustrated in FIG. 9 is another example configuration of the 8×8 CU 1012A included in the association table BT1 illustrated in FIG. 7.

In the 8×8 CU 1012A_2 illustrated in FIG. 9, a bin sequence has three portions, namely, a flag, a prefix portion, and a suffix portion.

For the intra CU, the flag is "1". For the inter CU, the flag is "0".

For the intra CU, only the suffix portion is defined. Specifically, the suffix portion is "0" for the PU partition type of 2N×2N, and the suffix portion is "1" for the PU partition type of N×N.

For the inter CU, on the other hand, only the prefix portion is defined. Specifically, the prefix portions for 2N×2N, 2N×N, and N×2N are "1", "01", and "00", respectively.

In the 8×8 CU 1012A 2 illustrated in FIG. 9, similarly to the 8×8 CU 1012A_1 illustrated in FIG. 8, a shorter code is assigned to a large size CU than a code assigned to an intra CU, and the code assigned to an intra CU is shorter than the code assigned to an inter CU.

The 8×8 CU 1012A_2 having the configuration illustrated in FIG. 9 allows the CU prediction mode decoding unit 1011 to decode short codes for intra CUs having a small size in a region for which inter prediction is less reliable. This achieves the advantage of improved coding efficiency.

In the configuration described above, preferably, a specific context, which is different from the contexts set for the prefix portion and the suffix portion, is set for the flag. Preferably, furthermore, the same context is set for the prefix portion of a small size CU and the prefix portion of a large size CU.

For example, the context storage unit 1013 may store a single context into which the 8×8 CU prefix 1013A and the non-8×8 CU prefix 1013B are integrated.

The configuration described above is designed such that individual bins have the same meaning between the prefix portion of a small size CU and the prefix portion of a large size CU. Accordingly, the same context is set for both CUs, enabling an improvement in the coding efficiency of bins.

[Operations and Effects]

The present invention may also be expressed in the following form. An image decoding device according to an aspect of the present invention is an image decoding device for decoding information for restoring an image from encoded image data for each coding unit to restore an image. The image decoding device includes decoding means for decoding codes assigned to combinations of sizes of prediction units and prediction schemes to be applied to the coding units, the decoding means decoding a shorter code for a combination of a coding unit with a size less than or equal to a predetermined value and a prediction scheme for intra-frame prediction, than codes assigned to combinations other than the combination.

Thus, it is possible to assign a short code to a combination having a high probability of occurrence in coding units having a size less than or equal to a predetermined value. This achieves the advantage of improved coding efficiency.

[1-4] Configuration for Modifying the Interpretation of Bin Sequences in Accordance with Neighboring Prediction Parameters The CU prediction mode decoding unit 1011 may be configured to modify the interpretation of bin sequences by referring to prediction parameters allocated to neighboring regions.

[Example Configuration 1-4-1]

The binarization information stored in the binarization information storage unit 1012 may have a configuration as illustrated in FIG. 10.

FIG. 10 is a diagram illustrating still another example configuration of the binarization information stored in the binarization information storage unit 1012.

A binarization information association table BT20 illustrated in FIG. 10 is configured such that the interpretation of bin sequences is made different in accordance with the values of the prediction parameters of neighboring regions by replacing the 8×8 CU 1012A illustrated in FIG. 7 with an inter CU definition (1012D) and an intra CU definition (1012C).

Specifically, the association table BT20 is configured such that a definition of a small size CU has different interpretations of bin sequences between the inter CU 1012D, which is a binarization information definition in a case that at least one of neighboring CUs is an inter CU, and the intra CU 1012C, which is a binarization information definition in a case that both neighboring CUs are intra CUs.

In the inter CU 1012D (in a case that at least one of neighboring CUs is an inter CU), the target CU is interpreted as an intra CU (2N×2N or N×N) for the bin sequence "000" in the prefix portion, and the target CU is interpreted as a 2N×2N inter CU for the bin sequence "1" in the prefix portion.

In the intra CU 1012C (in a case that both neighboring CUs are intra CUs), the target CU is an intra CU (2N×2N or N×N) for the bin sequence "1" in the prefix portion, and the target CU is a 2N×2N inter CU for the bin sequence "000" in the prefix portion.

If neighboring CUs are intra CUs, the target CU can also possibly be an intra CU in terms of spatial correlation. Accordingly, if neighboring CUs are intra CUs, short codes are assigned to the intra CUs, resulting in a reduction in the amount of coding.

In addition, a small size CU has a high frequency of occurrence of an intra CU. Accordingly, a short code is assigning to an intra CU in a small size CU, leading to further improvement in coding efficiency.

In contrast, as illustrated in FIG. 10, a CU other than a small size CU (for example, a large size CU) may not necessarily have a configuration for "assigning a short code to an intra CU in a case that both neighboring CUs are intra". Which CU size the configuration for "assigning a short code to an intra CU in a case that both neighboring CUs are intra" is employed for may be based on the frequency of occurrence of an intra CU. In general, an intra CU tends to be more frequently selected for a CU having a smaller size. Thus, preferably, a short code is assigned to an intra CU for a CU having a size less than or equal to a predetermined value (for example, 16×16) including a CU having the minimum size. In this configuration, if neighboring CUs are intra CUs, the CU prediction mode decoding unit 1011 refers to the intra CU 1012C, and assigns short codes to the intra CUs. If neighboring CUs include an inter CU, the CU prediction mode decoding unit 1011 refers to the inter CU 1012D, and assigns a short code to the inter CU. As a result, the amount of coding may be reduced to improve coding efficiency.

[Example Configuration 1-4-2]

The binarization information stored in the binarization information storage unit 1012 may have a configuration as illustrated in FIG. 11.

FIG. 11 is a diagram illustrating still another example configuration of the binarization information stored in the binarization information storage unit 1012.

A binarization information association table BT30 illustrated in FIG. 11 is configured such that the interpretation of bin sequences is made different in accordance with the values of the prediction parameters of neighboring regions by replacing the non-8×8 CU 1012B illustrated in FIG. 7 with a definition (1012B_1) "in which an upper CU has a size greater than or equal to the target CU" and a definition (1012B_2) "in which an upper CU has a size less than the target CU".

Specifically, the association table BT30 is configured such that a definition of a large size CU has different interpretations of bin sequences between the case that an upper neighboring CU has a size greater than or equal to the target CU and the case that an upper neighboring CU has a size less than the target size.

In the definition 1012B_1 "in which an upper CU has a size greater than or equal to the target CU" (in a case that an upper neighboring CU has a size greater than or equal to the target CU), the target CU is interpreted as being of a portrait-oriented partition for the bin sequence "001" in the prefix portion, and the target CU is interpreted as being of a landscape-oriented partition for the bin sequence "01" in the prefix portion.

In the definition 1012B_2 "in which an upper CU has a size less than the target CU" (in a case that an upper neighboring CU has a size less than the target CU), on the other hand, the target CU is interpreted as being of a portrait-oriented partition for the bin sequence "01" in the prefix portion, and the target CU is interpreted as being of a landscape-oriented partition for the bin sequence "001" in the prefix portion.

If a neighboring CU has a size smaller than the target CU, it is probable that an edge is present in the neighboring CU.

In this case, it is probable that the target CU is split into partitions in a direction perpendicular to the side corresponding to the boundary between the target CU and the neighboring CU. Accordingly, if an upper neighboring CU has a size less than the target CU, it is probable that a portrait-oriented partition will be selected.

Thus, if an upper neighboring CU has a size less than the target CU, a short code is assigned to the portrait-oriented partition that can probably be selected. Accordingly, coding efficiency may be improved.

According to the configuration described above, if an upper neighboring CU has a size less than the target CU, the CU prediction mode decoding unit 1011 refers to the definition 1012B_2 "in which an upper CU has a size less than the target CU", and assigns a short code to a portrait-oriented partition.

If an upper neighboring CU has a size greater than or equal to the target CU, on the other hand, the CU prediction mode decoding unit 1011 refers to the definition 1012B_1 "in which an upper CU has a size greater than or equal to the target CU", and assigns a short code to a landscape-oriented partition. As a result, the amount of coding may be reduced to improve coding efficiency.

In addition, preferably, the suffix portions have the same interpretation without depending on the interpretation of the prefix portion based on neighboring CUs. In the association table BT30, the interpretation of the same suffix portion is the same regardless of whether the prefix portion represents a portrait-oriented partition or a landscape-oriented partition. In an example of the association table BT30, thus, the decoding process for the suffix portions may not necessarily be changed depending on whether the prefix portion represents a portrait-oriented partition or a landscape-oriented partition.

In other words, the association table BT30 is configured such that the PU partition type (the number of splits) does not depend on the parameter to be referred to.

Since the number of splits does not depend on the value of the parameter to be referred to, an error in the reference parameter will have small effect on the subsequent variable length decoding processes. Specifically, even in a case that erroneous size of a neighboring CU causes wrong interpretation of which of a portrait-oriented partition and a landscape-oriented partition the prefix portion represents, the subsequent syntax elements including the suffix portions may be continuously decoded.

That is, the decoding process for the suffix portion is possible regardless of the size of neighboring CUs. Thus, the decoding process is less affected by neighboring parameter error, increasing error robustness.

If a left neighboring CU has a size smaller than the target CU, it is probable that a landscape-oriented partition will be selected. Accordingly, if a left neighboring CU has a size smaller than the target CU, a short code may be assigned to the landscape-oriented partition that can probably be selected. Accordingly, advantages similar to those described above may be achieved.

In addition, preferably, the switching of interpretation based on the size of neighboring CUs is not performed on a minimum size CU. If the target CU is a minimum size CU, the size of the target CU is always less than or equal to that of neighboring CUs. The omission of the process of switching interpretation may simplify decoding processes.

The term "upper neighboring CU has a size less than the target CU" can also mean that a CU boundary having a vertical positional relationship with an upper side (except for the topmost vertex) of the target CU is present at the upper side.

Accordingly, in a case that a CU boundary or PU boundary having a vertical positional relationship with an upper side (except for the topmost vertex) of the target CU is present at the upper side, a short code may be assigned to a portrait-oriented partition.

While a description has been made of neighboring CUs adjacent to the target CU, the present invention is limited thereto. The above similarly applies to a CU located as near as spatial correlation could be recognized.

The configuration described above is generalized as follows. In the configuration described above, for a set of binary sequences, and for a set of pred_type each associated with the same number of partitions, priorities are set for pred_type in terms of the possibility of occurrence of pred_type in accordance with neighboring prediction parameters, and pred_type with higher priority is associated with a shorter binary sequence.

In the foregoing description, the condition that the size of an upper neighboring CU is smaller than the size of the target CU may also be expressed as follows.

(1) The upper left pixel in the target CU is represented by (xc, yc).

(2) An upper neighboring CU including the pixel at (xc, yc−1) is derived, and the upper left pixel in the upper neighboring CU is represented by (xu, yu).

(3) If the relationship of "log2CUSize[xu][yu] <log2CUSize[xc][yc]" holds true, it is determined that the size of the upper neighboring CU is smaller than the size of the target CU, where log2CUSize[x][y] is a logarithmic value with a base of 2 of the size of the CU in which the upper left pixel is the pixel at (x, y).

Preferably, the determination described above is based on the comparison between only the size of the CU located above the upper left pixel in the target CU and the size of the target CU.

While a description has been given of an upper neighboring CU, the size of a left neighboring CU may be determined. In this case, preferably, only the size of the CU located to the left of the upper left pixel in the target CU is compared with the size of the target CU.

In the determination step (3), by way of example, the values of the CU sizes are directly compared with each other. Other values associated with the CU sizes may be compared with each other. For example, the condition in the determination step (3) may be determined using the values of a CU partition depth (cuDepth[x][y]) indicating the number of times the tree block (LCU) is partitioned, in accordance with the formula "cuDepth[xu][yu]>cuDepth[xc][yc]".

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions. The image decoding device includes changing means for changing a plurality of codes associated with a plurality of combinations of partition types and prediction schemes, the partition types being types in which a target coding unit that is a coding unit to be decoded is split into the prediction units, in accordance with a decoded parameter allocated to a decoded prediction unit near a target prediction unit that is a prediction unit to be decoded.

Thus, it is possible to assign a shorter code to a combination of prediction scheme and partition type having a higher probability of occurrence in accordance with a decoded parameter allocated to a nearby decoded prediction unit. Accordingly, coding efficiency may be improved.

(2) Details of PU Information Decoding Unit

Figure 12:
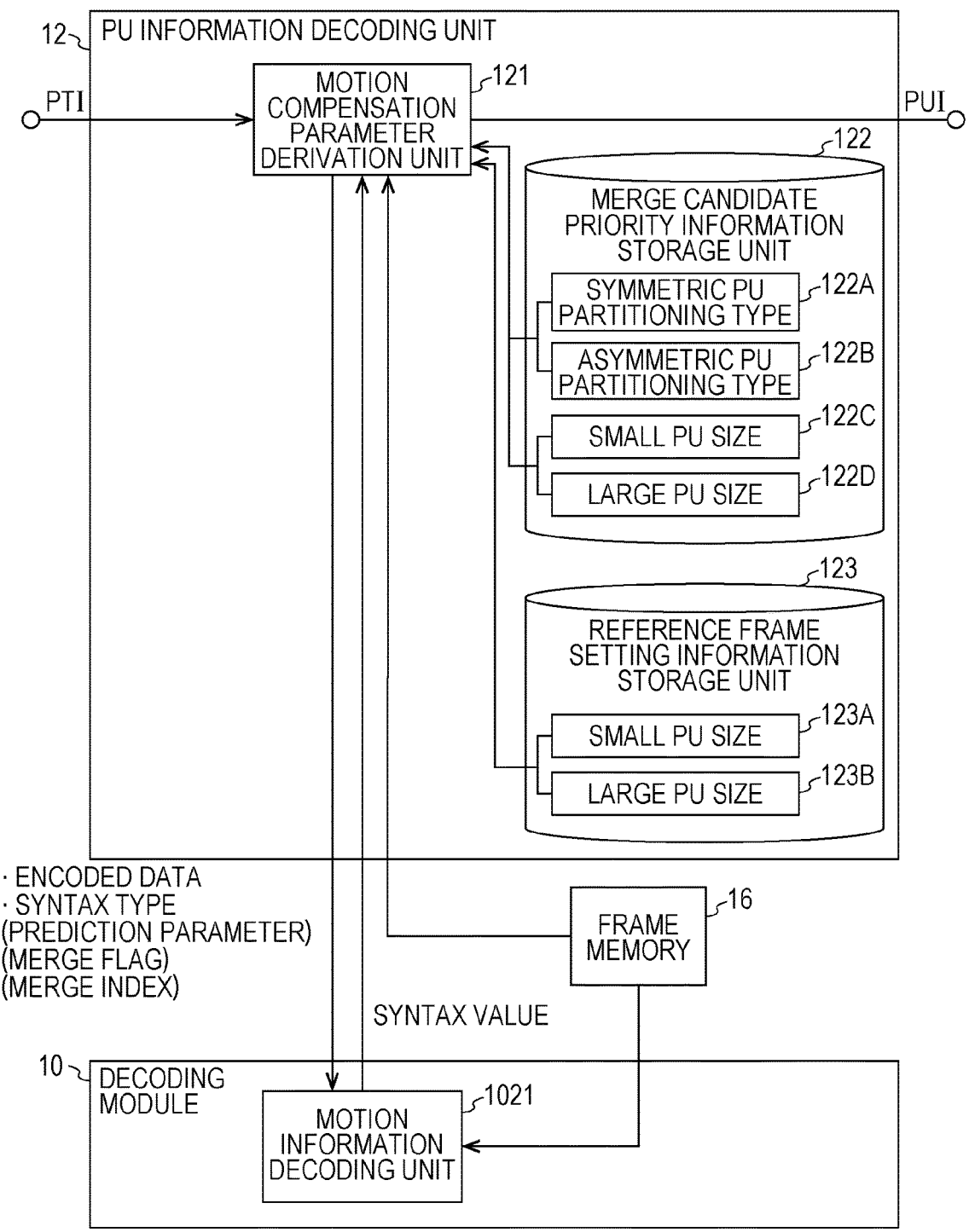
FIG. 12 is a functional block diagram illustrating an example configuration of a PU information decoding unit and a decoding module in the video decoding device.

Next, an example configuration of the PU information decoding unit 12 and the decoding module 10 will be described with reference to FIG. 12. FIG. 12 is a functional block diagram exemplifying a configuration for decoding motion information in the video decoding device 1, that is, the configuration of the PU information decoding unit 12 and the decoding module 10.

The configuration of the individual components in the PU information decoding unit 12 and the decoding module 10 will be described hereinafter in this order.

(PU Information Decoding Unit)

As illustrated in FIG. 12, the PU information decoding unit 12 includes a motion compensation parameter derivation unit (bi-prediction restriction means, candidate determining means, estimating means) 121, a merge candidate priority information storage unit 122, and a reference frame setting information storage unit 123.

The motion compensation parameter derivation unit 121 derives motion compensation parameters for each of the PUs included in the target CU from the encoded data.

Specifically, the motion compensation parameter derivation unit 121 derives motion compensation parameters using the following procedure. If the target CU is a skip CU, a skip index may be decoded instead of a merge index, and prediction parameters in the skip CU may be derived based on the value of the decoded skip index.

First, the motion compensation parameter derivation unit 121 determines a skip flag. As a result of the determination, if the target CU is a non-skip CU, the motion compensation parameter derivation unit 121 decodes a merge flag using a motion information decoding unit 1021.

If the target CU is a skip CU or a merge PU, the motion compensation parameter derivation unit 121 decodes a merge index to derive prediction parameters (motion vector, reference image index, inter prediction flag) on the basis of the value of the decoded merge index. Note that the motion compensation parameter derivation unit 121 determines merge candidates to be specified by the merge index, in accordance with merge candidate information stored in the merge candidate priority information storage unit 122.

If the target CU is not a skip CU or a merge PU, the motion compensation parameter derivation unit 121 decodes prediction parameters (inter prediction flag, reference image index, motion vector difference, motion vector predictor index).

Furthermore, the motion compensation parameter derivation unit 121 derives an estimated motion vector on the basis of the value of the motion vector predictor index, and also derives a motion vector on the basis of the motion vector difference and the estimated motion vector.

The merge candidate priority information storage unit 122 stores merge candidate information. The merge candidate information includes information indicating regions designated as merge candidates and information indicating the priorities of the merge candidates.

The reference frame setting information storage unit 123 stores reference frame setting information for determining which inter-frame prediction scheme will be used among a uni-prediction scheme in which one reference image is referred to and a bi-prediction scheme in which two reference images are referred to.

(Decoding Module)

As illustrated in FIG. 12, the decoding module 10 includes the motion information decoding unit 1021. The motion information decoding unit 1021 decodes a syntax value, in accordance with the encoded data and syntax type supplied from the motion compensation parameter derivation unit 121, from a binary representation included in the encoded data. The motion compensation parameters decoded by the motion information decoding unit 1021 include a merge flag (merge_flag), a merge index (merge_idx), a motion vector predictor index (mvp_idx), a reference image index (ref_idx), an inter prediction flag (inter_pred_flag), and a motion vector difference (mvd).

[Example Configuration for Deriving Prediction Parameters in Merge PU]

[2-1] Example of Positions and Priorities of Merge Candidates

The derivation of prediction parameters in a merge PU will be described with reference to FIG. 13 to FIG. 15.

In a case that the PU partition type is asymmetric, the motion compensation parameter derivation unit 121 may be configured to determine the priorities of merge candidates using a method different from that in a case that the PU partition type is symmetric.

First, a description will be given of the characteristics of asymmetric partitions. Of the asymmetric partitions, a smaller partition can possibly include an edge extending in the longitudinal direction. In addition, it is probable that accurate motion vectors will have been derived in a region including an edge.

A specific description will now be given with reference to FIG. 13. FIG. 13 illustrates a CU for which an asymmetric partition has been selected. As illustrated in FIG. 13, in a target CU 30, an edge E1 having an inclination is present in a region, and the 2N×nU PU partition type has been selected.

The target CU includes a PU 31 and a PU 32. Here, the target PU is the PU 31. The edge E1 having an inclination crosses the region of the target PU 31.

Figure 13:
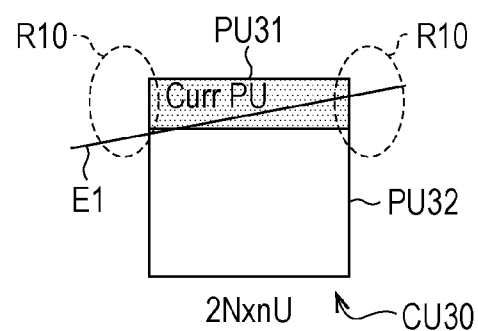
FIG. 13 is a diagram illustrating a CU for which an asymmetric partition has been selected.

In the example illustrated in FIG. 13, it is probable that the same edge as the edge present in the region of the target PU 31 will be present in regions R10 near the short sides of the target PU 31. Thus, it is probable that the same motion vector (mv) as that for the target PU 31 will have been allocated to the regions R10.

Accordingly, in a region possibly including an edge, that is, in the smaller partition, motion vectors allocated to regions near the short sides of the region are referred to, whereas, in the larger partition, motion vectors allocated to regions around the smaller partition are referred to. Thus, the accuracy of motion vectors may be increased.

The merge candidate priority information stored in the merge candidate priority information storage unit 122 is configured to include two types of merge candidate priority information, namely, merge candidate priority information on a symmetric PU partition type 122A and merge candidate priority information on an asymmetric PU partition type 122B.

The merge candidate priority information on the symmetric PU partition type 122A will now be described with reference to FIG. 14.

Figure 14:
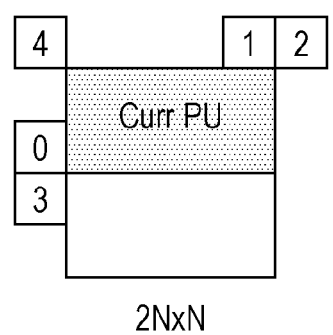
FIG. 14 is a diagram illustrating the priorities of merge candidates of a CU for which a symmetric partition has been selected.

FIG. 14 illustrates a CU for which a symmetric partition has been selected. As illustrated in FIG. 14, the 2N×N PU partition type has been selected for a symmetric CU. In FIG. 14, the target PU is represented by "Curr PU". Priorities are assigned to merge candidates for the target PU, in the order of left (L), upper (U), upper right (UR), bottom left (BL), and upper left (UL) merge candidates.

The merge candidate priority information on the asymmetric PU partition type 122B will be described hereinafter with reference to FIG. 15. Parts (a) and (b) of FIG. 15 illustrate the setting of the priorities for the smaller partition in 2N×nU and the larger partition in 2N×nU, respectively. Parts (c) and (d) of FIG. 15 illustrate the setting of the priorities for the larger partition in 2N×nD and the smaller partition in 2N×nD, respectively.

Figure 15:
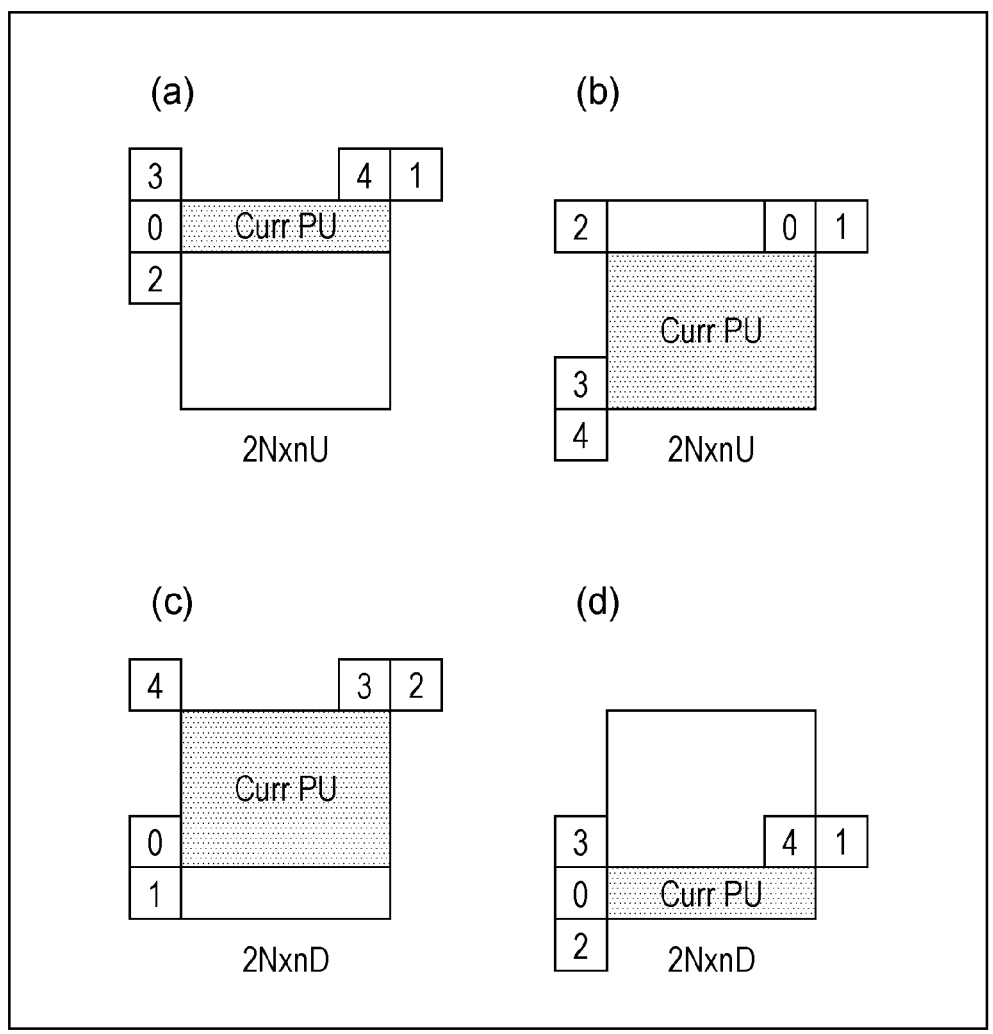
FIG. 15 includes diagrams illustrating the priorities of merge candidates of a CU for which an asymmetric partition has been selected. Parts (a) and (b) of FIG. 15 illustrate CUs with the PU partition type of 2N×nU. Part (a) of FIG. 15 illustrates the priorities of merge candidates in the smaller partition, and part (b) of FIG. 15 illustrates the priorities of merge candidates in the larger partition. Parts (c) and (d) of FIG. 15 illustrate CUs with the PU partition type of 2N×nD. Part (c) of FIG. 15 illustrates the priorities of merge candidates in the larger partition, and part (d) of FIG. 15 illustrates the priorities of merge candidates in the smaller partition.

For the smaller partition in the asymmetric partitions, as illustrated in parts (a) and (d) of FIG. 15, high priorities are assigned to merge candidates near the short sides of the smaller partition.

Specifically, priorities are assigned to merge candidates for the smaller PUs in 2N×nU and 2N×nD, as illustrated in parts (a) and (d), respectively, in the order of those adjacent to the short sides (L), adjacent to the vertices (UR, BL, UL), and adjacent to the long sides (U).

For the larger partition in the asymmetric partitions, as illustrated in parts (b) and (c) of FIG. 15, higher priorities are assigned to merge candidates located near the smaller partition.

Specifically, priorities are assigned to merge candidates for the larger PU in 2N×nU, as illustrated in part (b) of FIG. 15, in the order of a merge candidate (U) in the smaller PU, merge candidates (UR, UL) near the smaller PU, and the other merge candidates (L, BL).

Further, for the larger PUs in 2N×nD, as illustrated in part (c) of FIG. 15, priorities are assigned to merge candidates in the order of merge candidates (L, BL) near the smaller PU and the other merge candidates (U, BL, UL).

Note that a candidate having a high priority is assigned a low merge index, and a short code is assigned to a low merge index. Only candidates having high priorities may be designated as selectable merge candidates.

While a description has been made of the derivation of prediction parameters in a merge PU, a similar derivation method may be used for the derivation of estimated motion vectors to be used to restore motion vectors for non-merge PUs in an inter CU. In general, the method described above may be applicable to the derivation of, for each PU in asymmetric PUs, the estimated values or predicted values of motion parameters corresponding to neighboring regions.

[Operations and Effects]

The present invention may also be expressed in the following form. An image decoding device according to an aspect of the present invention is an image decoding device for restoring an image by generating a prediction image using an inter-frame prediction scheme for each of prediction units obtained by splitting a coding unit into one or more partitions. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes estimating means for estimating a prediction parameter for inter-frame prediction using, in a case that the partition type is an asymmetric partition, an estimation method different from an estimation method in a case that the partition type is a symmetric partition.

Thus, the following advantage may be achieved: different estimation methods are used for the case that the partition type is an asymmetric partition and the case that the partition type is a symmetric partition, allowing prediction parameters for inter-frame prediction to be estimated using a desired estimation method in accordance with the partition type.

[2-2] Change of Merge Candidates Using Combination of CU Size and Skip/Merge

The motion compensation parameter derivation unit 121 may be configured to change merge candidates in accordance with a combination of a CU size and a CU type, namely, whether or not the CU of interest is a CU to skip/merge. Accordingly, the merge candidate information stored in the merge candidate priority information storage unit 122 is configured to include two types of definition information, namely, definition information on a small PU size 122C and definition information on a large PU size 122D.

The merge candidate information on the small PU size 122C defines the number of merge candidates to be applied to a small size PU. The merge information on the large PU size 122D defines the number of merge candidates to be applied to a large size PU.

As an example, merge candidate information has a definition in which the number of merge candidates (the number of merge candidates of a small size PU) defined for the small PU size 122C is smaller than the number of merge candidates (the number of merge candidates of a large size PU) defined for the large PU size 122D.

A region where a small size PU is selected generally includes complex motion. Thus, the motion vectors allocated to neighboring PUs of such a region tend to have low correlations with each other.

This tendency may result in less improvement in estimation accuracy than that in the case of a large size PU even if the number of merge candidates increases.

Thus, preferably, the number of merge candidates is reduced to reduce the amount of coding of side information.

In the example described above, in the merge candidate information, the number of merge candidates of a small size PU generally including complex motion is smaller than the number of merge candidates of a large size PU. Thus, the amount of coding of side information may be reduced.

Examples of combinations of small size PUs and large size PUs are as follows.

A small size PU is a PU having sides at least one of which is smaller than a predetermined threshold value (for example, 8), and a large size PU is a PU other than that PU. For example, PUs with 16×4, 4×16, 8×4, 4×8, and 4×4 sizes are small size PUs, and PUs with 8×8 and 16×16 sizes are large size PUs.

A small size PU is a PU having an area smaller than a predetermined threshold value (for example, 64), and a large size PU is a PU other than that PU. For example, PUs with 8×4, 4×8, and 4×4 sizes are small size PUs, and PUs with 8×8, 16×4, 4×16, 16×16, and similar sizes are large size PUs.

A small size PU is a PU included in a CU having a size less than or equal to a predetermined value (for example, 8×8), and a large size PU is a PU included in a larger CU. For example, PUs with 8×8, 8×4, 4×8, and 4×4 sizes included in an 8×8 CU are small size PUs.

A small size PU is a smaller PU in a CU to which an asymmetric partition is adapted, and a large size PU is a larger PUs in a CU to which an asymmetric partition is adapted.

As another example, in the merge candidate information, the number of merge candidates based on temporal prediction for a small PU is preferably smaller than the number of merge candidates based on temporal prediction for a large PU. The merge candidate information may be defined as not including merge candidates based on temporal prediction for a small PU.

In a region with complex motion where a small size PU is selected, the correlation between a collocated PU used for temporal prediction and a target PU is low. Thus, it is less probable that temporal prediction will be selected for such a region. Accordingly, it is preferable that the number of merge candidates based on temporal prediction be reduced or merge candidates based on temporal prediction not be included.

[Operations and Effects]

The present invention may also be expressed in the following form. An image decoding device according to an aspect of the present invention is an image decoding device for restoring an image by generating a prediction image using an inter-frame prediction scheme for each of prediction units obtained by splitting a coding unit into one or more partitions. The image decoding device includes candidate determining means for determining a candidate in a region to be used for estimation in accordance with a size of a target prediction unit, which is a prediction unit to be decoded, in a case that the target prediction unit is a prediction unit in which a prediction parameter of the target prediction unit is estimated from a prediction parameter allocated to a neighboring region of the target prediction unit.

Thus, it is possible to reduce side information by reducing the number of candidates, and, as a result, to improve coding efficiency.

[2-3] Determination of Number of Reference Frames

The motion compensation parameter derivation unit 121 may be configured as given in items [2-3-1] to [2-3-4] below, and may accordingly determine which prediction scheme out of uni-prediction and bi-prediction to apply in inter prediction.

[2-3-1] Bi-Prediction Restriction in Small Size PU

The motion compensation parameter derivation unit 121 may determine which prediction scheme out of uni-prediction and bi-prediction to apply in inter prediction, by referring to the reference frame setting information stored in the reference frame setting information storage unit 123.

The motion compensation parameter derivation unit 121 may be configured to restrict bi-prediction for a small size PU. Accordingly, the reference frame setting information is configured to include two types of definition information, namely, definition information on a small PU size 123A and definition information on a large PU size 123B.

A prediction scheme selectable for a large size PU is defined in the large PU size 123B. The large PU size 123B has a definition in which either prediction scheme out of bi-prediction and uni-prediction can be selected for a large size PU without any restriction.

A prediction scheme selectable for a small size PU is defined in the small PU size 123A. The small PU size 123A has a definition in which bi-prediction is restricted for a small size PU.

An example of the definition of the small PU size 123A is as follows. Uni-prediction is applied, without the inter prediction flag being decoded, to a PU not to merge in an inter CU, the PU having a size less than 16×16.

Another example of the definition of the small PU size 123A is as follows. Uni-prediction is applied to a PU to merge in an inter CU, the PU having a size less than 16×16.

Still another example of the definition of the small PU size 123A is as follows. Uni-prediction is applied to each of PUs included in a skip CU.

Still another example of the definition of the small PU size 123A is as follows. Weighted prediction is not applied to a PU not to merge in an inter CU, the PU having a size less than 16×16. That is, information concerning weighted prediction is omitted.

The details of the configuration of encoded data and the configuration of the video decoding device in a case that bi-prediction is restricted on the basis of reference frame setting information will be described hereinafter with reference to a syntax table and a block diagram.

(Types of Bi-Prediction Restriction)

PU types include a PU in which the target CU is skip (skip PU), a PU for which a merge is adapted to the target PU (merge PU), and a PU for which the target PU is not skip or merge (basic inter PU or non-motion information omitted PU). For a basic inter PU, an inter prediction flag indicating bi-prediction or uni-prediction is decoded from encoded data to derive motion compensation parameters. For a skip PU and a merge PU, on the other hand, motion compensation parameters are derived without decoding the inter prediction flag. For these PUs, a candidate used for motion compensation is selected from among skip candidates or merge candidates on the basis of the skip index or the merge index to derive motion compensation parameters for the target PU on the basis of the motion compensation parameters for the selected candidate. In general, motion compensation parameters for the skip PU may be derived using a method similar to that for the merge PU. If the use of merge is restricted using a flag in the sequence parameter set or the like, the same method as that for the basic inter PU, except that the motion vector difference (mvd) is not decoded, may be used. In this case, the bi-prediction restriction operation for the skip PU is the same as that for the basic inter PU.

Part (a) of FIG. 35 illustrates examples of bi-prediction restriction for each PU. The examples of bi-prediction restriction include bi-prediction restriction only on the basic inter PU and bi-prediction restriction on all the PUs to which motion compensation prediction is applied. In the case of bi-prediction restriction only on the basic inter PU, the restriction of bi-prediction is not imposed on the skip PU or the merge PU but the restriction of bi-prediction is imposed only on the basic inter PU. The amount of processing imposed on a video encoding device and a video decoding device and the size of their circuitry may be reduced for both bi-prediction restriction only on the basic inter PU and bi-prediction restriction on all the PUs.

Part (b) of FIG. 35 illustrates bi-prediction restriction methods for the respective PUs. The prediction of bi-prediction is imposed on the skip PU and the merge PU by the derivation of information indicating that bi-prediction is not applied to the derivation of motion compensation parameters based on skip candidates or merge candidates. Specifically, as described below with reference to a motion compensation parameter derivation unit, the restriction of bi-prediction is imposed by the conversion of the value of the inter prediction flag included in the motion compensation parameters from bi-prediction to uni-prediction. In order to impose the restriction of bi-prediction on the basic inter PU, whether or not to apply the restriction of bi-prediction is determined in accordance with the PU size information. If the restriction of bi-prediction is not applied, the inter prediction flag is decoded. If the restriction of bi-prediction is applied, the decoding of the inter prediction flag is omitted. Furthermore, the process for estimating the value of the inter prediction flag as uni-predictive is performed.

The PU size information is information for determining whether the PU of interest is a small PU, and may include the size of the target CU and the PU partition type, the size of the target CU and the number of PU partitions, the PU width or height, the area of the PU, or the like.

The skip PU and the merge PU are different from the basic inter PU in the method for decoding the motion compensation parameters as well as the situations in which the PUs are used. For the skip PU and the merge PU, the amount of coding is reduced by the restriction of selectable motion compensation parameters. Such PUs are mainly used in a region with uniform motion. Uniform motion is likely to have a large noise removal effect created by bi-prediction because two prediction images are close to each other. For this reason, the skip PU and the merge PU would be more likely to experience a reduction in coding efficiency due to the restriction of bi-prediction than the basic inter PU, compared to the restriction of bi-prediction for the basic inter PU. Accordingly, as described above, the restriction that bi-prediction is used only for a basic inter PU may be preferable. In addition, as described below, the PU size to be limited may be changed between the basic inter PU and the skip and merge PUs. In view of the structure of encoded data, the restriction of bi-prediction for the basic inter PU is more effective in terms of reducing the amount of coding because the inter prediction flag is not encoded.

(Motion Compensation Parameters of PU)

The motion compensation parameters of a PU are expressed as prediction list utilization flags predFlagL0 and predFlagL1, reference index numbers refIdxL0 and refIdxL1, and motion vectors mvL0 and mvL1. The prediction list utilization flags predFlagL0 and predFlagL1 indicate whether or not a reference prediction list is to be used. In the following, the value 1 indicates use and the value 0 indicates non-use. The use of two reference prediction lists, or predFlagL0=1 and predFlagL1=1, corresponds to bi-prediction, and the use of one reference prediction list, that is, (predFlagL0, predFlagL1)=(1, 0) or (predFlagL0, predFlagL1)=(0, 1), corresponds to uni-prediction. Whether or not bi-prediction will be applied may be represented using an inter prediction flag described below. The inter prediction flag is used when information indicating whether the number of reference pictures is equal to 1 (uni-prediction) or 2 (bi-prediction) is decoded from the encoded data.

If the prediction list utilization flag predFlagL0 is equal to 1, a reference picture in an L0 list is specified by the reference index number refIdxL0, and the motion vector corresponding to the reference picture specified by the motion vector mvL0 is specified.

If the prediction list utilization flag predFlagL1 is equal to 1, a reference pictures in an L1 list is specified by the reference index number refIdxL1, and the motion vector corresponding to the reference picture specified by the motion vector mvL1 is specified.

If the list X is not used (where X is 0 or 1), that is, if the prediction list utilization flag predFlagLX is equal to 0, basically, the value of the reference index number refIdxLX is set to −1 and the value of the motion vector mvL1 is set to (0, 0).

(Details of Inter Prediction Flag)

The details of the inter prediction flag will now be described. The inter prediction flag inter_pred_flag may be a binary flag indicating uni-prediction or bi-prediction, or may be a flag further including information for selecting a list of reference images (reference list) to be referred to in uni-prediction from among a plurality of reference lists. For example, the inter prediction flag may be defined as a ternary flag including a flag for selecting one of two reference lists (L0 list and L1 list). The individual cases will be described hereinafter.

The decoding module 10 decodes a combined list flag ref_pic_list_combination_flag for selecting whether to use the L0 or L1 list or the combined list (LC list) as a reference frame list from the slice header or the like. The method for determining the reference frame for uni-prediction differs depending on the value of the combined list flag. If the combined list flag is equal to 1, the combined list LC is used as a reference list to be used to specify a uni-predictive reference frame, and a flag for specifying a reference list for each PU is not needed. The inter prediction flag inter_pred_flag may thus be a binary flag. If the combined list flag is equal to 0, it is necessary to select a reference list from the L0 list or the L1 list for each PU. Thus, the inter prediction flag inter_pred_flag is a ternary flag.

Part (a) of FIG. 32 illustrates the meaning of an inter prediction flag in a case that the inter prediction flag is a binary flag. Part (b) of FIG. 32 illustrates the meaning of an inter prediction flag in a case that the inter prediction flag is a ternary flag.

(Example of Syntax Table for Bi-Prediction Restriction)

FIG. 31 illustrates an example of a PU syntax table in the related art, and illustrates the configuration of encoded data in a case that no restriction of bi-prediction is performed. FIG. 33 illustrates an example of a PU syntax table, in which parts (a) and (b) illustrate the configuration of encoded data in a case that restriction of bi-prediction is performed, and specifically illustrate the portion of the inter prediction flag inter_pred_flag. Part (a) of FIG. 33 illustrates an example of the syntax table in a case that the inter prediction flag is always a binary flag. In this case, two portions, namely, Pred_LC, which means uni-prediction, and Pred_Bi, which means bi-prediction, are identified from each other by inter_pred_flag. If the slice is a B slice and bi-prediction is active (DisableBiPred=false), the encoded data includes the inter prediction flag inter_pred_flag in order to identify uni-prediction and bi-prediction from each other. If bi-prediction is not active (DisableBiPred=true), the encoded data does not include the inter prediction flag inter_pred_flag because uni-prediction is always enabled.

Part (b) of FIG. 33 illustrates an example of a syntax table in a case that the inter prediction flag is a ternary flag. If a combined list is used, two types, namely, Pred_LC, which means uni-prediction in which one reference frame in an LC list is used, and Pred_Bi, which means bi-prediction, are identified from each other by inter_pred_flag. Otherwise, three types, namely, Pred_L0, which means uni-prediction with the L0 list, Pred_L1, which means uni-prediction with the L1 list, and Pred_Bi, which means bi-prediction, are identified from one another. If the slice is a B slice and bi-prediction is active (DisableBiPred=false), the encoded data includes a first inter prediction flag inter_pred_flag0 for specifying uni-prediction and bi-prediction. If bi-prediction is not active, only in a case that a combined list is not used, the encoded data includes a second inter prediction flag inter_pred_flag1 for specifying uni-prediction and bi-prediction to specify a reference list. The case that a combined list is not used is determined specifically using !UsePredRefLC && !NoBackPredFlag, as illustrated in part (a) of FIG. 33. That is, the determination is based on a flag UsePredRefLC (indicating that a combined list is used if the value of UsePredRefLC is true) specifying whether or not to use a combined list, and a flag NoBackPredFlag (indicating that backward prediction is not used if the value of NoBackPredFlag is true) specifying whether or not to use backward prediction. If a combined list is used, the use of a combined list is determined without list selection. No use of backward prediction means the disabling of Pred_L1. In this case, it may be determined that the list used also when the second inter prediction flag inter_pred_flag1 is not encoded is the combined list (Pred_LC) or the L0 list (Pred_L1). The expression "NoL1PredFlag", which means no use of the L1 list, may be used instead of NoBackPredFlag.

A threshold value used to determine whether or not to impose the restriction of bi-prediction or to determine the PU size in a case that the restriction of bi-prediction is imposed may be included in the encoded data. FIG. 34 illustrates an example of a syntax table for bi-prediction restriction. Part (a) of FIG. 34 illustrates the case that the sequence parameter set includes the flag disable_bipred_in_small_PU restricting whether or not to impose the restriction of bi-prediction. As illustrated in Part (a) of FIG. 34, a flag for the restriction of bi-prediction may be encoded independently from a flag disable_inter_4x4 prohibiting a small size PU (here, a 4×4 size PU). The purpose of the flag prohibiting a small size PU is also to reduce the amount of worst-case processing to generate a PU prediction image, similarly to the restriction of bi-prediction. Accordingly, the flag prohibiting a small size PU and the flag prohibiting small size bi-prediction may be used as a common flag. Part (b) of FIG. 34 illustrates an example in which a prediction restriction flag use_restricted_prediction is used as a common flag. In this case, if the prediction restriction flag is true, both the application of small size PU and bi-prediction for small size PU are simultaneously prohibited. Part (c) of FIG. 34 illustrates an example in which the encoded data includes disable_bipred_size indicating the size of a PU for which bi-prediction is prohibited. disable_bipred_size may be the value of a logarithm with a base of 2 of a threshold value TH described below in the determination method for bi-prediction restriction, or the like. The flags described above may be encoded using a parameter set other than the sequence parameter set, or may be encoded using the slice header.

While the syntax for CABAC has been described, a description will now be given of the syntax for CAVLC. As described above, FIG. 33 illustrates a syntax table for CABAC. FIG. 36 illustrates a syntax table for CAVLC. In FIG. 36, combined_inter_pred_ref_idx is a flag in which the inter prediction flag inter_pred_flag and the reference picture indices (ref_idx_10, ref_idx_lc, ref_idx_11) are combined. As illustrated in FIG. 36, if coding mode information (entropy_coding_mode_flag) is equal to 0, that is, in CAVLC, combined_inter_pred_ref_idx, which is the combination flag, is encoded instead of the inter prediction flag inter_pred_flag and the reference picture indices being separately encoded and decoded. Thus, the encoded data includes combined_inter_pred_ref_idx.

Furthermore, if bi-prediction is available (the flag DisableBipred indicating bi-prediction restriction is false) and if combined_inter_pred_ref_idx is equal to a predetermined value MaxPredRef (described below), the encoded data further includes the inter prediction flag inter_pred_flag. DisableBipred is assumed to be true if the PU size is small size. The derivation method for DisableBipred in FIG. 36 is an example. DisableBipred=true is obtained for the PU sizes of 4×4, 4×8, and 8×4.

(Combined Inter Prediction Reference Index)

FIG. 37 includes diagrams depicting the combined inter prediction reference index combined_inter_pred_ref_idx. Parts (a), (b), and (c) of FIG. 37 are diagrams depicting an example of values of combined_inter_pred_ref_idx. Part (d) of FIG. 37 illustrates a table TBL37 and pseudo code CODE37 indicating the derivation method for the maximum value MaxPredRef of combined_inter_pred_ref_idx. combined_inter_pred_ref_idx is used to code a combination of inter prediction flag inter_pred_flag and reference picture index having a high probability of occurrence using a short bit string. combined_inter_pred_ref_idx is an index used to select a reference picture managed in a reference list LC (in LC, C is the abbreviation for "combined") having elements composed of combinations of reference pictures having a high probability of occurrence.

In the example in parts (a) and (c) of FIG. 37, the value of combined_inter_pred_ref_idx is in the range of 0 to 8 (=MaxPredRef). As illustrated in part (c) of FIG. 37, values ranging from 0 to 7 are assigned to combinations having high frequency of occurrence (combined reference picture sets). The value 8 (=MaxPredRef) is assigned to the other combinations of inter prediction flags inter_pred_flag and reference picture indices. The derivation method for the maximum value MaxPredRef illustrated in part (d) of FIG. 37 will be described below.

Figure 38:
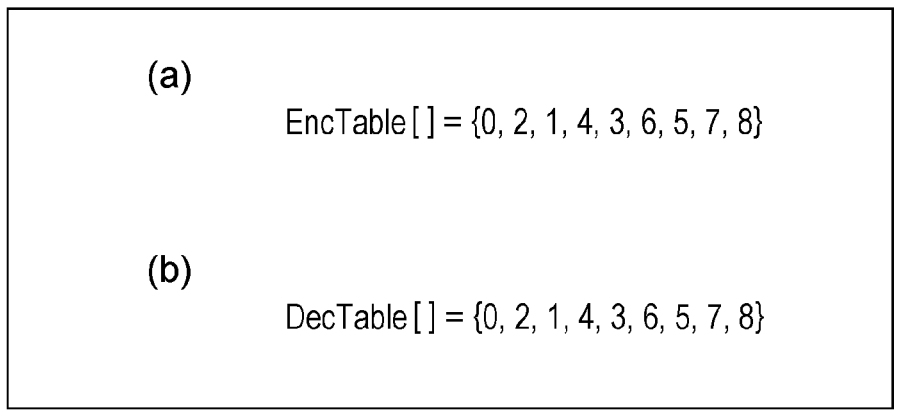
FIG. 38 includes diagrams depicting a variable table relative to a combined table, in which part (a) is a diagram illustrating an example of a conversion variable table EncTable, and part (b) is a diagram illustrating an inverse conversion variable table DecTable.

In CAVLC, combined_inter_pred_ref_idx is converted into a code number codeNum using a table called a conversion variable table EncTable, and the code number codeNum is coded using truncated unary code with MaxPredRef as its maximum value. That is, codeNum=EncTable[combined_inter_pred_ref_idx] is coded. In the truncated unary code, a smaller value is coded with a shorter bit string. In addition, the maximum value is explicitly used, enabling coding without unnecessary bits. The decoding of the code number (codeNum) using truncated unary code in the case of the maximum value cMax is implemented using the process specified in pseudo code as follows, where read_bits (1) is a function in which a 1-bit binary representation is read from the encoded data and the read value is returned.
leadingZeroBits=−1
for(b=0; !b && leadingZeroBits<cMax; leadingZeroBits++)
 b=read_bits(1)
codeNum=leadingZeroBits Parts (a) and (b) of FIG. 38 illustrate an example of a conversion variable table EncTable and an inverse conversion variable table DecTable, respectively. As illustrated in the example in part (a) of FIG. 38, with the use of the conversion variable table EncTable, a small value is assigned to a combination having a higher frequency of occurrence in the combined reference picture set, and is coded with a short code. The conversion variable table and the inverse conversion variable table are updated so that, each time one combined_inter_pred_ref_idx is encoded or decoded, a generated value becomes a short code number. This enables coding with a shorter code than coding using a fixed variable table. Part (b) of FIG. 38 illustrates an inverse conversion variable table DecTable. The decoded codeNum is corrected to combined_inter_pred_ref_idx using DecTable. That is, combined_inter_pred_ref_idx=DecTable[combined_inter_pred_ref_idx] is obtained. The details of the decoding operation will be described below in the description of an inter prediction flag decoding unit 1028.

(Motion Compensation Parameter Derivation Unit in Bi-Prediction Restriction)

Figure 29:
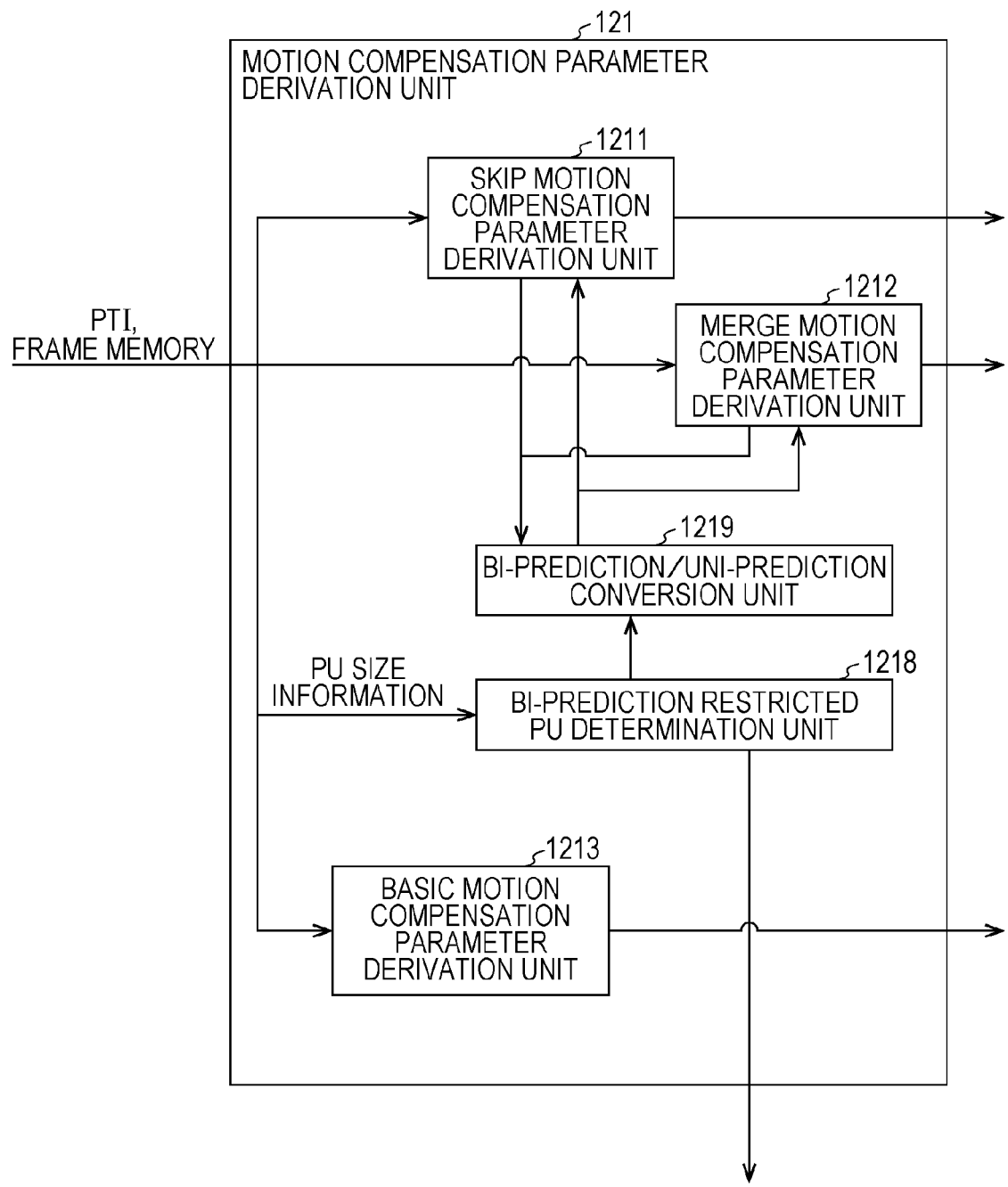
FIG. 29 is a functional block diagram illustrating a detailed example configuration of a motion compensation parameter derivation unit in the PU information decoding unit in the video decoding device.

FIG. 29 illustrates a configuration of the motion compensation parameter derivation unit 121. The motion compensation parameter derivation unit 121 includes a skip motion compensation parameter derivation unit 1211, a merge motion compensation parameter derivation unit 1212, a basic motion compensation parameter derivation unit 1213, a bi-prediction restricted PU determination unit 1218, and abi-prediction/uni-prediction conversion unit 1219.

The motion compensation parameter derivation unit 121 imposes the restriction of bi-prediction on, particularly, the skip PU and the merge PU, which are PUs in a case that the inter prediction flag is not decoded.

The skip motion compensation parameter derivation unit 1211 derives motion compensation parameters for a skip PU if the target CU is skip, and inputs the derived motion compensation parameters to the bi-prediction/uni-prediction conversion unit 1219. The bi-prediction/uni-prediction conversion unit 1219 converts the motion compensation parameters in accordance with a bi-prediction restriction condition, and returns the resulting motion compensation parameters to the skip motion compensation parameter derivation unit 1211. The bi-prediction restriction condition is a condition for determining whether or not to impose the restriction of bi-prediction. This determination is performed by, as described below, the bi-prediction restricted PU determination unit 1218. The details of the method by which the bi-prediction/uni-prediction conversion unit 1219 converts bi-prediction into uni-prediction (bi-prediction conversion method) will be described below. The skip motion compensation parameter derivation unit 1211 outputs the motion compensation parameters converted in accordance with the bi-prediction restriction condition to outside as the motion compensation parameters of the target PU. If the motion compensation parameters are determined by a skip index, the following configuration may be used: the bi-prediction/uni-prediction conversion unit 1219 may convert each skip candidate, and the converted skip candidates may be selected using the skip index. If the same method is used for the derivation of the skip candidates of the skip PU and for the derivation of the merge candidates of the merge PU, the skip motion compensation parameter derivation unit 1211 is replaced by the merge motion compensation parameter derivation unit 1212, and merge candidates are replaced by skip candidates which are derived.

The merge motion compensation parameter derivation unit 1212 derives motion compensation parameters of a target PU if the target PU is merge, and inputs the derived motion compensation parameters to the bi-prediction/uni-prediction conversion unit 1219. The bi-prediction/uni-prediction conversion unit 1219 converts the motion compensation parameters in accordance with a bi-prediction restriction condition, and returns the resulting motion compensation parameters to the merge motion compensation parameter derivation unit 1212. The merge motion compensation parameter derivation unit 1212 outputs the motion compensation parameters converted in accordance with the bi-prediction restriction condition to outside as the motion compensation parameters of the target PU. If the motion compensation parameters are determined by the merge index, the following configuration may be used: the bi-prediction/uni-prediction conversion unit 1219 may convert each merge candidate, and the converted merge candidates may be selected using the merge index.

The basic motion compensation parameter derivation unit 1213 derives motion compensation parameters of a target PU if the target PU is not skip or merge, and outputs the derived motion compensation parameters to outside.

The bi-prediction restricted PU determination unit 1218 refers to the PU size information on the target PU, and determines whether or not to impose the restriction of bi-prediction, in which bi-prediction is not used, on the target PU. Whether or not to impose the restriction of bi-prediction on the skip CU and the merge PU may be determined independently from the determination of whether or not to impose the restriction of bi-prediction on the basic inter PU. For example, the restriction of bi-prediction may be imposed using the same PU size as a threshold value for all the PUs, or the restriction of bi-prediction may be imposed using a larger PU size as a threshold value for the skip PU and the merge PU. Alternatively, the restriction of bi-prediction may be imposed only on the basic inter PU whereas the restriction of bi-prediction may not be imposed on the skip PU or the merge PU.

In cases where the inter prediction flag is decoded using a skip PU, such as in a case that the use of merge is restricted, whether or not to impose the restriction of bi-prediction may be determined individually for each of a skip PU, a merge PU, and a basic inter PU.

In the configuration described above, the setting of bi-prediction and uni-prediction, which is set by the skip motion compensation parameter derivation unit 1211, is determined in the bi-prediction/uni-prediction conversion unit 1219 in accordance with the bi-prediction restricted PU determination unit 1218. However, the present invention is not limited to this configuration. For example, the following configuration may be used: a determination result of the bi-prediction restricted PU determination unit 1218 may be input directly to the skip motion compensation parameter derivation unit 1211 to perform the setting of bi-prediction/uni-prediction.

The following is a description of the individual components of the motion compensation parameter derivation unit 121 described above, in sequence, namely, the details of the merge motion compensation parameter derivation unit 1212, the basic motion compensation parameter derivation unit 1213, the bi-prediction restricted PU determination unit 1218, and the bi-prediction/uni-prediction conversion unit 1219.

(Details of Merge Motion Compensation Parameter Derivation Unit 1212)

Figure 43:
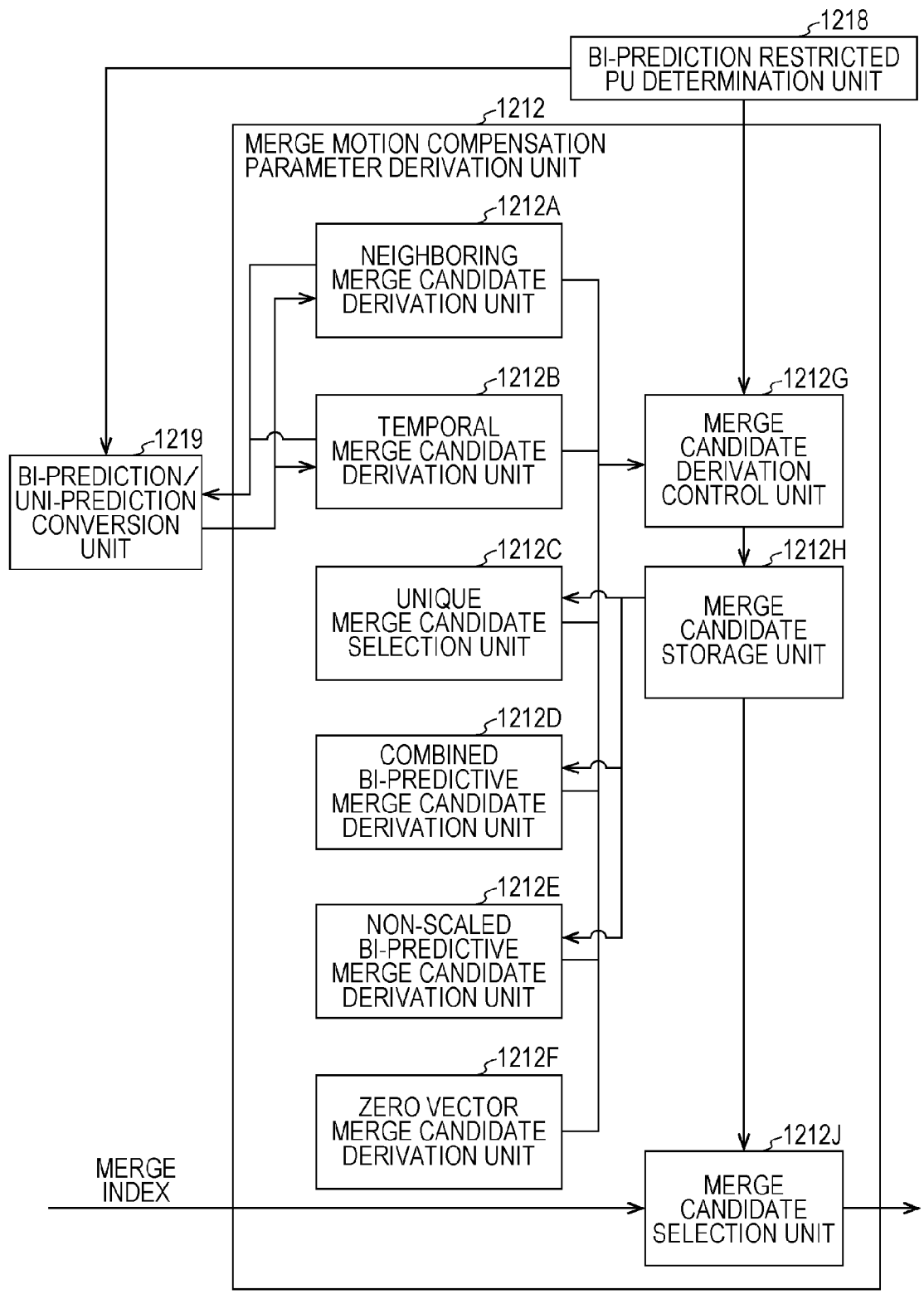
FIG. 43 is a block diagram illustrating a configuration of a merge motion compensation parameter derivation unit.

FIG. 43 is a block diagram illustrating a configuration of the merge motion compensation parameter derivation unit 1212. In a case that the merge motion compensation parameter derivation unit 1212 is used for a skip PU, the merge candidates given below are replaced by skip candidates for operation.

The merge motion compensation parameter derivation unit 1212 includes a neighboring merge candidate derivation unit 1212A, a temporal merge candidate derivation unit 1212B, a unique candidate derivation unit 1212C, a combined bi-predictive merge candidate derivation unit 1212D, a non-scaled bi-predictive merge candidate derivation unit 1212E, a zero vector merge candidate derivation unit 1212F, a merge candidate derivation control unit 1212G, a merge candidate storage unit 1212H, and a merge candidate selection unit 1212J. Although not illustrated in FIG. 43, the neighboring merge candidate derivation unit 1212A and the temporal merge candidate derivation unit 1212B are supplied with decoding parameters for an already decoded CU and PU, which are stored in the frame memory 16, particularly, motion compensation parameters on a per-PU basis. In the following, the neighboring merge candidate derivation unit 1212A, the temporal merge candidate derivation unit 1212B, the unique candidate derivation unit 1212C, the combined bi-predictive merge candidate derivation unit 1212D, the non-scaled bi-predictive merge candidate derivation unit 1212E, and the zero vector merge candidate derivation unit 1212F are collectively referred to as "merge candidate deriving means".

In the merge motion compensation parameter derivation unit 1212, the merge candidate derivation control unit 1212G controls each merge candidate deriving means to derive a predetermined number MRG_MAX_NUM_CANDS of merge candidates, and stores the derived merge candidates in the merge candidate storage unit 1212H. Here, each merge candidate is composed of prediction list utilization flags predFlagL0 and predFlagL1, which are motion compensation parameters of a PU, reference index numbers refIdxL0 and refIdxL1, and motion vectors mvL0 and mvL1. The merge candidate storage unit 1212H stores sets of the motion compensation parameters described above as merge candidates. The stored merge candidates are managed as lists (merge candidate lists) in which the merge candidates are arranged in storage order. The merge candidate selection unit 1212J selects a merge candidate specified by the merge index, and outputs the selected merge candidate as prediction information PUI.

The combined bi-predictive merge candidate derivation unit 1212D and the non-scaled bi-predictive merge candidate derivation unit 1212E are particularly referred to as "bi-predictive merge candidate deriving means" since the combined bi-predictive merge candidate derivation unit 1212D and the non-scaled bi-predictive merge candidate derivation unit 1212E derive bi-predictive merge candidates.

Figure 44:
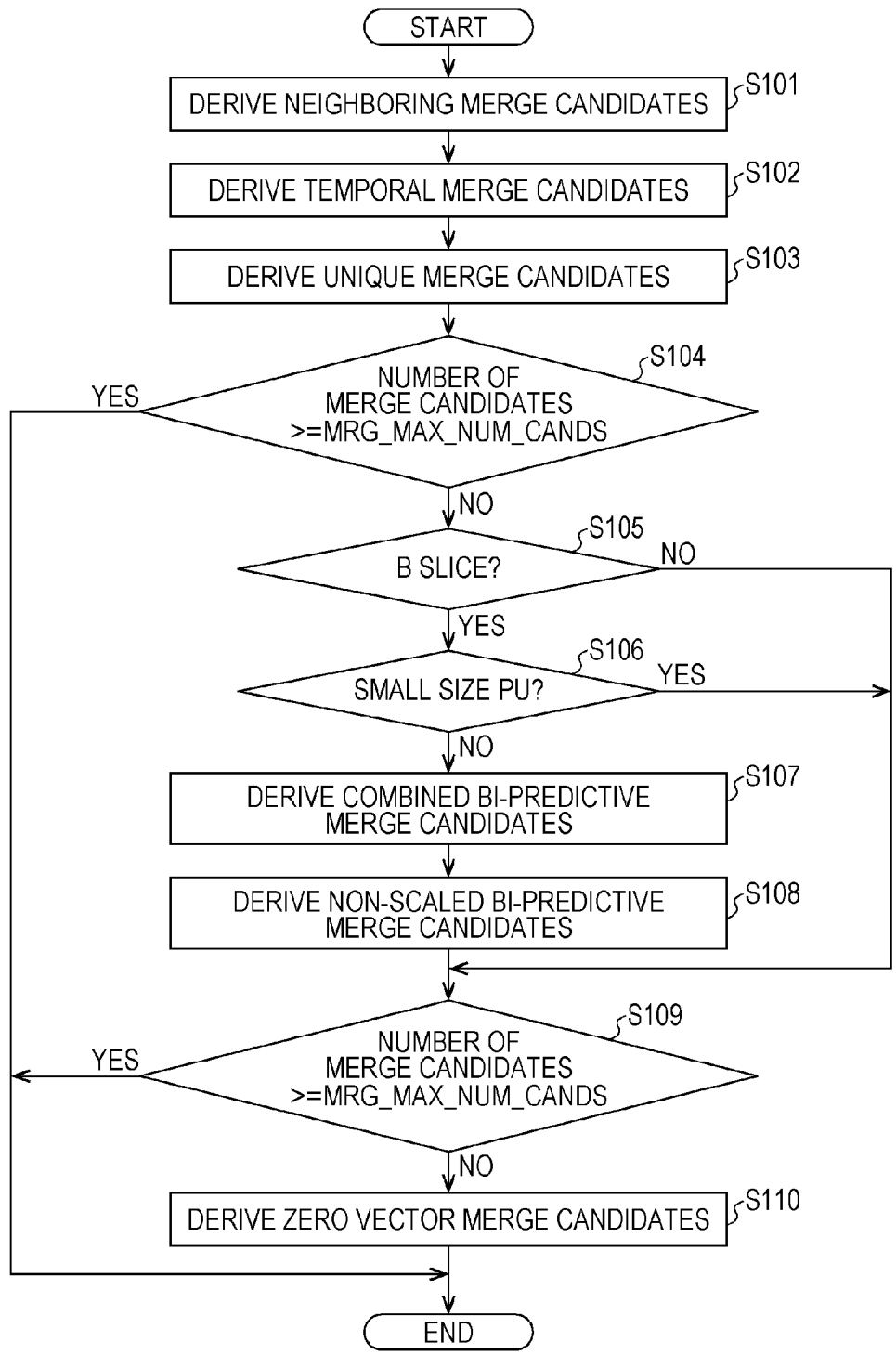
FIG. 44 is a flowchart illustrating the operation of the merge motion compensation parameter derivation unit.

FIG. 44 is a flow diagram illustrating the operation of the merge motion compensation parameter derivation unit 1212. A technique in which each merge candidate deriving means derives merge candidates will be described below with reference to a different diagram. First, the neighboring merge candidate derivation unit 1212A determines merge candidates A0 to B2 using motion compensation parameters of a neighboring block (S101). Then, the temporal merge candidate derivation unit 1212B determines a merge candidate T using motion compensation parameters of an already decoded reference picture (S102). In S103, a redundant merge candidate is removed from among the derived merge candidates A0 to T, and the remaining merge candidates are stored in the merge candidate storage unit 1212H. If the number of non-redundant merge candidates is greater than or equal to MRG_MAX_NUM_CANDS, the derivation of merge candidates is terminated (YES in S104). Otherwise (NO in S104), the operation proceeds to S105. In the case of a B slice (YES in S105), the operation proceeds to S106, and otherwise (NO in S105), the operation skips S106, S107 and S108 and proceeds to S109 (S105). Also in a case that the restriction of bi-prediction is imposed, here, in the case of a small size PU, which corresponds to the case that the bi-directional derivation of merge candidates is skipped, the operation skips the bi-predictive motion candidate derivation process of S107 and S108, and proceeds to S109 (S106). In S107, the combined bi-predictive merge candidate derivation unit 1212D derives combined bi-predictive merge candidates, and the derived combined bi-predictive merge candidates are stored in the merge candidate storage unit 1212H. In S108, the non-scaled bi-predictive merge candidate derivation unit 1212E derives non-scaled bi-predictive merge candidates, and the derived non-scaled bi-predictive merge candidates are stored in the merge candidate storage unit 1212H. Here, if the number of merge candidates is greater than or equal to MRG_MAX_NUM_CANDS (YES in S109), the derivation of merge candidates is terminated. Although not illustrated in FIG. 44, at the time when the number of merge candidates reaches MRG_MAX_NUM_CANDS during each step of S107 and S108, the corresponding process is stopped and the derivation of merge candidates is terminated. In S110, the zero vector merge candidate derivation unit 1212F derives merge candidates having a zero vector until the number of merge candidates reaches MRG_MAX_NUM_CANDS, and the derived merge candidates are stored in the merge candidate storage unit 1212H.

In the processes described above, the merge candidate derivation process regarding bi-predictive merge candidates is omitted for a small size PU, resulting in a reduction in the amount of processing taken to derive merge candidates. The combined bi-predictive merge candidate derivation process (S107) and the non-scaled bi-predictive merge candidate derivation process (S108) regarding bi-predictive merge candidates are heavy processes that require a plurality of iterations of determination. Thus, the omission of such processes for a small size PU, which requires a limited amount of time (by a limited amount of processing) of decoding, will be effective particularly for a device that needs to perform a decoding process in real time. The omission of bi-predictive merge candidates may be applicable not only to the operation of the combined bi-predictive merge candidate derivation unit 1212D and the non-scaled bi-predictive merge candidate derivation unit 1212E but also to any other merge candidate derivation process for generating mainly bi-predictive merge candidates.

Figure 45:
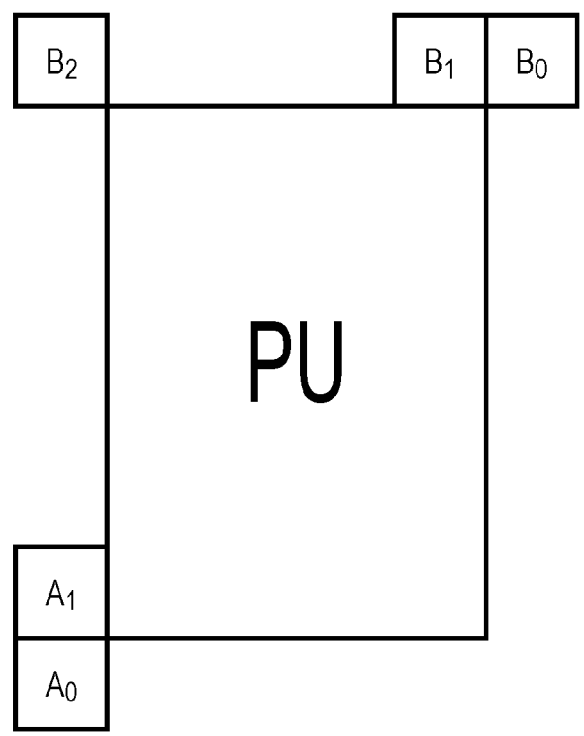
FIG. 45 is a diagram depicting the operation of a neighboring merge candidate derivation unit 1212A.

The details of each merge candidate deriving means will now be described. FIG. 45 is a diagram depicting the operation of the neighboring merge candidate derivation unit 1212A. As illustrated in FIG. 45, motion compensation parameters for neighboring blocks including those at positions A0, A1, B0, B1, and B2 are copied to derive individual merge candidates. The order of derivation is assumed to be A1, B1, B0, A0, and B2. The derived merge candidates are converted by the bi-prediction/uni-prediction conversion unit 1219, and then are stored in the merge candidate storage unit 1212H. In a case that the restriction of bi-prediction is to be imposed, the bi-prediction/uni-prediction conversion unit 1219 converts a merge candidate to be input into the uni-predictive one. If there are a plurality of converted uni-predictive merge candidates (for example, two for L0 prediction and L1 prediction), the plurality of merge candidates are stored in the merge candidate storage unit 1212H. The outputs of the bi-prediction/uni-prediction conversion unit 1219 may be a plurality of merge candidates. This similarly applied to the other merge candidate derivation units described hereinafter.

In a case that a neighboring block is not available (unavailable) or in the case of an intra block, the corresponding merge candidates are not derived. A neighboring block is not available in a case that the block is located outside the screen, the block is located outside the slice, or the block is an undecoded block in the scan order of blocks. The positions A0 to B2 may be expressed as follows, where the upper left coordinates of a PU is represented by (xP, yP) and the PU has sizes nPSW and nPSH.

$A0:(xP-1, yP+nPSH)$ $A1:(xP-1, yP+nPSH-1)$ $B0:(xP+nPSH, yP-1)$ $B1:(xP+nPSH-1, yP-1)$ $B2:(xP-1, yP-1)$

If all the merge candidates corresponding to the positions A0, A1, B0, and B1 are successfully derived, the merge candidate corresponding to the position B2 is not derived. In the derivation of merge candidates for the PU partition type of 2N×N or N×2N and the PU index of 1, the following operation is performed. Only in a case that the motion compensation parameters for each merge candidate do not match the motion compensation parameters for a PU with the index 0, the corresponding merge candidates are derived and are stored in the merge candidate storage unit 1212H. The operation of a function equalMotion (A, B) by which the matching of the motion compensation parameters between a block A and a block B is determined may be specified as follows.

equalMotion(A, B)=(predFlagL0A==
    predFlagL0B)&&(predFlagL1A==
    predFlagL1B)&& mvL0A[0]==mvL0B[0] &&
    mvL0A[1]==mvL0B[1] && mvL1A[0]==mvL1B
    [0] && mvL1A[1]==mvL1B[1])

where predFlagL0A and predFlagL1A are each equal to 1 if an L0 or L1 reference picture is used for the block A, and equal to 0 otherwise. mvL0[0] and mvL0[1] are an L0 horizontal motion vector and vertical motion vector, and mvL1[0] and mvL1[1] are an L1 horizontal motion vector and vertical motion vector. For the block B, A is replaced by B.

FIG. 46 is a diagram depicting the operation of the temporal merge candidate derivation unit 1212B. Referring to part (a) of FIG. 46, if the current picture is represented by currPic, a temporal merge candidate is derived by copying motion compensation parameters of a reference picture PU specified by the reference index number refIdxL0 that occupies substantially the same spatial position as the spatial position of the target PU in the current picture or by copying motion compensation parameters of a reference picture PU specified by the reference index number refIdxL0. The method for deriving the reference index number refIdxL0 and the reference index number refIdxL1 will be described with reference to part (b) of FIG. 46. The reference index number refIdxLX (where X is 0, 1, or C) is determined using the reference pictures refIdxLXA, refIdxLXB, and refIdxLXC of neighboring PUs A, B, and C of the target PU as follows.
 (1) In the case of refIdxLXA=refIdxLXB=refIdxLXC, if refIdxLXA=−1, refIdxLX=0 otherwise, refIdxLX=refIdxLXA
 (2) In the case of refIdxLXA=refIdxLXB, if refIdxLXA=−1, refIdxLX=refIdxLXC otherwise, refIdxLX=refIdxLXA
 (3) In the case of refIdxLXB=refIdxLXC, if refIdxLXB=−1, refIdxLX=refIdxLXA otherwise, refIdxLX=refIdxLXB
 (4) In the case of refIdxLXA=refIdxLXC, if refIdxLXA=−1, refIdxLX=refIdxLXB otherwise, refIdxLX=refIdxLXA
 (5) In the case of refIdxLXA=−1, refIdxLX=min (refIdxLXB, refIdxLXC)
 (6) In the case of refIdxLXB=−1, refIdxLX=min (refIdxLXA, refIdxLXC)
 (7) In the case of refIdxLXC=−1, refIdxLX=min (refIdxLXA, refIdxLXB)
 (8) In other cases, refIdxLX=min (refIdxLXA, refIdxLXB, refIdxLXC)
where min is a function that takes a minimum value. The coordinates of the blocks A and B are as follows.

$A:(xP-1, yP+nPSH-1)$ $B:(xP+nPSW-1, yP-1)$

The coordinates of the block C are any of C0, C1, and C2 below. It is assumed that the scanning operation is performed in the order from C0 to C2 and that in a case that the PU corresponding to each individual position is available and is non-intra, the refIdxLX of the PU at the individual position is represented by refIdxLXC.

$C0:(xP+nPSW-1, yP-1)$ $C1:(xP-1, yP+nPSH)$ $C2:(xP-1, yP-1)$

When refIdxL0 and refIdxL1 are derived in the way described above, a motion vector of L0 is determined using the motion compensation parameters for the position (xP+nPSW, yP+nPSH) of the reference picture represented by refIdxL0, and a motion vector of L1 is determined using the motion compensation parameters for the position (xP+nPSW, yP+nPSH) of the reference picture represented by refIdxL1. Accordingly, a temporal merge candidate is derived. That is, motion vectors mvLXCol[0] and mvLXCol[0] for the respective reference picture lists LX (X=0, X=1, or X=C) are calculated from reference pictures represented by LXlist and refIdxLX. Specifically, if the PU at the position (xP+nPSW, yP+nPSH) of the reference picture represented by refIdxLX is unavailable or is in intra prediction mode, the LX motion vectors mvLXCol[0] and mvLXCol[1] of the temporal merge candidate are set to 0. Otherwise, that is, if the PredFlagL0 of the PU is equal to 0, the L1 motion vector MvL1 of the PU is used as the LX motion vectors mvLXCol[0] and mvLXCol[1] of the temporal merge candidate. Otherwise, the L0 motion vector MvL0 of the PU is used as the LX motion vectors mvLXCol[0] and mvLXCol[1] of the temporal merge candidate.

Then, the scaling of motion vectors is performed using the POC (Picture Order Count) of the current frame and the POC of the reference picture. For temporal merge candidates, similarly to neighboring merge candidates, merge candidates are input to the bi-prediction/uni-prediction conversion unit 1219 for conversion before the merge candidates are stored in the merge candidate storage unit 1212H. The converted merge candidates are stored as temporal merge candidates in the merge candidate storage unit 1212H.

The unique candidate derivation unit 1212C updates a merge candidate list so that the individual merge candidates in the merge candidate list are unique to one another. If the merge candidates stored in the merge candidate list are in the range of index 0 to index CANDX, a unique merge candidate list may be obtained using steps indicated in pseudo code in FIG. 47. The merge candidate list is managed using the string motion_cand[ ] in which merge candidates are stored. If the number of merge candidates is represented by Numcand, CANDX=Numcand−1 is obtained. The following is a description of the individual steps S in the pseudo code in FIG. 47.
 S4701: All the validity flags in the range of index 0 to index CANDX are initialized to valid. Here, motion_valid[ ] is a string in which the validity flags are stored.
 S4702: For the loop variable i (i=1 to CANDX), the validity flag motion_valid[i] of i is invalidated if the same motion compensation parameter as the merge candidate motion_cand[i] of i appears in motion_cand[j] of an index j whose number is smaller than i (0<=j<i). In S4702-1, the motion compensation parameters for the index i are compared with the motion compensation parameters for the index j. The comparison in motion compensation parameters is based on the equalMotion function. Here, equalMotion(A, B) is a function for determining whether or not the input motion compensation parameters A is identical to the input motion compensation parameters B (in FIG. 47, the determination is labeled "hasEqualMotion"). If the motion compensation parameters match, the validity flag motion_valid[i] of i is set to invalid.
 S4703: The merge candidate motion_cand with the validity flag motion_valid being true is stored in the merge candidate list. The merge candidate list is reconfigured by adding copies in the merge candidate list composed of a string of merge candidates motion_cand in ascending order from the smallest number. Here, copy (A, B) is a function for copying B to A.
 S4704: The validity flag motion valid is reset.
 S4705: The number of valid merge candidates NumCand is updated.

FIG. 48 is a diagram depicting the operation of the combined bi-predictive merge candidate derivation unit 1212D. A combined bi-predictive merge candidate is derived using two reference merge candidates stored in a merge candidate list by copying an list L0 motion compensation parameter from one of the reference merge candidates and copying an list L1 motion compensation parameter from the other reference merge candidate. Part (c) of FIG. 48 is a table for determining two reference merge candidate lists to be extracted. The index of the combined bi-predictive merge candidate to be derived is represented by combCand$_k$. combCand$_k$ is equal to a value obtained by adding 1 to the value of the last index in an already derived merge candidate list, where k is an index starting from 0, which increments by 1 when a combined bi-predictive merge candidate is added to the merge candidate list. The index combIdx is a temporary index used for the derivation of combined bi-predictive merge candidates, and has a value from 0 to 11. For the index combIdx from 0 to 11, the reference merge candidates of the indices identified by two indices l0CandIdx and l1CandIdx are selected from the merge candidate list. The selection of an index candidate identified by the index lXCandIdx (X=0 or X=1) means the extraction of a candidate identified by the index lXCandIdx from among the merge candidates with indices 0 to CANDX stored in the merge candidate list. Part (a) of FIG. 48 illustrates determination formulas for determining whether or not to derive a combined bi-predictive merge candidate. A combined bi-predictive merge candidate is derived in a case that the L0 motion compensation parameters predFlagL0l0Cand, refIdxL0l0Cand, and mvL0l0Cand of the merge candidate selected by l0CandIdx and the L1 motion compensation parameters predFlagL1l1Cand, refIdxL1l1Cand, and mvL1l1Cand of the merge candidate selected by l1CandIdx satisfy all the determination formulas in part (a) of FIG. 48. Part (b) of FIG. 48 is a diagram illustrating the method for deriving the combined bi-predictive merge candidate indicated by the index combCand$_k$. The motion compensation parameters refIdxL0combCand$_k$, refIdxL1combCand$_k$, predFlagL0combCand$_k$, predFlagL1combCand$_k$, mvL0combCand$_k$[0], mvL0combCand$_k$[1], mvL1combCand$_k$[0], and mvL1combCand$_k$[1] of the combined bi-predictive merge candidate are derived by copying the L0 motion compensation parameters and the L1 motion compensation parameters. If the derived combined bi-predictive merge candidate does not match any of the merge candidates stored in the merge candidate list in the merge candidate storage unit 1212H, the combined bi-predictive merge candidate is stored at the end of the merge candidate list. The matching determination is performed using the function equalMotion described above.

If the number of merge candidates has reached MRG_MAX_NUM_CANDS, the operation of the combined bi-predictive merge candidate derivation unit 1212D ends. If MRG_MAX_NUM_CANDS has not been reached, combIdx increments by 1. Two reference merge candidates are extracted using the table in part (c) of FIG. 48, and merge candidates are continuously derived. The operation of the combined bi-predictive merge candidate derivation unit 1212D ends at the time when two reference merge candidates are extracted for all the tables.

FIG. 49 is a diagram depicting the derivation by the non-scaled bi-predictive merge candidate derivation unit 1212E. Part (a) of FIG. 49 illustrates determination formulas for determining whether or not to derive a non-scaled bi-predictive merge candidate. Part (b) of FIG. 49 is a diagram illustrating a method for deriving the non-scaled bi-predictive merge candidate indicated by the index nscaleCand$_l$. The index nscaleCand$_l$ is a value obtained by adding 1 to the value of the last index in an already derived merge candidate list, where l is an index starting from 0 and increments by 1 when a non-scaled bi-predictive merge candidate is added to the merge candidate list. The non-scaled bi-predictive merge candidate derivation unit 1212E derives a merge candidate for which motion vectors for two reference pictures have an inverse relationship, by using the motion vectors of the merge candidates already derived and stored in the merge candidate storage unit 1212H. In a case that the index of the merge candidate to be referred to is represented by origCand and satisfies all the determination formulas in part (a) of FIG. 49, a non-scaled bi-predictive merge candidate is derived in accordance with part (b) of FIG. 49. Also for a non-scaled bi-predictive merge candidate, if the combined bi-predictive merge candidate derived using the function equalMotion does not match any of the merge candidates stored in the merge candidate list in the merge candidate storage unit 1212H, the combined bi-predictive merge candidate is stored at the end of the merge candidate list. If the number of merge candidates has reached MRG_MAX_NUM_CANDS, the operation ends. If the number of merge candidates has not reached MRG_MAX_NUM_CANDS, the process is repeatedly performed.

FIG. 50 is a diagram illustrating the operation of the zero vector merge candidate derivation unit 1212F. No processing is performed if the number of merge candidates in the merge candidate storage unit 1212H has reached MRG_MAX_NUM_CANDS. If the number of merge candidates has not reached MRG_MAX_NUM_CANDS, zero vectors are stored until the number of merge candidates reaches MRG_MAX_NUM_CANDS. That is, assuming that the index of the merge candidate to be referred to is represented by mvL0zeroCand$_m$, a candidate for which both L0 motion vectors (mvL0zeroCand$_m$[0], mvL0zeroCand$_m$[1]) and L1 motion vectors (mvL1zeroCand$_m$[0], mvL1zeroCand$_m$[1]) are 0 is derived. The index zeroCand$_m$ is a value obtained by adding 1 to the value of the last index in an already derived merge candidate list, where m is an index starting from 0, which increments by 1 when a zero vector predictive merge candidate is added to the merge candidate list. The zero vector merge candidate derivation unit 1212F is also capable of deriving a merge candidate that uses two reference pictures, that is, a merge candidate with predFlagL1=1 and predFlagL1=1. If the restriction of bi-prediction is to be imposed on the merge PU, only uni-predictive merge candidates are derived in a small size PU to be subject to bi-prediction restriction.

The merge candidate derivation control unit 1212G performs the operation illustrated in the flowchart in FIG. 44 to derive merge candidates.

The merge candidate storage unit 1212H saves the derived merge candidates.

(Details of Basic Motion Compensation Parameter Derivation Unit 1213)

FIG. 54 is a block diagram illustrating a configuration of the basic motion compensation parameter derivation unit 1213. The basic motion compensation parameter derivation unit 1213 includes a neighboring motion vector candidate derivation unit 1213A, a temporal motion vector candidate derivation unit 1213B, a zero vector merge candidate derivation unit 1213F, a motion vector candidate derivation control unit 1213G, a motion vector candidate storage unit 1213H, a motion vector candidate selection unit 1213I, and a motion vector restoration unit 1213J. In the following, the neighboring motion vector candidate derivation unit 1213A, the temporal motion vector candidate derivation unit 1213B, and the zero vector merge candidate derivation unit 1213F are collectively referred to as "motion vector/merge candidate deriving means".

In the basic motion compensation parameter derivation unit 1213, the motion vector candidate derivation control unit 1213G controls each motion vector/merge candidate deriving means to derive a predetermined number PMV_MAX_NUM_CANDS of predictive motion vector candidates, and stores the derived predictive motion vector candidates in the motion vector candidate storage unit 1213H. Here, each predictive motion vector candidate is composed of motion vectors mvL0 and mvL1. The motion vector candidate storage unit 1213H stores the combinations of motion compensation parameters described above as predictive motion vector candidates. The stored predictive motion vector candidates are managed as lists (predictive motion vector candidate lists) in which the predictive motion vector candidates are arranged in storage order.

Similarly to the neighboring merge candidate derivation unit 1212A, the neighboring motion vector candidate derivation unit 1213A derives each predictive motion vector candidate by copying motion compensation parameters of a neighboring block.

Similarly to the temporal merge candidate derivation unit 1212B, the temporal motion vector candidate derivation unit 1213B derives a temporal predictive motion vector candidate by copying motion compensation parameters of an already decoded picture.

The zero vector merge candidate derivation unit 1213F derives a zero vector as a predictive motion vector candidate.

The motion vector candidate derivation control unit 1213G terminates the derivation operation at the time when a predetermined number PMV_MAX_NUM_CANDS of predictive motion vector candidates are derived. In addition, using a unique candidate determination unit 1213C included therein, the motion vector candidate derivation control unit 1213G stores predictive motion vector candidates in the motion vector candidate storage unit 1213H so that the predictive motion vectors derived from the neighboring motion vector candidate derivation unit 1213A do not match (are unique to) the predictive motion vectors derived from the temporal motion vector candidate derivation unit 1213B. Specifically, the motion vector candidate derivation control unit 1213G inputs two motion vectors, namely, a motion vector A and a motion vector B, to the unique candidate determination unit 1213C, and causes the unique candidate determination unit 1213C to determine whether or not the motion vector A and the motion vector B match. The unique candidate determination unit 1213C determines whether or not the input two motion vectors match.

(Details of Bi-Prediction Restricted PU Determination Unit 1218: Determination Method for Bi-Prediction Restriction)

A preferred example of a method in which the bi-prediction restricted PU determination unit 1218 determines whether or not the PU of interest is a small size PU to be subject to bi-prediction restriction will now be described. The determination method is not limited to the following example, and other parameters may be used as PU size information.

(Example Determination Method 1)

In example determination method 1, a PU with a size less than TH×TH is subject to bi-prediction restriction, where TH is a threshold value used to determine a PU size. In this case, a determination formula that uses the target CU size (here, the CU Width) and the PU partition type is as follows.

DisableBiPred=((CU Width==TH && PU partition type !=2$N$×2$N$)||CU Width<TH)? true:false Specifically, the following operation is performed: In the case of TH=16, respective PUs with the sizes of 16×8, 8×16, 12×16, 4×16, 16×12, 16×4, 8×8, 8×4, 4×8, and 4×4 are subject to bi-prediction restriction. In the case of TH=8, respective PUs with the sizes 8×4, 4×8, and 4×4 are subject to bi-prediction restriction.

Instead of the CU Width, the logarithm log2CUSize of the CU size (CU Width) with a base of 2 may be used as a CU size used to determine a PU size. In this case, the determination formula for the restriction of bi-prediction for 16×8, 8×16, 12×16, 4×16, 16×12, 16×4, 8×8, 8×4, 4×8, and 4×4 is as follows.

DisableBiPred=((log2CUSize==4 && PU partition type !=2$N$×2$N$)||log2CUSize<4)? true:false The determination formula for the restriction of bi-prediction for 8×4, 4×8, and 4×4 is as follows.

DisableBiPred=(log2CUSize==3 && PU partition type !=2$N$×2$N$)

It is possible to perform determination using parameters other than the target CU size and the PU partition type. For example, the following determination may be performed using the number of PU partitions NumPart.

DisableBiPred=((CU Width==TH && NumPart>1) && CU Width<TH)? true:false (Example Determination Method 2)

In example determination method 2, a PU with a size less than or equal to TH×TH is subject to bi-prediction restriction. In this case, a determination formula is as follows.

DisableBiPred=((CU Width==2*TH && PU partition type==$N$×$N$)||CU Width<2*TH)? true:false Specifically, the following operation is performed:: In the case of TH=16, respective PUs with the sizes of 16×16, 16×8, 8×16, 12×16, 4×16, 16×12, 16×4, 8×8, 8×4, 4×8, and 4×4 are subject to bi-prediction restriction.

In the case of TH=8, respective PUs with the sizes of 8×8, 8×4, 4×8, and 4×4 are subject to bi-prediction restriction. In the case of TH=4, PUs with the size of 4×4 are subject to bi-prediction restriction.

If log2CUSize is used for PU size determination, the determination formula for the restriction of bi-prediction for 8×8, 8×4, 4×8, and 4×4 is as follows.

DisableBiPred=((log2CUSize==4 && PU partition type==$N$×$N$)||log2CUSize<4)? true:false The determination formula for 4×4 is as follows.

DisableBiPred=((log2CUSize==3 && PU partition type==$N$×$N$))? true:false

The following determination using the number of PU partitions NumPart is also possible.

DisableBiPred=((CU Width==2*TH && NumPart !=4)||CU Width<2*TH)? true:false

In the example described above, different PU sizes (threshold value TH) may be used for the skip PU, the merge PU, and the basic inter PU. In addition, as already illustrated in part (c) of FIG. 34, the PU size (threshold value TH) used for determination may be encoded.

(Details of Bi-Prediction/Uni-Prediction Conversion Unit 1219)

The bi-prediction/uni-prediction conversion unit 1219 converts the motion compensation parameters input to the bi-prediction/uni-prediction conversion unit 1219 into those for uni-prediction if the input motion compensation parameters represent bi-prediction and if the bi-prediction restricted PU determination unit determines that the skip PU and the merge PU are subject to bi-prediction restriction.

The bi-prediction/uni-prediction conversion unit 1219 may be configured to switch between a plurality of bi-prediction conversion methods, and may perform bi-prediction/uni-prediction conversion using a bi-prediction conversion method specified by the merge candidate derivation unit. Alternatively, an instruction as to whether or not to perform bi-prediction/uni-prediction conversion may be input to the bi-prediction/uni-prediction conversion unit 1219, and the bi-prediction/uni-prediction conversion unit 1219 may perform switching in accordance with the instruction.

As described below, if the input motion compensation parameters are those for bi-prediction, the bi-prediction/uni-prediction conversion unit 1219 may sequentially output two motion compensation parameters.

The motion compensation parameters are converted into 1, which indicates uni-prediction, if the inter prediction flag inter_pred_flag of the motion compensation parameters, which is derived by copying the motion compensation parameters for a temporally and spatially neighboring PU or derived from a combination of motion compensation parameters for a temporally and spatially neighboring PU, is equal to 2, which indicates bi-prediction. If an inter prediction flag (internal inter prediction flag) used for internal processing is a flag including 1, which indicates L0 prediction, 2, which indicates L1 prediction, and 3, which indicates bi-prediction, the following operation is performed. If the internal inter prediction flag is equal to 3, the internal inter prediction flag is converted into the value 1, which indicates L0 prediction, or the value 2, which indicates L1 prediction. For conversion into L0 prediction, for example, the motion compensation parameters concerning L1 prediction may be refreshed to zero. For conversion into L1 prediction, for example, the motion compensation parameters concerning L0 prediction may be refreshed to zero. The internal inter prediction flag and the prediction list utilization flags predFlagL0 and predFlagL1 may be interconverted as follows.

Internal inter prediction flag=(predFlag$L$1<<1)+pred-Flag$L$0 predFlagL0=internal inter prediction flag & 1 predFlagL1=internal inter prediction flag>>1

Methods for conversion into uni-prediction include a method for modifying an inter prediction flag (and internal inter prediction flag), converting one of the prediction list utilization flags predFlagL0 and predFlagL1 to 0, which is a value indicating no use, in a case that both prediction list utilization flags are equal to 1, which is a value indicating the use of the prediction list.

FIG. 51 is a diagram depicting an example of a method for conversion into uni-prediction (bi-prediction conversion method). In L0 selection, the prediction list utilization flag predFlagL1 is changed to 0. In L1 selection, the prediction list utilization flag predFlagL0 is changed to 0. In reference index number selection, the prediction list utilization flag of a list with a larger one of the reference index number refIdxL0 and the reference index number refIdxL1 is changed to 0. The following formula is used: X=(ref_idx_L1<ref_idx_L0)? 0:1, predFlagLX=0. Accordingly, a list having a smaller reference index number is used. In POC selection, the prediction list utilization flag of a list with a larger one of the difference between the POC of the current picture (POC_curr) and the POC of the reference picture (POC_L0) indicated by the reference index number refIdxL0 and the absolute value difference between the POC of the current picture and the POC of the reference picture (POC_L1) indicated by the reference index number refIdxL1 is changed to 0. X=(|POC_L1−POC_curr|<|POC_L0−POC_curr|)? 0:1, predFlagLX=0. Accordingly, a reference picture having a close POC to the current picture is used.

In dual selection, candidates both in the use of the L0 motion compensation parameters and in the use of the L1 motion compensation parameters are used. Specifically, if the input merge candidate is bi-predictive, two merge candidates, namely, a merge candidate that is modified so that L0 is used, such as predFlagL1=0, and a merge candidate that is modified so that predFlagL0=0, are output to the merge candidate derivation unit from which the merge candidate has been input.

The inventors' experiment shows that the reduction in coding efficiency was substantially zero in a method in which L1 selection is performed for bi-prediction/uni-prediction conversion in a case that the restriction of bi-prediction is imposed on the PU sizes of 8×4 and 4×8. In this case, bi-prediction/uni-prediction conversion may be expressed as follows. In a case that the CU size log2CUSize is equal to 3 and the PU partition type PartMode is other than 2N×2N, the prediction list utilization flag predFlagL0 is set to 0 if both the prediction list utilization flag predFlagL0 and the prediction list utilization flag predFlagL1 are equal to 1.

In motion compensation parameter derivation processes, reference pictures in the L0 list are generally prioritized. A derivation process using reference pictures in the L1 list in place of reference pictures in the L0 list would be differentiated from these derivation processes that prioritize the L0 list. In a case that a plurality of derivation processes are selectable using a predetermined coding parameter, the L0 list is prioritized in the derivation process for a predetermined group whereas the L1 list is prioritized in the derivation process for another group. This allows the derivation processes to be complementary to each other. Such complementary use of derivation processes is effective for a sequence or a region with a larger amount of motion. With the use of the L1 list in bi-prediction/uni-prediction conversion, accordingly, high coding efficiency may be achieved.

A further description will be given of an example of conversion into uni-prediction, other than the example in FIG. 51. In the case of bi-prediction (both predFlagL0 and predFlagL1 are equal to 1), whether predFlagL1 is set to 0 (the L0 list is to be used) or not may be determined for each bi-predictive merge candidate. For example, the neighboring merge candidate derivation unit 1212A may derive merge candidates in the order of A1, B1, B0, A0, and B2, where predFlagL1=0 is set for A1, B0, and B2 and predFlagL1=1 is set for B1 and A0. In this example, each time a merge candidate is derived, the use of the L0 list and the use of the L1 list are alternately selected. In this example, furthermore, the L0 list is used for one of the merge candidates A0 and A1 calculated from left neighboring blocks, and the L1 list is used for the other. In addition, the L0 list is used for one of the merge candidates B0 and B1 calculated from upper neighboring blocks, and the L1 list is used for the other. In this manner, neighboring merge candidates are converted into uni-predictive merge candidates with the setting of predFlagL1=0 for some of the neighboring merge candidates and predFlagL0=0 for the others, resulting in well-balanced use of the motion compensation parameters of the respective reference lists. Accordingly, high coding efficiency may be obtained. Preferably, different reference lists are selected for right neighboring merge candidates (A0, A1) and upper neighboring merge candidates (B0, B1, B2). Which merge candidate predFlagL1=0 is set for and which merge candidate predFlagL0=0 is set for may be determined using a method other than that described above. For example, predFlagL1=1 may be set for A1, B0, and B2, and predFlagL1=0 may be set for B1 and A0. Alternatively, an opposite reference list may be used for each order of derivation or each index for storage in a merge candidate list.

In addition, in a case that bi-prediction/uni-prediction conversion is performed by setting the prediction list utilization flag predFlagLX in the reference list X to 0, the value of the reference index number refIdxLX is not refreshed to an initial value such as −1, and the value of the motion vector mvL1 is not refreshed to an initial value such as (0, 0). However, refreshing may be possible. The inventors' experiment shows that high coding efficiency is achieved when these values are not refreshed. In a case that these values are not refreshed, even if the use of a reference picture list is restricted, the values of the reference index number and motion vector in the reference picture list whose use has been restricted may be used in later processes. Accordingly, high coding efficiency may be obtained.

The bi-prediction/uni-prediction conversion unit 1219 may be implemented as a means included in each of the skip motion compensation parameter derivation unit 1211 and the merge motion compensation parameter derivation unit 1212. The bi-prediction/uni-prediction conversion unit 1219 may not necessarily be provided when the restriction of bi-prediction is imposed only on the basic inter PU.

(Motion Information Decoding Unit 1021 for Bi-Prediction Restriction)

Figure 30:
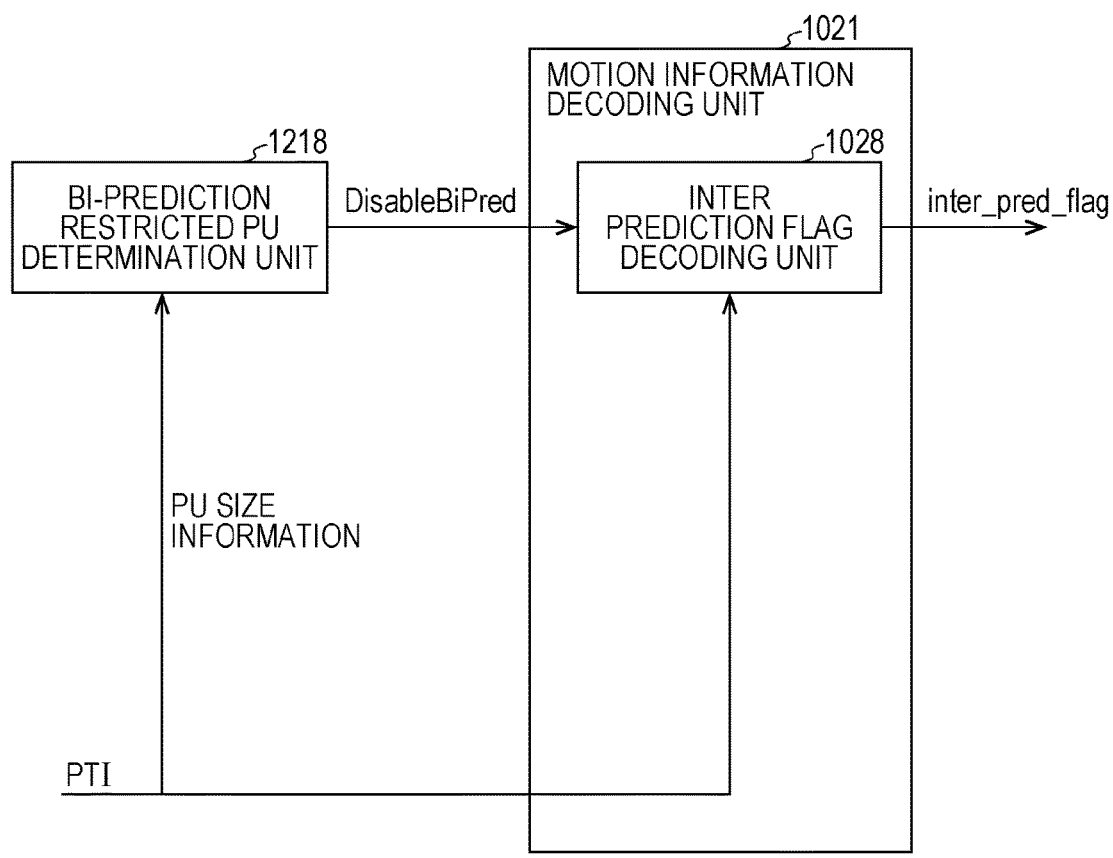
FIG. 30 is a functional block diagram illustrating a detailed example configuration of a motion information decoding unit in the decoding module in the video decoding device.

FIG. 30 is a block diagram illustrating a configuration of the motion information decoding unit 1021. The motion information decoding unit 1021 at least includes the inter prediction flag decoding unit 1028. The motion information decoding unit 1021 imposes the restriction of bi-prediction on the basic inter PU, which is a PU used to particularly decode an inter prediction flag. The inter prediction flag decoding unit 1028 changes whether or not to decode the inter prediction flag, in accordance with whether or not the bi-prediction restricted PU determination unit 1218 described above imposes the restriction of bi-prediction on the basic inter PU.

In cases where the inter prediction flag is decoded using a skip PU, such as in a case that the use of merge is restricted, the skip PU is subject to bi-prediction restriction.

(Inter Prediction Flag Decoding Unit 1028)

Figure 39:
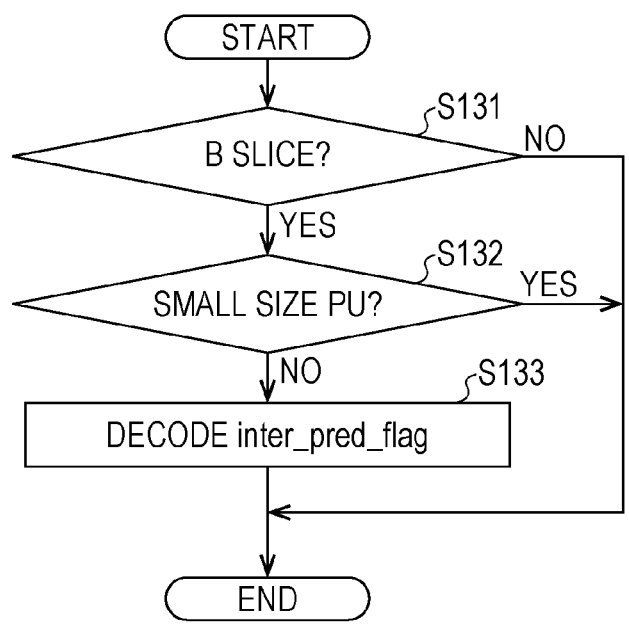
FIG. 39 is a diagram depicting the decoding of inter_pred_flag for bi-prediction restriction.

FIG. 39 is a flow diagram illustrating the operation of the inter prediction flag decoding unit 1028 in CABAC. If the slice is a B slice (YES in S131), the inter prediction flag decoding unit 1028 proceeds to S132. Otherwise (NO in S131), the inter prediction flag decoding unit 1028 ends the operation without decoding the inter prediction flag inter_pred_flag. If the PU size is a small PU size (if DisableBiPred=true) (YES in S132), the inter prediction flag decoding unit 1028 ends the operation without decoding the inter prediction flag inter_pred_flag. Otherwise (NO in S132), the inter prediction flag decoding unit 1028 decodes the inter prediction flag inter_pred_flag (S133).

Figure 40:
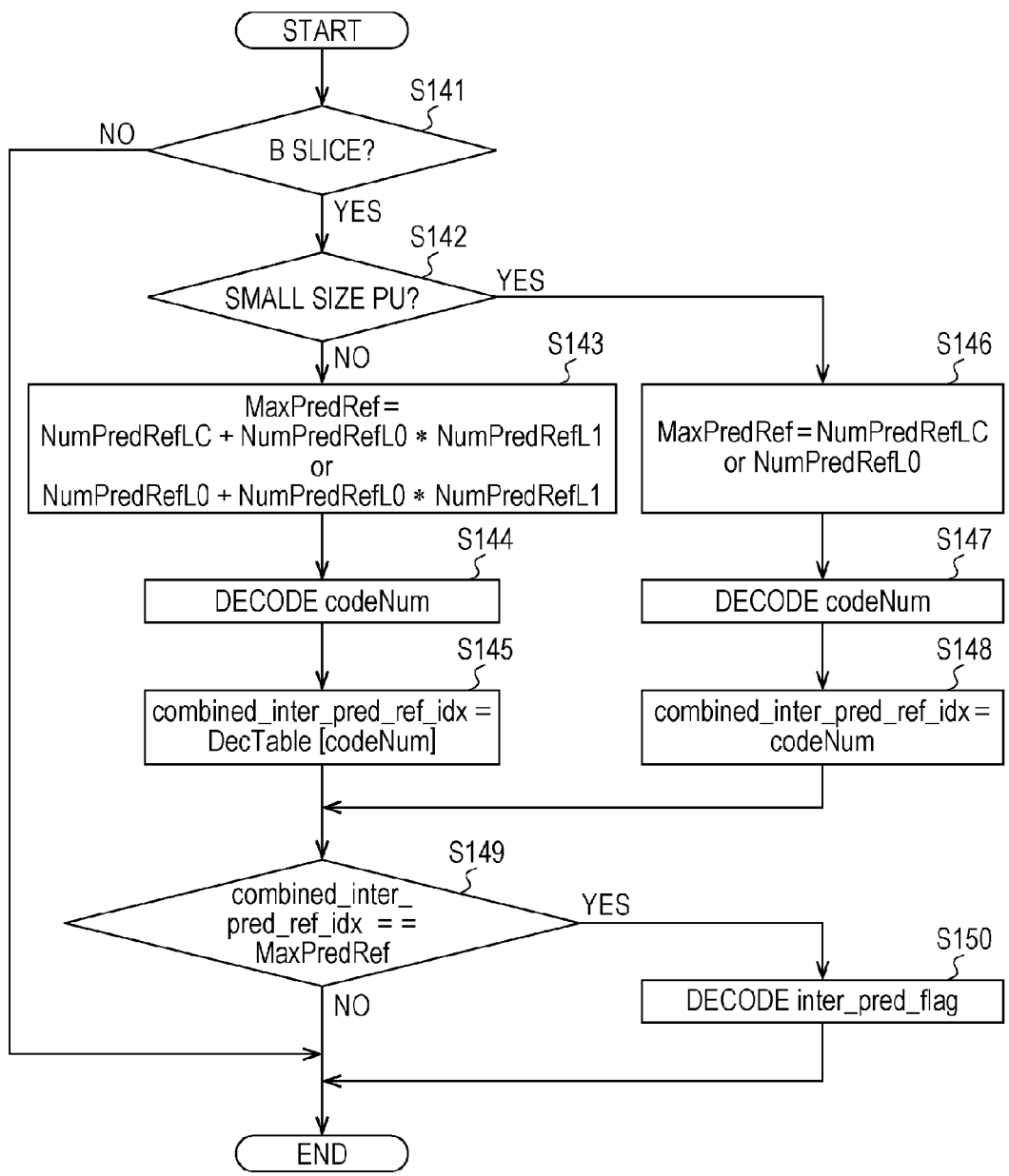
FIG. 40 is a diagram depicting the decoding of a combined inter prediction reference index flag combined_inter_pred_ref_idx for bi-prediction restriction.

FIG. 40 is a flow diagram illustrating the operation of the inter prediction flag decoding unit 1028 in CAVLC. If the slice is a B slice (YES in S141), the inter prediction flag decoding unit 1028 proceeds to S142. Otherwise (NO in S141), the inter prediction flag decoding unit 1028 ends the operation without decoding the inter prediction flag inter_pred_flag. If the PU size is a size other than the small PU size (if DisableBiPred !=true) (NO in S142), the inter prediction flag decoding unit 1028 decodes the combined inter prediction reference index combined_inter_pred_ref_idx through S143, S144, and S145. If the PU size is the small PU size (YES in S142), the inter prediction flag decoding unit 1028 decodes the combined inter prediction reference index combined_inter_pred_ref_idx through S146, S147, and S148.

In S143 and S146, a maximum value MaxPredRef is calculated. The maximum value MaxPredRef is as illustrated in the table TBL37 and the pseudo code CODE37 in part (d) of FIG. 37. Specifically, the maximum value MaxPredRef for a size other than the small size PU, that is, for no restriction of bi-prediction (DisableBiPred !=true), is calculated by NumPredRefLC+NumPredRefL0*NumPredRefL1 or NumPredRefL0+NumPredRefL0*NumPredRefL1, that is, by determining the sum of the number of uni-predictive combined reference picture sets (NumPredRefLC or NumPredRefL0) and the number of bi-predictive combined reference picture sets (NumPredRefL0*NumPredRefL1) (S143). The maximum value MaxPredRef for restriction of bi-prediction (DisableBiPred=true) is calculated by NumPredRefLC or NumPredRefL0, that is, by determining the number of uni-predictive combined reference picture sets (NumPredRefLC or NumPredRefL0), and does not include a bi-predictive combined reference picture set (S146). Accordingly, unnecessary codes may be eliminated. Note that num_ref_idx_lc_active_minus1 is a value obtained by subtracting 1 from the number of reference list numbers (the size of the reference list LC) managed in the reference list LC. num_ref_idx_lc_active_minus1 larger than 0 indicates the use of the reference list LC. Similarly, num_ref_idx_l0_active_minus1 is a value obtained by subtracting 1 from the number of reference list numbers (the size of the reference list L0) managed in the reference list L0, and indicates the use of the reference list L0. Similarly, num_ref_idx_l1_active_minus1 is a value obtained by subtracting 1 from the number of reference list numbers (the size of the reference list L1) managed in the reference list L1. The number of uni-predictive combined reference picture sets may be defined as a value obtained by, as given in the formulas below, clipping the size of the reference list with a maximum value (4 for the reference list LC, and 2 for the other reference lists).

$$NumPredRefLC = Min(°4, °num\_ref\_idx\_lc\_active\_minus1°+°1°)$$

$$NumPredRefL0 = Min(°2, °num\_ref\_idx\_l0\_active\_minus1°+°1°)$$

$$NumPredRefL1 = Min(°2, °num\_ref\_idx\_l1\_active\_minus1°+°1°)$$

In the decoding of combined_inter_pred_ref_idx in S144 or S147, codeNum encoded with unary code whose maximum value is MaxPredRef is decoded. In S145 or S148, codeNum is converted into combined_inter_pred_ref_idx. In the case of a size other than the small size PU, codeNum is converted into combined_inter_pred_ref_idx using the inverse conversion variable table DecTable. That is, combined_inter_pred_ref_idx=DecTable[codeNum] is obtained (S145). In the case of the small size PU, codeNum is used as it is as the value of combined_inter_pred_ref_idx. That is, combined_inter_pred_ref_idx=codeNum is obtained (S148). Then, it is determined whether or not combined_inter_pred_ref_idx matches the maximum value MaxPredRef (S149). If both match (YES in S149), inter_pred_flag is decoded in the case of a size other than the small size PU (S150). This operation corresponds to the decoding of the syntax table illustrated in FIG. 36.

In the example described above, simple decoding is achieved without the use of an inverse conversion variable table for the small size PU. By replacing the step of S148 described above with the processing indicated by the pseudo code in FIG. 41, the decoding of combined_inter_pred_ref_idx using an inverse conversion variable table is also possible. The same inverse conversion variable table and the same conversion variable table are used for restriction of bi-prediction and for no restriction of bi-prediction. In a case that a bi-prediction table is not used, entries corresponding to bi-prediction among the entries in the table are invalid. Thus, a process for skipping the invalid entries is needed. Specifically, a decoding unit decodes a code number, and then scans the entries in the inverse conversion variable table DecTable in order from the highest probability of occurrence to the lowest probability of occurrence, that is, in order from the smallest number to the largest number. An entry whose content represents bi-prediction, that is, an entry in which two prediction lists are used, is invalid and is therefore skipped. Only the number of valid entries is counted. If the count value matches a decoded code number, the parameter of the entry having the count value is set as the value of combined_inter_pred_ref_idx to be decoded. The inverse conversion variable table DecTable is updated by regarding a count value representing the count of entries including invalid entries as a code number. Specifically, an operation in FIG. 41 is performed. FIG. 41 illustrates pseudo code representing a decoding process of combined_inter_pred_ref_idx in a case that an inverse conversion variable table is used. The following is a description of the individual steps S in the pseudo code illustrated in FIG. 41. In FIG. 41, for convenience of coding style, the maximum value MaxPredRef is expressed as uiMaxVal. In addition, NumPredRefLC, NumPredRefL0, and NumPredRefL1 are expressed as uiValNumRefIdx0fLC, uiValNumRefIdx0fL0, and uiValNumRefIdx0fL1, respectively.

S501: The maximum value MaxPredRef is obtained.
S502: The maximum values MaxPredRef and uiBipredVal for restriction of bi-prediction are obtained.
S503: A code number tmp is obtained by invoking the unary decoding process xReadUnaryMaxSymbol using the maximum value MaxPredRef as an argument.
S504: combined_inter_pred_ref_idx is obtained from the code number tmp using the inverse conversion variable table m_uiMITableD. For no restriction of bi-prediction, this value is the final value of combined_inter_pred_ref_idx.
S505: This step is a branch to a process for obtaining combined_inter_pred_ref_idx from a code number for restriction of bi-prediction.
S506: The maximum value MaxPredRef for no restriction of bi-prediction is obtained for later use in the determination of S509.
S507: The processing of 0 to the maximum value MaxPredRef is performed using a temporary code number tmp2 as a loop variable. A second temporary code number cx is initialized to 0.
S508: A temporary value x of combined_inter_pred_ref_idx, which is obtained by converting the temporary code number tmp2 using the inverse conversion variable table, is obtained.
S509: It is determined whether or not the temporary value x of combined_inter_pred_ref_idx is within a valid range. The temporary value x of combined_inter_pred_ref_idx is valid if the temporary value x does not exceed the maximum value uiBipredVal for restriction of bi-prediction, and also valid if the temporary value x is equal to the maximum value MaxPredRef for no restriction of bi-prediction.
S510: The loop ends if the second temporary code number cx matches the decoded code number tmp. The temporary code number tmp2 at the time when the loop ends corresponds to the code number for no restriction of bi-prediction. Thus, the second temporary code number cx is substituted into the code number tmp.
S511: The second temporary code number cx increments.
S512: The temporary value x of combined_inter_pred_ref_idx at the time when the loop ends is obtained as the decoded value of combined_inter_pred_ref_idx.
S513: The process adaptCodeword for updating the inverse conversion variable table is invoked using the code number tmp for no restriction of bi-prediction.

FIG. 42 illustrates pseudo code representing an encoding process of combined_inter_pred_ref_idx in a case that a variable table is used.

In the foregoing, a description has been given of the following methods for reducing the amount of processing for a small PU size: bi-prediction restriction on the basic inter PU (change in the method for decoding the inter prediction flag and the combined inter prediction reference index), bi-prediction restriction on the merge PU (bi-prediction/uni-prediction conversion in the derivation of merge candidates), and skipped calculation of bi-predictive merge candidates. These restrictions may be used individually, or PU sizes to be subject to these restrictions may have different values. FIG. 52 and FIG. 53 illustrate an example of the reduction in the amount of processing for bi-prediction. In FIG. 52 and FIG. 53, open circles indicate that the processes are performed, and crosses indicate that the processes are not performed.

Part (a) of FIG. 52 illustrates an example in which the bi-prediction restriction on the basic inter PU, the bi-prediction restriction on the merge PU, and the skipped derivation of bi-predictive merge candidates are uniformly applied to the PUs having the sizes of 4×4, 4×8, and 8×4. Parts (b) and (c) of FIG. 52 illustrate an example in which the restriction of bi-prediction is imposed only on the basic inter PU without the application of the bi-prediction restriction on the merge PU and the skipped derivation of bi-predictive merge candidates. In general, the restriction of bi-prediction for the merge PU may cause a reduction in coding efficiency. It is thus appropriate that the restriction of bi-prediction is imposed only on the basic inter PU.

Part (d) of FIG. 52 illustrates an example in which the bi-prediction restriction on the basic inter PU is uniformly applied to the PUs having sizes of 4×4, 4×8, and 8×4 and in which the bi-prediction restriction on the merge PU and the skipped derivation of bi-predictive merge candidates are applied to the PUs having an 8×8 size. Relaxing the bi-prediction restriction on the merge PU compared to the bi-prediction restriction on the basic inter PU will be appropriate in terms of coding efficiency.

Part (a) of FIG. 53 illustrates an example in which the bi-prediction restriction on the basic inter PU and the skipped derivation of bi-predictive merge candidates are applied to 4×4, 4×8, 8×4, and 8×8. Simplifying the derivation of merge candidates used as motion compensation parameters of a merge PU, without the restriction of bi-prediction on the merge PU, may reduce the amount of processing regarding bi-prediction in the merge PU. Part (b) of FIG. 53 illustrates an example in which the skipped derivation of bi-predictive merge candidates is applied to 4×4, 4×8, 8×4, and 8×8. In this manner, the skipped derivation of bi-predictive merge candidates may be used alone.

In order to implement the cases described above, determination methods may be managed using different flags. For example, flags DisableBiPredFlag, DisableBiPredMerge, and DisableBiPredMergeDerive for imposing the respective prediction restrictions are provided, and are made feasible through the following operation.

For example, the bi-prediction restricted PU determination unit 1218 individually derives three flags DisableBiPredFlag, DisableBiPredMerge, and DisableBiPredMergeDerive. In the example illustrated in part (d) of FIG. 52, the flags may be derived as follows.

DisableBiPredFlag=(log2CUSize==3 && PU partition type !=2N×2N)? true:false

DisableBiPredMerge, DisableBiPredMergeDerive= ((log2CUSize==4 && PU partition type==N×N) log2CUSize<4)? true:false The inter prediction flag decoding unit 1028 modifies the decoding method of the inter prediction flag and the combined inter prediction reference index if DisableBiPredFlag is true.

If DisableBiPredMerge is true, the merge motion compensation parameter derivation unit 1212 performs bi-prediction/uni-prediction conversion using the bi-prediction/uni-prediction conversion unit 1219 in the derivation of merge candidates.

If DisableBiPredMergeDerive is true, the merge motion compensation parameter derivation unit 1212 performs the skipped derivation of bi-predictive merge candidates in the derivation of merge candidates.

The operations and effects achieved by the motion compensation parameter derivation unit 121 imposing the restriction of bi-prediction by referring to the small PU size 123A are as follows. Bi-prediction involves a larger amount of processing than uni-prediction, and a small size PU requires a larger amount of processing per unit area than a large size PU. Thus, bi-prediction for a small size PU can be a bottleneck in processing. To address this bottleneck, for a small size PU, suppressing bi-prediction may prevent an excessive increase in the amount of processing. In particular, the amount of worst-case processing such as the processing of a PU with the smallest size may be reduced.

An additional description will now be given of the inter prediction flag. In NPL 1, the inter prediction flag (inter_pred_flag) is basically a flag to select bi-prediction or uni-prediction. However, if a combined list is not used and a backward prediction disabling flag is not disabled, a flag to select L0 or L1 as a reference frame list to be used for uni-prediction may be transmitted using inter_pred_flag.

[Operations and Effects]

The present invention may also be expressed in the following form. An image decoding device according to an aspect of the present invention is an image decoding device for restoring an image in a prediction unit using a prediction scheme for any inter-frame prediction out of uni-prediction in which one reference image is referred to and bi-prediction in which two reference images are referred to. The image decoding device includes bi-prediction restriction means for imposing restriction of bi-prediction on a target prediction unit to which the inter-frame prediction is to be applied, the target prediction unit being a prediction unit having a size less than or equal to a predetermined value.

With the restriction described above, the advantage of reducing the amount of processing that can be a bottleneck in decoding processing may be achieved.

[2-3-2] Determination of Size to be Subject To Bi-Prediction Restriction

A configuration for determining a size to be subject to bi-prediction restriction will be disclosed with reference to FIG. 58 to FIG. 70.

(Level Limits)

First, level limits specified in H.264/AVC will be described with reference to FIG. 58 and FIG. 59. FIG. 58 and FIG. 59 illustrate tables defining level limits specified in H.264/AVC.

Level limits will be described with reference to FIG. 58. The levels in the level limits specify the performance of a decoder and the complexity of a bit stream.

The levels are identified by integer portions and non-integer portions. The levels with integer portions mainly represent rough categories in accordance with the resolution of the image to be handled. As illustrated in FIG. 58, numbers from 1 to 5 are designated as integers. Level 1, level 2, and level 3 correspond to the resolutions for QICF, CIF, and SDTV (standard television), respectively.

Level 4 corresponds to the resolution for HDTV (high-definition television). Level 5 corresponds to the resolution for super HDTV.

As illustrated in FIG. 58, for each integer level, an intermediate level or levels may be identified by a non-integer portion or portions (see the column "Level number" indicated by COL581).

The parameters representing the performance of a decoder and the complexity of a bit stream are defined for these identified levels.

The parameters specified in the table illustrated in FIG. 58 are MaxMBPS, MaxFS, MaxDPB, MaxBR, MaxCPB, MaxVmvR, MinCR, and MaxMvsPer2Mb in order from left to right, starting from Level number (COL581) in the table.

A description will now be given of MaxFS indicated by reference symbol COL582. MaxFS specifies a maximum frame size using the number of macroblocks (MBs).

For example, MaxFS=1620 is obtained at levels 2.2 and 3. Further, MaxFS=3600 is obtained at level 3.1, and MaxFS=5120 is obtained at level 3.2.

There are screen sizes of 480p, 720p, 1080p, 4k, and so on. Which level each of these screen sizes is processible at is determined by MaxFS.

One macroblock is composed of 16×16=256 pixels. Accordingly, for example, the number of macroblocks included in 480p (720×480) is given by 720×480/256=1350 (MBs). As described above, MaxFS=1620 is obtained at level 2.2, and thus it is possible to process 480p.

Furthermore, for example, for 720p (1280×720), it is only required to process macroblocks, given by 1280×720/256=3600 (MBs), per frame. Thus, it is possible to process 720p at levels 3.1 and 3.2. If an image size that is not divisible by 16 is targeted for the computation of the capabilities for processing of image sizes, the image size is rounded up to the nearest value divisible by 16 before computation is performed. For example, "1080p" is divided into macroblocks as a screen corresponding to 1920×1088 before computation is performed.

In the following, the screen sizes processible at levels 4 to 5.1 are given in the right side of the table in FIG. 58.

At levels 4 to 4.2, 1080p is processible. At level 5, 2560×1600, which is a size used in a PC display, is processible. At level 5.1, 4k is processible.

In FIG. 59, as indicated by reference symbol COL591, at level 3.1 or higher levels (screen size of 720p or more), the minimum block size at which bi-prediction for luminance is allowed is 8×8 (MinLumaBiPredSize). That is, bi-prediction in units of sub-macroblocks (8×4, 4×8, and 4×4) is disabled at level 3.1 or higher levels.

A macroblock in H.264/AVC is a unit corresponding to CU, TU, and PU in HEVC.

H.264/AVC specifies restriction of only bi-prediction. Uni-prediction for a small size PU also requires a large amount of processing and a large amount of transfer of reference pixels to perform a filter process for motion compensation. Thus, it is appropriate to impose the restriction of bi-prediction on a small PU size and to restrict the use of a small PU size. As the level increases, the resolution (image size) to be used basically increases. The higher the resolution, the more the amount of processing and the amount of transfer. In addition, if the resolution increases, the object size also increases correspondingly (because the spatial correlation of motion increases). Thus, high coding efficiency may be implemented only with comparatively large PUs. The restricted use of a small PU size and the restriction of bi-prediction on a small PU size may be achieved without a significant reduction in coding efficiency. The resolution basically corresponds to the level. Thus, PU sizes to be subject to constraints and prediction units (PUs) to be subject to bi-prediction restriction differ depending on the level. For example, at level 3.1 (720P), preferably, constraints are imposed on a 4×4 PU, and the restriction of bi-prediction is imposed on an 8×4 PU and a 4×8 PU. At level 5 (corresponding to 2560×1600 and corresponding to 4k), preferably, constraints are imposed on an 8×4 PU and a 4×8 PU, and the restriction of bi-prediction is imposed on an 8×8 PU.

In HEVC, furthermore, a minimum CU size can be controlled by the value log2_min_coding_block_size_minus3 in encoded data, described below. A minimum CU size is reduced in order to reduce the amount of processing and the amount of transfer. Thus, it is appropriate to also restrict bi-prediction, which will greatly affect the amount of processing and the amount of transfer. Since the degree of the amount of processing and the amount of transfer to be restricted differs depending on the minimum CU size, the restriction of bi-prediction is preferably adaptively changed in accordance with the minimum CU size. Examples of adaptive constraints and restrictions will be described with reference to FIG. 60. Part (a) of FIG. 60 illustrates examples of bi-prediction restrictions for a 16×16 CU. Part (b) of FIG. 60 illustrates examples of bi-prediction restrictions for an 8×8 CU. As illustrated by way of example in part (a) of FIG. 60, a 16×16 CU may include any of 16×16 PU, 16×8 PU, 8×16 PU, 8×8 PU, and so on. Whereas the restriction of bi-prediction is not imposed on 16×16 PU, 16×8 PU, and 8×16 PU, the restriction of bi-prediction is imposed on 8×8 PU.

As illustrated by way of example in part (b) of FIG. 60, an 8×8 CU may include any of 8×8 PU, 8×4 PU, and 4×8 PU. Whereas the restriction of bi-prediction is not imposed on 8×8 PU, the restriction of bi-prediction is imposed on 8×4 PU and 4×8 PU.

(Restriction of Encoded Data by Level Limits)

The adaptive constraints and restrictions illustrated in FIG. 60 may also be implemented by level limits for restrictions on the value of the motion compensation parameter derived when encoded data is decoded, in accordance with the level without providing the video decoding device 1 with any special configuration. FIG. 84 illustrates an example of level limits of the present invention. In a table in FIG. 84, MaxLog2MinCUSize, MinPUSize, and MinBipredPUSize are the logarithmic values of the minimum CU size, the minimum PU size, and the minimum bi-prediction PU size, respectively, and represent the minimum values of the CU size and PU size that are available at specific levels. As in FIG. 84, if the level level_idc is less than a predetermined threshold value TH1, the logarithmic values of the minimum CU size and the minimum PU size are 3 and 4×4, respectively, and are not particularly restricted. The minimum bi-prediction PU size is 8×4 or 4×8, and the use of bi-prediction for 4×4 PU is disabled. If the level level_idc is greater than or equal to the predetermined threshold value TH1 and less than a predetermined threshold value TH2, the logarithmic value of the minimum CU size (the logarithmic value of the minimum PU size) is 3, and is not particularly restricted, whereas the minimum PU size is 8×4 or 4×8. That is, the use of 4×4 PU is disabled. In addition, the minimum bi-prediction PU size is 8×4 or 4×8, and the use of bi-prediction for 4×4 PU is disabled. If the level level_idc is greater than or equal to the predetermined threshold value TH2, the logarithmic value of the minimum CU size is 4, and the minimum PU size is restricted to 8×8. That is, the use of 8×4 PU, 4×8 PU, and 4×4 PU is disabled. In addition, the minimum bi-prediction PU size is 16×8, and the use of bi-prediction for 8×8 PU is disabled. The use of bi-prediction for 8×4 PU, 4×8 PU, and 4×4 PU is also disabled due to the restriction of the minimum PU size. It is appropriate that the threshold value TH1 is level 3.1, which is on the line of 720P, and the threshold value TH2 is level 5, which is on the line equivalent to 2560×1600. However, other threshold values may be used.

FIG. 85 illustrates another example of level limits of the present invention. The illustrated example is substantially the same as the example in FIG. 84, except that if the level level_idc is less than a predetermined threshold value TH0, the logarithmic value of the minimum CU size, the minimum PU size, and the minimum bi-prediction PU size are 3, 4×4, and 4×4, respectively, and no restrictions are imposed thereon. In this way, an unlimited level may be set. The level limits may be applied in accordance with the restriction on encoded data. That is, for a small PU size, some of the skipped decoding of the inter prediction flag, bi-/uni-prediction conversion for merge candidates, and the skipped derivation of bi-predictive merge candidates in the derivation of merge candidates may not be implemented, or not all of them may be implemented. Conversely, for a small PU size, some or all of the skipped decoding of the inter prediction flag, bi-/uni-prediction conversion for merge candidates, and the skipped derivation of bi-predictive merge candidates in the derivation of merge candidates may be implemented in combination with one another.

[Operations and Effects]

In the level limits described above, both the available PU size and the available bi-prediction PU size are restricted in accordance with the level. Accordingly, the amount of processing necessary for a filter process for motion compensation to perform and the amount of transfer of reference pixels may be appropriately restricted. As in the level limits in H.264/AVC, no restrictions are imposed on an available PU size in a case that only an available bi-prediction PU size is restricted. Thus, a problem occurs in that, similarly to bi-prediction, uni-prediction for a small PU will also require a large amount of processing and a large amount of transfer. In other words, the level limits described above may eliminate an unbalanced situation of restriction for the amount of processing and the amount of transfer for bi-prediction and no restriction for the amount of processing and the amount of transfer for uni-prediction.

Furthermore, the level limits described above allow switching between an available PU size and an available bi-prediction PU size in accordance with the level using the same threshold value. For example, if the minimum PU size MinPUSize is changed before or after the threshold value TH1, the minimum bi-prediction PU size MinBipredPUSize is changed using the same threshold value, or the threshold value TH1. In this manner, the same threshold value is used for the available PU size and the available bi-prediction PU size, allowing a video decoding means that supports decoding at a specific level or lower to appropriately restrict the amount of processing and the amount of transfer. In addition, at which level the required restriction will change may be determined in a straightforward way.

In addition, in the level limits described above, the following combinations of available PU sizes and available bi-prediction PU sizes are used.

Restriction on 4×4 PU and restriction of bi-prediction on 8×4 PU

Restriction on 8×4 PU and restriction of bi-prediction on 8×8 PU

The above-described combinations of PU restriction and bi-prediction restriction create a balance because the amount of processing and the amount of transfer are restricted by substantially the same amount.

(Explanation of Configuration)

First, a configuration for determining a size to be subject to bi-prediction restriction will be described with reference to FIG. 62 to FIG. 70 in addition to FIG. 61. In the configuration illustrated in FIG. 61, the bi-prediction restricted PU determination unit 1218 in the configuration illustrated in FIG. 43 is replaced by a bi-prediction restricted PU determination unit 1218A.

The bi-prediction restricted PU determination unit 1218A determines a bi-prediction restriction condition, and determines whether or not the target PU is subject to bi-prediction restriction in which bi-prediction is not used. The bi-prediction restricted PU determination unit 1218A may separately determine whether or not a skip CU and a merge PU are subject to bi-prediction restriction and whether or not a basic inter PU is subject to bi-prediction restriction.

As in the case that the use of merge is restricted, if the inter prediction flag is decoded using a skip PU, whether or not to impose the restriction of bi-prediction on each of a skip PU, a merge PU, and a basic inter PU may separately be determined.

In the configuration described above, similarly to the configuration illustrated in FIG. 43, the setting of bi-prediction or uni-prediction, which is set by the skip motion compensation parameter derivation unit 1211, may be determined by a bi-prediction/uni-prediction conversion unit 1219A on the basis of the bi-prediction restricted PU determination unit 1218A. The present invention is not limited to the configuration described above, and, for example, the following configuration may be used: a determination result of the bi-prediction restricted PU determination unit 1218A is input directly to the skip motion compensation parameter derivation unit 1211 and the setting of bi-prediction or uni-prediction is performed.

The bi-prediction restricted PU determination unit 1218A determines a bi-prediction restriction condition on the basis of various flags and parameters set by the encoder. Specifically, the bi-prediction restricted PU determination unit 1218A may have any of the following configurations given in items (1A) to (1E) below, by way of example. The following description will be made of the respective example configurations given in the items (1A) to (1E) below in conjunction with respective syntax tables and pseudo code. The level limits and the respective example configurations are not exclusive but may be used in combination with each other.

(1A) Direct specification of size to be subject to bi-prediction restriction by using flag indicating whether or not to impose restriction of bi-prediction

[Syntax Table]

An example of a syntax table for bi-prediction restriction will be described with reference to FIG. 62. FIG. 62 is a diagram illustrating an example of a syntax table for bi-prediction restriction. As illustrated in FIG. 62, in an RBSP (Raw Byte Sequence Payload) of the sequence parameter set of the encoded data, log2_min_coding_block_size_minus3 (SYN621), inter_4×4_enabled_flag (SYN622), restrict_bipred_flag (SYN623), and log2_min_bipred_coding_block_size_minus3 (SYN625) are encoded.

log2_min_coding_block_size_minus3 is a flag that determines a minimum CU size. log2_min_coding_block_size_minus3 stores a value obtained by subtracting 3 from the logarithmic value of the minimum CU size to be specified. For example, if the minimum CU size is 8×8, log2_min_coding_block_size_minus3=0 is obtained. If the minimum CU size is 16×16, log2_min_coding_block_size_minus3=1 is obtained.

inter_4×4_enabled_flag is a flag that prohibits the inter 4×4 PU, as is apparent from its name.

log2_min_coding_block_size_minus3 and inter_4×4_enabled_flag represent the logarithmic value Log2MinCUSize of the minimum CU size and 4×4 PU availability, respectively, and the available PU size is constrained. The logarithmic value Log2MinCUSize of the minimum CU size is derived by log2_min_coding_block_size_minus3+3. For example, the minimum CU size is 8×8 for Log2MinCUSize=3, and the minimum CU size is 16×16 for Log2MinCUSize=4. If the minimum CU size is 8×8, the use of 8×4 PU, 4×8 PU, and 4×4 PU, which are PUs obtained by dividing the minimum CU, is enabled. However, if inter_4×4_enabled_flag is equal to 0, the use of 4×4 PU is disabled.

For example, for Log2MinCUSize=4 (log2_min_coding_block_size_minus3=1), that is, if the minimum CU size is a 16×16 CU, the 8×8 CU size is not available. Accordingly, whereas the use of 8×8 PU is enabled, the use of 8×4 PU, 4×8 PU, and 4×4 PU, which are PUs obtained only by dividing 8×8, is disabled.

restrict_bipred_flag and log2_min_bipred_coding_block_size_minus3 are pieces of information concerning bi-prediction restriction.

restrict_bipred_flag is a flag indicating whether or not to impose the restriction of bi-prediction. The value of this flag is determined by the video encoding device 2 in accordance with the level. restrict_bipred_flag equal to "1" indicates restriction of bi-prediction. restrict_bipred_flag equal to "0" indicates no restriction of bi-prediction.

log2_min_bipred_coding_block_size_minus3 directly specifies a minimum CU size (hereinafter referred to as the minimum bi-prediction-restricted CU size) to be subject to bi-prediction restriction. The method for specifying a size in log2_min_bipred_coding_block_size_minus3 is similar to that in log2_min_coding_block_size_minus3. In addition, log2_min_bipred_coding_block_size_minus3 is decoded if restrict_bipred_flag has been encoded (SYN625).

[Pseudo Code]

Next, the operation of the bi-prediction restricted PU determination unit 1218A will be described with reference to pseudo code illustrated in FIG. 63. The following is a description of the individual steps S in the pseudo code illustrated in FIG. 63.

S631: The bi-prediction restricted PU determination unit 1218A determines whether or not restrict_bipred_flag is equal to "0".

S632: If restrict_bipred_flag is equal to "0", the bi-prediction restricted PU determination unit 1218A sets "0" in the variable DisableBipred. The variable DisableBipred is a variable indicating whether or not to impose the restriction of bi-prediction. If "0" is set in the variable DisableBipred, the restriction of bi-prediction is not imposed. If "1" is set in the variable DisableBipred, the restriction of bi-prediction is imposed.

S633: On the other hand, if restrict_bipred_flag is not equal to "0", the bi-prediction restricted PU determination unit 1218A further determines whether or not Log2MinBipredCUSize is equal to "3", where Log2MinBipredCUSize=log2_min_bipred_coding_block_size_minus3+3. That is, in S633, it is determined whether or not the minimum CU size to be subject to bi-prediction restriction is 8×8 CU.

S634: If Log2MinBipredCUSize is equal to "3", the bi-prediction restricted PU determination unit 1218A sets the variable DisableBipred as follows.

The restriction of bi-prediction is imposed on a PU for which the logarithmic value (log2CUSize) of the CU size matches Log2MinBipredCUSize (=3) and for which the PU mode is a mode other than 2N×2N.

That is, in S634, if the minimum bi-prediction-restricted CU size is 8×8 CU, the 8×8 CU is subject to the restriction of bi-prediction for (2N×2N) PU other than 8×8 PU.

In S634, the operator "&&" represents logical AND. Specifically, in the left term of "&&", it is determined whether or not the logarithmic value (log2CUSize) of the CU size of the target block matches Log2MinBipredCUSize (here, "3"). In the right term of "&&", it is determined that the PU mode (PartMode) is not 2N×2N. Note that "!=" is the relational operator indicating "inequality".

S635: On the other hand, if Log2MinBipredCUSize is not equal to "3", the bi-prediction restricted PU determination unit 1218A sets the variable DisableBipred as follows.

The restriction of bi-prediction is imposed on a PU (minimum PU) for which the logarithmic value (log2CUSize) of the CU size matches Log2MinBipredCUSize and for which the PU mode is N×N.

That is, in S635, if the minimum bi-prediction-restricted CU size is other than 8×8 (for example, 16×16), a CU whose size matches the minimum bi-prediction-restricted CU size is subject to the restriction of bi-prediction for the minimum PU (N×N). In FIG. 63, the phrase "restriction of B" means "restriction of bi-prediction (bi-predictive prediction)".

S635 may be modified to S635' as follows.

S635': If Log2MinBipredCUSize is not equal to "3", the bi-prediction restricted PU determination unit 1218A sets the variable DisableBiPred as follows.

The restriction of bi-prediction is performed "in a case that the logarithmic value (log2CUSize) of the CU size matches Log2MinBipredCUSize and the PU mode is N×N" or "in a case that the logarithmic value (log2CUSize) of the CU size is smaller than Log2MinBipredCUSize".

In S635', in addition to the restriction in S635, for a CU size smaller than the minimum bi-prediction-restricted CU size, the restriction of bi-prediction is imposed on all the modes.

[Operations and Effects]

In the example configuration described above, adaptive bi-prediction restriction may be provided in accordance with the purpose of the video encoding device 2 (the information included in the encoded data).

The video encoding device 2 may encode information concerning bi-prediction restriction in accordance with, for example, the resolution of a moving image or the performance of the video decoding device 1.

This enables the video decoding device 1 to finely adjust the restriction of bi-prediction in accordance with the resolution of a moving image or the performance of the video decoding device 1.

(1B) Determination of size to be subject to bi-prediction restriction in accordance with minimum CU size without using additional flag for bi-prediction restriction

[Syntax Table]

Another example of the syntax table for bi-prediction restriction will be described with reference to FIG. 64. FIG. 64 is a diagram illustrating another example of the syntax table for bi-prediction restriction. As illustrated in FIG. 64, in an RBSP of the sequence parameter set of the encoded data, it is only required that log2_min_coding_block_size_minus3 have been encoded (SYN641).

[Pseudo Code]

Next, the operation of the bi-prediction restricted PU determination unit 1218A will be described with reference to pseudo code illustrated in FIG. 65. The following is a description of the individual steps S in the pseudo code illustrated in FIG. 65.

S651: The bi-prediction restricted PU determination unit 1218A determines whether or not Log2MinCUSize is equal to "3", where Log2MinCUSize=log2_min_coding_block_size_minus3+3. That is, in S651, it is determined whether or not the minimum CU size is 8×8 CU.

S652: If Log2MinCUSize is equal to "3", the bi-prediction restricted PU determination unit 1218A sets the variable DisableBipred as follows.

The restriction of bi-prediction is imposed on a PU for which the logarithmic value (log2CUSize) of the CU size matches Log2MinCUSize (=3) and for which the PU mode is a mode other than 2N×2N.

That is, in S652, if the CU size is 8×8 CU, a CU having a size that matches the minimum CU size is subject to the restriction of bi-prediction for (2N×2N) PU other than 8×8 PU.

S653: On the other hand, if Log2MinCUSize is not equal to "3", the bi-prediction restricted PU determination unit 1218A sets the variable DisableBipred as follows.

The restriction of bi-prediction is imposed on a PU (minimum PU) for which the logarithmic value (log2CUSize) of the CU size matches Log2MinCUSize and for which the PU mode is N×N.

That is, in S653, if the minimum CU size is other than 8×8 (for example, 16×16), a CU having a size that matches the minimum CU size is subject to the restriction of bi-prediction for the minimum PU (N×N).

[Operations and Effects]

In the example configuration described above, bi-prediction restriction is imposed in accordance with the minimum CU size. Accordingly, the restriction of bi-prediction is possible without additional encoding of information concerning bi-prediction restriction.

(1C) Determination of size to be subject to bi-prediction restriction in accordance with minimum CU size by using flag indicating whether or not to impose restriction of bi-prediction

[Syntax Table]

Another example of the syntax table for bi-prediction restriction will be described with reference to FIG. 66. FIG. 66 is a diagram illustrating another example of the syntax table for bi-prediction restriction. As illustrated in FIG. 66, in an RBSP of the sequence parameter set of the encoded data, log2_min_coding_block_size_minus3 (SYN661) and restrict_bipred_flag (SYN663) are encoded. In the RBSP of the sequence parameter set of the encoded data, inter_4×4_enabled_flag may have been encoded (SYN662).

[Pseudo Code]

Next, the operation of the bi-prediction restricted PU determination unit 1218A will be described with reference to pseudo code illustrated in FIG. 67. The following is a description of the individual steps S in the pseudo code illustrated in FIG. 67.

S671: The bi-prediction restricted PU determination unit 1218A determines whether or not restrict_bipred_flag is equal to "0".

S672: If restrict_bipred_flag is equal to "0", the bi-prediction restricted PU determination unit 1218A sets "0" in the variable DisableBipred.

S673: On the other hand, if restrict_bipred_flag is not equal to "0", the bi-prediction restricted PU determination unit 1218A further determines whether or not Log2MinCUSize is equal to "3".

S674: If Log2CUMinSize is equal to "3", the bi-prediction restricted PU determination unit 1218A sets the variable DisableBipred as follows.

The restriction of bi-prediction is imposed on a PU for which the logarithmic value (log2CUSize) of the CU size matches the Log2MinCUSize (=3) and for which the PU mode is a mode other than 2N×2N.

That is, in S674, similarly to S652, if the CU size is 8×8 CU, a CU having a size that matches the minimum CU size is subject to the restriction of bi-prediction for (2N×2N) PU other than 8×8 PU.

S675: If Log2MinCUSize is not equal to "3", the bi-prediction restricted PU determination unit 1218A sets the variable DisableBipred as follows.

The restriction of bi-prediction is imposed on a PU (minimum PU) for which the logarithmic value (log2CUSize) of the CU size matches Log2MinCUSize and for which the PU mode is N×N.

That is, in S675, similarly to S653, if the minimum CU size is other than 8×8 (for example, 16×16), a CU having a size that matches the minimum CU size is subject to the restriction of bi-prediction for the minimum PU (N×N).

[Operations and Effects]

In the example configuration described above, bi-prediction restriction is imposed in accordance with the minimum CU size by the determination of a flag indicating whether or not to impose the restriction of bi-prediction. Accordingly, the restriction of bi-prediction is possible without additional encoding of information concerning bi-prediction restriction that directly specifies the minimum bi-prediction-restricted CU size. In the example configuration described above, both the available PU size and the available bi-prediction PU size are controlled using the same Log2MinCUSize flag. Thus, the amount of processing and the amount of transfer required for bi-prediction and the amount of processing and the amount of transfer required for uni-prediction may be controlled in a balanced way.

The example configuration described above may be modified to (1C') as follows.

(1C') In 1C, change of flag indicating whether or not to impose restriction of bi-prediction to ternary flag In the following, a modification of 1C in which restrict_bipred_flag is a ternary flag will be described hereinafter with reference to pseudo code illustrated in FIG. 68. In this modification, it is assumed that restrict_bipred_flag may take one of 0, 1, and otherwise (for example, 2). The following is a description of the individual steps S in the pseudo code illustrated in FIG. 68.

S681: If restrict_bipred_flag is equal to "0", the bi-prediction restricted PU determination unit 1218A sets "0" in the variable DisableBipred.

S682: If restrict bipred flag is equal to "1", the bi-prediction restricted PU determination unit 1218A sets the variable DisableBipred as follows.

The restriction of bi-prediction is performed "in a case that the logarithmic value (log2CUSize) of the CU size matches Log2MinCUSize and the PU mode is other than 2N×2N" or "in a case that the logarithmic value (log2CUSize) of the CU size is smaller than Log2MinCUSize".

S682: If restrict bipred flag is equal to a value other than the values described above (for example, "2"), the bi-prediction restricted PU determination unit 1218A sets the variable DisableBipred as follows.

The restriction of bi-prediction is performed "in a case that the logarithmic value (log2CUSize) of the CU size matches Log2MinCUSize and the PU mode is N×N" or "in a case that the logarithmic value (log2CUSize) of the CU size is smaller than Log2MinCUSize".

[Operations and Effects]

In the modification described above, restrict_bipred_flag is implemented as a ternary flag, which may allow finer adjustment for the restriction of bi-prediction.

For example, a 16×16 CU may be subject to only the restriction of bi-prediction for 8×8 PU or to the restriction of bi-prediction for 8×8 PU, 16×8 PU, and 8×16 PU. Accordingly, the modification described above may provide a wide variety of options for bi-prediction restriction.

(1D) Use of flag indicating whether or not to impose restriction of bi-prediction also as flag indicating prohibition of inter 4×4 PU

[Syntax Table]

Still another example of the syntax table for bi-prediction restriction will be described with reference to FIG. 69. FIG. 69 is a diagram illustrating still another example of the syntax table for bi-prediction restriction. As illustrated in FIG. 69, in an RBSP of the sequence parameter set of the encoded data, log2_min_coding_block_size_minus3 (SYN691) and restrict_motion_compensation_flag (SYN692) are encoded.

Here, a comparison between the syntax table in the item (1C) illustrated in FIG. 66 and the syntax table in the item (1D) illustrated in FIG. 69 will be presented.

In the RBSP of the sequence parameter set of the encoded data according to the example configuration described above, restrict_motion_compensation_flag (SYN692) is encoded in place of inter_4×4_enabled_flag (SYN662) and restrict_bipred_flag (SYN663) illustrated in FIG. 66.

restrict_motion_compensation_flag is obtained by sharing !inter_4×4_enabled flag ("!" represents the logical negation operator) and restrict_motion_compensation_flag. That is, restrict_motion_compensation_flag is a flag indicating whether or not to prohibit inter 4×4 and is also a flag indicating whether or not to impose the restriction of bi-prediction.

[Pseudo Code]

Next, the operation of the bi-prediction restricted PU determination unit 1218A will be described with reference to pseudo code illustrated in FIG. 70. The following is a description of the individual steps S in the pseudo code illustrated in FIG. 70.

S701: The bi-prediction restricted PU determination unit 1218A determines whether or not restrict_motion_compensation_flag is equal to "0".

S702: If restrict_motion_compensation_flag is equal to "0", the bi-prediction restricted PU determination unit 1218A sets "0" in the variable DisableBipred.

S703: On the other hand, if restrict_motion_compensation_flag is not equal to "0", the bi-prediction restricted PU determination unit 1218A further determines whether or not Log2MinCUSize is equal to "3".

S704: If Log2CUSize is equal to "3", the bi-prediction restricted PU determination unit 1218A sets the variable DisableBipred as follows.

The restriction of bi-prediction is imposed on a PU for which the logarithmic value (log2CUSize) of the CU size matches Log2MinCUSize (=3) and for which the PU mode is a mode other than 2N×2N.

That is, in S704, similarly to S674, if the CU size is 8×8 CU, a CU having a size that matches the minimum CU size is subject to the restriction of bi-prediction for (2N×2N) PU other than 8×8 PU.

S705: If Log2CUSize is not equal to "3", the bi-prediction restricted PU determination unit 1218A sets the variable DisableBipred as follows.

The restriction of bi-prediction is imposed on a PU (minimum PU) for which the logarithmic value (log2CUSize) of the CU size matches Log2MinCUSize and for which the PU mode is N×N.

That is, in S705, similarly to S675, if the minimum CU size is other than 8×8 (for example, 16×16), a CU having a size that matches the minimum CU size is subject to the restriction of bi-prediction for the minimum PU (N×N).

[Operations and Effects]

In the example configuration described above, a flag indicating whether or not to impose the restriction of bi-prediction also serves as a flag indicating the prohibition of 4×4 PU. The example configuration described above may reduce the number of flags, and may impose the restriction of bi-prediction in a relatively easy way.

(1E) Determination of size to be subject to bi-prediction restriction based on level value

[Syntax Table]

The syntax table in FIG. 64 is used. As illustrated in FIG. 64, in the RBSP of the sequence parameter set of the encoded data, it is only required that level_idc have been encoded (SYN642).

[Pseudo Code]

Next, the operation of the bi-prediction restricted PU determination unit 1218A will be described with reference to pseudo code illustrated in FIG. 86. The following is a description of the individual steps S in the pseudo code illustrated in FIG. 86.

S861: The bi-prediction restricted PU determination unit 1218A determines whether or not the value of the level level_idc is less than a predetermined threshold value TH1.

S862: If the value of the level level_idc is less than TH1, the bi-prediction restricted PU determination unit 1218A does not perform any specific process.

S863: On the other hand, if the value of the level level_idc is not less than TH1, the bi-prediction restricted PU determination unit 1218A further determines whether or not the value of the level level_idc is less than a predetermined threshold value TH2.

S864: If the value of the level level_idc is less than TH2, the bi-prediction restricted PU determination unit 1218A sets the variable DisableBipred as follows.

The restriction of bi-prediction is imposed on a PU for which the logarithmic value (log2CUSize) of the CU size matches Log2MinCUSize (=3) and for which the PU mode is a mode other than 2N×2N.

That is, in S864, an 8×8 CU having the minimum CU size is subject to the restriction of bi-prediction for (2N×2N) PU other than 8×8 PU.

S865: If the value of the level level_idc is not less than TH2, the bi-prediction restricted PU determination unit 1218A sets the variable DisableBipred as follows.

The restriction of bi-prediction is imposed on a PU (minimum PU) for which the logarithmic value (log2CUSize) of the CU size matches Log2MinCUSize (=4) and for which the PU mode is N×N.

That is, in S865, if the minimum CU size is other than 8×8 (for example, 16×16), a CU having a size that matches the minimum CU size is subject to the restriction of bi-prediction for the minimum PU (N×N). In S864 and S865, the bi-prediction restricted PU determination unit 1218A may determine Log2MinCUSize by referring to MaxLog2MinCUSize in the table in FIG. 84 in accordance with the value of the level level_idc. For example, as illustrated in FIG. 84, if the value of the level level_idc is greater than or equal to TH1 and less than TH2, MaxLog2MinCuSize=3 is obtained. Thus, in S864, the bi-prediction restricted PU determination unit 1218A may use MaxLog2MinCuSize=3 as the value of Log2MinCUSize. Also in S865, the bi-prediction restricted PU determination unit 1218A may use MaxLog2MinCuSize=4 as the value of Log2MinCUSize.

[Operations and Effects]

In the example configuration described above, the size to be subject to bi-prediction restriction is changed in accordance with the level value. According to the example configuration described above, bi-prediction restriction may be imposed in accordance with the desired environment identified by a level without using a flag that imposes the restriction of bi-prediction.

The configurations given in the items (1A) to (1E) above allow the implementation of adaptive constraints and restrictions as illustrated in FIG. 60. As illustrated in FIG. 84 and FIG. 85, the adaptive constraints and restrictions illustrated in FIG. 60 may also be implemented with level limits for limiting encoded data.

[2-3-3] Configuration for Partial Restriction of Bi-Prediction

A configuration for partial restriction of bi-prediction will be described hereinafter with reference again to FIG. 61. In the configuration illustrated in FIG. 61, the bi-prediction/uni-prediction conversion unit 1219 in the configuration illustrated in FIG. 43 is replaced by a bi-prediction/uni-prediction conversion unit 1219A.

The bi-prediction/uni-prediction conversion unit 1219A imposes partial restriction of bi-prediction on the derived merge candidates. More details are as follows.

First, the bi-prediction/uni-prediction conversion unit 1219A acquires merge candidates derived by the neighboring merge candidate derivation unit 1212A and merge candidates derived by the temporal merge candidate derivation unit 1212B.

Then, if the motion compensation parameters of the acquired merge candidates indicate bi-prediction and if the bi-prediction restricted PU determination unit 1218A determines that the restriction of bi-prediction is imposed, the bi-prediction/uni-prediction conversion unit 1219A imposes the restriction of bi-prediction on at least some of the acquired merge candidates.

Examples of the method for selecting a merge candidate to be subject to bi-prediction restriction from among the acquired merge candidates include a method for selecting the first N merge candidates. The bi-prediction/uni-prediction conversion unit 1219A may select, for example, the first one or two merge candidates (bi-prediction) from among neighboring merge candidates.

Alternatively, the bi-prediction/uni-prediction conversion unit 1219A may select one or two merge candidates from among neighboring merge candidates, and one merge candidate from among temporal merge candidates. The inventors' experiment has confirmed findings that the bi-/uni-prediction conversion of a temporal merge candidate will be effective in the bi-prediction of 8×8 PU. Accordingly, a configuration in which a temporal merge candidate is included in merge candidates to be subjected to bi-/uni-prediction conversion among merge candidates will be effective.

That is, the bi-prediction/uni-prediction conversion unit 1219A performs bi-/uni-prediction conversion on the selected merge candidates. The bi-/uni-prediction conversion has been described above, and a description thereof is thus omitted here.

[Processing Flow]

The processing flow of the bi-prediction/uni-prediction conversion unit 1219A will be described hereinafter with reference to FIG. 71. FIG. 71 is a flowchart illustrating an example of the processing flow of the merge motion compensation parameter derivation unit 1212 and the bi-prediction/uni-prediction conversion unit 1219A.

As illustrated in FIG. 71, the neighboring merge candidate derivation unit 1212A derives neighboring merge candidates (S711). Then, the bi-prediction/uni-prediction conversion unit 1219A performs a bi-/uni-prediction conversion process on the derived neighboring merge candidates (S714). In S714, if the bi-prediction restricted PU determination unit 1218A determines that the restriction of bi-prediction is imposed, the bi-prediction/uni-prediction conversion unit 1219A performs a bi-/uni-prediction conversion process on the first N neighboring merge candidates. In FIG. 71, dotted lines indicate that S714 is executed in parallel to the processing of S711 to S713. Further, the bi-prediction/uni-prediction conversion unit 1219A sequentially acquires the derived merge candidates one by one from the neighboring merge candidate derivation unit 1212A. However, the present invention is not limited to this operation. The bi-prediction/uni-prediction conversion unit 1219A may acquire at one time all the merge candidates derived by the neighboring merge candidate derivation unit 1212A.

Then, the temporal merge candidate derivation unit 1212B derives temporal merge candidates (S712). Then, the bi-prediction/uni-prediction conversion unit 1219A performs a bi-/uni-prediction conversion process on the derived temporal merge candidates (S714). In this case, in S714, the bi-prediction/uni-prediction conversion unit 1219A may perform a bi-/uni-prediction conversion process on the first N temporal merge candidates or perform a bi-/uni-prediction conversion process on all the temporal merge candidates. Alternatively, the bi-/uni-prediction conversion process may be omitted.

Then, other merge candidates are derived (S713). When the bi-/uni-prediction conversion process of the bi-prediction/uni-prediction conversion unit 1219A is completed, the process ends.

[Operations and Effects]

The bi-prediction/uni-prediction conversion unit 1219A sequentially acquires neighboring merge candidates from the neighboring merge candidate derivation unit 1212A, and performs a bi-/uni-prediction conversion process on the first N merge candidates if the restriction of bi-prediction is imposed.

According to the configuration described above, the bi-/uni-prediction conversion process is performed on some of the merge candidates. Accordingly, the processing load imposed by the bi-/uni-prediction conversion process is reduced, compared to the case that the bi-/uni-prediction conversion process is performed on all the merge candidates. Furthermore, a configuration in which bi-/uni-prediction conversion is performed on at least one temporal merge candidate ensures that, even if the restriction of bi-prediction is imposed on 8×8 PU having a relatively large PU size, temporal merge candidates for 8×8 PU are uni-predictive, or available. Accordingly, the reduction in coding efficiency may be minimized. In addition, the merge candidate derivation process and the bi-/uni-prediction conversion process are executed in parallel, resulting in processing being efficiently performed.

(Modifications)

Preferred modifications 1 to 3 of the present configuration will be described.

(Modification 1)

The bi-prediction/uni-prediction conversion unit 1219A may be configured to perform a bi-prediction/uni-prediction conversion process after all the merge candidates have been derived and a merge candidate list has been stored in the merge candidate storage unit 1212H.

Accordingly, a modified configuration illustrated in FIG. 72 is provided. In the configuration illustrated in FIG. 72, the bi-prediction/uni-prediction conversion unit 1219A in the configuration illustrated in FIG. 61 is replaced by a bi-prediction/uni-prediction conversion unit 1219B that performs a bi-/uni-prediction conversion process on a merge candidate list stored in the merge candidate storage unit 1212H in accordance with a merge candidate list completion notification from the merge candidate derivation control unit 1212G.

The bi-/uni-prediction conversion process performed by the bi-prediction/uni-prediction conversion unit 1219B is similar to that performed by the bi-prediction/uni-prediction conversion unit 1219A, and a description thereof is thus omitted here.

[Processing Flow]

The processing flow of the bi-prediction/uni-prediction conversion unit 1219B illustrated in FIG. 72 will be described hereinafter with reference to FIG. 73. FIG. 73 is a flowchart illustrating an example of the processing flow of the merge motion compensation parameter derivation unit 1212 and the bi-prediction/uni-prediction conversion unit 1219B.

S731 to S733 are similar to S101 to S103 described with reference to FIG. 44, and a description thereof is thus omitted here.

If the slice is a B slice in S734 subsequent to S733 (YES in S734), the bi-prediction restricted PU determination unit 1218A determines whether or not to impose the restriction of bi-prediction (S735).

If the restriction of bi-prediction is to be imposed (YES in S735), the bi-prediction/uni-prediction conversion unit 1219B performs bi-/uni-prediction conversion on the first N merge candidates in the merge candidate list (S736). After the execution of bi-/uni-prediction conversion, other merge candidates are derived (S737).

On the other hand, if the slice is not a B slice (NO in S734) or if the restriction of bi-prediction is not to be imposed (NO in S735), other merge candidates are derived without bi-/uni-prediction conversion being performed (S737).

[Operations and Effects]

Since S731 to S733 are executed, after a merge candidate list has been generated in the merge candidate storage unit 1212H, the bi-prediction/uni-prediction conversion unit 1219B performs a bi-/uni-prediction conversion process on the first N merge candidates in the merge candidate list if the restriction of bi-prediction is to be imposed.

According to the configuration described above, the bi-/uni-prediction conversion process is performed on some of the merge candidates. Accordingly, the processing load imposed by the bi-/uni-prediction conversion process may be reduced, compared to the case that the bi-/uni-prediction conversion process is performed on all the merge candidates.

Since S731 to S733 may be configured to be similar to S101 to S103, the configuration illustrated in FIG. 44 does not need to be largely changed for a merge candidate generation process. In this way, a process for partial restriction of bi-prediction may be implemented with a simple change in configuration.

(Comparison)

Here, a comparison between the configuration illustrated in FIG. 61 and FIG. 71 and the configuration illustrated in FIG. 72 and FIG. 73 will be presented.

As already discussed, the configuration illustrated in FIG. 61 and FIG. 71 is a configuration in which the merge candidate derivation process and the bi-/uni-prediction conversion process are executed in parallel.

A timetable of the series of processes is as illustrated in, for example, FIG. 74. In a time chart illustrated in FIG. 74, merge candidates A to E have been derived. Among them, two merge candidates are subjected to bi-/uni-prediction conversion by bi-prediction restriction. It is assumed that the time taken to derive the merge candidates C and E is longer than the time taken to derive the merge candidates A, B, and D.

As illustrated in FIG. 74, the merge candidates A and B are the first two merge candidates among the merge candidates A to E, and are thus targets of bi-/uni-prediction conversion. The bi-/uni-prediction conversion of the merge candidates A and B is performed in parallel to the execution of the merge candidates C and E, which may require a longer processing time. In the example illustrated in FIG. 74, thus, a list creation process is started upon the completion of the derivation process for the merge candidates C and E, and the entire process ends when the list creation process is completed.

In contrast, the configuration illustrated in FIG. 72 and FIG. 73 is a configuration in which the bi-/uni-prediction conversion process is performed after a merge candidate list has been generated.

A time chart of the series of processes is as illustrated in, for example, FIG. 75. Similarly to FIG. 74, in the time chart illustrated in FIG. 75, merge candidates A to E have been derived, and among them, two merge candidates are subjected to bi-/uni-prediction conversion by the restriction of bi-prediction. It is also assumed that the time taken to derive the merge candidates C and E is longer than the time taken to derive the merge candidates A, B, and D.

In the example illustrated in FIG. 75, after merge candidates A to E have been derived, a merge candidate list is completed. After that, bi-/uni-prediction conversion is performed.

Thus, comparing the examples illustrated in FIG. 74 and FIG. 75, in the example illustrated in FIG. 75, a longer time is taken to complete the whole process than that in the example illustrated in FIG. 74 by an amount corresponding to the amount of processing time for bi-/uni-prediction conversion.

In the example illustrated in FIG. 75, on the other hand, it is only required to add the bi-/uni-prediction conversion process after the creation of a merge candidate list, and the logic from the derivation of merge candidates to the creation of a merge candidate list does not need to be changed.

In the example illustrated in FIG. 74, merge candidates which have been subjected to bi-/uni-prediction conversion are stored in the merge candidate storage unit 1212H as a merge candidate list, and then a unique check is performed. Accordingly, in the example illustrated in FIG. 73, the uniqueness of the merge candidates included in the merge candidate list is maintained, compared to the case that, as illustrated in FIG. 75, bi-/uni-prediction conversion is performed on merge candidates included in the created merge candidate list.

Although disadvantageous in the time chart, a configuration of a type in which the bi-prediction/uni-prediction conversion unit 1219A and the bi-prediction/uni-prediction conversion unit 1219B are combined may be used. Specifically, the following configuration may be used: bi-/uni-prediction conversion is performed only on a temporal merge candidate at the time when the merge candidates are derived (before a merge candidate list is stored), and bi-/uni-prediction conversion is performed on other merge candidates after a merge candidate list has been stored. This ensures that bi-/uni-prediction conversion is performed using a valid temporal merge candidate for the restriction of bi-prediction on 8×8 PU, and also allows bi-/uni-prediction conversion with a simple configuration.

(Modification 2)

The bi-prediction/uni-prediction conversion unit 1219B may perform bi-/uni-prediction conversion in accordance with the number of uni-predictive merge candidates in a merge candidate list.

Specifically, the bi-prediction/uni-prediction conversion unit 1219B counts the number of uni-predictive merge candidates at the time when merge candidates are derived, and may perform bi-/uni-prediction conversion on the first N merge candidates only in a case that the merge candidate list does not include N or more uni-predictive merge candidates, where N is a positive integer and may be equal to 1, for example.

According to the configuration described above, bi-/uni-prediction conversion does not need to be performed if a merge candidate list includes N or more uni-predictive merge candidates. Accordingly, the load imposed by the merge candidate derivation process may be reduced.

(Modification 3)

The bi-prediction/uni-prediction conversion unit 1219A or the bi-prediction/uni-prediction conversion unit 1219B may perform bi-/uni-prediction conversion in accordance with whether or not two motion vectors for bi-predictive merge candidates are non-integer motion vectors.

The term "non-integer motion vector", as used herein, refers to a motion vector at least some components of which are represented in non-integer format when pixel positions are expressed as integer values. In contrast, a motion vector all the components of which are represented in integer format when pixel positions are expressed as integer values is referred to as an "integer motion vector".

An interpolation filter is applied to non-integer motion vectors to generate an interpolated image, leading to an increase in processing load. Furthermore, the range of reference pixels necessary for motion compensation increases, resulting in a tendency that the amount of transfer increases because the transfer of the reference pixels. In contrast, the filter process described above is not required for integer motion vectors.

For integer motion vectors, a reference range necessary for motion compensation is the same as the target block. Thus, in a case that integer motion vectors are included in bi-prediction, the amount of transfer and the amount of processing are not large even if bi-prediction is performed.

Accordingly, the bi-prediction/uni-prediction conversion unit 1219A or the bi-prediction/uni-prediction conversion unit 1219B may omit the bi-/uni-prediction conversion operation if at least one of two motion vectors for bi-predictive merge candidates is an integer motion vector.

That is, the bi-prediction/uni-prediction conversion unit 1219A or the bi-prediction/uni-prediction conversion unit 1219B may perform bi-/uni-prediction conversion only in a case that two motion vectors for bi-predictive merge candidates are non-integer motion vectors.

The bi-prediction/uni-prediction conversion unit 1219A or the bi-prediction/uni-prediction conversion unit 1219B may have the following configuration. The bi-prediction/uni-prediction conversion unit 1219A or the bi-prediction/uni-prediction conversion unit 1219B may omit the bi-/uni-prediction conversion operation if two motion vectors for bi-predictive merge candidates are integer motion vectors.

In addition, the bi-prediction/uni-prediction conversion unit 1219A or the bi-prediction/uni-prediction conversion unit 1219B may perform bi-/uni-prediction conversion if at least one of two motion vectors for bi-predictive merge candidates is a non-integer motion vector.

According to the configuration described above, not all the bi-predictive merge candidates may be subjected to bi-/uni-prediction conversion. Accordingly, the conversion of merge candidates for the restriction of bi-prediction may be minimized.

[2-3-4] Conversion of Motion Vectors into Integers

The conversion of motion vectors into integers will be described hereinafter with reference to FIG. 76 to FIG. 80. First, a configuration for converting motion vectors into integers will be disclosed with reference to FIG. 76. In the configuration illustrated in FIG. 76, the bi-prediction/uni-prediction conversion unit 1219A in the configuration illustrated in FIG. 61 is replaced by a motion-vector-to-integer conversion unit 1220.

The motion-vector-to-integer conversion unit 1220 converts at least one component among one or more non-integer components included in non-integer motion vectors into an integer component. The conversion performed by the motion-vector-to-integer conversion unit 1220 is hereinafter referred to as the conversion of motion vectors into integers.

More specifically, in a case that the restriction of bi-prediction is to be imposed, if the merge candidates input from the neighboring merge candidate derivation unit 1212A or the temporal merge candidate derivation unit 1212B include bi-predictive merge candidates, the motion-vector-to-integer conversion unit 1220 determines whether or not the two motion vectors of the bi-predictive merge candidates are non-integer motion vectors. If at least one of the two motion vectors of the bi-predictive merge candidates is a non-integer motion vector, the motion-vector-to-integer conversion unit 1220 converts the non-integer motion vector into an integer.

A specific example of the integer formation process will be described with reference to FIG. 77 to FIG. 80. FIG. 77 to FIG. 80 are diagrams illustrating a specific example of the integer formation process of the motion-vector-to-integer conversion unit 1220.

In the following, it is assumed that motion vectors are represented using two-dimensional (X, Y) coordinate notation. In the following description, furthermore, for convenience of description, it is assumed that the term "non-integer motion vector" refers to a non-integer motion vector whose X component and Y component are non-integers. mv_Lx represents the motion vector for a list Lx (x=0 or 1). mv_Lx[0] represents the X component of a motion vector, and mv_Lx[1] represents the Y component of a motion vector.

[Conversion of X Coordinate into Integer]

As illustrated by way of example in FIG. 77, the motion-vector-to-integer conversion unit 1220 may convert the X coordinate of a motion vector into an integer. The following is a description of the individual steps S in the pseudo code illustrated in FIG. 77.

S771: It is determined whether or not a motion vector of L0 is a non-integer vector. The least significant two bits of a coordinate component of a motion vector are bits indicating the decimal position. "mv_L0[x] & 3" (x=0 or 1) indicates the determination of whether or not the least significant two bits of a coordinate component are "11 (3)", and the determination of whether or not the coordinate position indicates the decimal position.

S772: If the motion vector of L0 is a non-integer vector, the least significant two bits of the X coordinate of L0 are set to "00" to convert the X coordinate of the motion vector of L0 into an integer. "~" is the bitwise negation operator, and "~3" represents a bitwise negation of "11", or "00". "&=" is the bitwise AND assignment operator. For example, "A &=B" means "A=A & B".

S773: It is determined whether or not a motion vector of L1 is a non-integer vector.

S774: If the motion vector of L1 is a non-integer vector, the X coordinate of the motion vector of L1 is converted into an integer.

[Conversion of Y Coordinate into Integer]

As illustrated by way of example in FIG. 78, the motion-vector-to-integer conversion unit 1220 may convert the Y coordinate of a motion vector into an integer. The following is a description of the individual steps S in the pseudo code illustrated in FIG. 78.

S781: It is determined whether or not a motion vector of L0 is a non-integer vector.

S782: If the motion vector of L0 is a non-integer vector, the Y coordinate of the motion vector of L0 is converted into an integer.

S783: It is determined whether or not a motion vector of L1 is a non-integer vector.

S784: If the motion vector of L1 is a non-integer vector, the Y coordinate of the motion vector of L1 is converted into an integer.

[Conversion of X Coordinate and Y Coordinate into Integers]

As illustrated by way of example in FIG. 79, the motion-vector-to-integer conversion unit 1220 may convert the X coordinate and Y coordinate of a motion vector into integers. The following is a description of the individual steps S in the pseudo code illustrated in FIG. 79.

S791: It is determined whether or not a motion vector of L0 is a non-integer vector.

S792: If the motion vector of L0 is a non-integer vector, the X coordinate and Y coordinate of the motion vector of L0 are converted into integers.

S793: It is determined whether or not a motion vector of L1 is a non-integer vector.

S794: If the motion vector of L1 is a non-integer vector, the X coordinate and Y coordinate of the motion vector of L1 are converted into integers.

[Conversion of X Coordinate and Y Coordinate for One List into Integers]

As illustrated by way of example in FIG. 80, the motion-vector-to-integer conversion unit 1220 may convert the X coordinate and Y coordinate of a motion vector of either list into integers. The following is a description of the individual steps S in the pseudo code illustrated in FIG. 80.

S801: It is determined whether or not a motion vector of LX is a non-integer vector (where X=0 or 1).

S802: If the motion vector of LX is a non-integer vector, the X coordinate and Y coordinate of the motion vector of LX are converted into integers.

[Operations and Effects]

As already discussed, a filter process with an interpolation filter is not required for integer motion vectors. Thus, the reference range to be referred to for motion compensation matches the target block. Accordingly, the amount of processing for the filter process and the amount of transfer of reference pixels are not large even if bi-prediction is performed.

If at least one of bi-predictive motion vectors is a non-integer motion vector whose X coordinate and Y coordinate are non-integer components, at least one non-integer component of non-integer motion vectors each having non-integer components for the X coordinates and Y coordinates is converted into an integer component, which may suppress the increase in the amount of processing and the amount of transfer compared to the case that the non-integer motion vectors are processed as they are.

Additionally, the conversion of non-integer motion vectors into integer motion vectors allows the reference range to match the target block. Accordingly, a further reduction in the amount of processing and the amount of transfer may be achieved.

The motion-vector-to-integer conversion unit 1220 may apply the integer formation process described above to a non-integer motion vector one of the X coordinate and Y coordinate of which is not a non-integer component.

(3) Details of TU Information Decoding Unit

Figure 16:
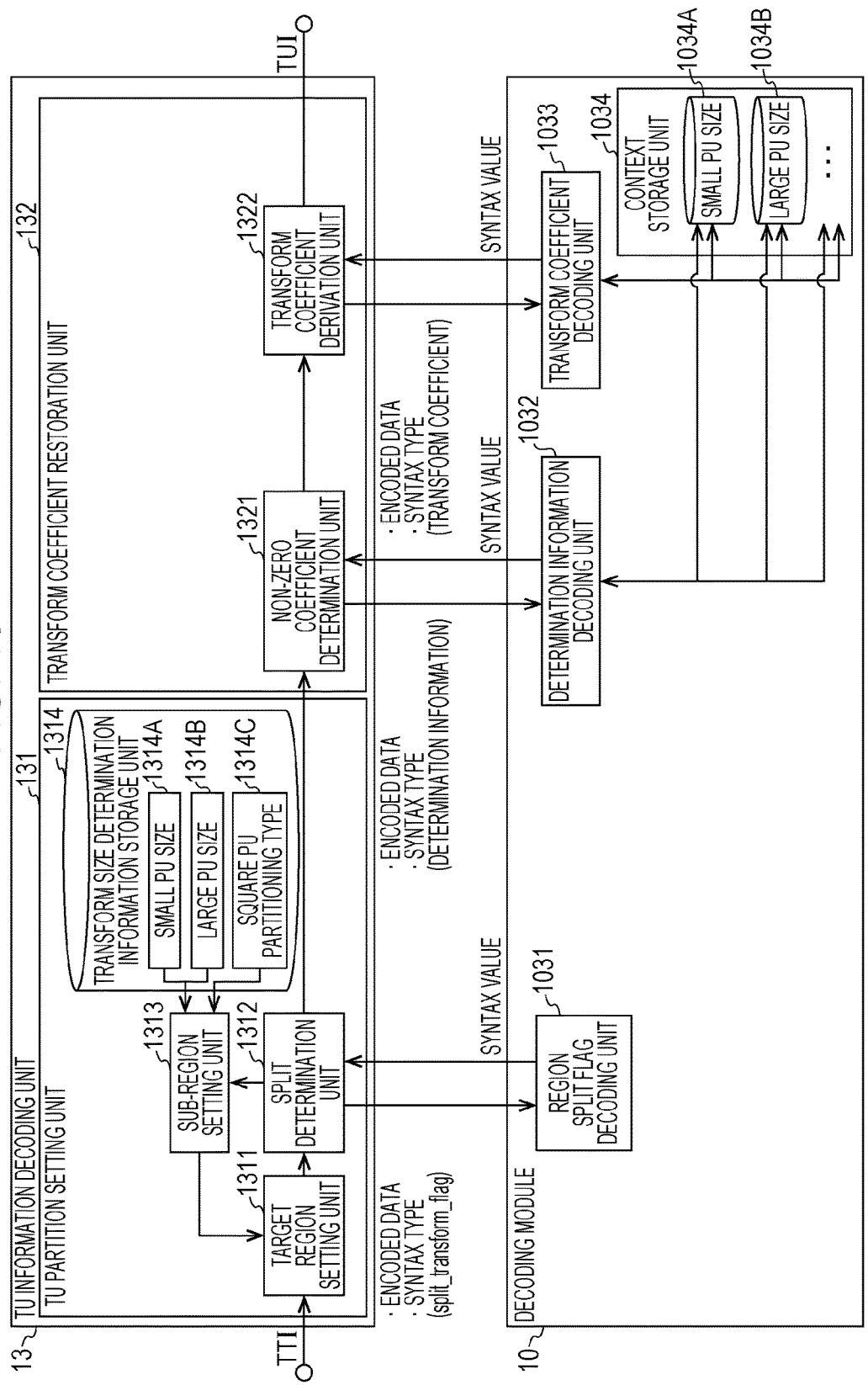
FIG. 16 is a functional block diagram illustrating an example configuration of a TU information decoding unit and a decoding module in the video decoding device.

Next, an example configuration of the TU information decoding unit 13 and the decoding module 10 will be described with reference to FIG. 16. FIG. 16 is a functional block diagram exemplifying a configuration in which the video decoding device 1 performs a TU partition decoding process, a transform coefficient decoding process, and a prediction residual derivation process, that is, the configuration of the TU information decoding unit 13 and the decoding module 10.

The configuration of the individual components in the TU information decoding unit 13 and the decoding module 10 will be described hereinafter in this order.

[TU Information Decoding Unit]

As illustrated in FIG. 16, the TU information decoding unit 13 includes a TU partition setting unit 131 and a transform coefficient restoration unit 132.

The TU partition setting unit 131 is configured to set a TU partitioning scheme on the basis of the parameters decoded from the encoded data, the CU size, and the PU partition type. The transform coefficient restoration unit 132 is configured to restore the prediction residuals of the individual TUs in accordance with the TU partition set by the TU partition setting unit 131.

[TU Partition Setting Unit]

First, the details of the TU partition setting unit 131 will be described with reference to FIG. 16. More specifically, the TU partition setting unit 131 includes a target region setting unit 1311, a split determination unit 1312, a sub-region setting unit (transform unit splitting means, splitting means) 1313, and a transform size determination information storage unit 1314.

The target region setting unit 1311 sets a target node, which is a target region. When the TU partitioning process for the target transform tree is started, the target region setting unit 1311 sets the entire target CU as an initial value of the target region. The partition depth is set to "0".

The split determination unit 1312 decodes information (split_transform_flag) indicating whether or not to split the target node set by the target region setting unit 1311, using a region split flag decoding unit 1031, and determines whether or not the splitting of the target node is required on the basis of the decoded information.

The sub-region setting unit 1313 sets sub-regions for the target node that is determined by the split determination unit 1312 to be required to be split. Specifically, the sub-region setting unit 1313 adds 1 to the partition depth for the target node determined to be required to be split, and splits the target node on the basis of the transform size determination information stored in the transform size determination information storage unit 1314.

Each target node obtained by splitting is further set as a target region by the target region setting unit 1311.

In TU partitioning, the series of processes of the "setting of a target region", the "determination of splitting", and the "setting of sub-regions" is recursively repeated for a target node, which has been split, by the target region setting unit 1311, the split determination unit 1312, and the sub-region setting unit 1313.

The transform size determination information storage unit 1314 stores transform size determination information indicating the partitioning scheme for a target node. The transform size determination information is, specifically, information that defines the correspondences between CU sizes, TU partition depths (trafoDepth), PU partition types of the target PU, and TU partition patterns.

A specific example of the configuration of the transform size determination information will now be described with reference to FIG. 17. In the transform size determination information illustrated in FIG. 17, TU partition patterns are defined in accordance with CU sizes, TU partition depths (trafoDepth), and PU partition types of the target PU. In the table, "d" represents the CU partition depth.

In the transform size determination information, the following four CU sizes are defined: 64×64, 32×32, 16×16, and 8×8.

In the transform size determination information, furthermore, selectable PU partition types are defined in accordance with CU sizes.

For CU sizes of 64×64, 32×32, and 16×16, any of 2N×2N, 2N×nU, 2N×nD, N×2N, nL×2N, and nR×2N may be selectable as a PU partition type.

For a CU size of 8×8, any of 2N×2N, 2N×N, and N×2N may be selectable as a PU partition type.

In the transform size determination information, furthermore, TU partition patterns are defined for respective TU partition depths in accordance with CU sizes and PU partition types.

For example, for a CU size of 64×64, the details are as follows. First, a TU partition depth of "0" is not defined, and a 64×64 CU is forcibly split (which is indicated by *1 in FIG. 17). The reason for this is that the maximum size of a transform unit is defined as 32×32.

For TU partition depths of "1" and "2", different TU partition patterns are defined for the case that only square quadtree partitions are included and the case that only non-square quadtree partitions are included.

For the PU partition type of 2N×2N and the TU partition pattern including only square quadtree partitions, a 32×32 square quadtree partition is defined at a TU partition depth of "1", and a 16×16 square quadtree partition is defined at a TU partition depth of "2".

The definitions for any of the PU partition types of 2N×2N, 2N×nU, 2N×nD, N×2N, nL×2N, and nR×2N and the TU partition pattern including only non-square quadtree partitions are as follows.

First, a 32×32 square quadtree partition is defined at a TU partition depth of "1". Then, at a TU partition depth of "2", a 32×8 non-square quadtree partition is defined for the PU partition types of 2N×2N, 2N×nU, and 2N×nD, and an 8×32 non-square quadtree partition is defined for the PU partition types of N×2N, nL×2N, and nR×2N.

The example for a CU size of 8×8 is as follows. For a CU size of 8×8, the selectable PU partition types are 2N×2N, 2N×2, and N×2N. For each of the PU partition types, an 8×8 square quadtree partition is defined at a TU partition depth of "1", and a 4×4 square quadtree partition is defined at a TU partition depth of "2". No definition is given at a TU partition depth of "3", and the CU is forced into non-split (which is indicated by *2 in FIG. 17).

The details of TU partitioning in the TU partition setting unit 131 will now be described with reference to FIG. 20. FIG. 20 is a diagram illustrating an example of TU partitions of the CU size of 32×32 and the PU partition type of 2N×N.

When the TU partitioning process starts, the target region setting unit 1311 sets the entire target CU as an initial value of the target region, and also sets depth=0. At depth=0, a PU boundary B1 is indicated by a dotted line at the center in the vertical direction of the region.

Then, the split determination unit 1312 determines whether or not the splitting of the target node is required on the basis of information (split_transform_flag) indicating whether or not to split the target node.

Since split=1 is set, the split determination unit 1312 determines that the target node is split.

The sub-region setting unit 1313 increases the depth by 1, and sets a TU partition pattern for the target node on the basis of transform size determination information. The sub-region setting unit 1313 executes TU partitioning on the target region, or the target CU, with depth=1.

In accordance with the definition of the transform size determination information illustrated in FIG. 17, at depth=1, the sub-region setting unit 1313 splits the target node into 32×8 regions using quadtree partitioning.

Accordingly, the target node is split into four landscape-oriented rectangular regions TU0, TU1, TU2, and TU3 using a partitioning scheme illustrated in part (b) of FIG. 18.

Further, the target region setting unit 1311 sequentially sets the respective nodes of TU0, TU1, TU2, and TU3 as target regions at the partition depth of depth=1.

Since split=1 is set for TU1, the split determination unit 1312 determines that TU1 is split.

The sub-region setting unit 1313 executes TU partitioning on TU1 with depth=2. In accordance with the definition of the transform size determination information illustrated in FIG. 17, at depth=2, the sub-region setting unit 1313 splits the target node into 16×4 regions using quadtree partitioning.

Accordingly, the target node TU1 is split into four landscape-oriented rectangular regions TU1-0, TU1-1, TU1-2, and TU1-3 using a partitioning scheme illustrated in part (a) of FIG. 19.

[3-1] Example of Configuration for Derivation of Sub-Region Size when PU Partition Type is Asymmetric For an asymmetric PU partition type, the sub-region setting unit 1313 may be configured to apply rectangular (non-square) transform to smaller PUs and to apply square transform to at least some of larger PUs.

For example, the transform size determination information stored in the transform size determination information storage unit 1314 includes pieces of definition information, namely, a small PU size 1314A and a large PU size 1314B.

The small PU size 1314A has a definition in which rectangular transform is applied to a small size PU among asymmetric PUs obtained by splitting.

The large PU size 1314B has a definition in which square transform is applied to a large size PU among asymmetric PUs obtained by splitting.

Further, the sub-region setting unit 1313 refers to one of the definition information of the small PU size 1314A and the definition information of the large PU size 1314B in accordance with the sizes of the asymmetric PUs obtained by splitting, and sets sub-regions.

TU partitioning with the example configuration described above will now be described with reference to FIG. 21.

Figure 21:
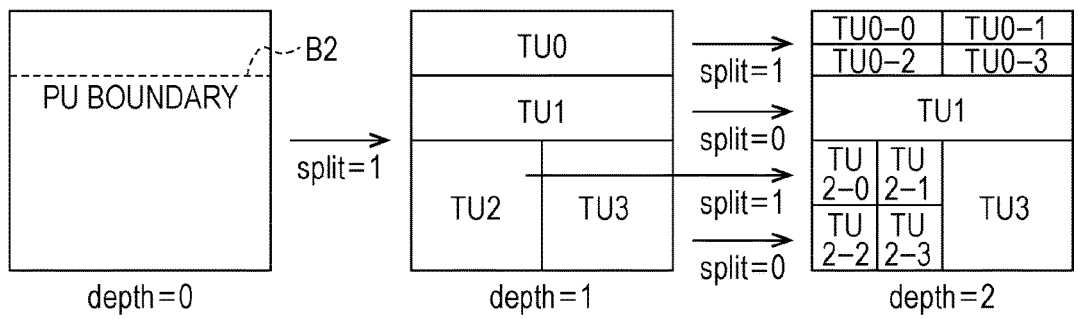
FIG. 21 is a diagram illustrating an example of TU partitions of a 32×32 CU with the PU partition type of 2N×nU.

FIG. 21 is a diagram illustrating an example of TU partitions of the PU partition type of 2N×nU in the example configuration described above.

First, when the TU partitioning process starts, the target region setting unit 1311 sets the entire target CU as an initial value of the target region, and also sets depth=0. At depth=0, a PU boundary B2 is indicated by a dotted line at a position above the center in the vertical direction of the region.

Then, the split determination unit 1312 determines whether or not the splitting of the target node is required on the basis of information (split_transform_flag) indicating whether or not to split the target node.

Since split=1 is set, the split determination unit 1312 determines that the target node is split.

The sub-region setting unit 1313 increases the depth by 1, and sets a TU partition pattern for the target node on the basis of transform size determination information. The sub-region setting unit 1313 executes TU partitioning on the target region, or the target CU, with depth=1.

The sub-region setting unit 1313 performs landscape-oriented rectangular TU partitioning on a small size PU among asymmetric PUs obtained by splitting, in accordance with the small PU size 1314A.

The sub-region setting unit 1313 performs setting so that a larger size PU among asymmetric PUs obtained by splitting includes square TU partitions, in accordance with the large PU size 1314B. As illustrated in FIG. 21, the sub-region setting unit 1313 may perform setting so that a region located near the PU boundary includes rectangular TU sub-regions.

As a result, at depth=1, the sub-region setting unit 1313 splits the target node into two rectangular nodes and two square nodes using quadtree partitioning.

Accordingly, the target node is split into four regions, namely, landscape-oriented rectangular regions TU0 and TU1 and square regions TU2 and TU3.

The target region setting unit 1311 further sequentially sets the respective nodes TU0, TU1, TU2, and TU3 as target regions at the partition depth of depth=1.

Since split=1 is set for TU0 and TU2, the split determination unit 1312 determines that TU0 and TU2 are split.

The sub-region setting unit 1313 executes TU partitioning on TU0 and TU2 with depth=2. At depth=2, the sub-region setting unit 1313 splits TU0 into four landscape-oriented rectangles using TU partitioning, and splits TU2 into four squares using TU partitioning.

Accordingly, TU0 is split into four landscape-oriented rectangular regions TU0-0, TU0-1, TU0-2, and TU0-3. TU2 is split into four landscape-oriented rectangular regions TU2-0, TU2-1, TU2-2, and TU2-3.

As described above, a CU with an asymmetric PU partition type is preferably subjected to TU partitioning so that no partitions lie across the PU boundary and the TU sub-regions obtained by splitting have the same area.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes transform unit splitting means for determining, in a case that a partition type of a target coding unit, which is a coding unit to be decoded, is the asymmetric partition, a partitioning scheme for a transform unit in accordance with a size of a prediction unit included in the target coding unit.

Thus, if the partition type is the asymmetric partition, a partitioning scheme for a transform unit that enables efficient removal if correlations in accordance with the size of a prediction unit included in the target coding unit described above may be selected.

[3-2] Example of Configuration for Applying Non-Rectangular Transform when PU Partition Type is a Square Partition for some CU Sizes

[Example Configuration 3-2-1]

The sub-region setting unit 1313 may split a target node into non-square regions if the PU partition type is a square partition.

To that end, in the transform size determination information stored in the transform size determination information storage unit 1314, a square PU partition type 1314C that defines a target node as being split into non-square regions may be defined if the PU partition type is a square partition.

If the PU partition type is a square partition, the sub-region setting unit 1313 splits a target node into non-square regions by referring to the square PU partition type 1314C.

If the CU size is 32×32 size and the PU partition type is 2N×2N, the sub-region setting unit 1313 may split a region into 32×8 nodes using TU partitioning.

If the CU size is 32×32 size and the PU partition type is 2N×2N, the sub-region setting unit 1313 may additionally decode information indicating the partitioning scheme for TU partitions, and split a region into 32×8, 16×16, or 8×32 nodes on the basis of the decoded information.

If the CU size is 32×32 size and the PU partition type is 2N×2N, the sub-region setting unit 1313 may estimate the TU size at which the target CU is split, on the basis of the size and PU partition type of the neighboring CUs. The sub-region setting unit 1313 may also estimate the TU size as given in the following items (i) to (iii).

(i) If a CU boundary or a PU boundary is present near the left side and a boundary between a CU boundary and a PU boundary is not present near the upper side, 32×8 is selected.

(ii) If a CU boundary or a PU boundary is present near the upper side and a boundary between a CU boundary and a PU boundary is not present near the left side, 8×32 is selected.

(iii) Otherwise than the items (i) and (ii) above (if a boundary is present near the left side or near the upper side or no boundary is present near the left side or near the upper side), 16×16 is selected.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partitioning schemes in which a coding unit is split into the transform units include square partitioning and rectangular partitioning. The image decoding device includes splitting means for splitting a target transform unit using a rectangular partitioning scheme in a case that a target prediction unit, which is a prediction unit to be decoded, has a square shape.

The operations and effects achieved by the configuration described above are as follows. In some cases, square prediction units may be selected even though edges are present in the region and the image has directionality. For example, in a case that an object including a large number of horizontal edges is moving, motion is uniform over the entire object. Thus, square prediction units are selected. In the transform process, however, preferably, transform units having a shape that is long in the horizontal direction along the horizontal edges are applied.

According to the configuration described above, in a case that a target prediction unit, which is the prediction unit to be decoded, has a square shape, a target transform unit is split using a rectangular partitioning scheme.

Accordingly, a rectangular transform unit may also be selected in a square coding unit, resulting in improved coding efficiency for the region described above.

[Example Configuration 3-2-2]

In addition to the configuration 3-2-1 described above, for the CU size of 16×16 size and the PU partition type of 2N×2N, the sub-region setting unit 1313 performs splitting as follows at the respective partition depths.

At a partition depth equal to 1, splitting into 16×4 TUs is performed.

At a partition depth equal to 2, splitting into 4×4 TUs is performed.

The configuration described above allows a uniform scan order in 4×4 TUs regardless of the PU partition type of a 16×16 CU. If the scan order is not uniform in 4×4 TUs because of different PU partition types of a 16×16 CU, the scanning process needs to be changed in accordance with the PU partition types of the 16×16 CU, causing an increased complexity of processing. Such non-uniformity in scan order might create a bottleneck in processing.

According to the configuration described above, uniformity of the scan order may achieve the advantage of simplified processing.

Figure 22:
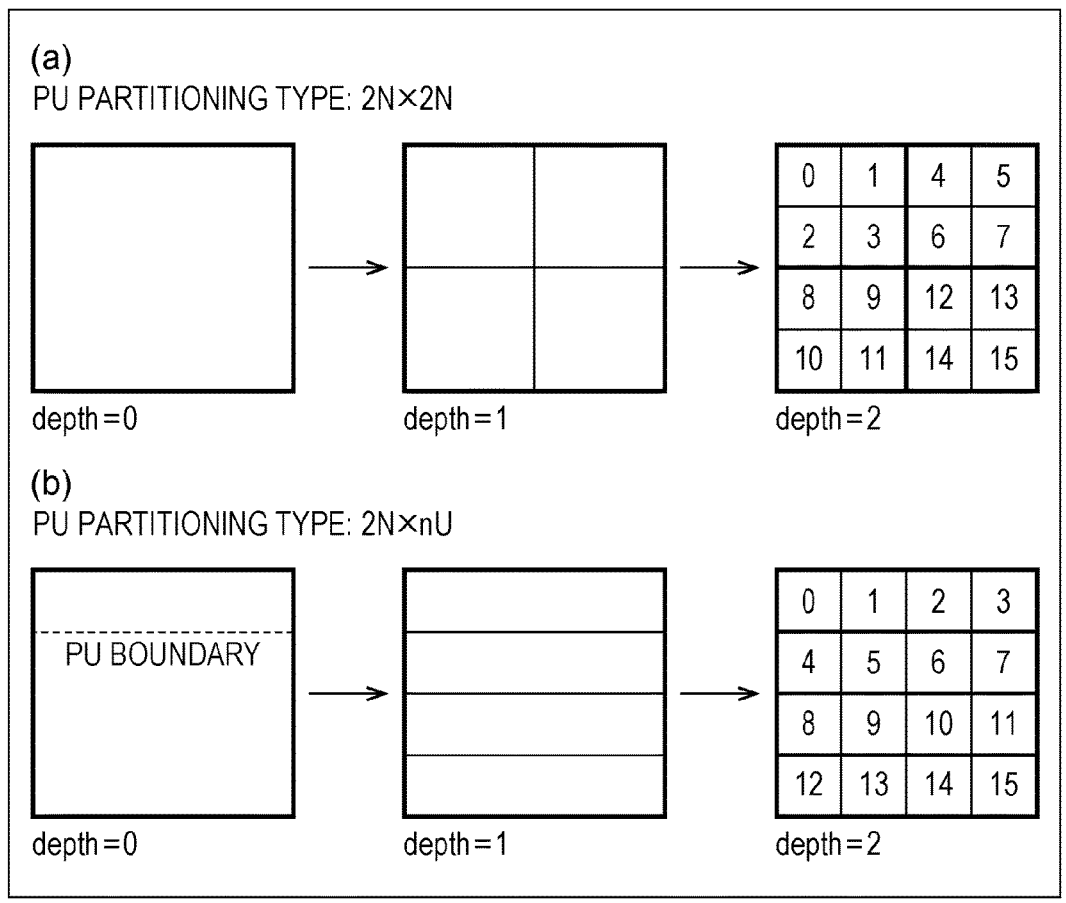
FIG. 22 includes diagrams illustrating the flow of TU partitioning in a case that a split is performed in accordance with the transform size determination information illustrated in FIG. 17. Part (a) of FIG. 22 illustrates the PU partition type of 2N×2N, and part (b) of FIG. 22 illustrates the PU partition type of 2N×nU.
Figure 23:
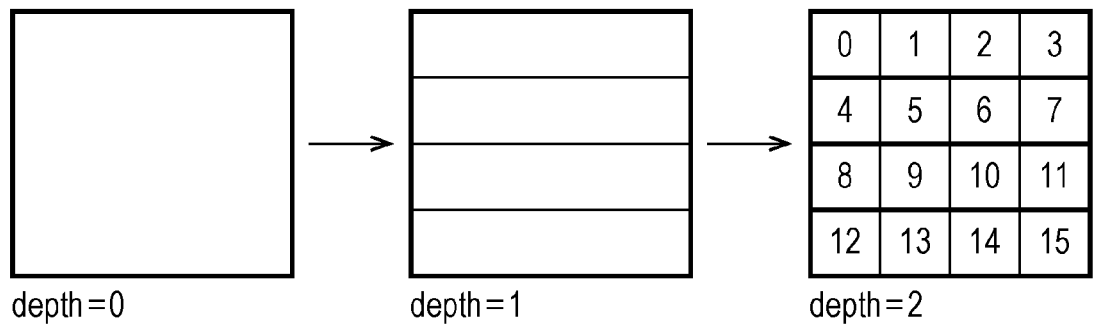
FIG. 23 is a diagram illustrating an example of the flow of TU partitioning in a case that a region with the PU partition type of 2N×2N is split.

More details will now be described with reference to FIG. 22 and FIG. 23. First, a description will be given of TU partitions illustrated in FIG. 22. FIG. 22 illustrates the flow of TU partitioning in a case that a split is performed in accordance with the transform size determination information illustrated in FIG. 17.

As illustrated in part (a) of FIG. 22, for the PU partition type of 2N×2N: at depth=1, the sub-region setting unit 1313 splits the target node using square quadtree partitioning. At depth=2, the sub-region setting unit 1313 further splits each of the square nodes obtained by splitting, using square quadtree partitioning. Here, the recursive z-scan order is used. The details are as illustrated in FIG. 22.

As illustrated in part (b) of FIG. 22, for the PU partition type of 2N×nU: at depth=1, the sub-region setting unit 1313 splits the target node using landscape-oriented rectangular quadtree partitioning. At depth=2, the sub-region setting unit 1313 further splits each of the landscape-oriented rectangular nodes obtained by splitting, using square quadtree partitioning. Here, raster scan order is used as the scan order of the TUs. The details are as illustrated in FIG. 22.

Next, a description will be given of the TU partitioning illustrated in FIG. 23. FIG. 23 illustrates the flow of TU partitioning in a case that a region with the PU partition type of 2N×2N is split in accordance with the square PU partition type 1314C.

For the PU partition type of 2N×2N: at depth=1, the sub-region setting unit 1313 splits the target node using landscape-oriented rectangular quadtree partitioning. At depth=2, the sub-region setting unit 1313 further splits each of the landscape-oriented rectangular nodes obtained by splitting, using square quadtree partitioning.

As a result, raster scan order is used. Accordingly, a common scan order, or raster scan order, can be used for the PU partition type of 2N×nU and the PU partition type of 2N×2N.

[Transform Coefficient Restoration Unit]

The details of the transform coefficient restoration unit 132 will be described hereinafter with reference again to FIG. 16. More specifically, the transform coefficient restoration unit 132 includes a non-zero coefficient determination unit 1321 and a transform coefficient derivation unit 1322.

The non-zero coefficient determination unit 1321 decodes non-zero transform coefficient presence or absence information on each TU included in a target CU or on a transform tree using a determination information decoding unit (coefficient decoding means) 1032 to determine whether or not each TU includes a non-zero transform coefficient.

The transform coefficient derivation unit 1322 restores the transform coefficient of each TU including a non-zero transform coefficient using a transform coefficient decoding unit (coefficient decoding means) 1033, and also sets the transform coefficient of each TU not including a non-zero transform coefficient to 0 (zero).

[Decoding Module]

As illustrated in FIG. 16, the decoding module 10 includes the region split flag decoding unit 1031, the determination information decoding unit 1032, the transform coefficient decoding unit 1033, and a context storage unit 1034.

The region split flag decoding unit 1031 decodes syntax values, in accordance with the encoded data and syntax type supplied from the split determination unit 1312, from a binary representation included in the encoded data. The region split flag decoding unit 1031 decodes information (split_transform_flag) indicating whether or not to split the target node.

In accordance with encoded data and syntax type of the non-zero transform coefficient presence or absence information supplied from the transform coefficient derivation unit 1322, the determination information decoding unit 1032 decodes a syntax value from a binary representation included in the encoded data. The syntax elements decoded by the determination information decoding unit 1032 include, specifically, no_residual_data_flag, cbf_luma, cbf_cb, cbf_cr, and cbp.

In accordance with encoded data and syntax type of the transform coefficients supplied from the transform coefficient derivation unit 1322, the transform coefficient decoding unit 1033 decodes a syntax value from a binary representation included in the encoded data. The syntax elements decoded by the transform coefficient decoding unit 1033 include, specifically, level, which is the absolute value of a transform coefficient, the sign of a transform coefficient, and the run of consecutive zeros.

The context storage unit 1034 stores contexts referred to by the determination information decoding unit 1032 and the transform coefficient decoding unit 1033 for decoding processes.

[3-3] Specific Configuration for Referring to Contexts when Decoding Transform Coefficients If the PU partition type is an asymmetric partition, each of the determination information decoding unit 1032 and the transform coefficient decoding unit 1033 may be configured to decode syntax values for transform coefficients using different contexts for TUs included in a smaller PU and TUs included in a larger PU. Examples of such types of syntax elements include a non-zero transform coefficient flag, a transform coefficient level, a run of transform coefficients, and non-zero transform coefficient presence or absence information on each node in the TU tree. The syntax elements described above may be used in combination.

Accordingly, the context storage unit 1034 may store a small PU size 1034A representing probability setting values corresponding to various syntax values for transform coefficients in contexts referred to in TUs included in a smaller PU, and a large PU size 1034B representing probability setting values in contexts referred to in TUs included in a larger PU. The small PU size 1034A and the large PU size 1034B are probability setting values corresponding to different contexts.

The determination information decoding unit 1032 arithmetically decodes Cbf (cbf_luma, cbf_cb, cbf_cr, etc.) for the target TU by referring to the small PU size 1034A if the target TU is included in a small PU or by referring to the large PU size 1034B if the target TU is included in a larger PU.

The transform coefficient decoding unit 1033 arithmetically decodes transform coefficients (level, sign, run, etc.) for the target TU by referring to the small PU size 1034A if the target TU is included in a small PU or by referring to the large PU size 1034B if the target TU is included in a larger PU.

The determination information decoding unit 1032 and the transform coefficient decoding unit 1033 may refer to the small PU size 1034A if the target TU is included in a larger PU and if the target TU is located near a smaller PU.

In other words, even in a case that the target TU is included in a larger PU, if the target TU is located near the PU boundary, the determination information decoding unit 1032 and the transform coefficient decoding unit 1033 may refer to the small PU size 1034A.

A smaller PU may possibly include an edge, and is likely to include a transform coefficient. On the other hand, a larger PU is less likely to include a transform coefficient. A different context is used for the target TU depending on whether the target TU is included in the small PU or the larger PU. Accordingly, variable length decoding may be performed in accordance with the probability of occurrence of the transform coefficient in each region.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include a split into asymmetric partitions that are prediction units having different sizes and a split into symmetric partitions that are prediction units having the same size. The image decoding device includes coefficient decoding means for decoding, in a case that a partition type of a target prediction unit, which is a prediction unit to be decoded, is a split into asymmetric partitions, transform coefficients by referring to different contexts for small and large prediction units obtained by the split.

Thus, variable length decoding may be performed in accordance with the probability of occurrence of transform coefficients in respective regions of transform units included in a small prediction unit and transform units included in a large prediction unit.

(Processing Flow)

Figure 24:
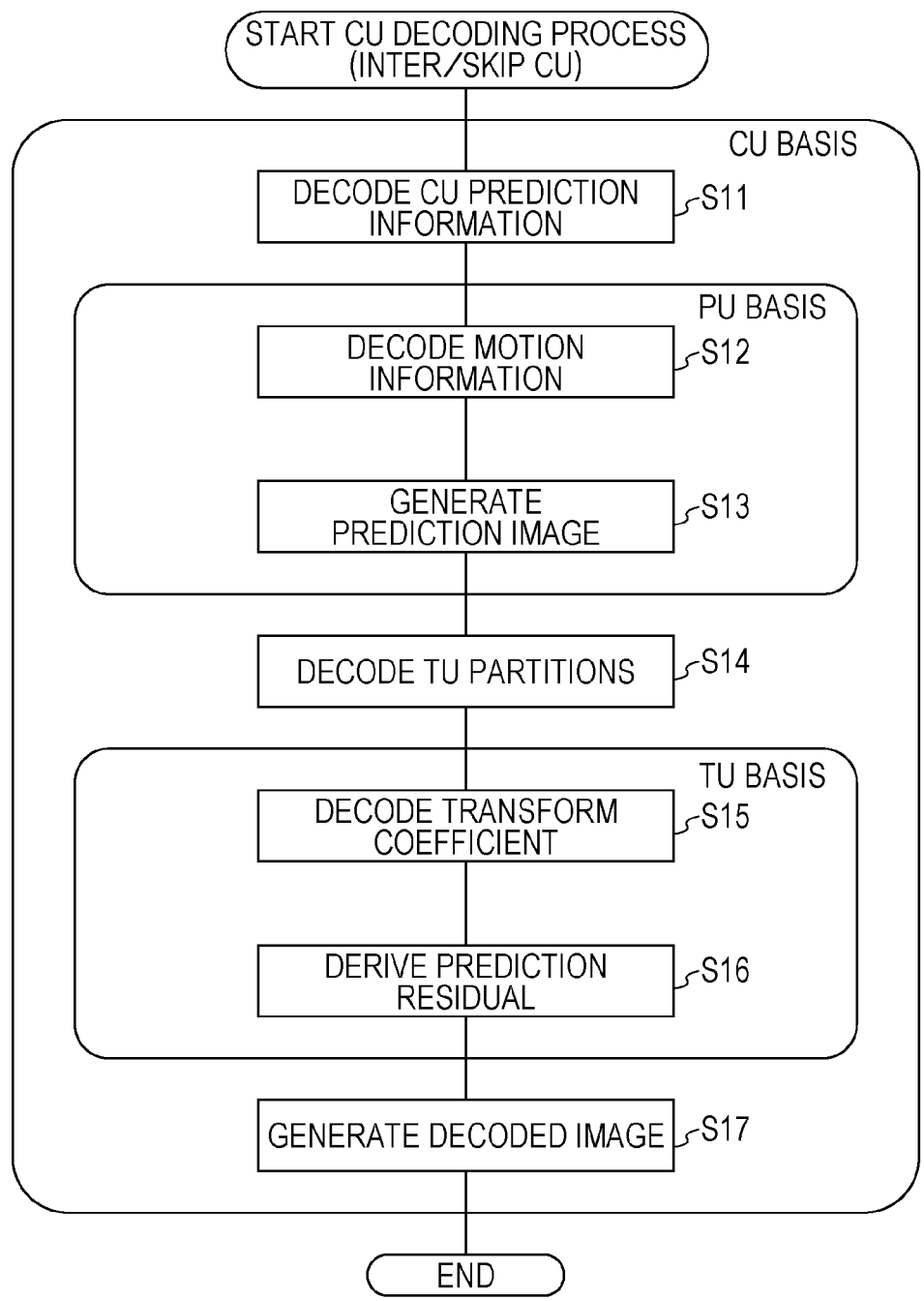
FIG. 24 is a flowchart illustrating an example of the flow of a CU decoding process.

The CU decoding process of the video decoding device 1 will now be described with reference to FIG. 24. In the following, it is assumed that a target CU is an inter CU or a skip CU. FIG. 24 is a flowchart illustrating an example of the flow of the CU decoding process (inter/skip CU) for the video decoding device 1.

When the CU decoding process starts, the CU information decoding unit 11 decodes CU prediction information on the target CU using the decoding module 10 (S11). This process is performed on a per-CU basis.

Specifically, in the CU information decoding unit 11, the CU prediction mode determination unit 111 decodes the skip flag SKIP using the decoding module 10. If the skip flag does not indicate a skip CU, the CU prediction mode determination unit 111 further decodes CU prediction type information Pred_type using the decoding module 10.

Then, processing on a per-PU basis is performed. Specifically, the motion compensation parameter derivation unit 121 in the PU information decoding unit 12 decodes motion information (S12), and the prediction image generation unit 14 generates a prediction image through inter prediction based on the decoded motion information (S13).

Then, the TU information decoding unit 13 performs a TU partition decoding process (S14). Specifically, in the TU information decoding unit 13, the TU partition setting unit 131 sets a TU partitioning scheme on the basis of parameters decoded from the encoded data and the CU size and the PU partition type. This process is performed on a per-CU basis.

Then, processing on a per-TU basis is performed. Specifically, the TU information decoding unit 13 decodes a transform coefficient (S15), and the dequantization/inverse transform unit 15 derives a prediction residual from the decoded transform coefficient (S16).

Then, the adder 17 adds together the prediction image and the prediction residual to generate a decoded image (S17). This process is performed on a per-CU basis.

[Video Encoding Device]

Figure 25:
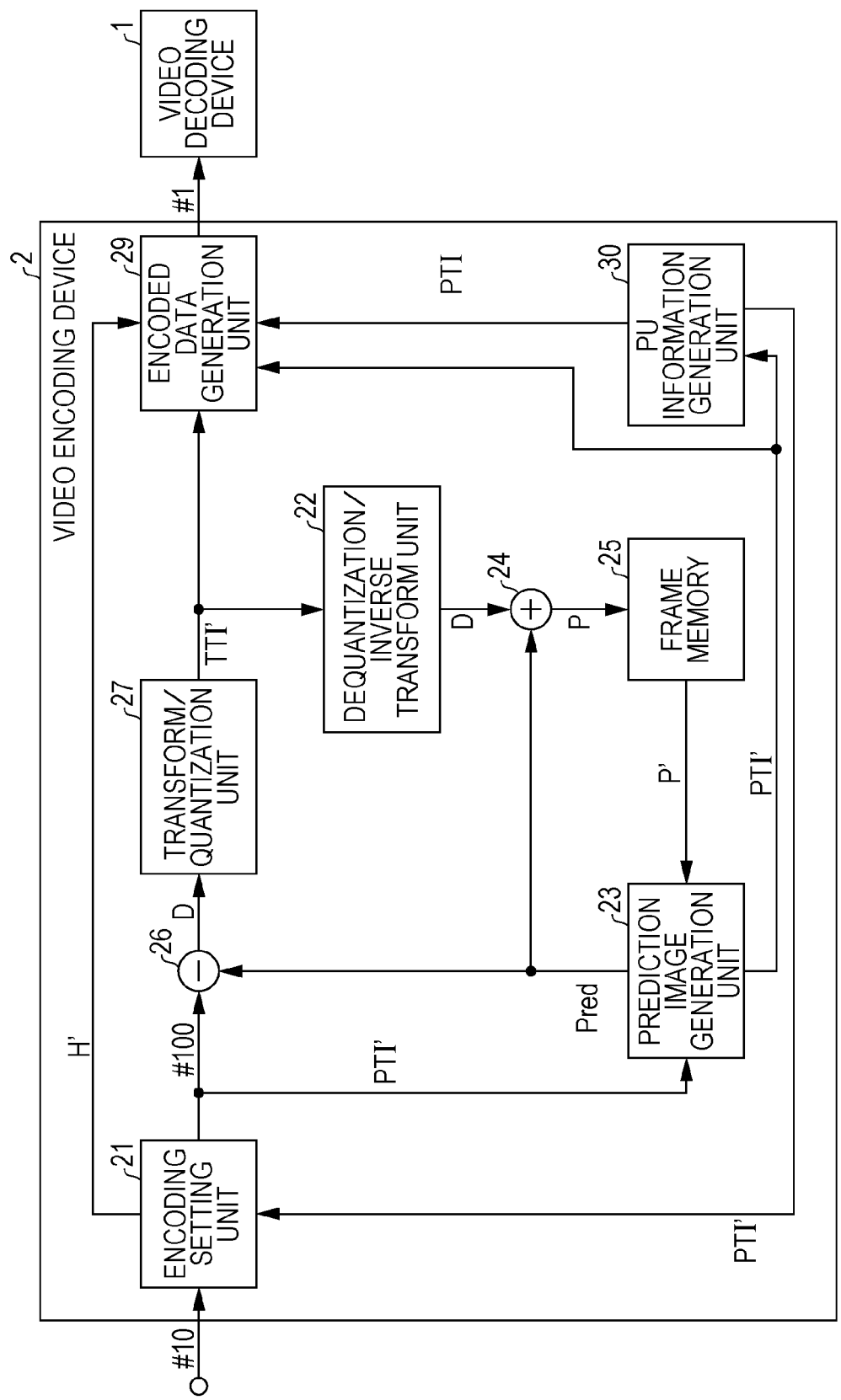
FIG. 25 is a functional block diagram illustrating a schematic configuration of a video encoding device according to an embodiment of the present invention.
Figure 26:
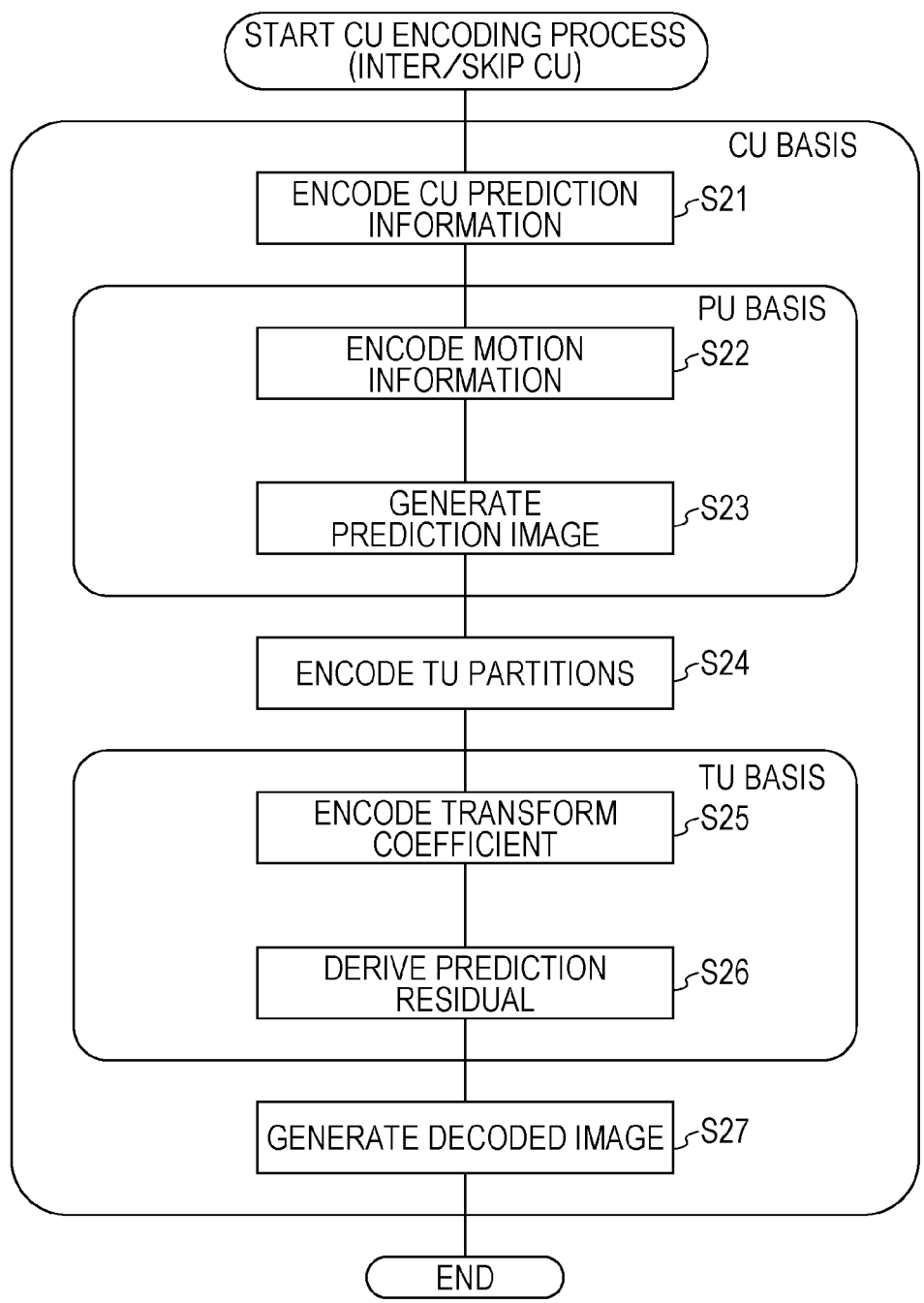
FIG. 26 is a flowchart illustrating an example of the flow of a CU encoding process.

The video encoding device 2 according to the present embodiment will be described hereinafter with reference to FIG. 25 and FIG. 26.

(Overview of Video Encoding Device)

Generally, the video encoding device 2 is a device configured to encode an input image #10 to generate encoded data #1, and to output the encoded data #1.

(Configuration of Video Encoding Device)

First, an example configuration of the video encoding device 2 will be described with reference to FIG. 25. FIG. 25 is a functional block diagram illustrating a configuration of the video encoding device 2. As illustrated in FIG. 25, the video encoding device 2 includes an encoding setting unit 21, a dequantization/inverse transform unit 22, a prediction image generation unit 23, an adder 24, a frame memory 25, a subtractor 26, a transform/quantization unit 27, an encoded data generation unit (encoding means) 29, and a PU information generation unit 30.

The encoding setting unit 21 generates image data and various kinds of setting information concerning encoding, on the basis of the input image #10.

Specifically, the encoding setting unit 21 generates the following image data and setting information.

First, the encoding setting unit 21 sequentially splits the input image #10 into slices and tree blocks to generate a CU image #100 for a target CU.

The encoding setting unit 21 further generates header information H' on the basis of the results of the splitting process. The header information H' includes (1) information on the size and shape of a tree block included in a target slice and the position of the tree block in the target slice, and (2) CU information CU' on the size and shape of CUs of each tree block and the position of CUs in a target tree block.

The encoding setting unit 21 also generates PT setting information PTI' by referring to the CU image #100 and the CU information CU'. The PT setting information PTI' includes information concerning all the combinations of (1) possible patterns of splitting the target CU into individual PUs and (2) possible prediction modes that are allocated to each PU.

The encoding setting unit 21 calculates the cost of each of the combinations of partition patterns and prediction modes, and determines the partition pattern and prediction mode with the lowest cost.

The encoding setting unit 21 supplies the CU image #100 to the subtractor 26. The encoding setting unit 21 further supplies the header information H' to the encoded data generation unit 29. The encoding setting unit 21 further supplies the PT setting information PTI' to the prediction image generation unit 23.

The dequantization/inverse transform unit 22 applies dequantization and inverse orthogonal transform to the quantized prediction residuals for each block, which are supplied from the transform/quantization unit 27, to restore prediction residuals for each block. The inverse orthogonal transform has been described in conjunction with the dequantization/inverse transform unit 15 illustrated in FIG. 2, and a description thereof is thus omitted here.

Further, the dequantization/inverse transform unit 22 integrates the prediction residuals for each block in accordance with a partition pattern specified by TT split information (described below), and generates a prediction residual D for the target CU. The dequantization/inverse transform unit 22 supplies the generated prediction residual D for the target CU to the adder 24.

The prediction image generation unit 23 generates a prediction image Pred for the target CU by referring to a locally decoded image P' recorded on the frame memory 25 and the PT setting information PTI'. The prediction image generation unit 23 sets the prediction parameters obtained by a prediction image generation process in the PT setting information PTI', and transfers the set PT setting information PTI' to the encoded data generation unit 29. The prediction image generation process of the prediction image generation unit 23 is similar to that of the prediction image generation unit 14 in the video decoding device 1, and a description thereof is thus omitted here.

The adder 24 adds together the prediction image Pred supplied from the prediction image generation unit 23 and the prediction residual D supplied from the dequantization/inverse transform unit 22 to generate a decoded image P for the target CU.

Decoded images P, which have been decoded, are sequentially recorded on the frame memory 25. At the time when the target tree block is decoded, the frame memory 25 has recorded thereon decoded images corresponding to all the tree blocks decoded before the target tree block is decoded (for example, all the preceding tree blocks in raster scan order), together with parameters used for the decoding of the decoded images P.

The subtractor 26 subtracts the prediction image Pred from the CU image #100 to generate a prediction residual D for the target CU. The subtractor 26 supplies the generated prediction residual D to the transform/quantization unit 27.

The transform/quantization unit 27 applies orthogonal transform and quantization to the prediction residual D to generate a quantized prediction residual. The term "orthogonal transform", as used herein, refers to an orthogonal transform from the pixel domain to the frequency domain. Examples of the orthogonal transform include DCT transform (Discrete Cosine Transform) and DST transform (Discrete Sine Transform).

Specifically, the transform/quantization unit 27 refers to the CU image #100 and the CU information CU', and determines the pattern in which the target CU is split into one or a plurality of blocks. The transform/quantization unit 27 splits the prediction residual D into prediction residuals for the respective blocks in accordance with the determined partition pattern.

Further, the transform/quantization unit 27 applies orthogonal transform to the prediction residual for each block to generate a prediction residual in the frequency domain. Then, the transform/quantization unit 27 quantizes the prediction residual in the frequency domain to generate a quantized prediction residual for each block.

The transform/quantization unit 27 further generates TT setting information TTI' including the generated quantized prediction residual for each block, TT split information for specifying the partition pattern of the target CU, and information concerning all possible patterns of splitting the target CU into individual blocks. The transform/quantization unit 27 supplies the generated TT setting information TTI' to the dequantization/inverse transform unit 22 and the encoded data generation unit 29.

The PU information generation unit 30 encodes the PT setting information PTI' if the prediction type indicated by the PT setting information PTI' is inter prediction, and derives PT setting information PTI. The PU information generation unit 30 further generates PTI setting information PTI' on merge candidates, and supplies the PTI setting information PTI' to the encoding setting unit 21.

The encoded data generation unit 29 encodes the header information H', the TT setting information TTI', and the PT setting information PTI'. The encoded data generation unit 29 further multiplexes the encoded header information H, TT setting information TTI, and PT setting information PTI to generate encoded data #1, and outputs the encoded data #1.

(Correspondence between Video Encoding Device and Video Decoding Device)

The video encoding device 2 includes a configuration corresponding to the configuration of the video decoding device 1. The term "correspondence", as used herein, is used to indicate a relationship in which the video encoding device 2 and the video decoding device 1 perform similar or opposite operations.

For example, as described above, the prediction image generation process of the prediction image generation unit 14 in the video decoding device 1 is similar to the prediction image generation process of the prediction image generation unit 23 in the video encoding device 2.

For example, a process in which the video decoding device 1 decodes syntax values from a bit sequence is opposite to a process in which the video encoding device 2 encodes a bit sequence from syntax values.

The following description will be given of what correspondence exists between the respective components of the video encoding device 2 and the CU information decoding unit 11, the PU information decoding unit 12, and the TU information decoding unit 13 of the video decoding device 1. Accordingly, the operations and functions of the respective components of the video encoding device 2 will become apparent in more detail.

The encoded data generation unit 29 corresponds to the decoding module 10. More specifically, whereas the decoding module 10 derives syntax values on the basis of encoded data and syntax type, the encoded data generation unit 29 generates encoded data on the basis of syntax values and syntax type.

The encoding setting unit 21 corresponds to the CU information decoding unit 11 of the video decoding device 1. A comparison between the encoding setting unit 21 and the CU information decoding unit 11 will be presented as follows.

The CU information decoding unit 11 supplies encoded data and syntax type for CU prediction type information to the decoding module 10, and determines a PU partition type on the basis of the CU prediction type information decoded by the decoding module 10.

On the other hand, the encoding setting unit 21 determines a PU partition type, and generates CU prediction type information. The encoding setting unit 21 supplies syntax values and syntax type for the CU prediction type information to the encoded data generation unit 29.

The encoded data generation unit 29 may include components similar to the binarization information storage unit 1012, the context storage unit 1013, and the probability setting storage unit 1014 in the decoding module 10.

The PU information generation unit 30 and the prediction image generation unit 23 correspond to the PU information decoding unit 12 and the prediction image generation unit 14 of the video decoding device 1. A comparison between them will be presented as follows.

As described above, the PU information decoding unit 12 supplies encoded data and syntax type for motion information to the decoding module 10, and derives motion compensation parameters on the basis of the motion information decoded by the decoding module 10. The prediction image generation unit 14 generates a prediction image on the basis of the derived motion compensation parameters.

On the other hand, the PU information generation unit 30 and the prediction image generation unit 23 determine motion compensation parameters in a prediction image generation process, and supplies syntax values and syntax type for the motion compensation parameters to the encoded data generation unit 29.

The PU information generation unit 30 and the prediction image generation unit 23 may include components similar to the merge candidate priority information storage unit 122 and the reference frame setting information storage unit 123 in the PU information decoding unit 12.

The transform/quantization unit 27 corresponds to the TU information decoding unit 13 and the dequantization/inverse transform unit 15 of the video decoding device 1. A comparison between them will be presented as follows.

The TU partition setting unit 131 in the TU information decoding unit 13 supplies encoded data and syntax type for information indicating whether or not to split a node to the decoding module 10, and performs TU partitioning on the basis of the information indicating whether or not to split a node, which is decoded by the decoding module 10.

The transform coefficient restoration unit 132 in the TU information decoding unit 13 supplies encoded data and syntax type for determination information and transform coefficients to the decoding module 10, and derives transform coefficients on the basis of the determination information and transform coefficients decoded by the decoding module 10.

On the other hand, the transform/quantization unit 27 determines a partitioning scheme for TU partitions, and supplies syntax values and syntax type for information indicating whether or not to split a node to the encoded data generation unit 29.

The transform/quantization unit 27 further supplies syntax values and syntax type for quantized transform coefficients obtained by applying transform and quantization to prediction residuals to the encoded data generation unit 29.

The transform/quantization unit 27 may include a configuration similar to that of the transform size determination information storage unit 1314 in the TU partition setting unit 131. The encoded data generation unit 29 may include a configuration similar to that of the context storage unit 1034 in the decoding module 10.

(Details of PU Information Generation Unit 30)

FIG. 55 is a block diagram illustrating a configuration of the PU information generation unit 30. The PU information generation unit 30 includes a motion compensation parameter generation unit 301 configured to generate motion compensation parameters. The motion compensation parameter generation unit 301 includes a bi-prediction restricted PU determination unit 1218, a bi-prediction/uni-prediction conversion unit 1219, a merge motion compensation parameter generation unit 3012, and a basic motion compensation parameter generation unit 3013. The merge motion compensation parameter generation unit 3012 generates merge candidates, and supplies the merge candidates to the encoding setting unit 21 as PTI setting information PTI'. The merge motion compensation parameter generation unit 3012 further outputs an index for selecting a merge candidate as PT setting information PTI. The basic motion compensation parameter generation unit 3013 encodes the PT setting information PTI from the input PTI setting information PTI', here, motion compensation parameters.

Next, a more detailed configuration of the merge motion compensation parameter generation unit 3012 will be described hereinafter with reference to FIG. 56. FIG. 56 is a block diagram illustrating a configuration of the merge motion compensation parameter generation unit 3012. Motion parameters for a skip PU are also derived by the merge motion compensation parameter generation unit 3012.

The merge motion compensation parameter generation unit 3012 includes a neighboring merge candidate derivation unit 1212A, a temporal merge candidate derivation unit 1212B, a unique candidate derivation unit 1212C, a combined bi-predictive merge candidate derivation unit 1212D, a non-scaled bi-predictive merge candidate derivation unit 1212E, a zero vector merge candidate derivation unit 1212F, a merge candidate derivation control unit 1212G, and a merge candidate storage unit 1212H.

In a merge candidate derivation process, similarly to that of the merge motion compensation parameter derivation unit 1212, a small size PU on which the bi-prediction restricted PU determination unit 1218 has determined to impose the restriction of bi-prediction is subjected to conversion into motion compensation parameters for uni-prediction, in the case of bi-prediction, using the bi-prediction/uni-prediction conversion unit 1219. Accordingly, only uni-predictive merge candidates are derived. The details of the respective units have already been described, and a description thereof is thus omitted.

The merge motion compensation parameter generation unit 3012 generates merge candidates, and supplies the merge candidates to the encoding setting unit 21 as PTI setting information PTI'. The merge motion compensation parameter generation unit 3012 also supplies a merge index to the encoded data generation unit 29 as PT setting information PTI.

Next, a more detailed configuration of the basic motion compensation parameter generation unit 3013 will be described hereinafter with reference to FIG. 57. FIG. 57 is a block diagram illustrating a configuration of the basic motion compensation parameter generation unit 3013. The basic motion compensation parameter generation unit 3013 includes a neighboring motion vector candidate derivation unit 1213A, a temporal motion vector candidate derivation unit 1213B, a zero vector merge candidate derivation unit 1213F, a motion vector candidate derivation control unit 1213G, a motion vector candidate storage unit 1213H, a motion vector candidate selection unit 3013A, and a differential motion vector calculation unit 3013B.

The process for deriving predictive motion vector candidates is similar to that of the basic motion compensation parameter derivation unit 1213 illustrated in FIG. 54, and a description thereof is thus omitted. The motion vector candidate selection unit 3013A selects the predictive motion vector candidate that is nearest the supplied predictive motion vector from the predictive motion vector candidates stored in the motion vector candidate storage unit 1213H, and derives the index of the selected predictive motion vector candidate as a predictive motion vector index. The selected predictive motion vector is supplied to the differential motion vector calculation unit 3013B. The differential motion vector calculation unit 3013B calculates the difference between the supplied motion vector and the predictive motion vector as a differential motion vector. The inter prediction flag, the reference index number, the derived predictive motion vector index, and the differential motion vector are supplied to the encoded data generation unit 29 as PT setting information PT.

(Correspondence between Video Encoding Device and Specific Configuration)

[1]' Encoding Setting Unit and Encoded Data Generation Unit

[1-1]' Example of Configuration for Restricting References to Contexts

If the PU partition type is an asymmetric partition, the encoded data generation unit 29 may perform an encoding process on information indicating the partition type of the asymmetric partition without using contexts for CABAC.

A specific configuration of the encoded data generation unit 29 is similar to that described in, for example, the example configuration [1-1] of the video decoding device 1, and a description thereof is thus omitted here. Note that "the CU prediction mode decoding unit 1011", "the probability setting storage unit 1014", and "decode (decoding)" in the description of the example configuration [1-1] should be substituted with "the encoded data generation unit 29", "the configuration corresponding to the probability setting storage unit 1014", and "encode (encoding)", respectively.

[1-2]' Configuration for Encoding CU Prediction Type Information (Pred_Type)

The encoded data generation unit 29 may be configured to encode CU prediction type information by referring to binarization information.

A specific configuration of the encoded data generation unit 29 is similar to that described in, for example, the example configuration [1-2] of the video decoding device 1, and a description thereof is thus omitted here. Note that "the CU prediction mode decoding unit 1011", "the binarization information storage unit 1012", and "decode (decoding)" in the description of the example configuration [1-2] should be substituted with "the encoded data generation unit 29", "the configuration corresponding to the binarization information storage unit 1012", and "encode (encoding)", respectively.

[1-3]' Configuration for Encoding Short Code of Intra CU in Small Size CU

The encoded data generation unit 29 may be configured to encode a short code of an intra CU in a small size CU.

A specific configuration of the encoded data generation unit 29 is similar to that described in, for example, the example configuration [1-3] of the video decoding device 1, and a description thereof is thus omitted here. Note that "the CU prediction mode decoding unit 1011", "the context storage unit 1013", "the binarization information storage unit 1012", and "decode (decoding)" in the description of the example configuration [1-3] should be substituted with "the encoded data generation unit 29", "the configuration corresponding to the context storage unit 1013", "the configuration corresponding to the binarization information storage unit 1012", and "encode (encoding)", respectively.

[1-4]' Configuration for Modifying Interpretation of Bin Sequence in Accordance with Neighboring Prediction Parameters The encoded data generation unit 29 may be configured to modify the interpretation of a bin sequence by referring to prediction parameters allocated to neighboring regions.

A specific configuration of the encoded data generation unit 29 is similar to that described in, for example, the example configuration [1-4] of the video decoding device 1, and a description thereof is thus omitted here. Note that "the CU prediction mode decoding unit 1011", "the binarization information storage unit 1012", and "decode (decoding)" in the description of the example configuration [1-4] should be substituted with "the encoded data generation unit 29", "the configuration corresponding to the binarization information storage unit 1012", and "encode (encoding)", respectively.

[2]' Prediction Image Generation Unit and Encoded Data Generation Unit

[2-1]' Example of Positions and Priorities of Merge Candidates

In a case that the PU partition type is asymmetric, the PU information generation unit 30 may be configured to determine the priorities of merge candidates using a method different from that in a case that the PU partition type is symmetric.

A specific configuration of the PU information generation unit 30 is similar to that described in, for example, the example configuration [2-1] of the video decoding device 1, and a description thereof is thus omitted here. Note that "the motion compensation parameter derivation unit 121" and "the merge candidate priority information storage unit 122" in the description of the example configuration [2-1] should be substituted with "the motion compensation parameter generation unit 301" and "the configuration corresponding to the merge candidate priority information storage unit 122", respectively.

[2-2]' Change of Merge Candidates Using Combination of CU Size and Skip/Merge

The PU information generation unit 30 may be configured to change merge candidates in accordance with a combination of a CU size and a CU type, namely, whether or not the CU of interest is a CU for skipping/merging.

A specific configuration of the PU information generation unit 30 is similar to that described in, for example, the example configuration [2-2] of the video decoding device 1, and a description thereof is thus omitted here. Note that "the motion compensation parameter derivation unit 121" and "the merge candidate priority information storage unit 122" in the description of the example configuration [2-2] should be substituted with "the motion compensation parameter generation unit 301" and "the configuration corresponding to the merge candidate priority information storage unit 122", respectively.

[2-3]' Determination of Number of Reference Frames

The motion compensation parameter generation unit 301 may have any of the configurations given in items [2-3-1]' to [2-3-4]' below, and may determine which prediction scheme out of uni-prediction and bi-prediction to apply in inter prediction accordingly.

[2-3-1]' Bi-Prediction Restriction in Small Size PU

The motion compensation parameter generation unit 301 may determine which prediction scheme out of uni-prediction and bi-prediction to apply in inter prediction, by referring to the reference frame setting information.

A specific configuration of the motion compensation parameter generation unit 301 is similar to that described in, for example, the example configuration [2-3-1] of the video decoding device 1, and a description thereof is thus omitted here. Note that "the motion compensation parameter derivation unit 121" and "the reference frame setting information storage unit 123" in the description of the example configuration [2-3-1] should be substituted with "the motion compensation parameter generation unit 301" and "the configuration corresponding to the reference frame setting information storage unit 123", respectively.

In the reference frame setting information, by limiting the prediction direction for small size to that of uni-prediction, it is possible to significantly reduce the amount of processing necessary for the motion compensation parameter generation unit 301 to generate a prediction image. In addition, also by limiting merge candidates for a small size PU to uni-predictive ones, it is possible to reduce the amount of processing necessary to generate a prediction image. Additionally, also by omitting the derivation of bi-predictive merge candidates for a small size PU, it is possible to reduce the amount of processing necessary to derive merge candidates.

[2-3-2]' Determination of Size to be Subject to Bi-Prediction Restriction

The PU information generation unit 30 may determine a size to be subject to bi-prediction restriction, before performing encoding. A specific configuration is as illustrated in FIG. 81. In the configuration illustrated in FIG. 81, the bi-prediction restricted PU determination unit 1218 in the PU information generation unit 30 illustrated in FIG. 55 or 56 is replaced by a bi-prediction restricted PU determination unit 1218A.

More details are similar to those described in, for example, the description of the example configuration [2-3-2] of the video decoding device 1, and a description thereof is thus omitted here. Note that "the motion compensation parameter derivation unit 121", "the merge motion compensation parameter derivation unit 1212", and "the reference frame setting information storage unit 123" in the description of the example configuration [2-3-2] should be substituted with "the motion compensation parameter generation unit 301", "the merge motion compensation parameter generation unit 3012", and "the configuration corresponding to the reference frame setting information storage unit 123", respectively.

[2-3-3]' Configuration for Partial Restriction of Bi-Prediction

The PU information generation unit 30 may perform partial restriction of bi-prediction. A specific configuration is as illustrated in FIG. 81 and FIG. 82. In the configuration illustrated in FIG. 81, the bi-prediction/uni-prediction conversion unit 1219 in the PU information generation unit 30 illustrated in FIG. 55 or 56 is replaced by a bi-prediction/uni-prediction conversion unit 1219A. In the configuration illustrated in FIG. 82, the bi-prediction/uni-prediction conversion unit 1219 in the PU information generation unit 30 illustrated in FIG. 55 or 56 is replaced by a bi-prediction/uni-prediction conversion unit 1219B.

More details are similar to those described in, for example, the description of the example configuration [2-3-3] of the video decoding device 1, and a description thereof is thus omitted here. Note that "the motion compensation parameter derivation unit 121", "the merge motion compensation parameter derivation unit 1212", and "the reference frame setting information storage unit 123" in the description of the example configuration [2-3-3] should be substituted with "the motion compensation parameter generation unit 301", "the merge motion compensation parameter generation unit 3012", and "the configuration corresponding to the reference frame setting information storage unit 123", respectively.

[2-3-4]' Conversion of Motion Vectors into Integers

The PU information generation unit 30 may convert motion vectors into integers. A specific configuration is as illustrated in FIG. 83. In the configuration illustrated in FIG. 83, the bi-prediction/uni-prediction conversion unit 1219 in the PU information generation unit 30 illustrated in FIG. 55 or 56 is replaced by a bi-prediction/uni-prediction conversion unit 1219A. In the configuration illustrated in FIG. 83, the bi-prediction/uni-prediction conversion unit 1219 in the PU information generation unit 30 illustrated in FIG. 55 or 56 is replaced by a motion-vector-to-integer conversion unit 1220.

More details are similar to those described in, for example, the description of the example configuration [2-3-4] of the video decoding device 1, and a description thereof is thus omitted here. Note that "the motion compensation parameter derivation unit 121", "the merge motion compensation parameter derivation unit 1212", and "the reference frame setting information storage unit 123" in the description of the example configuration [2-3-4] should be substituted with "the motion compensation parameter generation unit 301", "the merge motion compensation parameter generation unit 3012", and "the configuration corresponding to the reference frame setting information storage unit 123", respectively.

The bi-prediction restriction as given in the item [2-3-2]' to [2-3-4]' may reduce the amount of processing necessary for the motion compensation parameter generation unit 301 to generate a prediction image.

(Restriction of Motion Compensation Parameters for Encoded Data)

The restriction on encoded data based on level limits has been described in conjunction with a video decoding device. That is, the values of motion compensation parameters obtained by deriving encoded data for each level are restricted. Such restrictions may be implemented by the video encoding device 2, described below. The description will be made here of an example in which skipped encoding of the inter prediction flag, bi-/uni-prediction conversion for merge candidates, and the derivation of merge candidates are not performed.

The video encoding device 2 of this configuration includes a PU information generation unit 30 illustrated in FIG. 88. The PU information generation unit 30 includes a motion compensation parameter generation unit 301. The motion compensation parameter generation unit 301 includes the merge motion compensation parameter generation unit 3012 and the basic motion compensation parameter generation unit 3013. The motion compensation parameter generation unit 301 includes a motion compensation parameter restriction unit 3014 in place of the prediction restricted PU determination unit 1218. This configuration does not include the bi-prediction/uni-prediction conversion unit 1219 because bi-/uni-prediction conversion is not performed on merge candidates. However, the bi-prediction/uni-prediction conversion unit 1219 may be included in order to perform bi-/uni-prediction conversion of merge candidates for a small PU size.

The motion compensation parameter restriction unit 3014 receives PU size information and PTI setting information PTI', and calculates additional cost in accordance with the motion compensation parameters in the PTI setting information PTI'. The additional cost is transmitted to the encoding setting unit 21. Since the transmitted additional cost is added to the minimum cost, it is possible to prevent the selection of specific motion compensation parameters by setting a large additional cost.

[Pseudo Code]

Next, the operation of the motion compensation parameter restriction unit 3014 will be described with reference to pseudo code illustrated in FIG. 87. The following is a description of the individual steps S in the pseudo code illustrated in FIG. 87.

S871: The motion compensation parameter restriction unit 3014 determines whether or not the value of the level level_idc is less than a predetermined threshold value TH1.

S872: If the value of the level level_idc is less than TH1, the motion compensation parameter restriction unit 3014 does not perform any specific process.

S873: On the other hand, if the value of the level level_idc is not less than TH1, the motion compensation parameter restriction unit 3014 further determines whether or not the value of the level level_dc is less than a predetermined threshold value TH2.

4: If the value of the level level_idc is less than TH2, the motion compensation parameter restriction unit 3014 sets the variable DisableBipred as follows.

The restriction of bi-prediction is imposed on a PU for which the logarithmic value (log2CUSize) of the CU size matches Log2MinCUSize (=3) and for which the PU mode is a mode other than 2N×2N.

That is, in S874, an 8×8 CU having the minimum CU size is subject to the restriction of bi-prediction for (2N×2N) PU other than 8×8 PU.

In addition, if the PTI setting information PTI' is subject to the restriction described above, a sufficiently large additional cost is set. If the PTI setting information PTI' is not subject to the restriction described above, the additional cost is set to 0.

S874': If the value of the level level_idc is less than TH1, the motion compensation parameter restriction unit 3014 restricts an available PU size. Specifically, the motion compensation parameter restriction unit 3014 sets a flag inter 4×4 enable flag for imposing the restriction of motion compensation parameters to zero to restrict the use of 4×4 PU. Furthermore, if the PTI setting information PTI' is subject to the restriction described above, that is, if the PU size is 4×4, a sufficiently large additional cost is set. If the PTI setting information PTI' is not subject to the restriction described above, the additional cost is set to 0. In the foregoing, inter_4×4_enable_flag is used as a flag for restricting motion compensation parameters. However, any other flag that restricts the use of 4×4 PU (for example, use_restricted_prediction) may be used.

S875: If the value of the level level idc is not less than TH2, the motion compensation parameter restriction unit 3014 sets the variable DisableBipred as follows.

The restriction of bi-prediction is imposed on a PU (minimum PU) for which the logarithmic value (log2CUSize) of the CU size matches Log2MinCUSize (=4) and for which the PU mode is N×N.

That is, in S875, if the minimum CU size is other than 8×8 (for example, 16×16), a CU having a size that matches the minimum CU size is subject to the restriction of bi-prediction for the minimum PU (N×N).

Furthermore, if the PTI setting information PTI' is subject to the restriction described above, a sufficiently large additional cost is set. If the PTI setting information PTI' is not subject to the restriction described above, the additional cost is set to 0.

S875': If the value of the level level_idc is not less than TH2, the motion compensation parameter restriction unit 3014 restricts the available CU size to restrict the available PU size. Specifically, the motion compensation parameter restriction unit 3014 restricts the logarithmic value Log2MinCuSize of the CU size to 4 or more. The motion compensation parameter restriction unit 3014 restricts log2_min_cu_size_minus3 to 1 or more.

Furthermore, if the PTI setting information PTI' is subject to the restriction described above, that is, if the CU size is 8×8, a sufficiently large additional cost is set. If the PTI setting information PTI' is not subject to the restriction described above, the additional cost is set to 0. In S874, the motion compensation parameter restriction unit 3014 may determine Log2MinCUSize by referring to MaxLog2MinCUSize in the table in FIG. 84 in accordance with the value of the level level_idc. For example, as illustrated in FIG. 84, if the value of the level level_idc is greater than or equal to TH1 and less than TH2, MaxLog2MinCuSize=3 is obtained. Thus, in S874, the motion compensation parameter restriction unit 3014 may use MaxLog2MinCuSize=3 as the value of Log2MinCUSize.

[3]' Transform/Quantization Unit and Encoded Data Generation Unit

[3-1]' Example of Configuration for Derivation of Sub-Region Size when PU Partition Type is Asymmetric If the PU partition type is asymmetric, the transform/quantization unit 27 may be configured to apply rectangular (non-square) transform to a smaller PU and to apply square transform to a larger PU.

A specific configuration of the transform/quantization unit 27 is similar to that described in, for example, the example configuration [3-1] of the video decoding device 1, and a description thereof is thus omitted here. Note that "the target region setting unit 1311", "the split determination unit 1312", and "the sub-region setting unit 1313" in the description of the example configuration [3-1] should be substituted with "the transform/quantization unit 27". In addition, "the transform size determination information storage unit 1314" in the description of the example configuration [3-1] should be substituted with "the configuration corresponding to the transform size determination information storage unit 1314".

[3-2]' Example of Configuration for Applying Non-Rectangular Transform when some PU Partition Types are Square Partition If the PU partition type is a square partition, the transform/quantization unit 27 may be configured to split the target node into non-square regions. In addition to the configuration described above, if the CU size is 16×16 size and the PU partition type is 2N×2N, the transform/quantization unit 27 may be configured to perform splitting so that uniform scan order is used for the respective partition depths.

A specific configuration of the transform/quantization unit 27 is similar to that described in, for example, in the example configuration [3-2] of the video decoding device 1, and a description thereof is thus omitted here. Note that "the sub-region setting unit 1313" and "the transform size determination information storage unit 1314" in the description of the example configuration [3-2] should be substituted with "the transform/quantization unit 27" and "the configuration corresponding to the transform size determination information storage unit 1314", respectively.

[3-3]' Specific Configuration for Referring to Contexts for Encoding of Transform Coefficients If the PU partition type is asymmetric, the encoded data generation unit 29 may be configured to encode at least one of non-zero transform coefficient presence or absence information and transform coefficient using different contexts for TUs included in a smaller PU and TUs included in a larger PU.

A specific configuration of the encoded data generation unit 29 is similar to that described in, for example, the example configuration [3-3] of the video decoding device 1, and a description thereof is thus omitted here. Note that "the determination information decoding unit 1032" and "the transform coefficient decoding unit 1033" in the description of the example configuration [3-3] should be substituted with "the encoded data generation unit 29". In addition, "decode (decoding)" and "the context storage unit 1034" in the description of the example configuration [3-3] should be substituted with "encode (encoding)" and "the configuration corresponding to the context storage unit 1034", respectively.

(Processing Flow)

The CU encoding process of the video encoding device 2 will be described hereinafter with reference to FIG. 26. In the following, it is assumed that a target CU is an inter CU or a skip CU. FIG. 26 is a flowchart illustrating an example of the flow of the CU encoding process (inter/skip CU) of the video encoding device 2.

When the CU encoding process starts, the encoding setting unit 21 determines CU prediction information on the target CU, and the encoded data generation unit 29 encodes the CU prediction information determined by the encoding setting unit 21 (S21). This process is performed on a per-CU basis.

Specifically, the encoding setting unit 21 determines whether or not the target CU is a skip CU. If the target CU is a skip CU, the encoding setting unit 21 causes the encoded data generation unit 29 to encode the skip flag SKIP. If the target CU is not a skip CU, the encoding setting unit 21 causes the encoded data generation unit 29 to encode the CU prediction type information Pred_type.

Then, processing is performed on a per-PU basis. Specifically, the prediction image generation unit 23 derives motion information, and the encoded data generation unit 29 encodes the motion information derived by the prediction image generation unit 23 (S22). Further, the prediction image generation unit 14 generates a prediction image using inter prediction on the basis of the derived motion information (S23).

Then, the transform/quantization unit 27 performs a TU partition encoding process (S24). Specifically, the transform/quantization unit 27 sets a TU partitioning scheme on the basis of the CU size of the target CU and the PU partition type. This process is performed on a per-CU basis.

Then, processing is performed on a per-TU basis. Specifically, the transform/quantization unit 27 transforms a prediction residual into a transform coefficient, and quantizes the transform coefficient (S25). Then, the encoded data generation unit 29 encodes the transformed and quantized transform coefficient (S26).

Then, the dequantization/inverse transform unit 22 applies dequantization and inverse transform to the transformed and quantized transform coefficient to restore a prediction residual. In addition, the adder 24 adds together the prediction image and the prediction residual to generate a decoded image (S27). This process is performed on a per-CU basis.

[Application Examples]

The video encoding device 2 and the video decoding device 1, described above, may be mounted in various apparatuses for transmitting, receiving, recording, and reproducing a moving image for use. The moving image may be a natural moving image captured using a camera or the like, or may be an artificial moving image (including CG and GUI) generated using a computer or the like.

First, the use of the video encoding device 2 and the video decoding device 1, described above, for the transmission and reception of moving images will be described with reference to FIG. 27.

Figure 27:
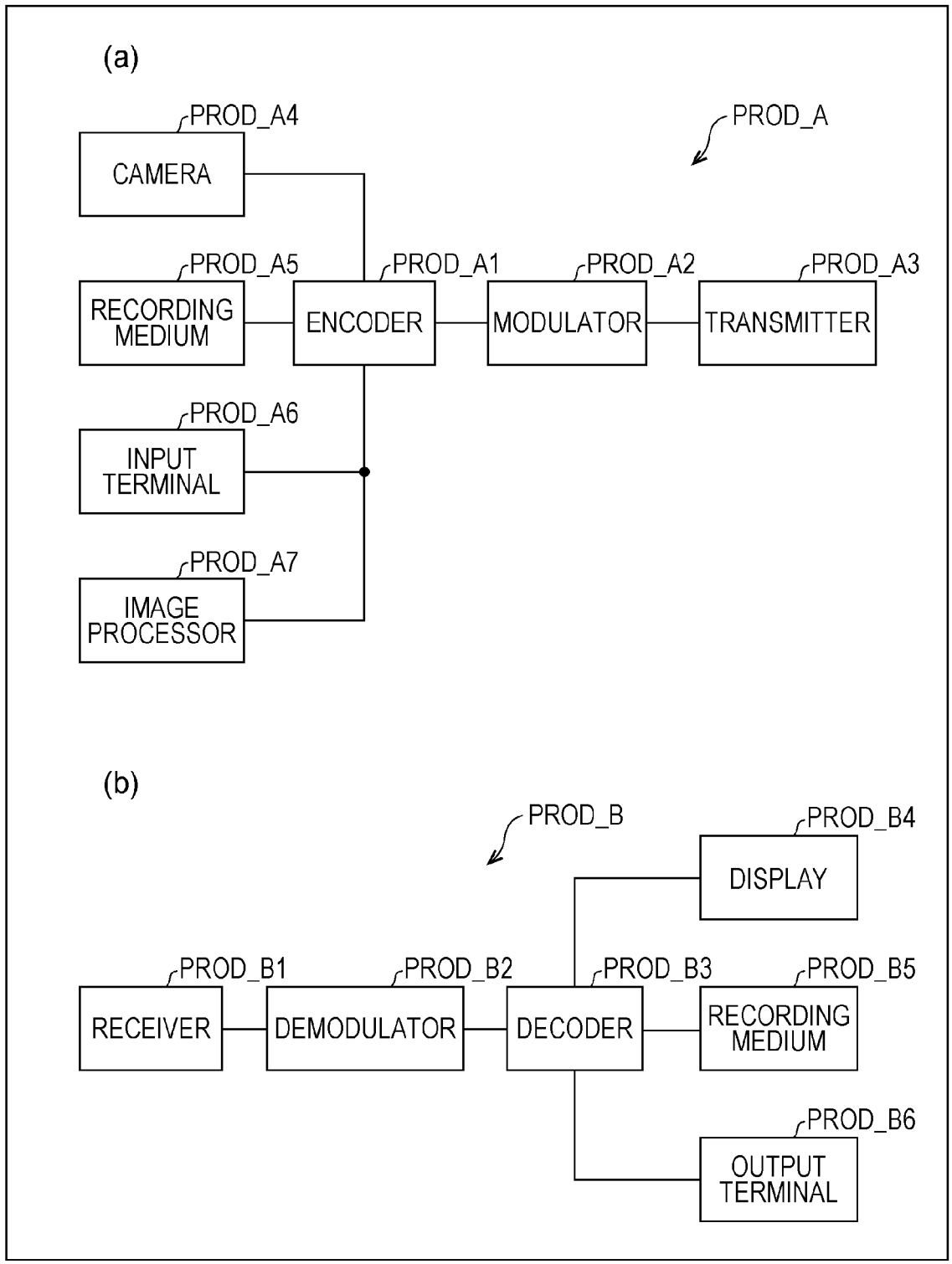
FIG. 27 illustrates a configuration of a transmitting apparatus including the video encoding device and a configuration of a receiving apparatus including the video decoding device. Part (a) of FIG. 27 illustrates the transmitting apparatus including the video encoding device, and part (b) of FIG. 27 illustrates the receiving apparatus including the video decoding device.

Part (a) of FIG. 27 is a block diagram illustrating a configuration of a transmitting apparatus PROD_A including the video encoding device 2. As illustrated in part (a) of FIG. 27, the transmitting apparatus PROD_A includes an encoder PROD_A1 for encoding a moving image to obtain encoded data, a modulator PROD_A2 for modulating a carrier wave using the encoded data obtained by the encoder PROD_A1 to obtain a modulation signal, and a transmitter PROD_A3 for transmitting the modulation signal obtained by the modulator PROD_A2. The video encoding device 2 described above may be used as the encoder PROD_A1.

The transmitting apparatus PROD_A may further include sources from which moving images to be input to the encoder PROD_A1 are supplied, including a camera PROD_A4 for capturing a moving image, a recording medium PROD_A5 having a moving image recorded thereon, an input terminal PROD_A6 through which a moving image is input from outside, and an image processor A7 for generating or modifying an image. In part (a) of FIG. 27, all of them are included in the transmitting apparatus PROD_A, by way of example. However, some of them may be omitted.

The recording medium PROD_A5 may have recorded thereon a moving image that has not been encoded, or may have recorded thereon a moving image that has been encoded using a recording coding scheme different from a transmission coding scheme. In the latter case, a decoder (not illustrated) may be disposed between the recording medium PROD_A5 and the encoder PROD_A1 to decode encoded data read from the recording medium PROD_A5 in accordance with a recording coding scheme.

Part (b) of FIG. 27 is a block diagram illustrating a configuration a receiving apparatus PROD_B including the video decoding device 1. As illustrated in part (b) of FIG. 27, the receiving apparatus PROD_B includes a receiver PROD_B1 for receiving a modulation signal, a demodulator PROD_B2 for demodulating the modulation signal received by the receiver PROD_B1 to obtain encoded data, and a decoder PROD_B3 for decoding the encoded data obtained by the demodulator PROD_B2 to obtain a moving image. The video decoding device 1 described above may be used as the decoder PROD_B3.

The receiving apparatus PROD_B may further include destinations to which a moving image output from the decoder PROD_B3 is to be supplied, including a display PROD_B4 on which the moving image is displayed, a recording medium PROD_B5 on which the moving image is recorded, and an output terminal PROD_B6 through which the moving image is output to outside. In part (b) of FIG. 27, all of them are included in the receiving apparatus PROD_B, by way of example. However, some of them may be omitted.

The recording medium PROD_B5 may be configured to have recorded thereon a moving image that has not been encoded, or may have recorded thereon a moving image that has been encoded using a recording coding scheme different from a transmission coding scheme. In the latter case, an encoder (not illustrated) may be disposed between the decoder PROD_B3 and the recording medium PROD_B5 to encode a moving image acquired from the decoder PROD_B3 in accordance with a recording coding scheme.

A transmission medium on which modulation signals travel may be wireless or wired. A transmission form in which modulation signals are transmitted may be broadcasting (here, a transmission form in which no destinations are specified in advance) or communication (here, a transmission form in which destinations are specified in advance). That is, the transmission of modulation signals may be implemented by any of radio broadcasting, wire broadcasting, wireless communication, and wired communication.

For example, a broadcasting station (such as a broadcasting facility)/receiving station (such as a television receiver) of terrestrial digital broadcasting is an example of the transmitting apparatus PROD_A/the receiving apparatus PROD_B for transmitting/receiving a modulation signal via radio broadcasting. A broadcasting station (such as a broadcasting facility)/receiving station (such as a television receiver) of cable television broadcasting is an example of the transmitting apparatus PROD_A/the receiving apparatus PROD_B for transmitting/receiving a modulation signal via wire broadcasting.

A server (such as a workstation)/client (such as a television receiver, a personal computer, or a smartphone) for VOD (Video On Demand) services, video sharing services, and the like over the Internet is an example of the transmitting apparatus PROD_A/the receiving apparatus PROD_B for transmitting/receiving a modulation signal via communication (in general, wireless or wired transmission media may be used for LANs, and wired transmission media are used for WANs). Examples of the personal computer include a desktop PC, a laptop PC, and a tablet PC. Examples of the smartphone also include a multifunctional mobile phone terminal.

A client for video sharing services has a function to decode encoded data downloaded from a server and to display the decoded data on a display, and also has a function to encode a moving image captured using a camera and to upload the encoded image to a server. That is, a client for video sharing services serves as both the transmitting apparatus PROD_A and the receiving apparatus PROD_B.

Next, the use of the video encoding device 2 and the video decoding device 1, described above, for the recording and reproduction of moving images will be described with reference to FIG. 28.

Figure 28:
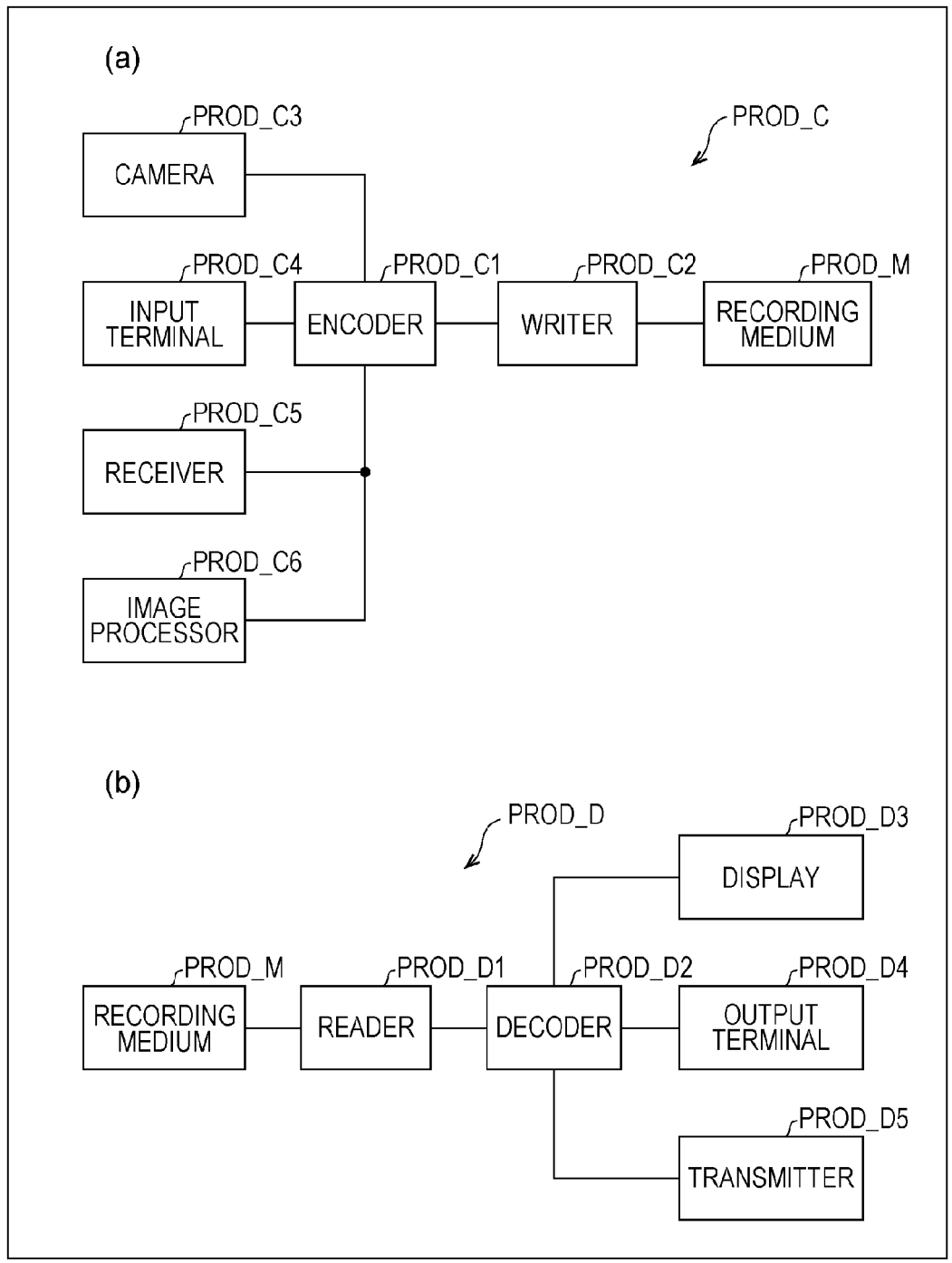
FIG. 28 illustrates a configuration of a recording apparatus including the video encoding device and a configuration of a reproducing apparatus including the video decoding device. Part (a) of FIG. 28 illustrates the recording apparatus including the video encoding device, and part (b) of FIG. 28 illustrates the reproducing apparatus including the video decoding device.

Part (a) of FIG. 28 is a block diagram illustrating a configuration of a recording apparatus PROD_C including the video encoding device 2 described above. As illustrated in part (a) of FIG. 28, the recording apparatus PROD_C include an encoder PROD_C1 for encoding a moving image to obtain encoded data, and a writer PROD_C2 for writing the encoded data obtained by the encoder PROD_C1 to a recording medium PROD_M. The video encoding device 2 described above may be used as the encoder PROD_C1.

The recording medium PROD_M may be (1) of a type incorporated in the recording apparatus PROD_C, such as an HDD (Hard Disk Drive) or an SSD (Solid State Drive), or (2) of a type connected to the recording apparatus PROD_C, such as an SD memory card or a USB (Universal Serial Bus) flash memory, or may be (3) set in a drive device (not illustrated) incorporated in the recording apparatus PROD_C, such as a DVD (Digital Versatile Disc) or a BD (Blu-ray Disc: registered trademark).

The recording apparatus PROD_C may further include sources from which moving images to be input to the encoder PROD_C1 are supplied, including a camera PROD_C3 for capturing a moving image, an input terminal PROD_C4 through which a moving image is input from outside, a receiver PROD_C5 for receiving a moving image, and an image processor PROD_C6 for generating or modifying an image. In part (a) of FIG. 28, all of them are included in the recording apparatus PROD_C, by way of example. However, some of them may be omitted.

The receiver PROD_C5 may be configured to receive a moving image that has not been encoded, or may be configured to receive encoded data that has been encoded using a transmission coding scheme different from a recording coding scheme. In the latter case, a transmission decoder (not illustrated) may be disposed between the receiver PROD_C5 and the encoder PROD_C1 to decode encoded data encoded using a transmission coding scheme.

Examples of the recording apparatus PROD_C include a DVD recorder, a BD recorder, and an HDD (Hard Disk Drive) recorder (in this case, the input terminal PROD_C4 or the receiver PROD_C5 serve as a main source from which a moving image is supplied). Other examples of the recording apparatus PROD_C include a camcorder (in this case, the camera PROD_C3 serves as a main source from which a moving image is supplied), a personal computer (in this case, the receiver PROD_C5 or the image processor C6 serves as a main source from which a moving image is supplied), and a smartphone (in this case, the camera PROD_C3 or the receiver PROD_C5 serves as a main source from which a moving image is supplied).

Part (b) of FIG. 28 is a block diagram illustrating a configuration of a reproducing apparatus PROD_D including the video decoding device 1 described above. As illustrated in part (b) of FIG. 28, the reproducing apparatus PROD_D includes a reader PROD_D1 for reading encoded data written in a recording medium PROD_M, and a decoder PROD_D2 for decoding the encoded data read by the reader PROD_D1 to obtain a moving image. The video decoding device 1 described above may be used as the decoder PROD_D2.

The recording medium PROD_M may be (1) of a type incorporated in the reproducing apparatus PROD_D, such as an HDD or an SSD, or (2) of a type connected to the reproducing apparatus PROD_D, such as an SD memory card or a USB flash memory, or may be (3) set in a drive device (not illustrated) incorporated in the reproducing apparatus PROD_D, such as a DVD or a BD.

The reproducing apparatus PROD_D may further include destinations to which a moving image output from the decoder PROD_D2 is to be supplied, including a display PROD_D3 on which the moving image is displayed, an output terminal PROD_D4 through which the moving image is output to outside, and a transmitter PROD_D5 for transmitting the moving image. In part (b) of FIG. 28, all of them are included in the reproducing apparatus PROD_D, by way of example. However, some of them may be omitted.

The transmitter PROD_D5 may be configured to transmit a moving image that has not been encoded, or may be configured to transmit encoded data that has been encoded using a transmission coding scheme different from a recording coding scheme. In the latter case, an encoder (not illustrated) may be disposed between the decoder PROD_D2 and the transmitter PROD_D5 to encode a moving image using a transmission coding scheme.

Examples of the reproducing apparatus PROD_D include a DVD player, a BD player, and an HDD player (in this case, the output terminal PROD_D4, to which a television receiver or the like is connected, serves as a main destination to which a moving image is to be supplied). Other examples of the reproducing apparatus PROD_D include a television receiver (in this case, the display PROD_D3 serves as a main destination to which a moving image is to be supplied), a digital signage (also referred to as an electronic signboard, an electronic bulletin board, or the like, in which case the display PROD_D3 or the transmitter PROD_D5 serves as a main destination to which a moving image is to be supplied), a desktop PC (in this case, the output terminal PROD_D4 or the transmitter PROD_D5 serves as a main destination to which a moving image is to be supplied), a laptop or tablet PC (in this case, the display PROD_D3 or the transmitter PROD_D5 serves as a main destination to which a moving image is to be supplied), and a smartphone (in this case, the display PROD_D3 or the transmitter PROD_D5 serves as a main destination to which a moving image is to be supplied).

[Summation]

An image decoding device according to an aspect of the present invention is an image decoding device for decoding an image in a prediction unit using, as an inter-frame prediction scheme, a uni-prediction scheme in which one reference image is referred to or a bi-prediction scheme in which two reference images are referred to. The image decoding device includes a motion compensation parameter derivation unit configured to derive a motion compensation parameter indicating one of the uni-prediction scheme and the bi-prediction scheme. In a case that the prediction unit has a size less than or equal to a predetermined value, the motion compensation parameter derivation unit is configured to derive the motion compensation parameter by switching between the prediction schemes.

The image decoding device according to the aspect of the present invention further includes merge candidate deriving means for deriving a motion compensation parameter of a prediction unit as a merge candidate, the derivation of the merge candidate being based on a motion compensation parameter of a neighboring prediction unit. In a case that the merge candidate indicates bi-prediction, the motion compensation parameter derivation unit is configured to derive the motion compensation parameter using the uni-prediction scheme.

In the image decoding device according to the aspect of the present invention, the motion compensation parameter includes at least a first prediction list utilization flag indicating whether or not a first reference prediction list is to be used, and a second prediction list utilization flag indicating whether or not a second reference prediction list is to be used. The motion compensation parameter derivation unit described above derives the motion compensation parameter using the first prediction list utilization flag and the second prediction list utilization flag.

In the image decoding device according to the aspect of the present invention, in a case that the first prediction list utilization flag indicates that the first prediction list utilization flag is to be used and the second prediction list utilization flag indicates that the second prediction list utilization flag is to be used, the motion compensation parameter derivation unit is configured to change the first prediction list utilization flag and the second prediction list utilization flag so that one of the first prediction list utilization flag and the second prediction list utilization flag is not used.

In the image decoding device according to the aspect of the present invention, the size of the prediction unit is calculated using a width and height of the prediction unit.

An image decoding method according to an aspect of the present invention is an image decoding method for decoding an image in a prediction unit using, as an inter-frame prediction scheme, a uni-prediction scheme in which one reference image is referred to or a bi-prediction scheme in which two reference images are referred to. The image decoding method at least includes the steps of deriving a motion compensation parameter indicating one of the uni-prediction scheme and the bi-prediction scheme, and determining whether or not the prediction unit has a size less than or equal to a predetermined value. The step of deriving a motion compensation parameter includes deriving the motion compensation parameter by switching between the prediction schemes in a case that the size of the prediction unit is less than or equal to the predetermined value.

An image encoding device according to an aspect of the present invention is an image encoding device for encoding an image in a prediction unit using, as an inter-frame prediction scheme, a uni-prediction scheme in which one reference image is referred to or a bi-prediction scheme in which two reference images are referred to. The image encoding device includes a motion compensation parameter derivation unit configured to derive a motion compensation parameter indicating one of the uni-prediction scheme and the bi-prediction scheme. In a case that the prediction unit has a size less than or equal to a predetermined value, the motion compensation parameter derivation unit is configured to derive the motion compensation parameter by switching between the prediction schemes.

An image decoding device according to an aspect of the present invention is an image decoding device for decoding encoded image data for each coding unit to generate a decoded image. The image decoding device includes a CU information decoding unit configured to decode information for specifying a partition type in which the coding unit is split, and an arithmetic decoding unit configured to decode binary values from the encoded image data using arithmetic decoding that uses contexts or arithmetic decoding that does not use contexts. In a case that the CU information decoding unit decodes information for specifying an asymmetric partition (AMP; Asymmetric Motion Partition) as the partition type, the arithmetic decoding unit is configure to decode the binary values by switching between the arithmetic decoding that uses contexts and the arithmetic decoding that does not use contexts in accordance with a position of the binary values.

According to the foregoing aspects of the present invention, it is possible to achieve a reduction in the amount of coding taken in the use of an asymmetric partition and to implement efficient encoding/decoding processes exploiting the characteristics of the asymmetric partition.

The present invention may also be expressed in the following form. An image decoding device according to an aspect of the present invention is an image decoding device for decoding information for restoring an image from encoded image data for each coding unit to restore an image. The image decoding device includes decoding means for decoding codes assigned to combinations of sizes of prediction units and prediction schemes to be applied to the coding units, the decoding means decoding a shorter code for a combination of a coding unit with a size less than or equal to a predetermined value and a prediction scheme for intra-frame prediction, than codes assigned to combinations other than the combination.

In the configuration described above, a coding unit having a size less than or equal to a predetermined value is a coding unit having a size that will make inter prediction less reliable in a coding unit having a size greater than the predetermined value.

A coding unit having a size less than or equal to a predetermined value tends to be used in a region where inter prediction is less reliable. In the following, a coding unit having a size greater than a predetermined value is referred to as a "large coding unit".

A coding unit having a size less than or equal to a predetermined value is, by way of example, a coding unit having a minimum size, and is a coding unit having 8×8 pixels.

Such a small coding unit has a larger spatial correlation than a large coding unit. Thus, an intra CU is generally applied to such a small coding unit in order to improve prediction accuracy.

In the configuration described above, a shorter code is assigned to a combination of small coding size and intra-frame prediction scheme than codes to be assigned to other combinations.

According to the configuration described above, accordingly, a short code may be assigned to a combination having a high probability of occurrence in a coding unit having a size less than or equal to a predetermined value. The advantage of improved coding efficiency is thus achieved.

In the image decoding device according to the aspect of the present invention, preferably, the decoding means described above decodes a shorter code for the combination described above than a code assigned to a combination of a coding unit with a size larger than the predetermined value and a prediction scheme for intra-frame prediction.

According to the configuration described above, a shorter code is decoded in a case that a prediction scheme for intra-frame prediction is applied to a small coding unit in which intra-frame prediction is more reliable than in a case that a prediction scheme for intra-frame prediction is applied to a large coding unit in which intra-frame prediction is less reliable.

Accordingly, a shorter code may be decoded for a combination having a higher frequency of occurrence. As a result, coding efficiency may be improved.

In the image decoding device according to the aspect of the present invention, preferably, the decoding means described above decodes a shorter code for the combination described above than a code assigned to a combination of a coding unit with a size equal to the predetermined value and a prediction scheme other than intra-frame prediction.

According to the configuration described above, a shorter code may be decoded for intra-frame prediction that is more reliable in a small coding unit than inter-frame prediction that is less reliable.

Accordingly, a shorter code may be decoded for a combination having a higher frequency of occurrence. As a result, coding efficiency may be improved.

An image decoding device according to an aspect of the present invention is an image decoding device for restoring an image in a prediction unit using a prediction scheme for any inter-frame prediction out of uni-prediction in which one reference image is referred to and bi-prediction in which two reference images are referred to. The image decoding device includes bi-prediction restriction means for imposing restriction of bi-prediction on a target prediction unit to which the inter-frame prediction is to be applied, the target prediction unit being a prediction unit having a size less than or equal to a predetermined value.

Bi-prediction requires a larger amount of processing than uni-prediction. Bi-prediction is a prediction scheme that uses two images to be referred to in inter-frame prediction. The images to be referred to may be previous or future frames in time with respect to the target frame.

A small prediction unit having a size less than or equal to a predetermined value requires a larger amount of processing per unit area than a large prediction unit having a size greater than the predetermined value.

Accordingly, bi-prediction in a small prediction unit will be likely to create a bottleneck in decoding processing because both require a large amount of processing.

According to the configuration described above, restriction of bi-prediction is imposed on a small prediction unit. The term "restriction" is used to include omitting some of the processes involved in bi-prediction and not performing the processing of bi-prediction.

The restriction described above may achieve the advantage of reducing the amount of processing that can be a bottleneck in decoding processing.

In the image decoding device according to the aspect of the present invention, preferably, the bi-prediction restriction means described above imposes the restriction described above on the target prediction unit that is a prediction unit in which decoding of at least some of motion vectors used for generation of a prediction image in the target prediction unit is not omitted and that is a prediction unit in which a prediction parameter to be allocated to the target prediction unit is not estimated from a prediction parameter allocated to a neighboring prediction unit of the target prediction unit.

According to the configuration described above, the restriction of bi-prediction is imposed in a case that a prediction parameter is actually derived in a target prediction unit without the so-called skip process and merge process being performed.

If the skip process or the merge process is not performed, all motion vectors need to be decoded, resulting in an increase in the amount of processing. The restriction described above may reduce the amount of processing that can be a bottleneck in decoding processing.

In the image decoding device according to the aspect of the present invention, preferably, the bi-prediction restriction means described above performs uni-prediction without decoding information indicating which of bi-prediction and uni-prediction to perform.

According to the configuration described above, the decoding process for a target prediction unit on which restriction of bi-prediction is imposed may be simplified. In addition, the overhead caused by the decoding of information indicating which of bi-prediction and uni-prediction to perform although the execution of uni-prediction has been determined in advance may be avoided.

In the image decoding device according to the aspect of the present invention, preferably, the bi-prediction restriction means described above omits the processing of information concerning weighted prediction in bi-prediction.

According to the configuration described above, the omission of the processing of information concerning weighted prediction in bi-prediction may reduce the amount of processing in bi-prediction. As a result, the amount of processing that can be a bottleneck in decoding processing, such as the processing of information concerning weighted prediction, may be reduced.

In the image decoding device according to the aspect of the present invention, the image decoding device may include merge candidate deriving means for deriving a merge candidate from a motion compensation parameter used for decoding of a decoded prediction unit. The bi-prediction restriction means described above may include bi-prediction/uni-prediction conversion means for converting bi-prediction into uni-prediction in a case that the merge candidate derived by the merge candidate deriving means is bi-predictive.

According to the configuration described above, restriction of bi-prediction may be imposed even in a case that a merge process is used for the decoding of a prediction image in a target prediction unit. The decoding process for the target prediction unit may thus be simplified.

In the image decoding device according to the aspect of the present invention, in a case that two prediction list utilization flags, each of which is a flag indicating use or non use of a reference picture list, are used, the bi-prediction/uni-prediction conversion means described above performs transformation so that, if the two prediction list utilization flags indicate use of the reference picture lists, one of the two prediction list utilization flags indicates non use of the corresponding reference picture list.

According to the configuration described above, an image decoding device configured to perform control to determine whether to perform bi-prediction using prediction list utilization flags or perform uni-prediction may impose restriction of bi-prediction. The decoding process for the target prediction unit may thus be simplified.

In the image decoding device according to the aspect of the present invention, the bi-prediction/uni-prediction conversion means described above may be configured to convert a reference picture list flag that indicates use of the L0 list to a reference picture list flag that indicates non use of the L0 list.

According to the configuration described above, a decoding device configured to perform control to determine whether to perform bi-prediction using prediction list utilization flags or to perform uni-prediction may impose restriction of bi-prediction while maintaining coding efficiency. The decoding process for the target prediction unit may thus be simplified.

The term "L0 list", as used herein, refers to a list of pictures to be used mainly for forward prediction. In general, reference pictures in the L0 list are often prioritized to derive motion compensation parameters. A derivation process using reference pictures in the L1 list in place of reference pictures in the L0 list would be differentiated from these derivation processes that prioritize the L0 list. In a case that a plurality of derivation processes are selectable using a predetermined coding parameter, the derivation process for a predetermined group prioritizes the L0 list whereas the derivation process for another group prioritizes the L1 list, allowing the individual derivation processes to be complementary to one another. Such complementary use of derivation processes is effective for a sequence or a region with a larger amount of motion. Accordingly, the use of the L1 list in bi-prediction/uni-prediction conversion may achieve high coding efficiency.

In the image decoding device according to the aspect of the present invention, in a case that the bi-prediction/uni-prediction conversion means described above performs conversion so that the flag that indicates use or non use of a reference picture list indicates non use of the reference picture list, the bi-prediction/uni-prediction conversion means may not necessarily refresh a reference index number or a motion vectors.

According to the configuration described above, even in a case that the use of a reference picture list is restricted, the values of the reference index number and motion vector in the reference picture list whose use is restricted may be used in later processes. Accordingly,restriction of bi-prediction may be imposed with coding efficiency maintained, compared to the case that the values of the reference index number and motion vector are refreshed. The decoding process for the target prediction unit may thus be simplified.

In the image decoding device according to the aspect of the present invention, in a case that a code number corresponding to a combined inter prediction reference index is to be decoded, the bi-prediction restriction means described above may set a maximum value of the values of code numbers as the number of uni-predictive combined reference picture set when the restriction of bi-prediction is imposed, and may set a maximum value of the values of code numbers as the sum of the number of uni-predictive combined reference picture sets and the number of bi-predictive combined reference picture sets when the restriction of bi-prediction is not imposed.

According to the configuration described above, an image decoding device that uses a combined inter prediction reference index may avoid the overhead caused by the decoding of corresponding code numbers in the case of bi-prediction although the execution of uni-prediction has been determined in advance.

In the image decoding device according to the aspect of the present invention, in a case that a combined inter prediction reference index is to be decoded, the bi-prediction restriction means described above may derive the combined inter prediction reference index from the code numbers using a variable table when the restriction of bi-prediction is imposed, and may derive the combined inter prediction reference index from the code numbers without using a variable table when the restriction of bi-prediction is not imposed.

According to the configuration described above, an image decoding device configured to decode a combined inter prediction reference index from code numbers using a variable table may simplify the decoding process for the variable table in a case that the restriction of bi-prediction is imposed.

In the image decoding device according to the aspect of the present invention, in a case that the decoded combined inter prediction reference index indicates anything other than a combined reference picture set, the bi-prediction restriction means described above may be configured to perform, when the restriction of bi-prediction is imposed, uni-prediction without decoding information indicating which of bi-prediction and uni-prediction to perform, and to decode, when the restriction of bi-prediction is not imposed, information indicating which of bi-prediction and uni-prediction to perform.

According to the configuration described above, an image decoding device that uses a combined inter prediction reference index may avoid the overhead caused by the decoding of information indicating which of bi-prediction and uni-prediction to perform although the execution of uni-prediction has been determined in advance.

In the image decoding device according to the aspect of the present invention, the image decoding device may include merge candidate deriving means for deriving a merge candidate that is a motion compensation parameter candidate in a case that a merge process is used for the decoding of a prediction image in a target prediction unit. The merge candidate deriving means described above may include neighboring merge candidate deriving means for deriving a merge candidate from a motion compensation parameter used for the decoding of a neighboring target prediction unit adjacent to the target prediction unit, and bi-predictive merge candidate deriving means for deriving a merge candidate from a plurality of reference pictures. In a case that the target prediction unit has a predetermined size, the merge candidate deriving means may not necessarily use a merge candidate obtained by the bi-predictive merge candidate deriving means.

According to the configuration described above, the omission of the derivation of merge candidates for bi-prediction may simplify the derivation of merge candidates.

An image decoding device according to an aspect of the present invention is an image decoding device for restoring an image by generating a prediction image for each of prediction units obtained by splitting a coding unit into one or more partitions. The image decoding device includes changing means for changing a plurality of codes associated with a plurality of combinations of partition types and prediction schemes, the partition types being types in which a target coding unit that is a coding unit to be decoded is split into the prediction units, in accordance with a decoded parameter allocated to a decoded prediction unit near a target prediction unit that is a prediction unit to be decoded.

The unit of generating a prediction image is based on a coding unit that is a unit of the coding process. Specifically, the same region as the coding unit or a region obtained by dividing the coding unit is used as a prediction unit.

In the configuration described above, the partition type in which a coding unit is split into prediction units may include a split into square partitions and a split into non-square partitions. The split into square partitions is obtained in a case that the prediction unit obtained by splitting is square.

This applies, for example, in a case that a square coding unit is split into four square partitions. This also applies in the case of non-split where a region having the same size as a square coding unit is used as the prediction unit. The partition type in the case of non-split is generally represented by 2N×2N.

A split into non-square partitions is obtained in a case that the prediction unit obtained by splitting is non-square. This applies, for example, in a case that the region of the coding unit is split into a large rectangle and a small rectangle.

The term "code" refers to a binary (bin) sequence of coded parameter values. The binary sequence may be directly coded or arithmetically coded. The prediction scheme is that either for inter-frame prediction or intra-frame prediction. A combination of prediction scheme and partition type is, for example, (intra-frame prediction, non-split), and may be represented by a parameter value called pred_type.

In the configuration described above, furthermore, codes and combinations of prediction schemes and partition types are associated with each other in one-to-one correspondence.

According to the configuration described above, the association is changed in accordance with a decoded parameter. In other words, even for the same code, the interpretation of which combination of prediction scheme and partition type is indicated is changed in accordance with a decoded parameter.

Accordingly, a shorter code may be assigned to a combination of prediction scheme and partition type having a higher probability of occurrence.

Specifically, if a neighboring coding unit of a target coding unit is a coding unit for intra-frame prediction, it is probable that the target coding unit will also be predicted using intra-frame prediction.

In this case, preferably, a short code is assigned to a combination including intra-frame prediction.

According to the configuration described above, a shorter code is assigned to a combination of prediction scheme and partition type having a higher probability of occurrence in accordance with a decoded parameter allocated to a neighboring decoded prediction unit. Thus, coding efficiency may be improved.

In the image decoding device according to the aspect of the present invention, preferably, the changing means described above changes a code associated with a combination including a prediction scheme for intra-frame prediction to a short code in a case that a prediction scheme for intra-frame prediction is allocated to a neighboring decoded coding unit of the target coding unit.

According to the configuration described above, in a case that a prediction scheme for intra-frame prediction is allocated to a neighboring decoded coding unit of a target coding unit, a code associated with a combination including a prediction scheme for intra-frame prediction is changed to a short code.

A plurality of neighboring coding units may be used. The neighboring coding units may include, for example, an upper adjacent coding unit and a left adjacent coding unit.

In this case, it is only required that one or both of a prediction scheme for intra-frame prediction be allocated to the upper adjacent coding unit and the left adjacent coding unit.

If a prediction scheme for intra-frame prediction is allocated to a neighboring decoded coding unit of a target coding unit, it is probable that intra-frame prediction will also be allocated to the target coding unit.

Thus, the code associated with a combination having a high frequency of occurrence may be short, leading to improved coding efficiency.

In the image decoding device according to the aspect of the present invention, preferably, the changing means described above changes a code associated with a combination including a partition type that involves a split in a neighboring direction to a short code in a case that a neighboring decoded coding unit of the target coding unit is smaller than the target coding unit.

According to the configuration described above, in a case that a neighboring decoded coding unit of the target coding unit is smaller than the target coding unit, a code associated with a combination including a partition type that involves a split in a neighboring direction is changed to a short code.

In a case that a neighboring decoded coding unit of the target coding unit is smaller than the target coding unit, it is probable that an edge will be present in a direction perpendicular to a boundary between the target coding unit and the neighboring decoded coding unit. That is, an edge often appears in a direction in which the target coding unit is adjacent to the decoded coding unit.

In this case, a partition type that involves a split in the adjacent direction is more likely to be selected.

Thus, the code associated with a combination having a high frequency of occurrence may be short, leading to improved coding efficiency.

An image decoding device according to an aspect of the present invention is an image decoding device for restoring an image by generating a prediction image using an inter-frame prediction scheme for each of prediction units obtained by splitting a coding unit into one or more partitions. The image decoding device includes candidate determining means for determining a candidate in a region to be used for estimation in accordance with a size of a target prediction unit, which is a prediction unit to be decoded, in a case that the target prediction unit is a prediction unit in which a prediction parameter of the target prediction unit is estimated from a prediction parameter allocated to a neighboring region of the target prediction unit.

According to the configuration described above, a candidate of a region to be used for the so-called skip or merge is determined in accordance with the size of the target prediction unit. Alternatively, a candidate of a region to be used for the derivation of an estimated motion vector to be used to restore a motion vector together with a decoded differential motion vector is set.

The correlation of motion vectors for inter-frame prediction varies depends on the size of the target prediction unit. For example, a region where a small prediction unit having a size less than or equal to a predetermined value is selected generally includes complex motion of an object, and the correlation of motion vectors is low in such a region.

According to the configuration described above, therefore, for example, the number of candidates may be reduced in accordance with the degree of complexity of motion. Accordingly, side information may be reduced, resulting in improvement in coding efficiency.

In the image decoding device according to the aspect of the present invention, preferably, the candidate determining means described above performs an operation so that the number of candidates for the small prediction unit having a size less than or equal to the predetermined value is less than the number of candidates for a prediction unit larger than the small prediction unit.

According to the configuration described above, the number of candidates for a small prediction unit having a size less than or equal to a predetermined value is less than the number of candidates for a prediction unit larger than the small prediction unit.

As described above, a region where a small prediction unit having a size less than or equal to a predetermined value generally includes complex motion of an object, and the correlation of motion vectors is low in such a region.

For this reason, the number of candidates in such a region is reduced to reduce side information, which is preferable.

In the image decoding device according to the aspect of the present invention, preferably, the candidate determining means described above performs an operation so that, in a small prediction unit having a size less than or equal to a predetermined value, candidates for temporal prediction are not included in the candidates.

According to the configuration described above, in a small prediction unit having a size less than or equal to a predetermined value, candidates for temporal prediction are not included in the candidates.

In a region with complex motion where a small prediction unit is selected, the correlation between a relevant prediction unit (collocated PU) used for temporal prediction and a target prediction unit is low. Thus, it is less probable that temporal prediction will be selected for such a region. In such a region, accordingly, it is preferable that merge candidates for temporal prediction are not included.

An image decoding device according to an aspect of the present invention is an image decoding device for restoring an image by generating a prediction image for each of prediction units obtained by splitting a coding unit into one or more partitions. Partition types in which a coding unit is split into the prediction units include a partition into rectangular prediction units, and codes for identifying a partition into the rectangular prediction units include a code indicating whether each of the rectangular prediction units is portrait-oriented or landscape-oriented, and a code indicating a type of rectangular prediction unit. The image decoding device includes decoding means for decoding the code indicating a type of rectangular prediction unit without using a context.

According to the configuration described above, in a case that the partition type in which a coding unit is split into prediction units is a split into rectangular prediction units, a code indicating a type of rectangular partition is decoded using a context.

The term "type of rectangular partition" is used to include, for example, the following three types if the partition types are landscape-oriented rectangular partitions: 2N×N, 2N×nU, 2N×nD.

A split into prediction units is generally performed so that no prediction units lie across an edge present in the region of the coding unit. If an edge having an inclination is present in a region, the same type of rectangular partition may not necessarily be sequentially selected. In such a region, a decoding process using contexts might not improve coding efficiency.

In such a region, conversely, a decoding process without using contexts would not cause a reduction in coding efficiency.

According to the configuration described above, in the region described above, it is possible to simplify processing because of no reference to contexts while maintaining coding efficiency.

An image decoding device according to an aspect of the present invention is an image decoding device for restoring an image by generating a prediction image using an inter-frame prediction scheme for each of prediction units obtained by splitting a coding unit into one or more partitions. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes estimating means for estimating a prediction parameter for inter-frame prediction using, in a case that the partition type is an asymmetric partition, an estimation method different from an estimation method in a case that the partition type is a symmetric partition.

According to the configuration described above, in a case that the partition type is an asymmetric partition, a prediction parameter for inter-frame prediction is estimated using an estimation method different from that in a case that the partition type is a symmetric partition.

A coding unit in which asymmetric partition is selected is asymmetrically split into a small prediction unit and a large prediction unit in order to obtain prediction units.

In a coding unit in which asymmetric partition is selected, furthermore, it is probable that an edge crossing the small prediction unit in the longitudinal direction will be present.

It is also probable that accurate motion vectors will have been derived in a region where an edge is present. That is, the region where motion vectors having high accuracy have been derived in a case that the partition type is an asymmetric partition is different from that in a case that the partition type is a symmetric partition.

Thus, the following advantage may be achieved: different estimation methods are used for the case that the partition type is an asymmetric partition and the case that the partition type is a symmetric partition, allowing prediction parameters for inter-frame prediction to be estimated using a desired estimation method in accordance with the partition type.

An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes transform unit splitting means for determining, in a case that a partition type of a target coding unit, which is a coding unit to be decoded, is the asymmetric partition, a partitioning scheme for a transform unit in accordance with a size of a prediction unit included in the target coding unit.

According to the configuration described above, in a case that a partition type of a target coding unit, which is a coding unit to be decoded, is an asymmetric partition, a partitioning scheme for a transform unit is determined in accordance with a size of a prediction unit included in the target coding unit.

When an asymmetric partition is applied, where as it is probable that an edge will be included in a smaller prediction unit, it is less probable that an edge will be included in a larger prediction unit.

If prediction residuals have no directionality, the application of square transform may more efficiently remove correlations than with the application of rectangular transform as a partitioning scheme for a transform unit.

According to the configuration described above, in a case that the partition type is an asymmetric partition, a partitioning scheme for a transform unit that will efficiently remove correlations may be selected in accordance with the size of a prediction unit included in the target coding unit. As a result, coding efficiency may be improved.

An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partitioning schemes in which a coding unit is split into the transform units include square partitioning and rectangular partitioning. The image decoding device includes splitting means for splitting a target transform unit using a rectangular partitioning scheme in a case that a target prediction unit, which is a prediction unit to be decoded, has a square shape.

In some cases, square prediction units may be selected even though edges are present in a region and an image has directionality. For example, in a case that an object including a large number of horizontal edges is moving, motion is uniform over the entire object. Thus, square prediction units are selected. In the transform process, however, preferably, transform units having a shape that is long in the horizontal direction and extending in the horizontal edges are applied.

According to the configuration described above, in a case that a target prediction unit, which is a prediction unit to be decoded, has a square shape, the target transform unit is split using a rectangular partitioning scheme.

Accordingly, a rectangular transform unit may also be selected in a square coding unit, resulting in improved coding efficiency for the region described above.

In the image decoding device according to the aspect of the present invention, preferably, in a case that a transform unit at a partition depth of 2 in a coding unit having a predetermined size has a square shape, the splitting means described above further performs an operation so that a target transform unit at a partition depth of 1 in the coding unit having a predetermined size is rectangular.

According to the configuration described above, in a case that the target prediction unit has a square shape, the target transform unit is split using a rectangular partitioning scheme.

A transform unit is recursively split twice using square quadtree partitioning, that is, the partition depth is increased up to 2, yielding 16 square transform units. In this case, the recursive z-scan order is used. Conventionally, the above-described partitioning scheme is applied in a case that the partition type of the target coding unit is a square partitioning.

In a case that a transform unit is split using a landscape-oriented quadtree partitioning scheme, in contrast, each node is split into square transform units at a partition depth of 2. That is, 16 square transform units are finally obtained at a partition depth of 2. In this case, the raster scan order is used for the 16 square transform units. Conventionally, the above-described partitioning scheme is applied in a case that the partition type of the target coding unit is a non-square partition.

The scan order is thus different for square partition and non-square partition as partition types of the target coding unit.

According to the configuration described above, in contrast, in a case that the partition type of the coding unit is a square partition, that is, in a case that the target prediction unit has a square shape, the target transform unit is split using a rectangular partitioning scheme.

Accordingly, the advantage of uniform scan order for square partition and non-square partition may be achieved.

An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include a split into asymmetric partitions that are prediction units having different sizes and a split into symmetric partitions that are prediction units having the same size. The image decoding device includes coefficient decoding means for decoding, in a case that a partition type of a target prediction unit, which is a prediction unit to be decoded, is a split into asymmetric partitions, transform coefficients by referring to different contexts for small and large prediction units obtained by the split.

A small prediction unit obtained by asymmetric partitioning may possibly include an edge, and is likely to include a transform coefficient. On the other hand, a large prediction unit is less likely to include a transform coefficient. A different context is used for the target transform unit depending on whether the target transform unit is included in the small prediction unit or the large prediction unit. Accordingly, variable length decoding may be performed in accordance with the probability of occurrence of the transform coefficient in each region.

An image encoding device according to an aspect of the present invention is an image encoding device for encoding information for restoring an image for each coding unit to generate encoded image data. The image encoding device includes encoding means for encoding codes assigned to combinations of sizes of prediction units and prediction schemes to be applied to the coding units, the encoding means encoding a shorter code for a combination of a coding unit with a size less than or equal to a predetermined value and a prediction scheme for intra-frame prediction, than codes assigned to combinations other than the combination.

An image encoding device including each of the configurations corresponding to the image decoding devices described above also falls within the scope of the present invention. An image encoding device having the configuration described above may achieve advantages similar to those of an image decoding device according to an aspect of the present invention.

An image decoding device according to an aspect of the present invention is an image decoding device for decoding encoded data to restore an image in a prediction unit using a prediction scheme for any inter-frame prediction out of uni-prediction in which one reference image is referred to and bi-prediction in which two reference images are referred to. The image decoding device includes bi-prediction restriction means for imposing restriction of bi-prediction on the basis of bi-prediction restriction information included in the encoded data, the bi-prediction restriction information being information indicating a size of a prediction unit to be subject to bi-prediction restriction.

According to the configuration described above, if an image encoding device encodes an image by adaptively encoding bi-prediction restriction information in accordance with a purpose, an image decoding device may be able to impose restriction of bi-prediction in accordance with the purpose. This achieves the advantage of fine adjustment in accordance with the resolution of an image or the performance of the image encoding device/image decoding device.

The image decoding device according to the aspect of the present invention preferably includes restriction information decoding means for decoding the bi-prediction restriction information in a case that a bi-prediction restriction flag that is a flag included in the encoded data and indicating whether or not to impose restriction of bi-prediction indicates restriction of bi-prediction.

The configuration described above enables adaptive bi-prediction restriction in accordance with an explicit flag from an image encoding device. Accordingly, the image decoding device may be able to perform a bi-prediction restriction process in accordance with the purpose intended by the image encoding device.

In the image decoding device according to the aspect of the present invention, preferably, the bi-prediction restriction flag is set in accordance with at least one of the degree of complexity of a stream of the encoded data and the performance of the image decoding device that decodes the encoded data.

As described above, the bi-prediction restriction flag is a flag indicating whether or not to impose restriction of bi-prediction. The bi-prediction restriction flag is set by an image encoding device in accordance with at least one of the degree of complexity of a stream of encoded data and the performance of an image decoding device. Examples of the index of the degree of complexity of a stream of encoded data and the performance of an image decoding device include level limits specified in H.264/AVC. In the level limits, the speed at which a decoder decodes a bit stream and the like are specified. The level limits include two kinds of levels, namely, integer levels and sub-levels (levels with the numbers to the right of the decimal point). The integer levels specify rough ranges, and levels 1 to 5 are specified.

For example, level 4 corresponds to the HDTV (High Definition Television) resolution of 1080p, and level 5 corresponds to the resolution of 4k.

In addition, sub-levels specify more detailed specifications of the respective integer levels.

Here, the PU size to be subject to constraints and the prediction unit (PU) to be subject to bi-prediction restriction differ depending on the level. For example, at level 4 (HD), preferably, 4×4 PU are subject to constraints and 8×4 PU and 4×8 PU are subject to bi-prediction restriction. At Level 5 (4k), preferably, 8×4 PU and 4×8 PU are subject to constraints and 8×8 PU are subject to bi-prediction restriction.

Furthermore, preferably, such restriction of bi-prediction is explicitly specified by an image encoding device.

According to the configuration described above, in a case that an image encoding device sets a bi-prediction restriction flag and bi-prediction restriction information for encoded data in accordance with the level, an image decoding device may be able to impose restriction of bi-prediction on the basis of the bi-prediction restriction flag and the bi-prediction restriction information.

That is, an image decoding device may be able to impose restriction of bi-prediction in accordance with the specification of the restriction of bi-prediction that is explicitly set by an image encoding device.

In this way, the restriction of bi-prediction based on bi-prediction restriction information in accordance with the determination result of the bi-prediction restriction flag may achieve the advantage of adaptive restriction of bi-prediction in accordance with the degree of complexity of a stream and/or the performance (level) of an image decoding device.

An image decoding device according to an aspect of the present invention is an image decoding device for decoding encoded data to restore an image in a prediction unit using a prediction scheme for any inter-frame prediction out of uni-prediction in which one reference image is referred to and bi-prediction in which two reference images are referred to. A size that can be taken by the prediction unit is defined in accordance with the size of a coding unit, which is the unit of coding. The image decoding device includes bi-prediction restriction means for imposing restriction of bi-prediction in accordance with the value of a flag indicating a minimum size of a coding unit included in the encoded data.

For example, in cited document 1, the minimum size of the coding unit (CU) is specified using a parameter called "log2_min_coding_block_size_minus3". In addition, the shape (size) of the prediction unit (PU) is defined with consideration of also the size of the coding unit (CU). If the minimum CU size is 8×8, 8×4 PU, 4×8 PU, and 4×4 PU, into which an 8×8 CU is split, are available in addition to 8×8 PU. If the minimum CU size is 16×16, 8×8 PU is available whereas 8×4 PU, 4×8 PU, and 4×4 PU are not available.

As described above, preferably, restriction of bi-prediction is performed in accordance with the so-called level, which is set in accordance with at least one of the degree of complexity of a stream of encoded data and the performance of an image decoding device.

The restriction of bi-prediction based on a minimum CU size allows the PU size to be subject to bi-prediction restriction and a PU size to be subject to restriction of uni-prediction itself to be balanced. That is, an unbalanced situation of restriction on the amount of processing and the amount of transfer for bi-prediction and no restriction on the amount of processing and the amount of transfer for uni-prediction may be eliminated.

As seen in cited document 1, the minimum CU size is specified as an existing parameter. By exploiting such an existing parameter, it becomes possible to easily impose restriction of bi-prediction without causing an increase in the amount of coding, compared to the case that an additional flag special for bi-prediction restriction is used.

In the image decoding device according to the aspect of the present invention, preferably, the bi-prediction restriction means described above imposes the restriction of bi-prediction in a case that a bi-prediction restriction flag that is a flag indicating whether or not to impose restriction of bi-prediction indicates restriction of bi-prediction.

According to the configuration described above, restriction of bi-prediction may be imposed based on a prediction restriction flag set by an image encoding device. Accordingly, restriction of bi-prediction may be imposed adaptively in accordance with the specification explicitly set by an image encoding device.

In the image decoding device according to the aspect of the present invention, the bi-prediction restriction flag is preferably set in accordance with at least one of the degree of complexity of a stream of the encoded data and the performance of an image decoding device that decodes the encoded data.

The configuration described above enables adaptive bi-prediction restriction in accordance with the level.

In the image decoding device according to the aspect of the present invention, preferably, the bi-prediction restriction flag may take at least three values, and the bi-prediction restriction means described above imposes restriction of bi-prediction in accordance with the value of the bi-prediction restriction flag.

According to the configuration described above, the restriction of bi-prediction may be finely adjusted in accordance with the value of the bi-prediction restriction flag. For example, if three values are set to the bi-prediction restriction flag, the following restriction of bi-prediction may be contemplated. The following three cases may be expressed with a bi-prediction restriction flag that may take three values: no restriction of bi-prediction on a CU having a predetermined size, restriction of bi-prediction for PUs other than 2N×2N PU, and restriction of bi-prediction for N×N PU.

More specifically, any of the following cases may be selected in accordance with the value of the bi-prediction restriction flag: no restriction of bi-prediction on a 16×16 CU, bi-prediction restricted only for 8×8 PU, and bi-prediction restricted for 8×8 PU, 16×8 PU, and 8×16 PU.

In the image decoding device according to the aspect of the present invention, preferably, the bi-prediction restriction flag also serves as a flag that disables an inter prediction unit of a minimum size defined in advance for a coding unit to be processed.

In the configuration described above, in order to disable an inter prediction unit of a minimum PU (N×N), the bi-prediction restriction flag may be set so as to indicate restriction of bi-prediction, or vice versa.

For example, as a flag indicating whether or not to allow an inter prediction unit of a minimum PU (N×N), inter_4×4_enabled_flag is specified in cited document 1. If the size of CU is 8×8 or larger or if inter_4×4_enabled_flag is equal to "1", N×N inter prediction is allowed.

Here, assuming !inter_4×4_enabled_flag ("!" represents the logical negation operator), the flag with this configuration can be a flag indicating whether or not to disable inter 4×4.

The restriction of bi-prediction is imposed on a PU with a minimum size (N×N) that may be taken for a predetermined CU size may be implemented using a flag having the configuration described above. In this case, the number of flags may be reduced, and restriction of bi-prediction may be imposed in a relatively easy way.

An image decoding device according to an aspect of the present invention is an image decoding device for decoding encoded data to restore an image in a prediction unit using a prediction scheme for any inter-frame prediction out of uni-prediction in which one reference image is referred to and bi-prediction in which two reference images are referred to. The image decoding device includes merge candidate deriving means for deriving merge candidates from a motion compensation parameter used for decoding of a decoded prediction unit, and bi-prediction restriction means for imposing restriction of bi-prediction on at least some of the derived merge candidates.

Bi-prediction requires a larger amount of processing than uni-prediction. Uni-prediction is a prediction scheme that uses one image to be referred to in inter-frame prediction, and bi-prediction is a prediction scheme that uses two images to be referred to in inter-frame prediction. The image or images to be referred to may be previous or future image or images in time with respect to the target frame.

According to the configuration described above, even in a case that a merge process is used for the decoding of a prediction image in a target prediction unit, restriction of bi-prediction may be imposed, and the decoding process for the target prediction unit may be simplified. The term "restriction" is used to include omitting some of the processes involved in bi-prediction, converting a bi-predictive motion vector into anything that may further reduce processing load, and not performing (prohibiting) the processing of bi-prediction.

The restriction of bi-prediction described above on at least some of the derived merge candidates may achieve the advantage of reduction in the amount of processing that can be a bottleneck in decoding processing.

In the image decoding device according to the aspect of the present invention, preferably, the bi-prediction restriction means described above converts the bi-prediction into uni-prediction in the restriction of bi-prediction.

In the configuration described above, the term "restriction of bi-prediction" refers to the conversion of bi-prediction into uni-prediction so that bi-prediction is not performed. As already discussed, uni-prediction involves less processing complexity and a smaller amount of processing than bi-prediction.

The term "conversion of bi-prediction into uni-prediction" refers to restriction of the number of reference images to be referred to from 2 to 1.

According to the configuration described above, in a case that a merge process is used for the decoding of a prediction image in a target prediction unit, the restriction of bi-prediction described above may simplify the decoding process for the target prediction unit.

In the image decoding device according to the aspect of the present invention, preferably, the bi-prediction restriction means described above imposes the restriction of bi-prediction described above on, among the derived merge candidates, a bi-predictive merge candidate with two motion vectors at least one of which is a non-integer motion vector including a non-integer component.

According to the configuration described above, a merge candidate with two motion vectors that are non-integer motion vectors are to be subject to bi-prediction restriction. On the other hand, a merge candidate that is an integer motion vector does not need to be subject to bi-prediction restriction.

The term "non-integer motion vector", as used herein, refers to a motion vector at least some components of which are represented in non-integer format when pixel positions are expressed as integer values.

An interpolation filter for generating an interpolated image is applied to non-integer motion vectors. Thus, the processing load tends to increase. In contrast, such a filter process is not required for integer motion vectors.

Since an interpolation filter process is not required for integer motion vectors, the range to be referred to during motion compensation may be the same as the target block. For this reason, in the case of integer motion vectors, bi-prediction will not cause an excessive increase in the amount of transfer and the amount of processing.

According to the configuration described above, bi-/uni-prediction conversion may be omitted for integer motion vectors for which a large load is imposed even without restriction of bi-prediction. The load imposed by a bi-prediction restriction process for bi-/uni-prediction conversion of merge candidates may be reduced.

In the image decoding device according to the aspect of the present invention, preferably, the bi-prediction restriction means described above converts at least some of non-integer components included in non-integer motion vectors for, among the derived merge candidates, bi-predictive merge candidates including non-integer motion vectors that include non-integer components into integer components.

In the configuration described above, the term "restriction of bi-prediction" refers to restriction of bi-prediction due to non-integer motion vectors.

As described above, there is no need to apply an interpolation filter to integer motion vectors. The conversion of non-integer motion vector components of bi-predictive merge candidates into integers may make the range to be referred to during motion compensation more match the range of the target block. Note that if all the components are converted into integers, the range to be referred to during motion compensation matches the target block.

The conversion into integers may be applied to, in two-dimensional (X, Y) coordinate notation, only the X coordinate or the Y coordinate or both the X coordinate and the Y coordinate. Alternatively, only one of the L0 and L1 lists may be subjected to the conversion into integers.

Bi-prediction with the integer motion vectors obtained in the way described above will reduce an increase in the amount of transfer and the amount of processing, compared to bi-prediction with non-integer motion vectors.

In the image decoding device according to the aspect of the present invention, preferably, the bi-prediction restriction means described above imposes the restriction of bi-prediction described above on a predetermined number of merge candidate among the derived merge candidates.

According to the configuration described above, restriction of bi-prediction may be imposed on some of the derived merge candidates. For example, if the order of derivation of merge candidates is determined in advance or if the order of derived merge candidates to be stored in a list is determined in advance, the first N merge candidates may be subject to bi-prediction restriction, where N is a positive integer and may be equal to 1.

Accordingly, processing load may be reduced, compared to the case that restriction of bi-prediction is imposed on all the merge candidates.

In the image decoding device according to the aspect of the present invention, preferably, the bi-prediction restriction means described above imposes the restriction of bi-prediction described above in a case that the derived merge candidates do not include uni-predictive merge candidates, the number of which is greater than or equal to a predetermined value.

In a case that the merge candidate list includes uni-predictive merge candidates, the number of which is greater than or equal to a predetermined value, in some cases, even if bi-prediction is allowed, processing load may not greatly increase as a whole. The configuration described above may omit the bi-prediction restriction process in such cases, suppressing the increase in the load imposed by the bi-prediction restriction process.

In the image decoding device according to the aspect of the present invention, preferably, the merge candidate deriving means described above derives all merge candidates, and then the bi-prediction restriction means described above imposes the restriction of bi-prediction described above on the derived merge candidates.

According to the configuration described above, first, a merge candidate list is generated. Such a process is generally used in the derivation of merge candidates. According to the configuration described above, it is not required to change such a general merge candidate list generation process, preventing an increase in complexity of processing logic.

In the image decoding device according to the aspect of the present invention, preferably, the merge candidate deriving means described above performs a process for deriving merge candidates, and, in parallel with the merge candidate derivation process, the bi-prediction restriction means described above performs a process for imposing the restriction of bi-prediction described above on the derived merge candidates.

According to the configuration described above, restriction of bi-prediction is imposed on a merge candidate before the merge candidate is stored in the merge candidate list. Furthermore, this process is performed in parallel to the process for deriving merge candidates.

Such parallel execution of the processes may increase processing efficiency. The parallel execution will be effective particularly for low tolerance for processing latency.

Furthermore, in the case of restriction of bi-prediction using the bi-/uni-prediction conversion of merge candidates, the uniqueness of merge candidates is checked. This allows a merge candidate list to be created while preventing the addition of redundant merge candidates, compared to the case that a merge candidate list is generated, the uniqueness of merge candidates is checked, and then bi-/uni-prediction conversion is performed.

An image encoding device according to an aspect of the present invention is an image encoding device for encoding information for restoring an image for each coding unit to generate encoded image data. The image encoding device includes encoding means for encoding, from encoded data, a bi-prediction restriction flag that is a flag indicating whether or not to impose restriction of bi-prediction within inter-frame prediction of uni-prediction in which one reference image is referred to and bi-prediction in which two reference images are referred to, in accordance with at least one of the degree of complexity of a stream of the encoded data and the performance of an image decoding device that decodes the encoded data.

A data structure of encoded image data according to an aspect of the present invention is a data structure of encoded image data obtained by encoding information for restoring an image for each coding unit using an image encoding device. The data structure includes a bi-prediction restriction flag that is a flag indicating whether or not to impose restriction of bi-prediction within inter-frame prediction of uni-prediction in which one reference image is referred to and bi-prediction in which two reference images are referred to, in accordance with at least one of the degree of complexity of a stream of the encoded data and the performance of an image decoding device that decodes the encoded data.

An image encoding device having each of the configuration corresponding to the image decoding devices described above, and a data structure of encoded image data generated by the image encoding device also fall within the scope of the present invention. An image encoding device and a data structure of encoded image data having the configuration described above may achieve advantages similar to those of an image decoding device according to an aspect of the present invention.

(Hardware-Based Implementation and Software-Based Implementation)

The respective blocks of the video decoding device 1 and the video encoding device 2 described above may be implemented in hardware as a logic circuit formed on an integrated circuit (IC chip) or may be implemented in software using a CPU (Central Processing Unit).

In the latter case, each of the devices includes a CPU for executing instructions in a program that implements individual functions, a ROM (Read Only Memory) having the program stored therein, a RAM (Random Access Memory) into which the program is loaded, a storage device (recording medium), such as a memory, for storing the program and various types of data, and so on. The object of the present invention may also be achieved by supplying to each of the devices described above a recording medium on which program code (execute form program, intermediate code program, source program) of a control program for each of the devices described above, which is software implementing the functions described above, is recorded in a computer-readable form, and by reading and executing the program code recorded on the recording medium using a computer (or a CPU or an MPU).

Examples of the recording medium include tapes such as a magnetic tape and a cassette tape, disks including magnetic disks such as a floppy (registered trademark) disk and a hard disk, and optical disks such as a CD-ROM (Compact Disc Read-Only Memory), an MO disc (Magneto-Optical disc), an MD (Mini Disc), a DVD (Digital Versatile Disc), a CD-R (CD Recordable), and a blu-ray disc (Blu-ray Disc: registered trademark), cards such as an IC card (including a memory card) and an optical card, semiconductor memories such as a mask ROM, an EPROM (Erasable Programmable Read-Only Memory), an EEPROM (registered trademark) (Electrically Erasable and Programmable Read-Only Memory), and a flash ROM, and logic circuits such as a PLD (Programmable logic device) and an FPGA (Field Programmable Gate Array).

In addition, each of the devices described above may be configured to be connectable to a communication network, and may be supplied with the program code described above via the communication network. The communication network is not particularly limited so long as it can transmit program code. For example, the Internet, an intranet, an extranet, a LAN (Local Area Network), an ISDN (Integrated Services Digital Network), a VAN (Value-Added Network), a CATV (Community Antenna television/Cable Television) communication network, a virtual private network, a telephone network, a mobile communication network, a satellite communication network, or the like may be used. A transmission medium forming the communication network may be a medium capable of transmitting program code, and is not limited to any specific configuration or type. A wired transmission medium, such as IEEE (Institute of Electrical and Electronic Engineers) 1394, USB, power line carrier, cable TV lines, telephone lines, or ADSL (Asymmetric Digital Subscriber Line) lines, or a wireless transmission medium, such as infrared type, for example, IrDA (Infrared Data Association) or a remote control, Bluetooth (registered trademark), IEEE 802.11 radio, HDR (High Data Rate), NFC (Near Field Communication), DLNA (Digital Living Network Alliance), a mobile phone network, a satellite network, or a terrestrial digital network, may be used. The present invention may also be implemented in the form of a computer data signal embodied in a carrier wave in which the program code described above is implemented by electronic transmission.

The present invention is not limited to the foregoing embodiments, and a variety of changes may be made within the scope defined by the claims. Embodiments which can be achieved by combinations of technical means modified as appropriate within the scope defined by the claims are also included in the technical scope of the present invention.

INDUSTRIAL APPLICABILITY

The present invention is suitable for use in image decoding devices for decoding encoded data obtained by encoding image data, and image encoding devices for generating encoded data by encoding image data. The present invention is also suitable for use in data structures of encoded data generated by image encoding devices and referred to by image decoding devices.

REFERENCE SIGNS LIST 1 video decoding device
10 decoding module
11 CU information decoding unit
12 PU information decoding unit
13 TU information decoding unit
16 frame memory
111 CU prediction mode determination unit
112 PU size determination unit
121 motion compensation parameter derivation unit (bi-prediction restriction means, candidate determining means, estimating means)
122 merge candidate priority information storage unit
123 reference frame setting information storage unit
131 TU partition setting unit
132 transform coefficient restoration unit
1011 CU prediction mode decoding unit (decoding means, changing means)
1012 binarization information storage unit
1013 context storage unit
1014 probability setting storage unit
1021 motion information decoding unit (restriction information decoding means)
1031 region split flag decoding unit 1032 determination information decoding unit (coefficient decoding means)
1033 transform coefficient decoding unit (coefficient decoding means)
1311 target region setting unit
1312 split determination unit
1313 sub-region setting unit (transform unit splitting means, splitting means)
1314 transform size determination information storage unit
2 video encoding device
21 encoding setting unit
23 prediction image generation unit
25 frame memory
27 transform/quantization unit
29 encoded data generation unit (encoding means)
1211 skip motion compensation parameter derivation unit
1212 merge motion compensation parameter derivation unit (merge candidate derivation unit)
1213 basic motion compensation parameter derivation unit
1218 bi-prediction restricted PU determination unit
1219 bi-prediction/uni-prediction conversion unit
1220 motion-vector-to-integer conversion unit
1212A neighboring merge candidate derivation unit
1212B temporal merge candidate derivation unit
1212C unique candidate derivation unit
1212D combined bi-predictive merge candidate derivation unit
1212E non-scaled bi-predictive merge candidate derivation unit
1212F zero vector merge candidate derivation unit
1212G merge candidate derivation control unit
1212H merge candidate storage unit
1212J merge candidate selection unit
1213A neighboring motion vector candidate derivation unit
1213B temporal motion vector candidate derivation unit
1213F zero vector merge candidate derivation unit
1213G motion vector candidate derivation control unit
1213H motion vector candidate storage unit
12131 motion vector candidate selection unit
1213J motion vector restoration unit
1218A bi-prediction restricted PU determination unit
1219A bi-prediction/uni-prediction conversion unit (bi-prediction restriction means)
1219B bi-prediction/uni-prediction conversion unit (bi-prediction restriction means)
3012 merge motion compensation parameter generation unit
3013 basic motion compensation parameter generation unit
3013A motion vector candidate selection unit
3013B differential motion vector calculation unit
3014 motion compensation parameter restriction unit

The invention claimed is:

1. A method for decoding an image, the method comprising:
a step to determine whether or not a skip mode is applied to a prediction unit by using a skip flag;
a step to decode a merge flag indicating whether or not a merge mode is applied to the prediction unit, if the non-skip mode is applied;
a step to decode a merge index, if the skip mode is applied or the merge mode is applied;
a step to derive motion compensation parameters for the merge mode using the merge index, wherein the motion compensation parameters include at least a first prediction list utilization flag indicating whether or not a first reference prediction list is to be used, and a second prediction list utilization flag indicating whether or not a second reference prediction list is to be used;
a step to generate a prediction image for inter prediction using the motion compensation parameters; and
a step to convert a value of the second prediction list utilization flag being equal to zero, which indicate that the second reference prediction list is not to be used, if (i) a prediction unit is a merge prediction unit, (ii) a value of the first prediction list utilization flag is equal to one, which indicates that the first reference prediction list is to be used, (iii) the value of the second prediction list utilization flag is equal to one, which indicates that the second reference prediction list is to be used, and (iv) the sum of a width and a height of the prediction unit is equal to a predetermined value.

2. An image decoding apparatus comprising:
a memory and
a processor, wherein the processor configured to perform steps of:
determining whether or not a skip mode is applied to a prediction unit by using a skip flag;
decoding a merge flag indicating whether or not a merge mode is applied to the prediction unit, if the non-skip mode is applied;
decoding a merge index, if the skip mode is applied or the merge mode is applied;
deriving motion compensation parameters for the merge mode using the merge index, wherein the motion compensation parameters include at least a first prediction list utilization flag indicating whether or not a first reference prediction list is to be used, and a second prediction list utilization flag indicating whether or not a second reference prediction list is to be used;
generating a prediction image for inter prediction using the motion compensation parameters; and
converting a value of the second prediction list utilization flag being equal to zero, which indicates that the second reference prediction list is not to be used, if (i) the prediction unit is a merge prediction unit, (ii) a value of the first prediction list utilization flag is equal to one, which indicates that the first reference prediction list is to be used, (iii) the value of the second prediction list utilization flag is equal to one, which indicates that the second reference prediction list is to be used, and (iv) the sum of a width and a height of the prediction unit is equal to a predetermined value.

3. A method for encoding an image, the method comprising:
a step to determine whether or not a skip mode is applied to a prediction unit by using a skip flag;
a step to decode a merge flag indicating whether or not a merge mode is applied to the prediction unit, if the non-skip mode is applied;
a step to decode a merge index, if the skip mode is applied or the merge mode is applied;
a step to derive motion compensation parameters for the merge mode using the merge index, wherein the motion compensation parameters include a least a first prediction list utilization flag indicating whether or not a first reference prediction list is to be used, and a second prediction list utilization flag indicating whether or not a second reference prediction list is to be used;

a step to generate a prediction image for inter prediction using the motion compensation parameters; and a step to convert a value of the second prediction list utilization flag being equal to zero, which indicate that the second reference prediction list is not to be used, if (i) the prediction unit is a merge prediction unit, (ii) a value of the first prediction list utilization flag is equal to one, which indicates that the first reference prediction list is to be used, (iii) the value of the second prediction list utilization flag is equal to one, which indicates that the second reference prediction list is to be used, and (iv) the sum of a width and a height of the prediction unit is equal to a predefined value.

4. An image encoding apparatus comprising:

a memory and a processor, wherein the processor configured to perform steps of:

determining whether or not a skip mode is applied to a prediction unit by using a skip flag;

decoding a merge flag indicating Nether not a merge mode is applied to the prediction unit, if the non-skip mode is applied;

decoding a merge index, if the skip mode is applied or the merge mode is applied;

deriving motion compensation parameters for the merge mode using the merge index, wherein the motion compensation parameters includes at least a first prediction list utilization flag indicating whether or not a first reference prediction list is to be used, and a second prediction list utilization flag indicating whether or not a second reference prediction list is to be used;

generating a prediction image for inter prediction using the motion compensation parameters; and converting a value of the second prediction list utilization flag being equal to zero, which indicates that the second reference prediction list is not to be used, if (i) the prediction unit is a merge prediction unit, (ii) a value of the first prediction list utilization flag is equal to one, which indicates that the first reference prediction list is to be used, (iii) the value of the second prediction list utilization flag is equal to one, which indicates that the second reference prediction list is to be used, and (iv) the sum of a width and a height of the prediction unit is equal to a predetermined value.

\* \* \* \* \*

UNITED STATES PATENT AND TRADEMARK OFFICE
CERTIFICATE OF CORRECTION

PATENT NO. : 10,194,169 B2
APPLICATION NO. : 15/642574
DATED : January 29, 2019
INVENTOR(S) : Tomoyuki Yamamoto et al.

Page 1 of 1

It is certified that error appears in the above-identified patent and that said Letters Patent is hereby corrected as shown below:

In the Claims

In Claim 3, at Column 120, Line 56:
Please replace "decode" with --encode--.

In Claim 3, at Column 120, Line 59:
Please replace "decode" with --encode--.

In Claim 4, at Column 121, Line 20:
Please replace "decoding" with --encoding--.

In Claim 4, at Column 121, Line 23:
Please replace "decoding" with --encoding--.

Signed and Sealed this
Eighteenth Day of March, 2025

Coke Morgan Stewart
*Acting Director of the United States Patent and Trademark Office*